(12) United States Patent
Fonte et al.

(10) Patent No.: US 11,033,044 B1
(45) Date of Patent: Jun. 15, 2021

(54) RAPIDLY COOLING FOOD AND DRINKS

(71) Applicant: Coldsnap, Corp., Billerica, MA (US)

(72) Inventors: Matthew Fonte, Concord, MA (US);
John Heymans, Hampstead, NH (US);
Nicholas Fonte, Sudbury, MA (US);
Robert Devaney, Auburndale, MA (US); Ian McGinty, Chelmsford, MA (US); Vincent Weaver, Brighton, MA (US); Benjamin Fichera, Newburyport, MA (US)

(73) Assignee: ColdSnap, Corp., Billerica, MA (US)

( * ) Notice: Subject to any disclaimer, the term of this patent is extended or adjusted under 35 U.S.C. 154(b) by 0 days.

(21) Appl. No.: 17/061,986

(22) Filed: Oct. 2, 2020

Related U.S. Application Data

(63) Continuation of application No. 16/824,616, filed on Mar. 19, 2020.

(60) Provisional application No. 62/961,495, filed on Jan. 15, 2020.

(51) Int. Cl.
| | |
|---|---|
| *B65D 85/80* | (2006.01) |
| *A23G 9/12* | (2006.01) |
| *A23G 9/22* | (2006.01) |
| *A23G 9/28* | (2006.01) |
| *A23G 9/30* | (2006.01) |
| *A23G 9/08* | (2006.01) |
| *B65D 85/804* | (2006.01) |
| *F25D 25/00* | (2006.01) |

(52) U.S. Cl.
CPC .............. *A23G 9/12* (2013.01); *A23G 9/083* (2013.01); *A23G 9/221* (2013.01); *A23G 9/224* (2013.01); *A23G 9/281* (2013.01); *A23G 9/30* (2013.01); *B65D 85/804* (2013.01); *B65D 85/8043* (2013.01); *F25D 25/005* (2013.01)

(58) Field of Classification Search
CPC .............. B65D 85/8043; B65D 85/804; B65D 85/8046; B65D 58/8043; A23G 9/10; A23G 9/106; A23G 9/12; A23G 9/224; B01F 15/00; B01F 7/00; B01F 7/161; B01F 7/1695; B01F 7/0045; B01F 5/0604
See application file for complete search history.

(56) References Cited

U.S. PATENT DOCUMENTS

| | | | |
|---|---|---|---|
| 1,438,523 A | 12/1922 | Duren | |
| 1,555,701 A | 9/1925 | Prichard et al. | |
| 1,944,114 A | 1/1934 | Snowlund | |
| 2,350,534 A | 6/1944 | Arthur | |

(Continued)

FOREIGN PATENT DOCUMENTS

| | | |
|---|---|---|
| CN | 203314023 | 12/2013 |
| CN | 16492721 | * 3/2017 |

(Continued)

OTHER PUBLICATIONS

Allpax, "Shaka Retorts 1300 and 1600," 2020, retrieved Apr. 16, 2020 from URL <https://www.allpax.com/products/production-shaka-retorts/>, 4 pages.

(Continued)

*Primary Examiner* — Ericson M Lachica
(74) *Attorney, Agent, or Firm* — Fish & Richardson P.C.

(57) ABSTRACT

Systems and methods have demonstrated the capability of rapidly cooling the contents of pods containing the ingredients for food and drinks.

14 Claims, 66 Drawing Sheets

(56) References Cited

U.S. PATENT DOCUMENTS

| | | | |
|---|---|---|---|
| 2,518,758 A | 8/1950 | Cook | |
| 2,541,814 A | 2/1951 | Gaddini | |
| 2,577,916 A | 12/1951 | Rollman | |
| 3,061,280 A | 10/1962 | Kraft et al. | |
| 3,393,900 A | 7/1968 | Wagner et al. | |
| 3,635,147 A | 1/1972 | Lee | |
| 3,896,959 A | 7/1975 | Roy | |
| 3,914,673 A | 10/1975 | Wallin | |
| 3,951,289 A | 4/1976 | Landen | |
| 4,110,476 A | 8/1978 | Rhodes | |
| 4,162,855 A | 7/1979 | Bender | |
| 4,359,283 A * | 11/1982 | McClellan | A47J 43/1018 366/247 |
| 4,408,690 A | 10/1983 | Ferrero | |
| 4,538,427 A | 9/1985 | Cavalli | |
| 4,563,880 A | 1/1986 | Cipelletti | |
| 4,568,192 A | 2/1986 | Kudermann | |
| 4,573,329 A | 3/1986 | Cavalli | |
| 4,632,566 A | 12/1986 | Masel et al. | |
| 4,635,560 A | 1/1987 | Ballantyne | |
| 4,664,529 A | 5/1987 | Cavalli | |
| 4,784,886 A | 11/1988 | Wissgott | |
| 4,796,440 A | 1/1989 | Shiotani et al. | |
| 4,827,732 A | 5/1989 | Suyama et al. | |
| 4,913,645 A | 4/1990 | Daouse et al. | |
| 4,926,390 A * | 5/1990 | Murzsa | B01F 7/1695 220/298 |
| 4,993,238 A | 2/1991 | Inagaki | |
| 5,264,237 A | 11/1993 | Traitler et al. | |
| 5,331,820 A | 7/1994 | Faries et al. | |
| 5,343,710 A | 9/1994 | Cathenaut et al. | |
| 5,363,746 A | 11/1994 | Gordon | |
| 5,435,143 A | 7/1995 | Heinrich | |
| 5,447,036 A | 9/1995 | Heinrich | |
| 5,533,800 A | 7/1996 | Stiegelmann et al. | |
| 5,549,042 A | 8/1996 | Bukoschek et al. | |
| 5,556,659 A | 9/1996 | De Pedro et al. | |
| 5,568,729 A | 10/1996 | Heinrich et al. | |
| 5,571,282 A | 11/1996 | Earle | |
| 5,603,965 A | 2/1997 | Daouse | |
| 5,823,675 A | 10/1998 | Myerly | |
| 5,834,739 A | 11/1998 | Lockwood et al. | |
| 5,843,512 A | 12/1998 | Daouse et al. | |
| 5,879,731 A | 3/1999 | Beckett et al. | |
| 5,888,562 A | 3/1999 | Hansen et al. | |
| 5,888,567 A | 3/1999 | Daouse | |
| 5,932,275 A | 8/1999 | Nalur | |
| 5,967,381 A | 10/1999 | Van Zeeland et al. | |
| 6,004,606 A | 12/1999 | French et al. | |
| 6,012,383 A | 1/2000 | Lande | |
| 6,045,836 A | 4/2000 | Saunier et al. | |
| 6,060,094 A | 5/2000 | Nalur | |
| 6,071,546 A | 6/2000 | Nalur | |
| 6,089,747 A | 7/2000 | Huang | |
| 6,174,157 B1 | 1/2001 | Daouse et al. | |
| 6,194,014 B1 | 2/2001 | Busse et al. | |
| 6,210,739 B1 | 4/2001 | Nalur | |
| 6,221,409 B1 | 4/2001 | Bueno Ceresuela | |
| 6,251,455 B1 | 6/2001 | Thomas | |
| 6,251,456 B1 | 6/2001 | Maul et al. | |
| 6,267,073 B1 | 7/2001 | Busse et al. | |
| 6,272,974 B1 | 8/2001 | Pascotti et al. | |
| 6,280,783 B1 | 8/2001 | Blaschke et al. | |
| 6,284,294 B1 | 9/2001 | French et al. | |
| 6,299,923 B1 | 10/2001 | Meziane | |
| 6,338,863 B1 | 1/2002 | Amiel et al. | |
| 6,340,488 B1 | 1/2002 | French et al. | |
| 6,379,724 B1 | 4/2002 | Best et al. | |
| 6,399,134 B1 | 6/2002 | Best et al. | |
| 6,413,563 B1 | 7/2002 | Blaschke et al. | |
| 6,431,395 B1 | 8/2002 | San Martin et al. | |
| 6,454,455 B1 * | 9/2002 | Jungvig | A47J 43/27 366/129 |
| 6,479,085 B1 | 11/2002 | Archibald | |
| 6,524,634 B2 | 2/2003 | Busse et al. | |
| 6,524,635 B1 | 2/2003 | Aebi | |
| 6,531,169 B2 | 3/2003 | Best et al. | |
| 6,548,097 B1 | 4/2003 | Best et al. | |
| 6,565,902 B2 | 5/2003 | Ruano Del Campo et al. | |
| 6,579,375 B2 | 6/2003 | Beckett et al. | |
| 6,592,928 B2 | 7/2003 | Makela et al. | |
| 6,616,963 B1 | 9/2003 | Zerby et al. | |
| 6,623,784 B2 | 9/2003 | Zerby et al. | |
| 6,627,239 B1 | 9/2003 | Gavie et al. | |
| 6,645,538 B2 | 11/2003 | Best et al. | |
| 6,689,406 B2 | 2/2004 | Kuehl et al. | |
| 6,713,101 B2 | 3/2004 | Lometillo et al. | |
| 6,726,944 B2 | 4/2004 | Blaschke et al. | |
| 6,739,475 B2 | 5/2004 | San Martin et al. | |
| 6,758,056 B1 | 7/2004 | Cathenaut et al. | |
| 6,790,467 B2 | 9/2004 | Kostival et al. | |
| 6,818,238 B2 | 11/2004 | Napolitano et al. | |
| 6,820,765 B2 | 11/2004 | Pahl | |
| 6,824,808 B2 | 11/2004 | Best et al. | |
| 6,835,406 B1 | 12/2004 | Wurzel et al. | |
| 6,861,082 B2 | 3/2005 | Laffont et al. | |
| 6,890,577 B2 | 5/2005 | Vaghela et al. | |
| 6,936,794 B2 | 8/2005 | Zhang et al. | |
| 6,942,885 B2 | 9/2005 | Ross et al. | |
| 6,971,248 B1 | 12/2005 | Wiggs | |
| 7,211,283 B2 | 5/2007 | Jones et al. | |
| 7,407,681 B2 | 8/2008 | Marchon et al. | |
| 7,451,613 B2 | 11/2008 | Barraclough et al. | |
| 7,513,213 B2 | 4/2009 | Mange et al. | |
| 7,619,188 B2 | 11/2009 | Oghafua et al. | |
| 7,650,834 B2 | 1/2010 | Bravo | |
| 7,658,960 B2 | 2/2010 | Thomas et al. | |
| 7,727,573 B2 | 6/2010 | Vaghela et al. | |
| 7,730,831 B2 | 6/2010 | Mange et al. | |
| 7,736,681 B2 | 6/2010 | Belzowski et al. | |
| 7,754,260 B2 | 7/2010 | Kruik et al. | |
| 7,918,334 B2 | 4/2011 | Gaetano et al. | |
| 8,182,853 B2 | 5/2012 | Puand et al. | |
| 8,273,392 B2 | 9/2012 | Ho et al. | |
| 8,347,808 B2 | 1/2013 | Belzowski et al. | |
| 8,425,967 B2 | 4/2013 | Vaghela et al. | |
| 8,459,497 B2 | 6/2013 | Milan et al. | |
| 8,628,811 B2 | 1/2014 | Panyam et al. | |
| 8,685,477 B2 | 4/2014 | Almblad et al. | |
| 8,720,493 B2 | 5/2014 | Dose et al. | |
| 8,777,057 B2 | 7/2014 | Fiedler | |
| 8,784,091 B2 | 7/2014 | Henriet et al. | |
| 8,840,943 B2 | 9/2014 | Amend | |
| 8,844,426 B2 | 9/2014 | Ochoa et al. | |
| 8,877,179 B2 | 11/2014 | Mercenier et al. | |
| 8,906,437 B2 | 12/2014 | Green et al. | |
| 8,936,821 B2 | 1/2015 | Ummadi et al. | |
| 8,940,352 B2 | 1/2015 | Ambrogi et al. | |
| 8,960,999 B1 | 2/2015 | Ochoa et al. | |
| 8,980,354 B2 | 3/2015 | Harlaux-Pasquier et al. | |
| 9,155,322 B2 | 10/2015 | Ricco et al. | |
| 9,237,811 B1 | 1/2016 | Panyam et al. | |
| 9,242,387 B2 | 1/2016 | Amend et al. | |
| 9,253,993 B2 | 2/2016 | Ummadi et al. | |
| 9,346,611 B1 | 5/2016 | Roberts et al. | |
| 9,351,503 B2 | 5/2016 | Amend et al. | |
| 9,351,504 B2 | 5/2016 | Ricco et al. | |
| 9,448,006 B2 | 9/2016 | Kulkarni et al. | |
| 9,572,358 B2 | 2/2017 | Whitehouse | |
| 9,573,726 B2 | 2/2017 | Danesin et al. | |
| 9,591,865 B2 | 3/2017 | Ravji et al. | |
| 9,826,756 B2 | 11/2017 | Ummadi et al. | |
| 9,861,114 B2 | 1/2018 | Lallemand et al. | |
| 9,888,706 B2 | 2/2018 | Ummadi et al. | |
| 9,913,486 B2 | 3/2018 | Nalur | |
| 10,039,298 B2 | 8/2018 | Noth et al. | |
| 10,058,833 B2 | 8/2018 | Bloch | |
| 10,111,447 B2 | 10/2018 | Noth et al. | |
| 10,117,445 B2 | 11/2018 | Imer | |
| 10,149,487 B2 | 12/2018 | Shuntich | |
| 10,279,973 B2 | 5/2019 | Butscher et al. | |
| 10,314,320 B2 | 6/2019 | Roberts et al. | |
| 10,334,868 B2 | 7/2019 | Fonte | |
| 10,358,284 B2 | 7/2019 | Fonte | |

(56) References Cited

U.S. PATENT DOCUMENTS

| | | |
|---|---|---|
| 10,368,680 B2 | 8/2019 | Ryan |
| 10,426,180 B1 | 10/2019 | Fonte |
| 10,543,978 B1 | 1/2020 | Fonte et al. |
| 10,612,835 B2 | 4/2020 | Fonte et al. |
| 10,782,049 B1 | 9/2020 | Fonte et al. |
| 2001/0052294 A1 | 12/2001 | Schmed |
| 2002/0001644 A1 | 1/2002 | Busse et al. |
| 2002/0020659 A1* | 2/2002 | Sweeney ............ B65D 85/8043 210/416.3 |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0110559 A1* | 4/2009 | Bell .................... B01F 3/04539 416/232 |
| 2009/0147618 A1 | 6/2009 | Kovacic et al. |
| 2009/0179042 A1 | 7/2009 | Milan et al. |
| 2009/0191318 A1 | 7/2009 | Cocchi |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0108696 A1* | 5/2010 | Farrell ................. B65D 1/265 220/608 |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0209562 A1 | 8/2010 | Henriet et al. |
| 2010/0209571 A1 | 8/2010 | Vaghela et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0142996 A1* | 6/2011 | Kruger ................. B65B 29/022 426/80 |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0123859 A1* | 5/2014 | Verbeek ................. A47J 31/407 99/295 |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0231562 A1* | 8/2014 | Potter ................. B01F 7/00275 241/100 |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0201810 A1* | 7/2015 | Sands ..................... B01F 7/006 241/101.8 |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0329282 A1* | 11/2015 | Bartoli ................. B01F 15/0254 426/115 |
| 2015/0351426 A1 | 12/2015 | Ricco et al. |
| 2015/0351430 A1 | 12/2015 | Pipe et al. |
| 2016/0051081 A1* | 2/2016 | Grassia ................. A47J 31/525 99/280 |
| 2016/0135479 A1 | 5/2016 | Ummadi et al. |
| 2016/0176624 A1* | 6/2016 | Talon ..................... B65D 85/73 426/115 |
| 2016/0192675 A1 | 7/2016 | Abu-Ali |

(56) References Cited

U.S. PATENT DOCUMENTS

| | | |
|---|---|---|
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrasekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0332188 A1* | 11/2016 | Agnello ............ B01F 13/0023 |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0112326 A1* | 4/2017 | Ochoa .................. A47J 43/044 |
| 2017/0173544 A1* | 6/2017 | Laby ................ B01F 15/00506 |
| 2017/0188600 A1 | 7/2017 | Scharfman et al. |
| 2017/0215456 A1 | 8/2017 | Noth et al. |
| 2017/0217648 A1 | 8/2017 | Bouziad et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouziad et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0332844 A1* | 11/2017 | Behar ............... B01F 15/00538 |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0056256 A1* | 3/2018 | Sun .................... B01F 13/0022 |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0177545 A1 | 5/2018 | Noth |
| 2018/0169599 A1* | 6/2018 | Ahmad ............... B01F 7/00733 |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1* | 2/2019 | Fonte ................. B65D 85/8046 |
| 2019/0069725 A1* | 3/2019 | Wang .................. A47J 43/0722 |
| 2019/0239534 A1 | 8/2019 | Halachmi |
| 2019/0254307 A1 | 8/2019 | Noth et al. |
| 2019/0269148 A1 | 9/2019 | Bouziad et al. |
| 2019/0270555 A1 | 9/2019 | Noth et al. |
| 2019/0291947 A1 | 9/2019 | Kruger |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0344955 A1 | 11/2019 | Fonte |
| 2019/0357564 A1* | 11/2019 | Yang ........................ A23G 9/12 |
| 2020/0055664 A1 | 2/2020 | Fonte et al. |
| 2020/0056814 A1 | 2/2020 | Fonte et al. |
| 2020/0056835 A1 | 2/2020 | Fonte et al. |
| 2020/0146311 A1 | 5/2020 | Halachmi |
| 2020/0245818 A1* | 8/2020 | Halkes ............... B65D 51/2885 |
| 2020/0292212 A1 | 9/2020 | Fonte et al. |
| 2020/0292229 A1 | 9/2020 | Fonte et al. |
| 2020/0315206 A1 | 10/2020 | Fonte |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |

FOREIGN PATENT DOCUMENTS

| | | | |
|---|---|---|---|
| DE | 1211905 | * | 3/1966 |
| EP | 1139837 | | 10/2001 |
| JP | H11507295 A | | 6/1999 |
| JP | 2002/068304 A | | 3/2002 |
| JP | 2005/318869 | | 11/2005 |
| WO | WO 2015/077825 | | 6/2015 |
| WO | WO 2017/139395 | | 8/2017 |
| WO | WO 2018/109765 | | 6/2018 |
| WO | WO 2020039439 | | 2/2020 |
| WO | WO 2020053859 | | 3/2020 |
| WO | WO 2020089919 | | 5/2020 |
| WO | WO 2020/163369 | | 8/2020 |

OTHER PUBLICATIONS

Arellano et al., "Online ice crystal size measurements during sorbet freezing by means of the focused beam reflectance measurement (FBRM) technology," Influence of Operating Conditions, Journal of Food Engineering, Nov. 1, 2012, 1;113(2):351-9.

Caldwell et al., "A low-temperature scanning electron microscopy study of ice cream. II. Influence of selected ingredients and processes," Food Structure, 1992;11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <https://www.ditusa.com/sc_helicone_mixers.php>, 3 pages.

Drewett et al., "Ice crystallization in a scraped surface freezer," Journal of Food Engineering, Feb. 1, 2007, 78(3):1060-6.

EP Extended Search Report in European Appln. No. 17814210.5, dated Jan. 24, 2020, pp. 1-3 of 12 pages.

Gonzalez-Ramirez et al., "Moments model for a continuous sorbet crystallization process," The 23rd IIR International Congress of Refrigeration, Refrigeration for Sustainable Development, Prague, Czech Republic, Aug. 2011, 21-6.

Hagiwara et al., "Effect of sweetener, stabilizer, and storage temperature on ice recrystallization in ice cream," Journal of Daily Science, May 1, 1996, 79(5):735-44.

Ice Cream Science, "How Long Does Homemade Ice Cream Last in the Freezer," Jun. 3, 2016, retrieved Apr. 16, 2020 form URL <http://icecreamscience.com/long-ice-cream-last-freezer/>, 18 pages.

Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.

Inoue et al., "Modeling of the effect of freezer conditions on the principal constituent parameters of ice cream by using response surface methodology," Journal of Dairy Science, May 1, 2008, 91(5):1722-32.

PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, pp. 1-16 of 19 pages.

PCT International Report on Patentability in International Appln. No. PCT/2019/013286, dated Jul. 23, 2020, 16 pages.

PCT International Search Report and Written Opinion in International Appln. No. PCT/US17/37972, dated Oct. 27, 2017, 16 pages.

PCT International Search Report and Written Opinion in International Appln. No. PCT/US19/13286, dated May 31, 2019, 21 pages.

PCT International Search Report and Written Opinion in International Appln. No. PCT/US2019/013286, dated Jan. 11, 2019, 21 pages.

(56) References Cited

OTHER PUBLICATIONS

PCT International Search Report and Written Opinion in International Appln. No. PCT/US2019/046946, dated Jan. 24, 2020, 24 pages.

PCT International Search Report and Written Opinion in International Appln. No. PCl/US2019/046954, dated Nov. 21, 2019, 20 pages.

PCT Invitation to Pay Additional Fees in International Appln. No. PCT/US2019/046946, dated Dec. 2, 2019, 19 pages.

Reichart, "Speed of Dasher and Scraper as Affecting the Quality of Ice Cream and Sherbet," Journal of Dairy Science, Mar. 1, 1931, 14(2):107-15.

Shaka Process, "Higher Quality Ambient Foods," 2018, retrieved Apr. 16, 2020 from URL <http://shakaprocess.com/>, 2 pages.

Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.

U.S. Notice of Allowance in U.S. Appl. No. 16/592,031, dated Jan. 10, 2020, 8 pages.

Waste Management Inc. et al "Tip: Aluminum Trays and Pans Are Recyclable," Nov. 2016 pp. 1-2 https://www.stocktonrecycles.conn/alunninunn-trays-pans-recyclable/.

Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.

JP Office Action in Japanese Appln. No. 2019-518176, dated Jan. 6, 2021, 8 pages (with English translation).

PCT International Search Report and Written Opinion in International Appln. No. PCT/US2020/051664, dated Dec. 17, 2020, 44 pages.

\* cited by examiner

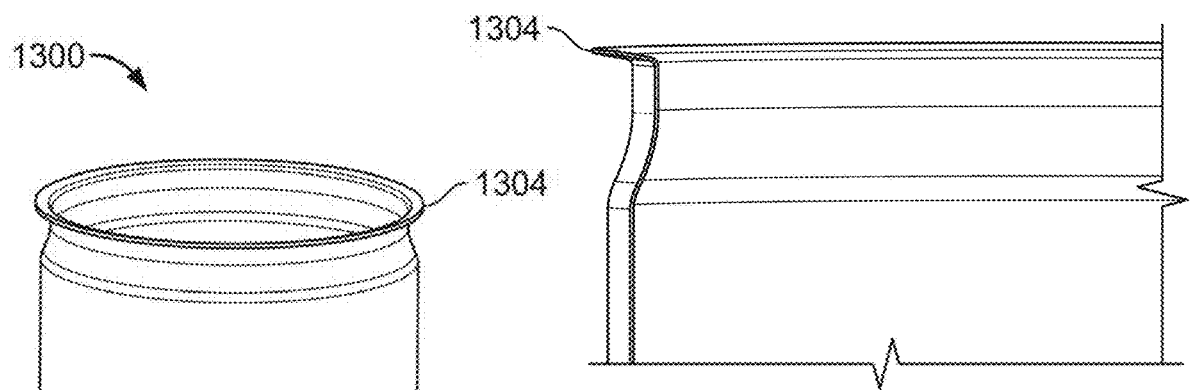
FIG. 13B
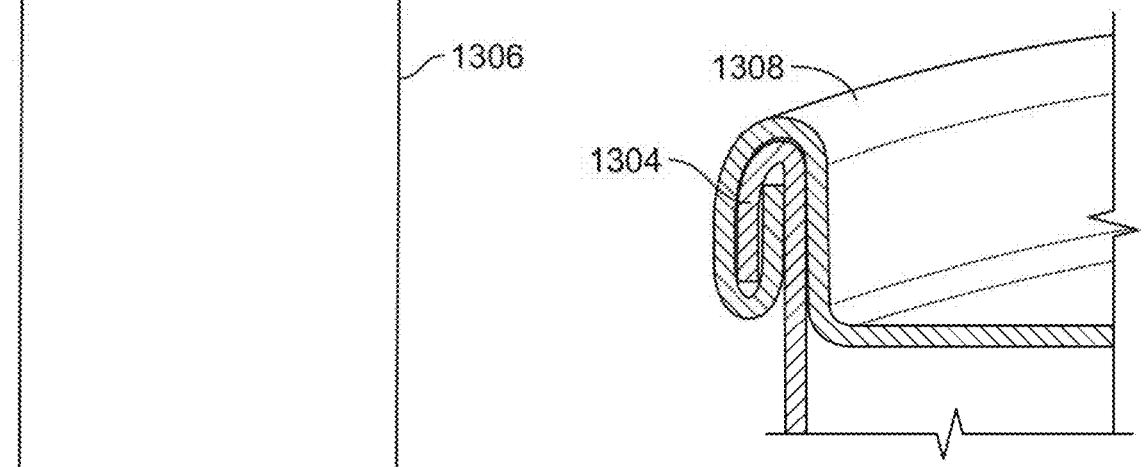
FIG. 13A
FIG. 13C
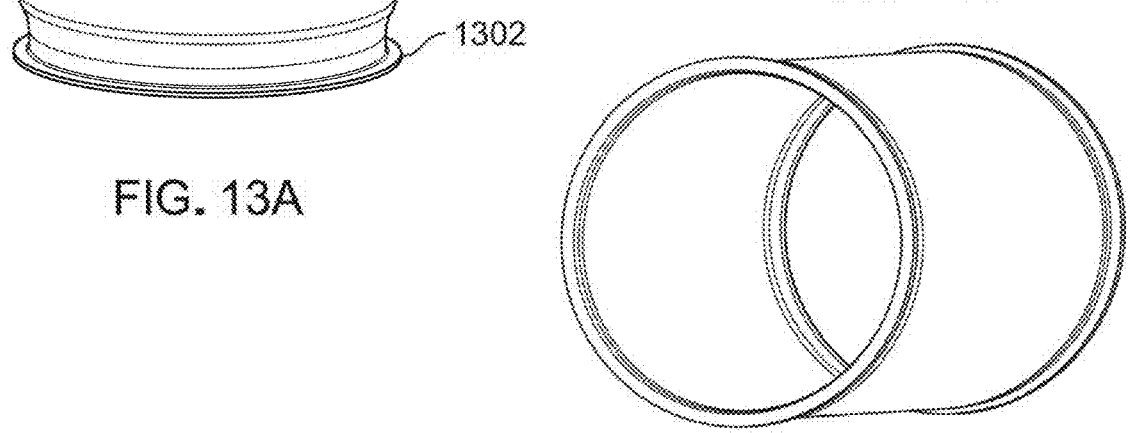
FIG. 13D

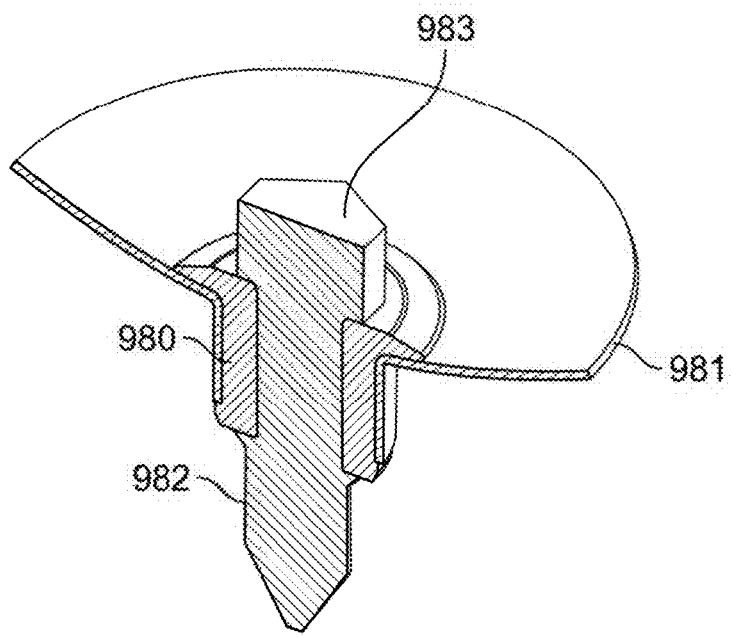
FIG. 37A
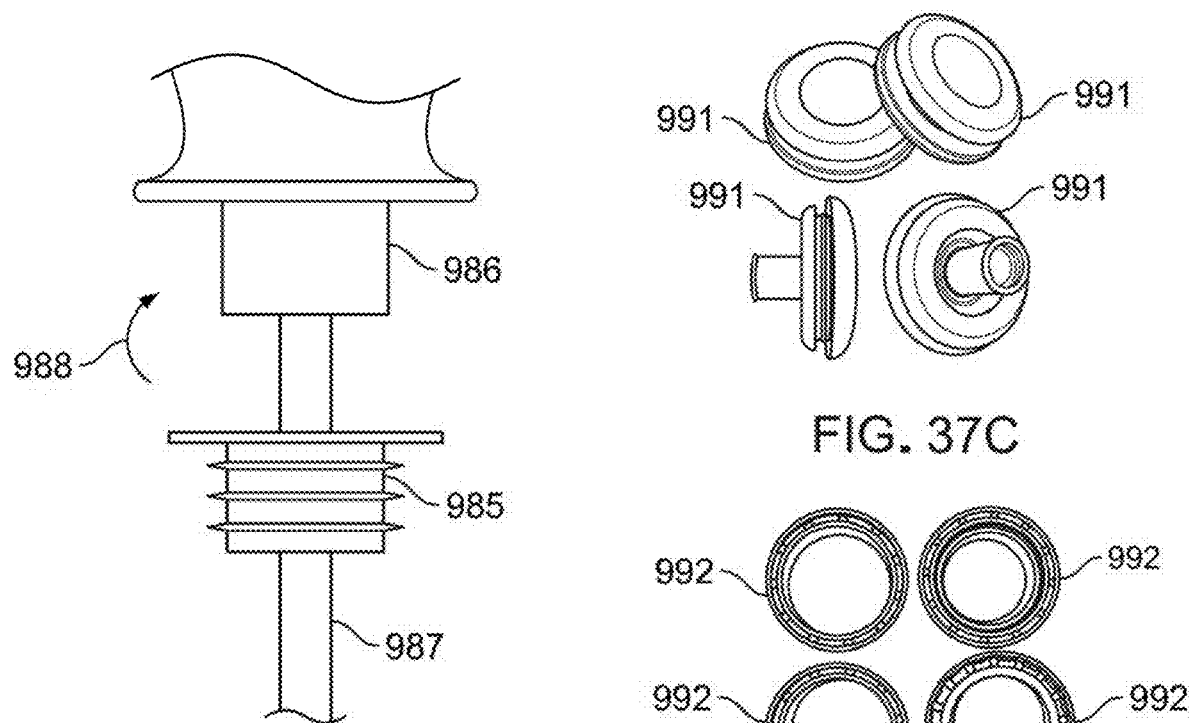
FIG. 37B
FIG. 37C
FIG. 37D

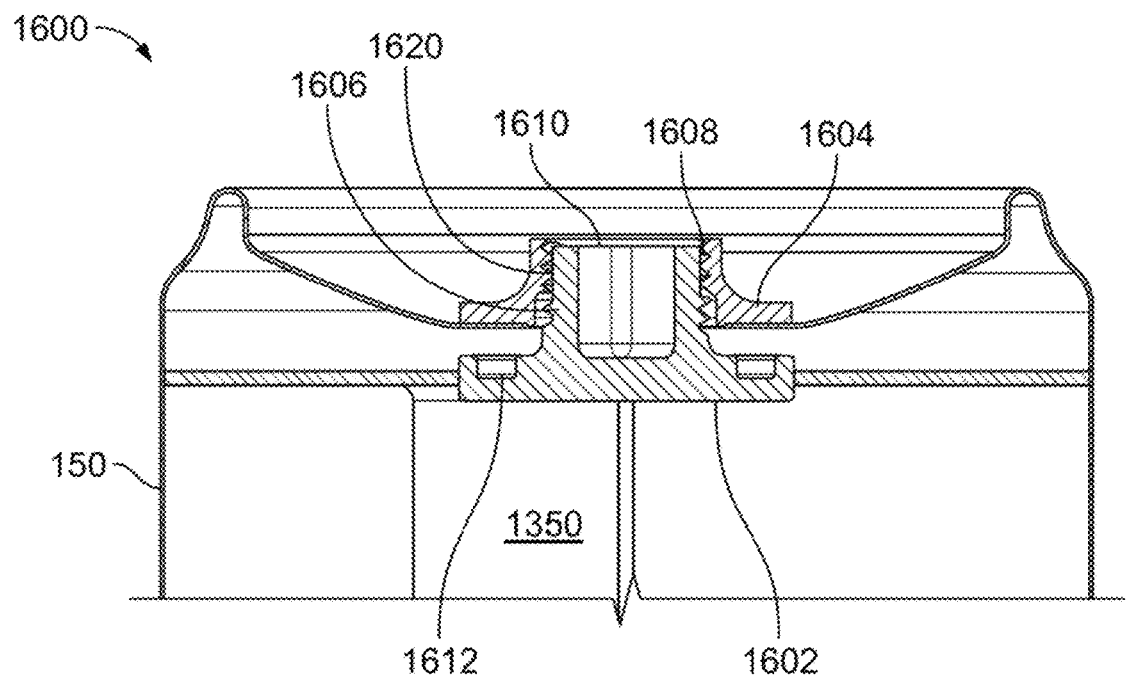
FIG. 40A
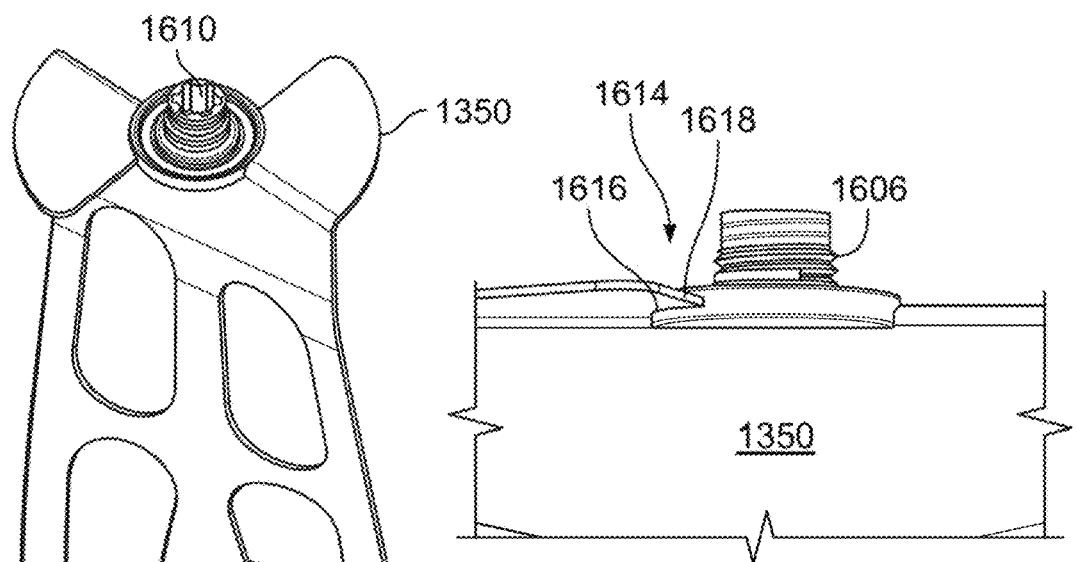
FIG. 40B
FIG. 40C

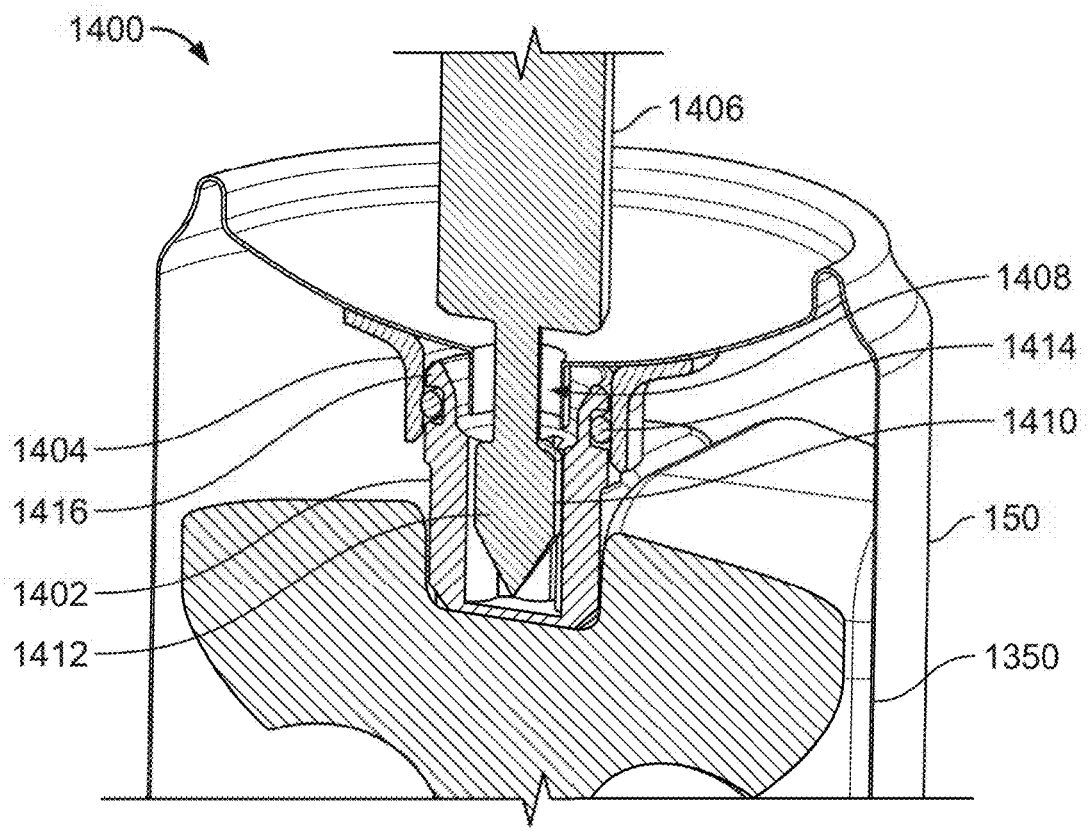
FIG. 41A
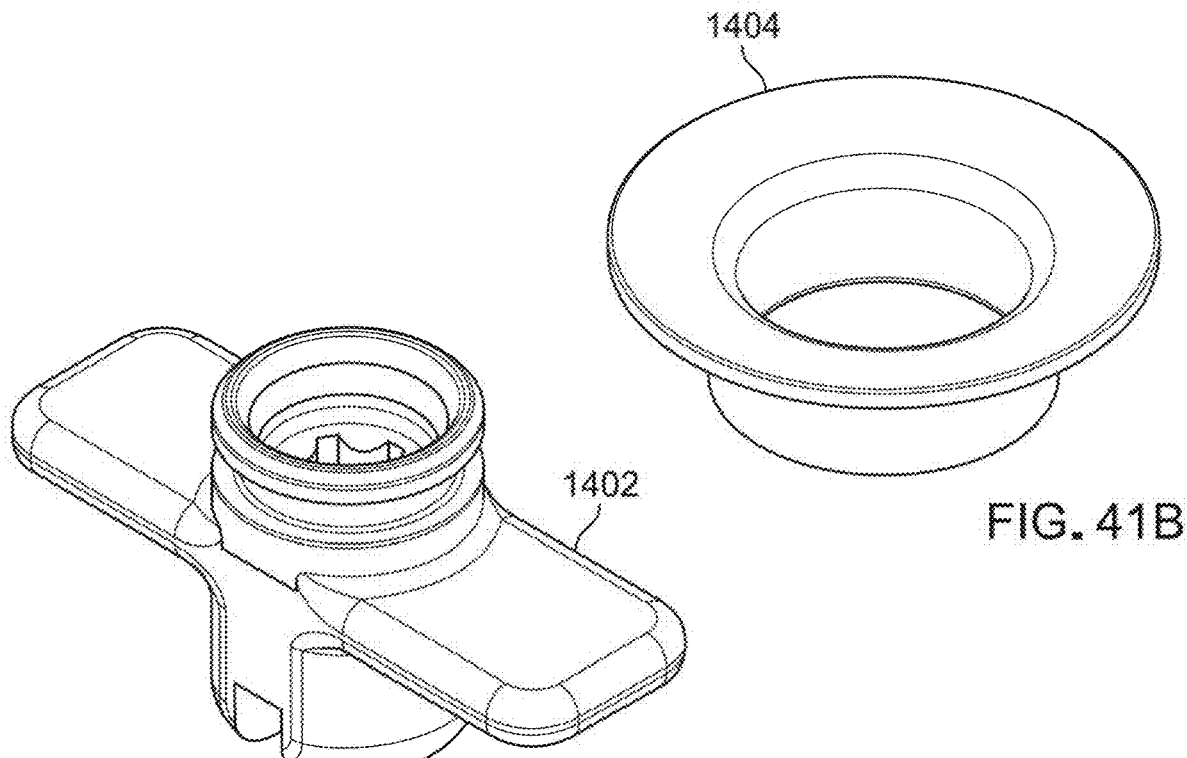
FIG. 41B
FIG. 41C

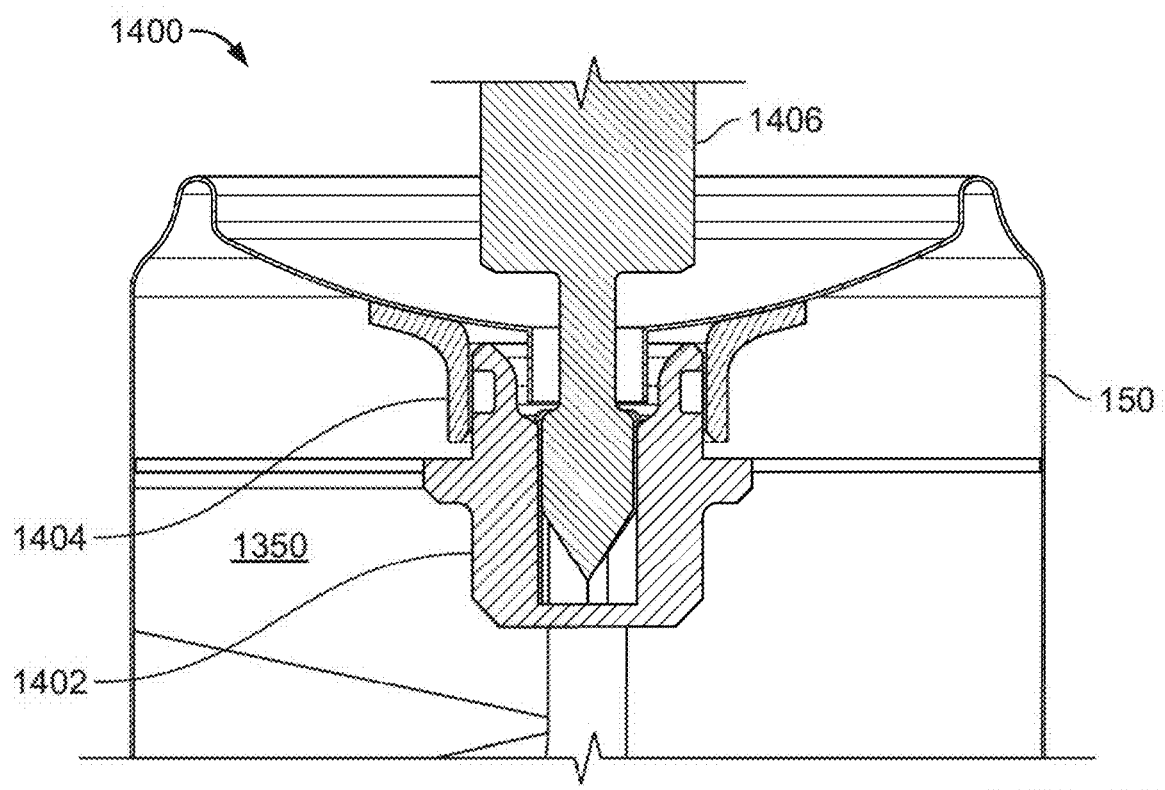
FIG. 41D
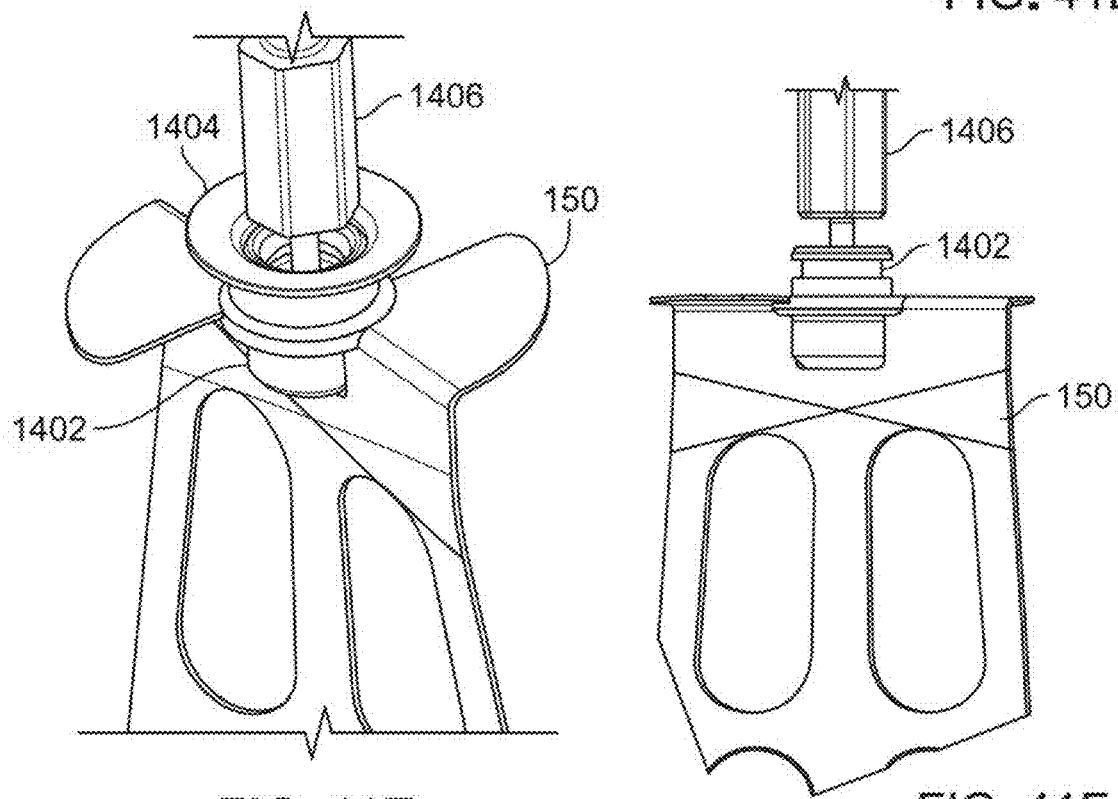
FIG. 41E
FIG. 41F

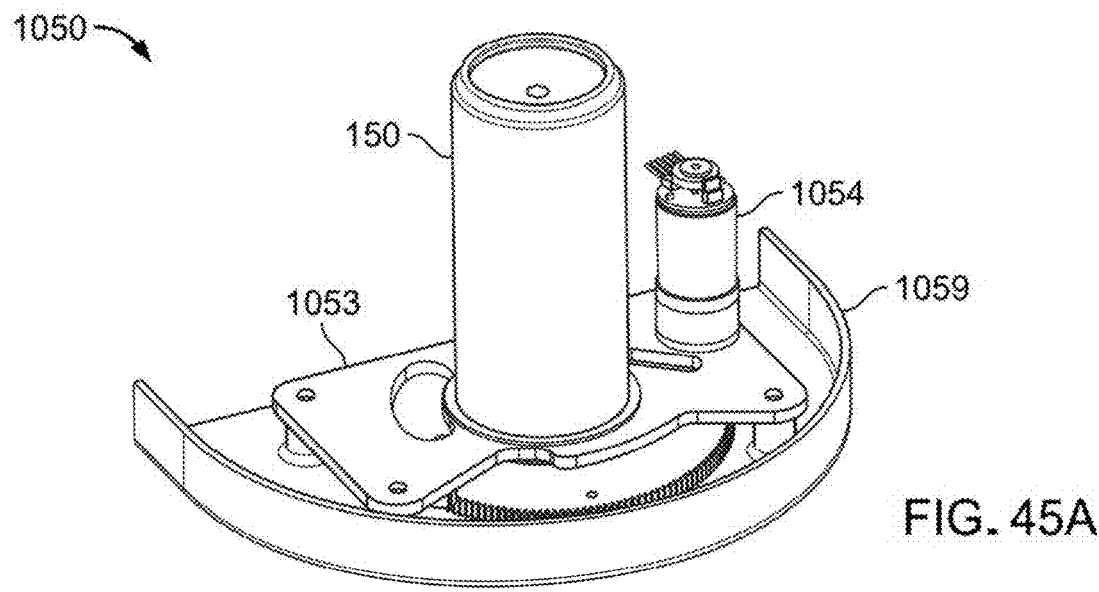
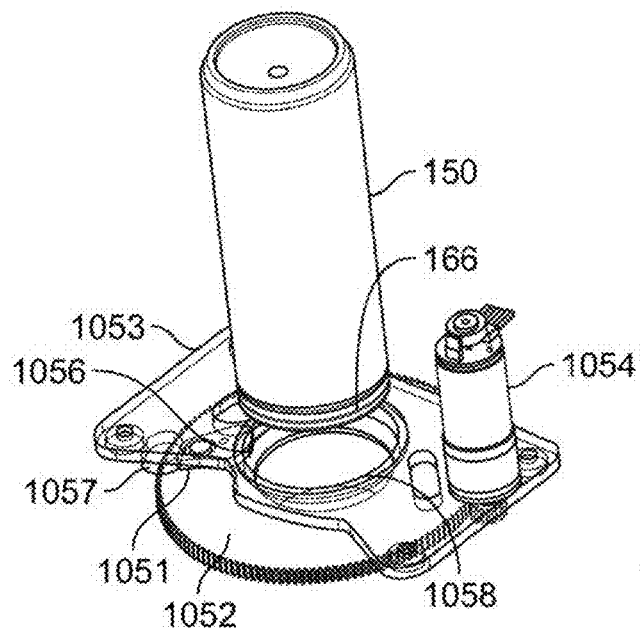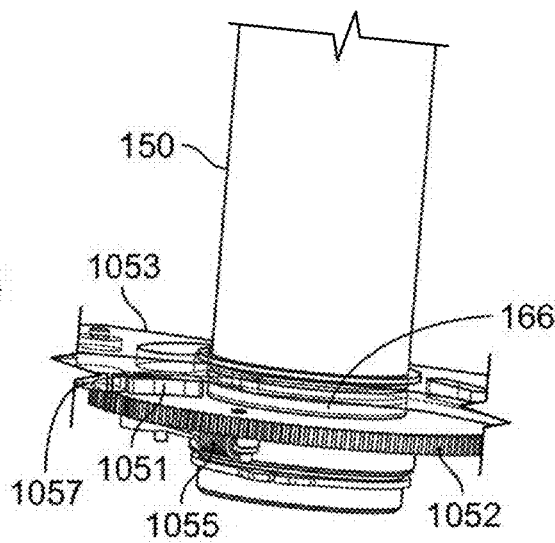
FIG. 45A
FIG. 45B  FIG. 45C

RAPIDLY COOLING FOOD AND DRINKS

RELATED APPLICATIONS

This patent application is a continuation of U.S. patent application Ser. No. 16/824,616, filed Mar. 19, 2020, and claims the benefit of U.S. provisional patent application Ser. No. 62/961,495, filed Jan. 15, 2020, all of which are hereby incorporated herein by reference in their entirety.

TECHNICAL FIELD

This disclosure relates to systems and methods for rapidly cooling food and drinks.

BACKGROUND

Beverage brewing system have been developed that rapidly prepare single servings of hot beverages. Some of these brewing systems rely on single use pods to which water is added before brewing occurs. The pods can be used to prepare hot coffees, teas, and cocoas.

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine. Some electric ice cream machines take 20 to 60 minutes to make a batch of ice cream and require time consuming clean up.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability make soft-serve ice cream from room-temperature pods in approximately 90 seconds. This approach has also been used to chill cocktails and other drinks including to produce frozen drinks. These systems and methods are based on a refrigeration cycle with low startup times and a pod-machine interface that is easy to use and provides extremely efficient heat transfer.

Some of the pods described are filled with ingredients in a manufacturing line and subjected to a sterilization process (e.g., retort, aseptic packaging, ultra-high temperature processing (UHT), ultra-heat treatment, ultra-pasteurization, or high pressure processing (HPP)). HPP is a cold pasteurization technique by which products, already sealed in its final package, are introduced into a vessel and subjected to a high level of isostatic pressure (300-600 megapascals (MPa) (43,500-87,000 pounds per square inch (psi)) transmitted by water. The pods can be used to store ingredients including, for example, dairy products at room temperature for long periods of time (e.g., 9-12 months) following sterilization.

Ice cream is considered a low acid food with pH levels ranging between 5.0 and 8.0. The acidity of ice cream is shown in the table below in relation to other food. The table shows a range of pH levels along a horizontal axis ranging from high alkaline content foods on the left, to high acid content foods on the right. Ice cream is a low acid food within the eggs and dairy food category. More specifically, a low-acid food is a food with a finished equilibrium pH greater than 4.6 and a water activity greater than 0.85.

| Food Category | High Alkaline | Alkaline | Low Alkaline | Low Acid | Acid | High Acid |
|---|---|---|---|---|---|---|
| Grains, Cereals | | | Amaranth, Lentils, Sweetcorn, Wild Rice, Quinoa, Millet, Buckwheat | Rye Bread, Whole Grain Bread, Oats, Brown Rice | White Rice, White Bread, Pastries, Biscuits, Pasta | |
| Meat | | | | Liver, Oysters, Organ Meat | Fish, Turkey, Chicken, Lamb | Beef, Pork, Veal, Shellfish, Canned Tuna & Sardines |
| Eggs & Dairy | | Breast Milk | Soy Cheese, Soy Milk, Goat Milk, Goat Cheese, Buttermilk, Whey | Whole Milk, Butter, Yogurt, Cottage Cheese, Cream, Ice Cream | Eggs, Camembert, Hard Cheese | Parmesan, Processed Cheese |
| Nuts * Seeds | | Hazelnuts, Almonds | Chestnuts, Brazils, Coconut | Pumpkin, Sesame, Sunflower Seeds | Pecans, Cashews, Pistachios | Peanuts, Walnuts |
| Oils | | | Flax Seed Oil, Olive Oil | Corn Oil, Sunflower Oil, Margarine | | |

FIG. 1 is a process diagram for one approach to manufacturing ice cream. In this approach, the raw material undergoes homogenization, pasteurization, crystallization, quick freezing, packaging, and storage.

Pasteurization is a process in which food (e.g., dairy or milk) is treated with mild heat, usually to less than 100° C. (212° F.), to eliminate pathogens and extend shelf life. The process is intended to destroy or deactivate organisms and enzymes that contribute to spoilage or risk of disease, including vegetative bacteria, but not bacterial spores. Pasteurization is not sterilization and may not kill bacterial spores. Pasteurization reduces the number of organisms in food.

The shelf life of refrigerated pasteurized dairy is usually greater than that of milk. For example, high-temperature, short-time (HTST) pasteurized milk typically has a refrigerated shelf life of two to three weeks, whereas ultra-pasteurized milk can last much longer, sometimes two to three months. When ultra-heat treatment (UHT) is combined with sterile handling and container technology (such as retort or aseptic packaging as previously described), the dairy can even be stored non-refrigerated for much longer periods of time, e.g., 9-12 months.

However, during ultra-heat treatment combined with retort-based sterile handling and container technology, pasteurized dairy can caramelize and become brown which can be undesirable. The highest rate of browning, or more generally referred to as color development, can be caused by the presence of fructose which begins to caramelize at temperatures of 230° F. Caramelization should not be confused with the Maillard reaction, in which reducing sugar reacts with amino acids. The process of browning, or the Maillard reaction, creates flavor and changes the color of food. Maillard reactions generally begin to occur at temperatures above 285° F. For example, caramelization temperatures of fructose can be 230° F., galactose can be 320° F., glucose can be 320° F., lactose can be 397° F., and sucrose can be 320° F.

While the pasteurization process extends shelf life, there can also be a need for homogenization. Homogenization is typically done either before or after pasteurization but before the freezing of the liquid ice cream mix. Homogenization is a commonly performed for any ice cream mix containing fat or oil and is traditionally used in the production of dairy products such as milk, yogurt, ice cream, and beverages such as juice, soy milk, and peanut milk. Homogenization not only creates a uniform mix, but also reduces the size of the fat droplets, resulting in a stabilized emulsion. It results in a greater viscosity and in the production of a more uniform color. It gives ice cream its creamy texture by breaking down large fat globules.

The process of homogenization occurs in the homogenizer, which works like a piston pump by drawing in air and then forcing it out at a very high pressure. This pressure is used to force the liquid ice cream through a very small tube-like opening, creating very fine fat particles that prevent the separation of cream. The pressure depends on the fat and solids in the liquid ice cream mix. Lower pressures can be used when high fat and total solids are included in the liquid ice cream mix. If a two stage homogenizer is used, a pressure of 2000-2500 psi on the first stage and 500-1000 psi on the second stage are satisfactory under most conditions, however for low-fat ice creams the pressure can be higher (e.g., 2,900 psi). Two stage homogenization is preferred for ice cream mix. Clumping or clustering of the fat is reduced by producing a thinner, more rapidly whipped ice cream mix.

The high pressure of the homogenization process creates a more stable emulsion and smaller fat particles. The smaller the fat particles, the more surface area is obtained. This results in more fat networks that will stabilize more air, which in turn slows down ice re-crystallization. For high-fat ice cream, the homogenization pressure is lower. Especially for an ice cream mix of more than 13% fat, it is preferable to reduce the pressure to minimize the risk of cluster formation. In addition, this process effectively mixes all the ingredients, avoids disintegration of any soft materials and prevents the growth of harmful bacteria. Homogenization is important in the ice cream production process, since it determines the reaction of the ice cream mix when it is frozen, hardened and distributed. Homogenization of the ice cream mix gives the ice cream a smoother texture, gives the ice cream greater apparent richness and palatability, give the ice cream better air stability and increases the ice cream's resistance to melting.

Low-acid foods packaged in hermetically sealed containers are defined as low-acid-canned-foods ("LACF") and are regulated by Title 21, Code of Federal Regulations (21 CFR) part 113. A hermetically sealed container is a container that is designed and intended to be secure against the entry of microorganisms and thereby to maintain the commercial sterility of its contents after processing. Low-acid-canned-foods are defined by being (i) shelf stable, (ii) heat-treated, (iii) having a pH of >4.6, and (iv) having a water activity of 0.85.

Once packaged, the low-acid-canned-food is sterilized. The method of sterilization is a thermal based process, or the application of high heat to the product. The high temperatures required in a sterilization process destroys pathogenic organisms that may be present in/on the container and/or food product, and is well above the boiling point of water at normal atmospheric pressure. Sterilization kills or deactivates living organism in the food product. Thermal processing/sterilization of shelf stable, low acid foods is usually performed at temperatures at or above about 250° F. The higher the temperature, the shorter the time the product needs to be exposed to heat.

There are two primary methods for sterilizing low-acid-canned-foods such as ice cream. The first method is a retort process, sometimes also called an autoclave or sterilizer, which is a pressure vessel used in the food manufacturing industry to sterilize or "commercially sterilize" food after it has been placed into its container and the container has been hermetically sealed. A report process or "retort" machine can be static or agitating style machines. Agitating style retort machines are typically used for convective (e.g., "flowable liquid") type products, such as liquid ice cream, that benefits from some product movement (e.g., "stirring") in the container during the process. These benefits can either be from a process stand-point (e.g., to improve the rate of heat transfer into/out of the container), and/or from a product quality stand-point (e.g., to shorten the exposure time to heat). Agitating style retorts can utilize various methods of agitation depending on the orientation of the product container. Vertically oriented containers, such as cans, are typically agitated in a rotary fashion, either axially or end-over-end, but horizontal agitation can also be used.

The second process of sterilizing low-acid-canned-foods is aseptic processing which is a processing technique where commercially thermally sterilized liquid products (typically foods such as liquid ice cream) are packaged into previously sterilized containers under sterile conditions to produce shelf-stable products that do not need refrigeration. Aseptic processing includes aseptic hermetical sealing in an atmosphere free of microorganisms. The regulations of 21 CFR 113 include guidance on times and temperatures for the sterilization process.

The best ice creams have a smooth and creamy texture. This creamy texture, primarily associated with a high fat content, is also determined by the average size of the ice crystals. Ice crystal size is governed by the mix formulation, as well as by factors relating to the freezing process; residence time; the evaporation temperature of the refrigerant fluid; dasher speed; and draw temperature. Each of these factors is described in detail below. Although discussed with respect to ice cream, the relationship between ice crystals and smoothness is also relevant to other frozen foods and drinks.

FIG. 2A shows a typical relationship between smoothness and ice crystal size. In FIG. 2A, ice crystal size increases from left to right along the horizontal axis while the smoothness increases from bottom to top along the vertical axis. Typical values are shown with an approximate linear trend line through the data. The data and trend indicates that decreasing ice crystal size (down to micrometer size) is directly correlated with increasing smoothness of the ice cream. Ice crystal size can be measured in various ways such as using a light microscope. Typically a quantity of ice cream is analyzed and an average ice crystal size is measured by the light microscope. It is possible to have variations in ice crystal size. Smooth and creamy ice cream requires the majority of ice crystals to be small, under 50 µm in size, and preferably 10-20 µm in size. If many crystals are larger than this, the ice cream will be perceived as being coarse or icy.

Ice crystals in ice cream range in size from about 1 to over 150 µm in diameter, with an average size of about 25 µm. Small ice crystals, around 10 to 20 µm in size, give ice cream its smooth and creamy texture, whereas larger ice crystals, for example ice crystals greater than 50 µm, impart a grainy texture.

The growth of the ice crystals can be controlled using stabilizers. Stabilizers are typically used to increase the melt resistance and shelf life of ice cream. Examples of stabilizers are guar gum, carob bean gum and cellulose gum and limit the growth of ice crystals by limiting the mobility of water in the unfrozen ice cream mix. Stabilizers also limit ice crystal growth by reducing ripening that occurs during early stages of hardening and during storage and distribution of the ice cream mix. (e.g., when the ice cream mix is exposed to relatively high temperatures (e.g. +10 to +18 F)). In these temperature ranges, a degree of freeze concentration is low, producing relatively low viscosity in the unfrozen portion. Low viscosity allows water to migrate from small to large ice crystals, which increases the average ice crystal size of the ice cream. Stabilizer act to limit this ice crystal growth by increasing the viscosity of the ice cream mix. Stabilizers limit water mobility by reducing a ripening effect at a freeze concentration. Stabilizers limit the size of air bubbles which grown through a process of disproportion.

The rheological effects of stabilizers are important in stabilizing properties of the finished ice cream related to the mobility of water in the unfrozen system. For example, high viscosity ice cream limits the temperature at which ice cream can be withdrawn and handled from the barrel of the ice cream freezer. When this happens, the amount of water frozen in the freezer is reduced. This has an undesirable effect on the resistance of the ice cream to heat shock. Low-viscosity stabilizers have not traditionally been used in ice cream because of an assumed lack of influence on water mobility.

At a point referred to as the "break point," a degree of concentration can cause the stabilizer and, possibly, other water-soluble compounds, to interact with each other, sometimes irreversibly, thus markedly increasing the effect on water mobility. This can be combined with an extreme freeze concentration that occurs at low frozen storage temperatures to produce other interactions between individual water-soluble compounds.

In addition to stabilizers, emulsifiers are traditionally added to an ice cream mix. Emulsifiers migrate to the interface between the fat and the water of the ice cream mix. Emulsifiers attach themselves to the surface of the fat globules and cause the protein molecules to displace. Emulsifiers are used to improve the melting properties during shipping and storage. Examples of emulsifiers are monodiglycerides (E471), lactic acid esters (E472b), propylene glycol esters (E477) and blends of these.

Emulsifiers are used in ice cream because they contribute to smooth and creamy texture by promoting fat destabilization. Fat destabilization refers to the process of clustering and clumping (known as partial coalescence) of the fat in an ice cream mix when it is churned in a machine. Because it is the proteins that stabilize the fat emulsion in an ice cream mix, emulsifiers are added to ice cream to reduce the stability of this emulsion and encourage some of the fat globules to come together, or partially coalesce. When a mix is churned in an ice cream machine, air bubbles that are beaten into the mix are stabilized by this partially coalesced fat, giving a smooth texture to the ice cream. Traditionally, if emulsifiers were not added, the air bubbles would not be properly stabilized and the ice cream would not have the same smooth texture.

Egg yolks are used as both a stabilizer, that thickens the mixture, and as an emulsifier, which encourages partial coalescence. To make use of the emulsifying properties of egg yolks, approximately 0.5 to 1% of the mixture should be egg yolk. To make use the stabilizing (thickening) properties as well, the proportion of egg yolk is traditionally increased to 3-4%. However, some frozen custard style ice creams can include over 8% of egg yolk.

Egg yolks include Lecithin which helps to make them good emulsifiers. In fact, egg lecithin has emulsification and lubricant properties, and is a surfactant. However, Lecithin need not only be extracted from egg yolk. Lecithin can be extracted from plant-based sources such as soybeans, sunflowers and rapeseed. Plant-based Lecithin can emulsify just as well as egg yolks without egg flavor and extra fat.

Many store-bought ice creams include stabilizers and emulsifiers to help keep the ice crystals from growing by improving the melting properties during shipping and storage and by increasing the shelf life of ice cream. An example is Ben & Jerry's Cinnamon Buns ice cream which includes: cream, skim milk, water, liquid sugar, sugar, dried cane syrup, wheat flour, corn syrup, egg yolks, brown sugar, soybean oil, butter, coconut oil, molasses, salt, cinnamon, soy lecithin, sodium bicarbonate, spice, vanilla extract, guar gum, and carrageenan. In this example, the stabilizers include guar gum and the emulsifiers include egg yolks, soybean oil, soy lecithin, carrageenan.

As previously described, ice crystal size is a factor in the development of smooth and creamy ice cream. Creamy ice cream requires the majority of ice crystals to be small, preferably under 50 µm in size. If many crystals are larger than this, the ice cream will be perceived as being coarse.

Ice cream is frozen in two stages: dynamic and static freezing. Dynamic freezing is a dynamic process where the mix is frozen in an ice cream machine while being agitated to incorporate air, destabilize the fat, and form ice crystals. The ice cream mix enters the ice cream machine at a temperature slightly above its freezing point, i.e., the temperature where the water in the mix begins to freeze. The ice cream machine cools the mix and brings it below the freezing point of the mix. At this point, a layer of ice freezes to the walls of the ice cream machine which causes rapid nucleation where small ice crystals begin to form. Upon exiting the ice cream machine, the ice cream, at about −5° C. to −6° C. (23 to 21.2° F.) exits with a consistency similar to soft-serve ice cream.

The ice cream then undergoes static freezing where it is hardened in a freezer without agitation until the core of the ice cream reaches a specified temperature, usually −18° C. (−0.4° F.). New ice crystals are formed during static freezing but the existing small crystals begin to grow in size until the temperature decreases to −18° C. (0.4° F.), or ideally −25° C. to −30° C. (−9.4 to −20.2° F.), to halt this growth. It is advantageous to cool the ice cream as quickly as possible during this process to limit the growth of the ice crystals.

During static freezing, ice crystals typically grow by about 30% to 40% to an average size of about 25 to 45 μm. A mean ice crystal size of about 50 μm is considered an average point where consumers start to notice a coarse texture. During static freezing ice crystals can often grow to over 100 μm. FIG. 2B shows an image of typical ice crystals during this process. The ice crystals in the image of FIG. 2B are of various shapes and sizes but some ice crystals are over 100 μm in diameter.

However, the ice cream described in this specification does not require static freezing because the ice cream is not stored. The ice cream is served ready for consumption. By eliminating the static freezing step, growth of ice crystals (e.g., ice crystals typically grow by about 30% to 40%) during the static freezing process is eliminated.

The dynamic freezing stage is an important step in creating ice cream because this is the stage in which crystallization of the ice cream occurs. During dynamic freezing, the ice cream mix is added to the ice cream machine at between 0° C. and 4° C. (32° F. and 39.2° F.). As the refrigerant absorbs the heat in the mix, a layer of ice freezes to the wall of the cold barrel wall causing rapid nucleation, that is, the birth of small ice crystals.

To produce small ice crystals during a dynamic freezing process, a high rate of nucleation, minimal growth, and minimal recrystallization are desired. Colder refrigerant temperatures and slower dasher speeds can promote higher rates of nucleation. Shorter residence times, lower dasher speeds, and lower draw temperatures can to minimize growth and recrystallization.

FIG. 2C shows a process of a rotating dasher also called a mixer, impeller, blade, scraper, or paddle, where the rotating dasher is used to scrape the ice crystals formed at the cold barrel wall 22. The design and rotation of the rotating dasher directs the ice crystals formed at the cold barrel wall 22 to the center of the barrel (the bulk region) where the temperature is warmer and ice crystals grow in size. This causes some crystals to melt and some to undergo recrystallization.

For smooth and creamy ice cream, it's desirable to have a high rate of nucleation so as to form as many small ice crystals as possible. The more ice crystals that are formed during dynamic freezing, the more ice crystals will be preserved during static freezing, resulting in a smaller average crystal size and smoother texture. Fewer crystals formed during dynamic freezing, or a lower rate of nucleation, can result in coarse texture as these crystals eventually grow to a significantly larger size.

Crystallization during dynamic freezing can be divided into two zones: the wall region, where the temperature at the barrel wall is cold enough for nucleation to occur, and the bulk region, where warmer temperatures in the center of the barrel mean that ice crystal growth and recrystallization, also called ripening or coarsening, predominate. The greater the extent of growth and recrystallization in the bulk region, the larger the ice crystals will be. Crystallization during ice cream freezing may be dominated by recrystallization and growth and that these mechanisms can be more important than nucleation in determining the final crystal population. Minimizing growth and recrystallization is, therefore, of paramount importance.

Residence time (the length of time ice cream spends in the ice cream machine) can have a significant effect on the final ice crystal size distribution, with shorter residence times producing ice creams with smaller ice crystals due to a decline in recrystallization. A longer residence time means that ice cream is slower to reach its draw temperature (the temperature at which ice cream is extracted from the ice cream machine) of around −5° C. to −6° C. (23° F. to 21.2° F.), which means that it spends more time in the bulk zone where warmer temperatures cause rapid recrystallization. It can be advantageous to minimize the residence time of the ice cream in the ice cream machine by reaching the draw temperature as quickly as possible. This can be achieved by mixing and cooling as quickly as possible.

FIG. 2D illustrates the dependence of draw temperature on ice crystal distribution of ice cream made with 28 D.E. (dextrose equivalent) corn syrup, a dasher speed of 500 RPM (revolutions per minute), and a flow rate of 34 l/h (liters per hour). The average diameter of the ice crystals increases from left to right along the horizontal axis while the percentage of the ice cream that contains this average diameter of ice crystal size is shown increasing from bottom to top on the vertical axis. As draw temperature decreases, the average diameter of the ice crystals in the ice cream also decreases.

For example, one can measure a recrystallization rate at −5° C. (23° F.) of 42 μm/day. At this rate, an ice crystal size increase of around 8 μm would be expected over a 10 minute period. This can match an increase in ice crystal size at a slightly different temperature of −4° C. (24.8° F.). The longer the ice cream remains within the ice cream machine at temperatures where recrystallization occurs very rapidly, the greater the extent of recrystallization, and the larger the ice crystals.

Investigating the effect of draw temperature, dasher speed, and residence time on ice crystal size indicates that these aspects can impact the final crystal size distribution.

Primary refrigerants (i.e., liquid ammonia or Freon) are used in ice cream machines to provide temperatures in the range of −23° C. to −29° C. (−9.4° F. to −20.2° F.), with temperatures at the barrel wall being a few degrees warmer. Decreasing the refrigerant temperature promotes rapid heat removal at the barrel wall. Rapid heat removal allows for faster ice nucleation rates, which results in smaller ice crystals due to the higher number of small ice crystals.

For ice crystal size in sorbet, low refrigerant temperatures (up to −19.9° C. (−3.82° F.)) can lead to lower draw temperatures and a significant reduction in the ice crystal chord length. This is due to faster freezing, which causes faster formation of more ice crystals. Reductions in ice crystal length as a function of a decreasing evaporation temperature can be observed.

The barrel wall temperature has a direct effect on the cooling rate (the rate at which heat is removed from the ice cream mix), and therefore on residence time. Lower wall temperatures can lower the bulk temperature of the ice cream faster, reducing residence time and improving the ice crystal size distribution.

During dynamic freezing, heat input from the rotating scraper blades, due to friction at the barrel wall and viscous dissipation, can be significant, accounting for as much as 50% of the total heat removed by the refrigerant. Increasing the dasher speed can cause an increase in the ice cream temperature, resulting in a significant increase in the average ice crystal size. This likely occurs because the extra frictional heat generated by the blades melts many of the smallest crystals, resulting in a lower nucleation rate and the enhancement of recrystallization. For this reason, dasher speeds are usually limited to 100-200 RPM. The large amount of frictional heat inputted by higher dasher speeds will also slow the freezing process, resulting in longer residence times.

Sometimes the motion of the rotating blade is not enough to cause the fat globules in the ice cream mix to clump together to partially coalesce which is important for developing and maintaining small air bubbles in the ice cream. Emulsifiers in the ice cream mix aid in the process of de-stabilizing the fat globules so they can clump together.

However, the ice cream described in this specification does not require emulsifiers because the quickly rotating dasher and the quick freezing process capability of the machines described in this specification are sufficient in developing a smooth and creamy ice cream quickly.

Additionally, the ice cream described in this specification does not require stabilizers because the ice cream does not need to be stored in the frozen state, so there is no need to increase the melt resistance and shelf life of ice cream using stabilizers.

Developing ice cream void of emulsifiers and stabilizers is an advantage of the ice cream described in this specification, even though a small amount of emulsifiers and stabilizers can be added in some cases. An ice cream void of emulsifiers and stabilizers, and only including milk, cream, and sugar, is considered a "clean label" ice cream and is an advantage of the ice cream mix described in this specification. A clean label refers to food products that have fewer and simpler ingredients, where the ingredients are from natural sources.

FIG. 2D illustrates that draw temperature can have a significant influence on mean ice crystal size, with lower drawing temperatures generally resulting in smaller ice crystals. Factors influencing draw temperature include the refrigerant temperature, heat transfer, residence time, and overrun. Ice crystals can become larger at draw temperatures from −3 to −6° C. (26.6° F. to 21.2° F.). When the draw temperatures are colder than −6° C. (21.2° F.), the mean ice crystal size decreases. The smaller ice crystal sizes can be attributed to the lower refrigerant temperatures necessary to obtain lower draw temperatures.

An increase in dasher speed can lead to an increase in draw temperatures. For example, when dasher speed is increased from 600 to 900 rpm, a 1° C. (1.8° F.) increase in draw temperature, due to frictional energy transmitted to the ice cream, can be observed. Conversely, an increase in dasher speed can also lead to an increase in the heat transfer at the barrel wall, producing lower draw temperatures. As previously noted, dasher speeds are usually limited to 100-200 RPM.

However, the ice cream machines and processes described in this specification use a dasher speed that is varied during freezing from 100 to 1200 RPM to reduce freeze times and reduce ice crystal size to be low, sometimes smaller than 30 µm with an average crystal size of under 20 µm (19.1 µm) and having no ice crystals above 40 µm. These properties can be similar to store-bought ice cream that have gone thru a static freezing process (i.e., a hard pack process).

Lower draw temperatures can also be attained through longer residence times. As previously noted, however, longer residence times mean that ice cream spends more time at temperatures where rapid growth and recrystallization occur, resulting in larger ice crystals. The dynamic freezing step can account for competing phenomena as shorter residence times are needed to produce small ice crystals, but longer residence times give a lower draw temperature.

The drawing temperature has been observed to have an effect on mean ice crystal diameter, followed by the mix flow rate (which determines the average residence time), overrun, and dasher speed. When the drawing temperature is warmer than −5° C. (23° F.), mean ice crystal diameter is strongly dependent on the drawing temperature, with larger mean ice crystals reported at warmer draw temperatures. When the drawing temperature is colder than −5° C. (23° F.), however, not only the draw temperature, but also the overrun (the amount of air whipped into ice cream), influenced the mean ice crystal diameter.

Differences in the mean ice crystal diameter may be insignificant when the drawing temperatures are between −5° C. and −6.5° C. (23° F. and 20.3° F.) and the overrun is below 70%. At higher overruns, the mean ice crystal diameter is often smaller. Tiny ice crystals can be formed when both the overrun and dasher speed are raised. However, as previously noted, increasing the dasher speed can cause an elevation in product temperature, which leads to the melting of small crystals and enhanced recrystallization.

Some ice cream machines rotate the mixing paddle at a constant RPM during the freezing and dispensing cycle. Additionally, the rotational speed of the mixing paddle is typically kept low, because as previously described, heat input from the rotating scraper blades can be significant. For this reason, dasher speeds are usually limited to 100-200 RPM. Furthermore, the large amount of frictional heat inputted by higher dasher speeds is known to slow the freezing process, resulting in longer residence times.

Cooling is used to indicate the transfer of thermal energy to reduce the temperature, for example, of ingredients contained in a pod. In some cases, cooling indicates the transfer of thermal energy to reduce the temperature, for example, of ingredients contained in a pod to below freezing.

The systems and methods described in this specification describe a machine with a mixing paddle that rotates slower in the beginning of an ice cream making process when the ice cream mix is liquid. In this state, increasing the amount of time that the liquid touches an inner diameter of the pod's wall is helpful for changing the ice cream mix from a liquid to ice. As the pod's wall becomes colder, using an evaporator of the ice cream machine, the rotational speed of the mixing paddle is increased to verify that the ice crystals are kept to a small size, preferably under 30 µm.

The action of speeding up the mixing paddle as the ice cream mix becomes increasingly more viscous can be counterintuitive. This is counterintuitive because the rotational speed of the mixing paddle is limited by a driving torque of the motor and increasing the rotational speed of the mixing paddle when the ice cream mix becomes more viscous increases the torque required by the motor. This requires more power by the motor. Furthermore, rotating the mixing paddle faster may damage ice cream machines that are not designed for such speeds.

However, by increasing the rotational speed of the mixing paddle in our machine, the machine is able to suck air into the pod. The process of sucking air into the pod in combination with the rotation of the mixing paddle helps churn the air into the frozen confection, creating air bubbles in the frozen confection. This process preferably creates at least a 30% overrun.

A clean label ice cream mix packaged in a sterilized container or pod described in this specification can advantageously provide (i) natural ingredients, (ii) storage at room temperatures opposed to need to be refrigerated or frozen, and (iii) long shelf-life at room temperatures, typically 6-9 months.

An ice cream machine for a pod of the clean label ice cream mix described in this specification can advantageously provide (i) an ice cream with very small ice crystals, often less than 40 µm in diameter on average (and sometimes less than 30 µm in diameter on average), which give the ice cream a smoother texture, and (ii) delivery of ice cream from room temperature to dispensing in less than 3 minutes.

The ice creams produced using the machines described in this specification have a much smaller ice crystal size on average and a much tighter standard deviation of ice crystal size than their store-bought counterparts. This is important because the ice cream machines described in this specification produce smoother ice cream that does not require refrigeration or freezing prior to production for consumption. The ice creams used in these machines do not need to include non-natural ingredients such as emulsifiers or stabilizers in the ice cream. The ice cream ingredients used with these machines can be "clean-label" and contain simply milk, cream, sugar, and powdered milk and can be stored at room-temperature for up to 9 months in a sterilized pod. The pods can simply be inserted into the machines described in this specification and a frozen ice cream is dispensed within minutes for a consumer to enjoy. These ice cream machines are designed to provide helpful interactions between the increasing rotational speed of mixing paddle, the design of the pod, and the rapid cooling properties of the evaporator and refrigeration system, come to together to make this possible.

Some devices and methods for providing a single serving of a frozen include: filling low acid liquid ingredients having an pH level of 4.0 or great into a pod; inserting the pod into a recess of a machine for providing the single serving of the frozen confection; contacting a sidewall of the pod against a sidewall of the recess; cooling the recess with a refrigeration system of the machine, pulling heat out of the pod while connecting a motor of the machine to a mixing paddle inside the pod; and moving the mixing paddle inside the pod at an increase in RPM over the freezing cycle to remove built up of ice from the inner diameter of the pod and dispersing the ice into the center of the pod while mechanically churning the ice into the balance of the fluid and simultaneously moving the warmer fluid ingredients from the center of the pod to the cooler inner dimeter of the pod in contact with the recess of the machine to facilitate quicker heat transfer.

Some devices and methods for providing a single serving of a frozen confection made in less than five minutes having a temperature between 17 degrees and 26 degrees Fahrenheit with a majority of its ice crystals smaller than 50 µm include: filling low acid liquid ingredients having an pH level of 4.0 or great into a pod; inserting the pod into a recess of a machine for providing the single serving of the frozen confection; contacting a sidewall of the pod against a sidewall of the recess; cooling the recess with a refrigeration system of the machine, pulling heat out of the pod while connecting a motor of the machine to a mixing paddle inside the pod; and moving the mixing paddle inside the pod to remove built up of ice from the inner diameter of the pod and dispersing the ice into the center of the pod while mechanically churning the ice into the balance of the fluid and simultaneously moving the warmer fluid ingredients from the center of the pod to the cooler inner dimeter of the pod in contact with the recess of the machine to facilitate quicker heat transfer.

Embodiments of these machines can include one or more of the following features.

In some embodiments, the mixing paddle rotates at least 50 RPM in the beginning of the refrigeration cycle and increases to at least twice that during the course of the refrigeration cycle.

In some embodiments, the dispensing of the frozen confection is done when its temperature is between 17-26 degrees Fahrenheit and the mixing paddle is rotating over 100 RPM.

In some embodiments, the filling of the low acid liquid ingredients having an pH level of 4.0 or great is done before the pod is inserted into the recess of the machine for providing the single serving of the frozen confection.

In some embodiments, the frozen confection is a low acid food including up to approximately 0.5% emulsifiers and/or up to approximately 0.5% stabilizers. In some cases, the stabilizers can be thickeners such as sodium carboxymethyl cellulose (cellulose gun), guar gum, locust bean gum, sodium alginate, propylene glycol alginate, xanthan, carrageenan, modified starches, microcrystalline cellulose (cellulose gel), gelatin, calcium sulfate, propylene glycol monostearate or other monoesters, and others. In some cases, the emulsifiers can be mono- and diglycerides, distilled monoglycerides (saturated or unsaturated), polyoxyethylene sorbitan monostearate (60) or monooleate (80), and others. In some cases, the ice cream mix formulation can have minimal or no stabilizers.

In some embodiments, the pod may be a multi-use, reusable pod.

In some embodiments, the pod has completed a retort sterilization process to make its low acid ingredients shelf-stable at room temperature.

In some embodiments, the pod has been aseptically filled and sealed to make its low acid ingredients shelf-stable at room temperature.

In some embodiments, the mixing paddle is part of the machine.

In some embodiments, the pod is an aluminum beverage can.

In some embodiments, the pod is frustoconical.

In some embodiments, the frozen confection has an average ice crystal size of less than 30 µm.

In some embodiments, the ice cream formulation is considered a "clean label" without the use of stabilizing gums.

In some embodiments, the mixing paddle is helical and the rotation of the paddle removes the built up of ice from the inner diameter of the pod and drives the frozen confection downward.

In some embodiments, the mixing paddle is helical and the rotation of the paddle removes the built up of ice from the inner diameter of the pod and moves the ice to the center of the pod while pushing the warmer fluid from the center of the pod to the cooler inner diameter of the pod.

In some embodiments, the mixing paddle is rotated and the rotational speed of the paddles are varied in response to the changing viscosity of the frozen confection in pod.

In some embodiments, dispensing the frozen confection from the pod into an edible cone or a collecting container while the pod is in the recess of the machine without the frozen confection coming into contact with another object.

In some embodiments, the mixing paddle forces the frozen confection out of pod.

In some embodiments, the recess of the machine can have an open and closed position and the cooling of the pod occurs when the recess is in the closed position.

In some embodiments, the refrigeration system cools the pod with a compressor and uses a two-phase refrigerant fluid, for example R22, R134A, R-600a or R290. In some cases, the compressor is a reciprocating compressor. In some cases, the compressor is a rotary compressor. In some cases, the compressor is a Direct Current (DC) compressor. In some cases, the DC compressor has a variable motor speed to allow for increased displacement towards the begging of the refrigeration cooling cycle, the first 45 seconds for example of cooling the pod and slow down the motor speed towards the end of the cooling cycle of the pod when most of the refrigerated fluid has been evaporated. In some cases, the DC compressor has a variable motor speed that is adjusted depending on the load on the machine's refrigeration cycle.

The systems and methods describe in this specification can provide various advantages.

Some of these features of these systems and methods allow the dasher speed to be varied or increased during freezing of the ice cream in the single serve pod. Mixing paddle rotational speed could vary from 50 to 1200 RPM to reduce freeze times and reduce ice crystal size to be low, about 50 µm or smaller.

Some of these systems use a low temperature refrigerant such as R290 or R-600A should be used at temperatures (−7° C. to −19.9° C.) to effectively achieve draw temperatures to achieve ice crystals less than 50 µm for the majority of the single serve batch.

Some of these systems use liquid ice cream mix that is shelf-stable for 9-12 months. This is achieved by performing a retort process where hermetically sealed pods of liquid ice cream mix is heated to 250° F. for at least 5 minutes. By using unpasteurized dairy in our pods and performing a retort process on the pod before use, the dairy inside the pod is only getting pasteurized once. This is in contrast to the typical pasteurization process illustrated in FIG. 1 where the dairy is usually pasteurized before leaving the dairy factory which means it is pasteurized twice, e.g., once at the dairy factory and once in our retort process.

Some of these systems and processes use a retort process that retorts at 250° F. even though retorting at higher temperatures is generally preferred because it would allow the pasteurization process to complete in less time. Completing a retort at 250° F. can limit the effect of browning when we remove fructose from the ice cream mix formulation.

Some of these features of these systems and methods lead to compact machines. For example, machines with sliding lid assemblies are more compact than systems with pop-up lid assemblies. This approach can facilitate placement of machines in home use on kitchen countertops underneath kitchen cupboards which are often 18" distance from the countertops. Machines with a quickly mixing paddle rotating at upwards of 100 to 1,500 RPM can cause a suction effect by drawing air into the container. Such a process does not need to use a separate air supply and makes the overall system more compact than systems which inject air into ice cream being formed.

Some of these systems and methods provide improved mixing. For example, systems with a mixing paddle that has off center holes can create a mixing effect that stirs the contents of a container better than a symmetric mixing paddle.

Some of these systems are easy to use. For example, some machines do not require a user to align pods (e.g., cans) being inserting into the machines. In another example, machines that do not require a user to lower a lid manually to apply force to insert a plunger into a container are more accessible to users without limited strength. Machines that provide this functionality without an additional motor tend to be more compact and simpler than machines that include a specific motor to provide this functionality.

Some of these systems and methods provide operational advantages. For example, machines with a refrigeration system that has a heater and/or a hot gas bypass can reach steady state quickly. This approach can improve performance and reduce wait times. Some systems include mixing motors that does not reverse direction and that continue to rotate the driveshaft through a mixing, shearing, and a dispensing cycle. This approach appears to reduce the likelihood of the mixing motor stalling as viscosity of the contents of the pod increase with cooling.

Some systems include a shearing cap designed to shear a protrusion of a container. A machine with such a shearing cap can more securely grip a pod during use so the pod is less likely to slip. This can improve performance of the machine.

Some machines offer vending-type dispensing capability to allow them to accept payment for ice cream, provide a variety of ice cream flavors/options, and to make them easily used in commercial environments.

For ease of description, terms such as "upward", "downward" "left" and "right" are relative to the orientation of system components in the figures rather than implying an absolute direction. For example, movement of a driveshaft described as vertically upwards or downwards relative to the orientation of the illustrated system. However, the translational motion of such a driveshaft depends on the orientation of the system and is not necessarily vertical.

The details of one or more embodiments of these systems and methods are set forth in the accompanying drawings and the description below. Other features, objects, and advantages of these systems and methods will be apparent from the description and drawings, and from the claims.

DESCRIPTION OF FIGURES

FIGS. 13A-13D are views of a can for a pod with seamed ends.

FIG. 26B is the machine with the top cover removed.

FIGS. 37A-37B illustrate a grommet on a driveshaft.

FIGS. 37C-37D are views of grommets.

FIG. 40A is a plan view of a mixing paddle using an alternate sealed connection to a pod. FIG. 40B is a perspective view of the mixing paddle showing a portion of the sealed connection shown in FIG. 40A. FIG. 40C is a perspective view of the mixing paddle and the portion of the seal shown in FIG. 40B.

FIG. 41A is a perspective view of mixing paddle using an alternate sealed connection to a pod. FIG. 41B is the seal shown in FIG. 41A. FIG. 41C is the coupling shown in FIG. 41A. FIG. 41D is a plan view of the mixing paddle and the alternate sealed connection shown in FIG. 41A. FIG. 41E is a perspective view of the mixing paddle and the alternate sealed connection shown in FIG. 41A with the pod hidden. FIG. 41F is a plan view of the mixing paddle and the alternate sealed connection shown in FIG. 41A with the pod hidden.

FIGS. 45A-45E are perspective views the cam system engaging a pod.

Like reference symbols in the various drawings indicate like elements.

DETAILED DESCRIPTION

Figure 1:
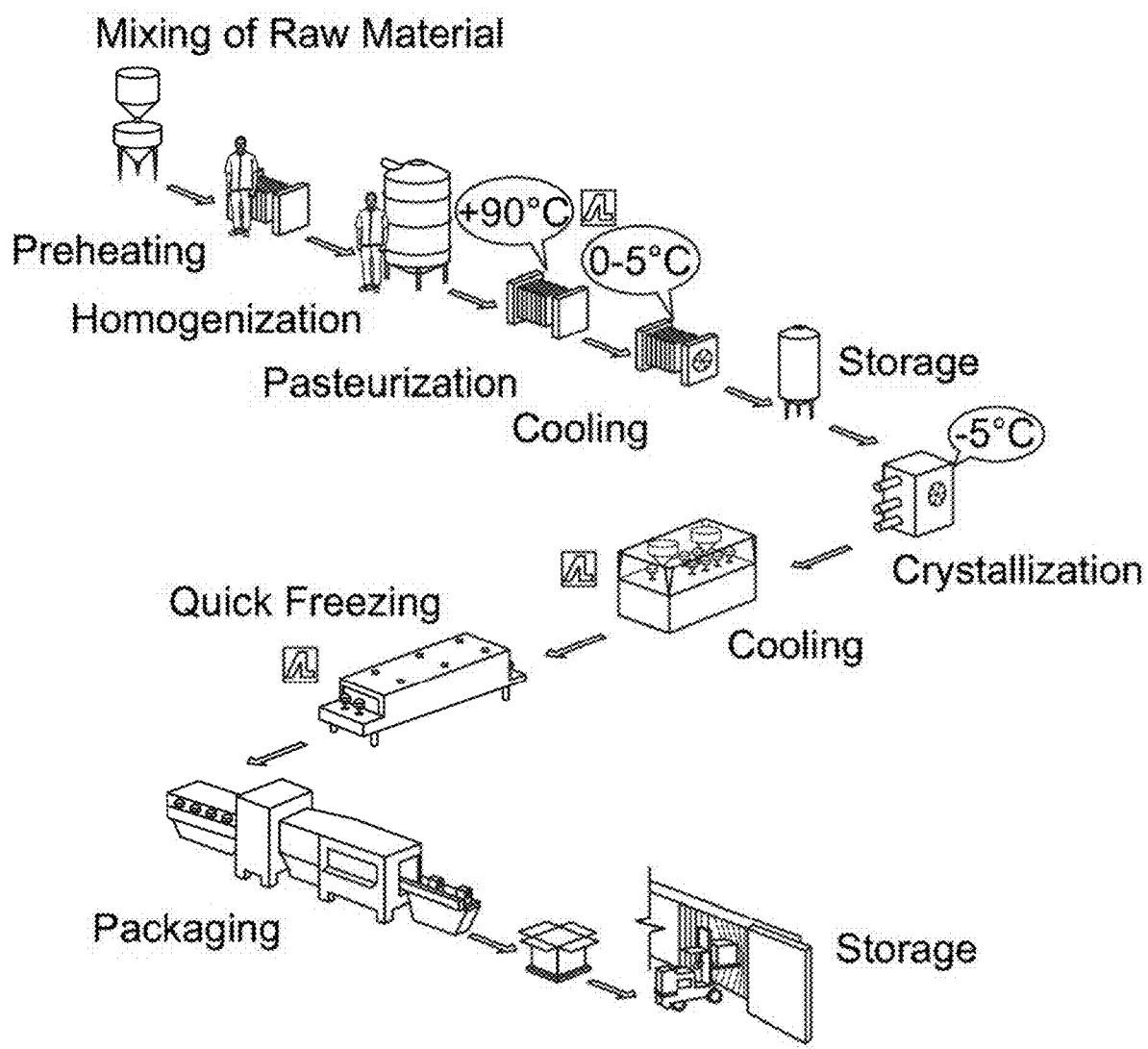
FIG. 1 is a process diagram for an approach to manufacturing ice cream.
Figure 2A:
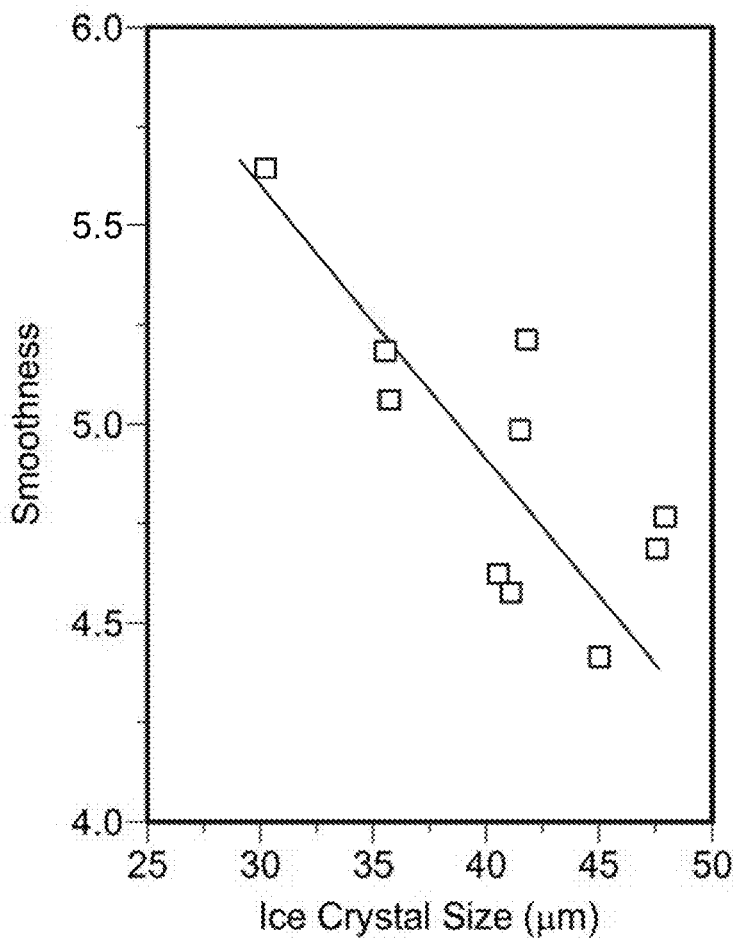
FIGS. 2A-2D illustrate ice crystals in ice cream related to smoothness, churning, and draw temperature.
Figure 2B:
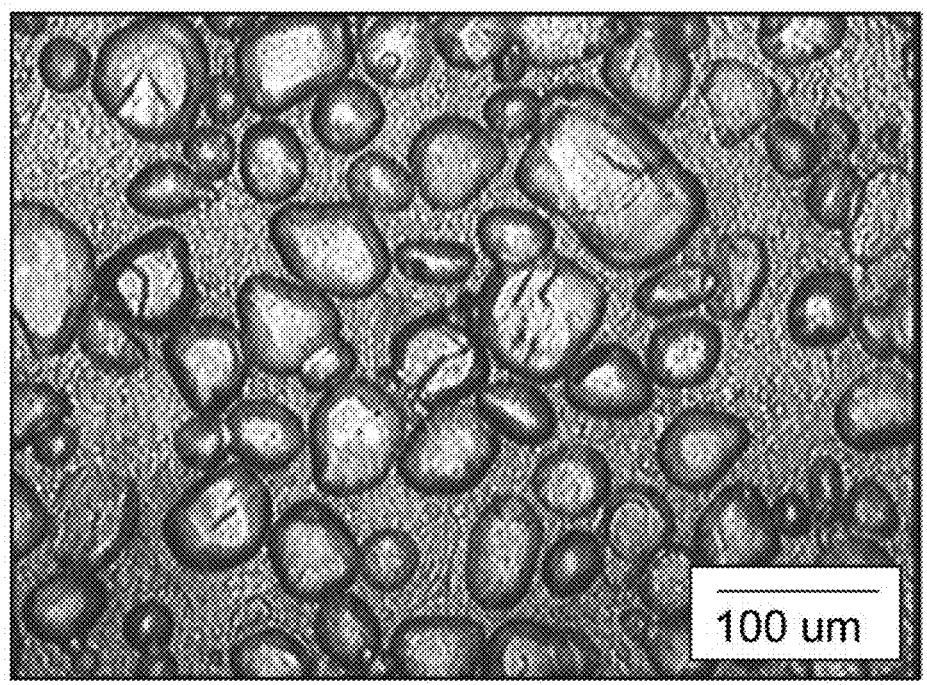
Figure 2C:
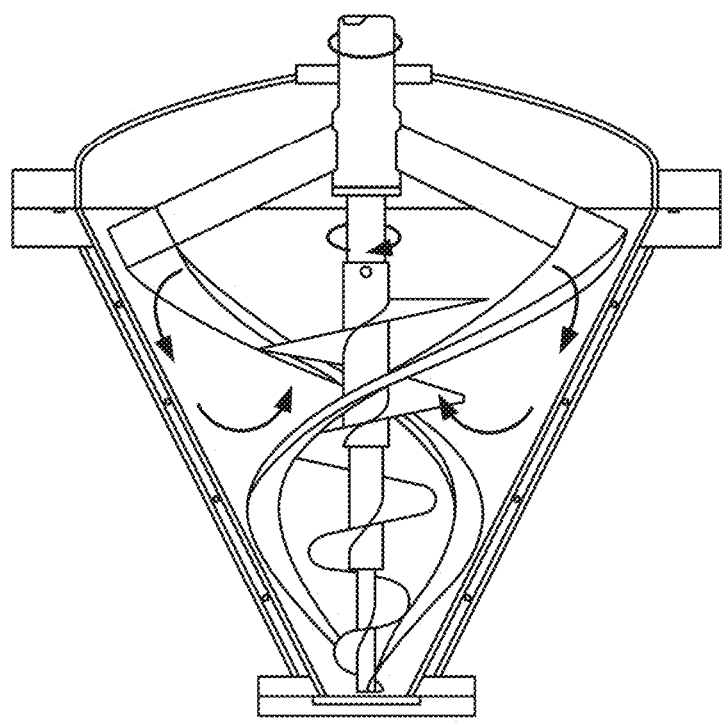
Figure 2D:
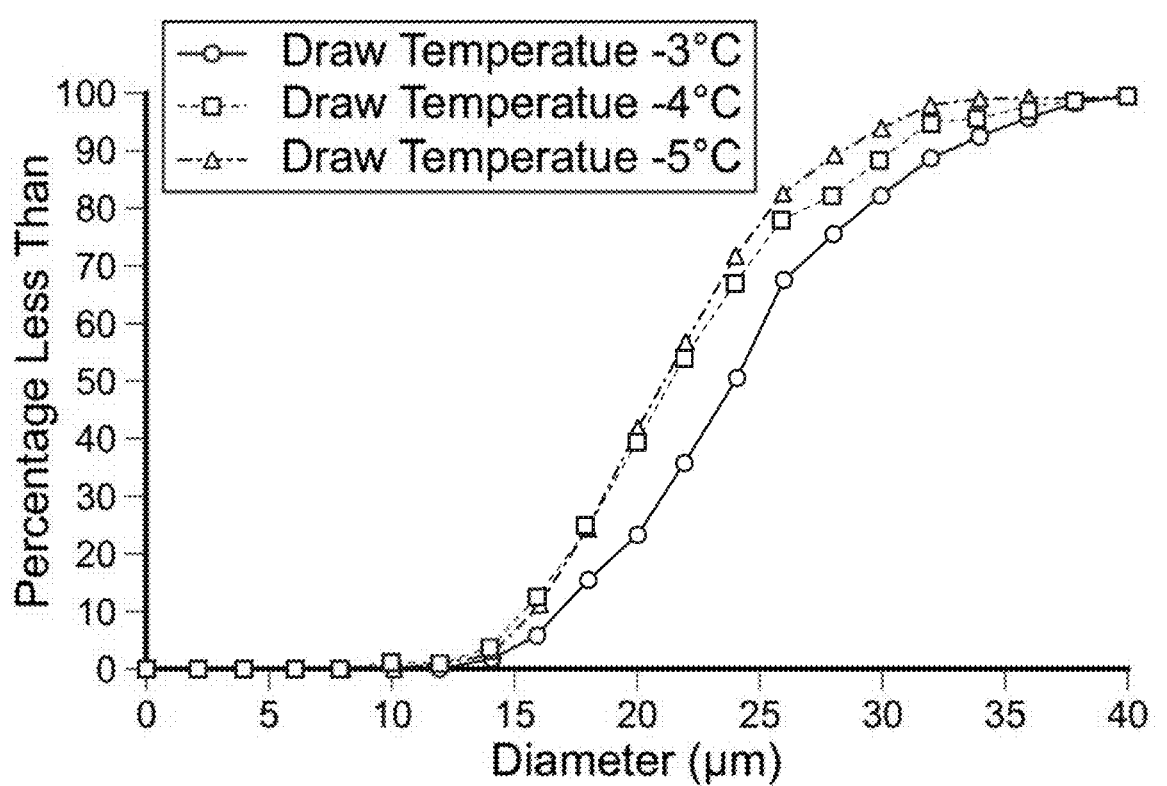

This specification describes systems and methods for rapidly cooling food and drinks. Some of these systems and methods use a counter-top or installed machine to cool food and drinks in a container from room temperature to freezing in less than three minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagenbased, energy, plant-based, non-dairy, and CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle with low startup times and a pod-machine interface that is easy to use and provides extremely efficient heat transfer. Some of the pods described can be sterilized (e.g., using retort sterilization or aseptic filling) and used to store ingredients including, for example, dairy products at room temperature for up to 18 months. These machines are described in more detail in U.S. patent application Ser. No. 16/459,176 filed Jul. 1, 2019 and incorporated herein by reference in its entirety.

A significant challenge in the design of ice cream machines is the ability to cool a pod from room temperature to the draw temperature as quickly as possible, preferably within two minutes. Some machines reduce the residence time the ice cream remains in the ice cream machine by reaching the draw temperature as quickly as possible. This can be achieved by mixing and cooling as quickly as possible.

The machines and processes described in this specification create ice cream with the majority of the ice crystals below 50 μm and often the majority is below 30 μm in a single serve pod. In order to still be able to dispense the ice cream out of the pod into a bowl or dish without the ice cream contacting the machine, a draw temperature or dispensing temperature of the ice cream should be between −3° to −8° C. (26.6° F. to 17.6° F.) and preferably between −3° to −6° C. (26.6° F. to 21.2° F.).

The machines and processes described in this specification use a novel feature of increasing the rotational speed during freezing and dispensing, which is counter-intuitive. The machines described in this specification can use a mixing paddle that begins rotating slowly, but as the ice cream starts to freeze from liquid to solid, the rotational speed is increased requiring much more power to overcome the increase in mixing paddle torque. Normally as torque increases one would slow down the rotational speed of the mixing paddle to keep the power requirement constant. In some machines, the rotational speed of the mixing paddle is increased during freezing process from 100 RPM to 1200 RPM to reduce freeze times and reduce ice crystal size to be low, around 50 μm.

Furthermore, by increasing the rotational speed of the mixing paddle, ice on the inner diameter of the pod is melted, which is opposite the intended function of the pod wall to freeze the ice cream quickly. The freeze time for the ice cream increases by melting the ice crystals at the pod wall with the extra friction generated by the high rotational speed of the mixing paddle. This is opposite the typical goal of reducing consumer the wait time for the ice cream to freeze and dispense. For at least these reasons, increasing the rotational speed of the mixing paddle above a threshold of about 200 RPM is counter-intuitive.

Figure 34A:
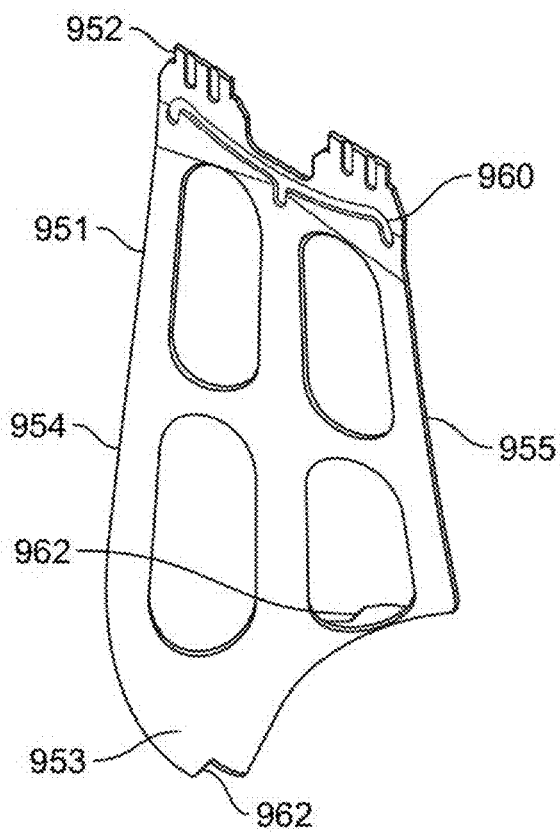
FIGS. 34A-34D are perspective and plan views of a mixing paddle.
Figure 34B:
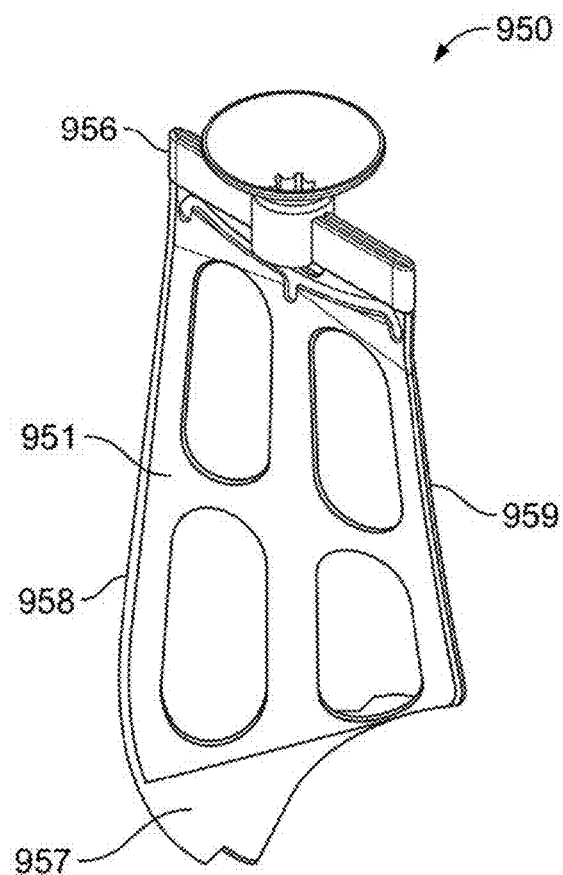

The rotational speed of the impeller mixing paddle is increased to draw air into the frozen confection to achieve improved overrun (preferably at least 30% overrun). Rotation of the helical profile of the mixing paddle (for example, the helical profile of the mixing paddle 950 is shown in FIG. 34A) also generates downward pressure to extrude the ice cream out of the exit port of the pod.

Furthermore, as previously described, the combination of spinning the mixing paddle quickly and cooling rapidly at the walls of the pod allows the cooled ice cream to mix properly within the pod and maintain small ice crystal size which is directly correlated to ice cream smoothness. This is in part because of scraping the chilled ice cream from the walls of the pod and forcing it to the center of the pod where the temperature is warmer. Optimal performance of the ice cream machine relies of having both efficient cooling at the walls of the pod and rapid scraping/mixing of the contents of the pod. A machine with efficient cooling but without rapid scraping/mixing and vice versa would be less optimal.

The ice cream mix described in this specification uses a novel feature of includes minimal or no stabilizers and emulsifiers. The absence or near absence of stabilizers, emulsifiers, and unnatural products, is considered a "clean label". The ice cream mix described in this specification includes milk, cream, sugar and powder milk. By including these features in the ice cream mix, the resulting ice cream has a majority of ice crystals under 25 μm in diameter.

For example, a clean label formulation for a 150 g serving of ice cream can include the following proportions: 48 g of whole milk, 67 g of heavy cream (no gums), 24 g of white sugar, and 11 g of non-fat dry milk powder.

Figure 3A:
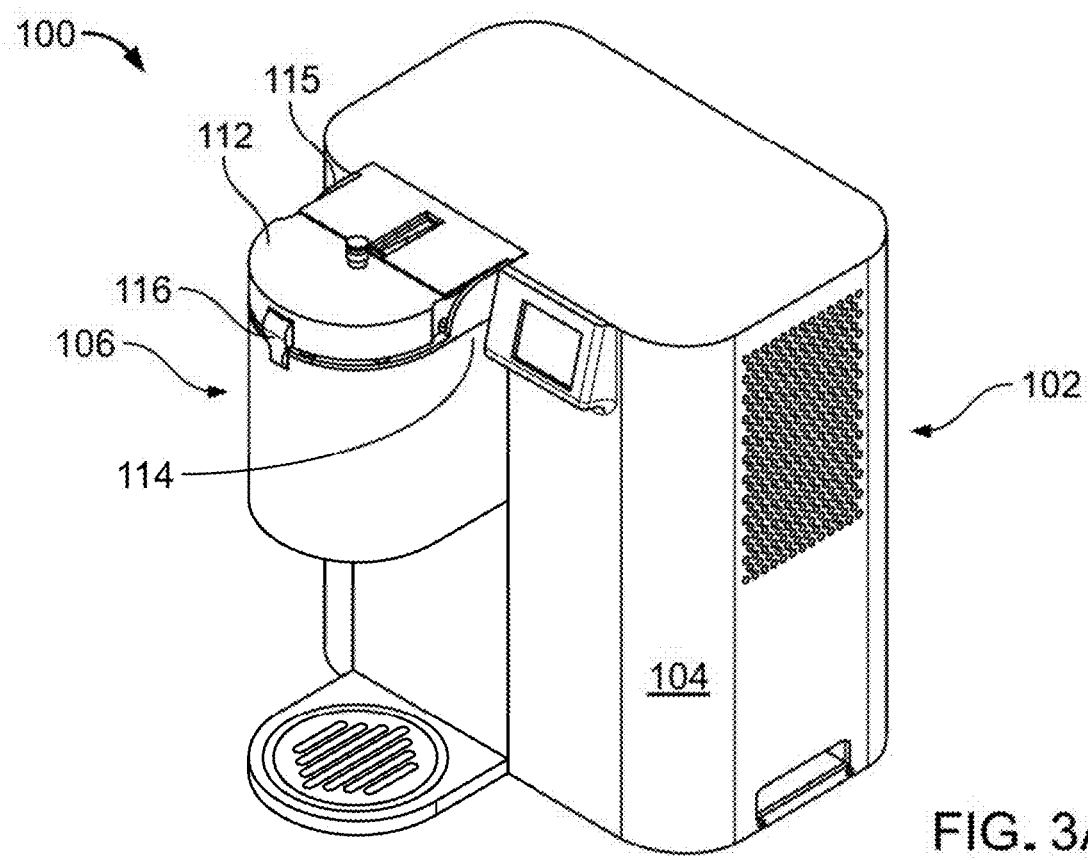
FIG. 3A is a perspective view of a machine for rapidly cooling food and drinks.
Figure 3B:
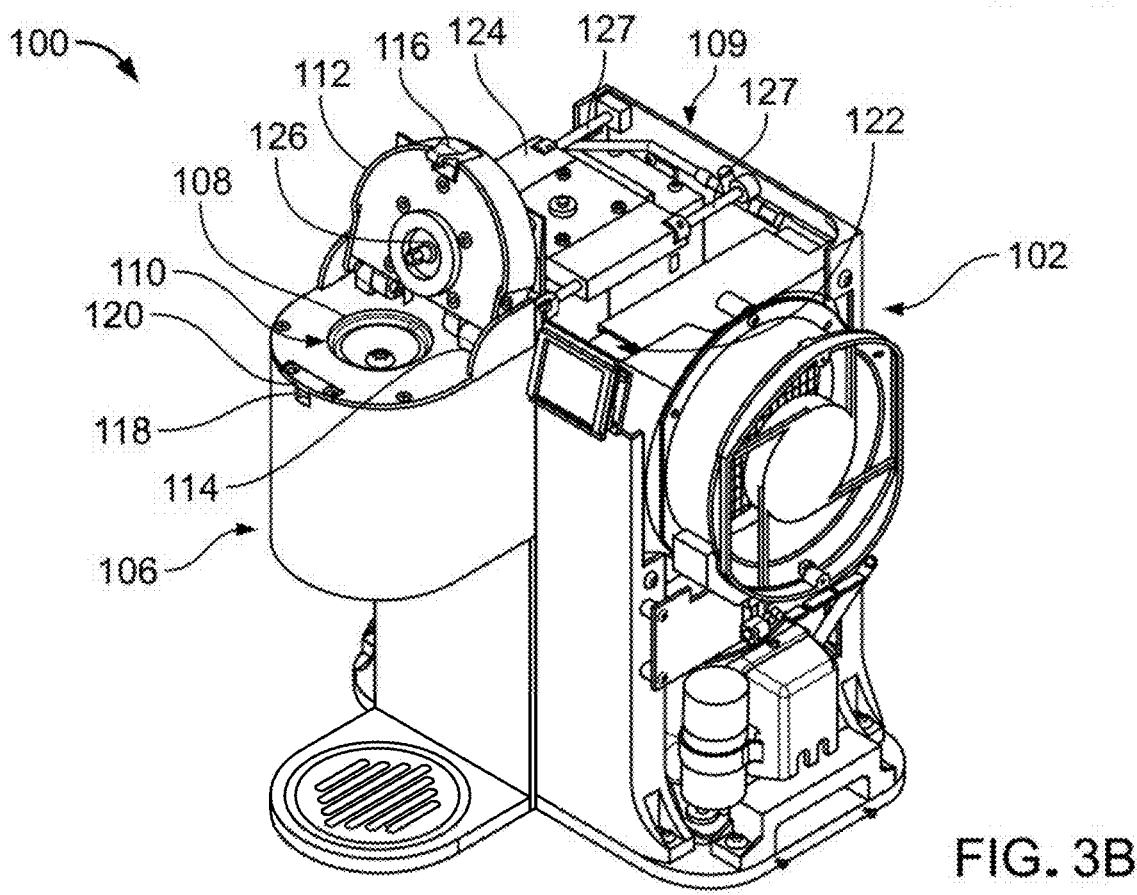
FIG. 3B shows the machine without its housing.

FIG. 3A is a perspective view of a machine 100 for cooling food or drinks. FIG. 3B shows the machine without its housing. The machine 100 reduces the temperature of ingredients in a pod containing the ingredients. Most pods include a mixing paddle used to mix the ingredients before dispensing the cooled or frozen products. In some instances, the mixing paddle can be part of the machine and inserted into the pod. In some instances, the mixing paddle can be used more than once. In some instances, the machine will not dispense the frozen confection and in this case the frozen confection can be scooped out of the pod with a spoon.

The machine 100 includes a body 102 that includes a compressor, a condenser, a fan, an evaporator, capillary tubes, a control system, a lid system and a dispensing system with a housing 104 and a pod-machine interface 106. The pod-machine interface 106 includes an evaporator 108 of a refrigeration system 109 whose other components are disposed inside the housing 104. As shown on FIG. 3B, the evaporator 108 defines a receptacle 110 sized to receive a pod.

A lid 112 is attached to the housing 104 via a hinge 114. The lid 112 can rotate between a closed position covering the receptacle 110 (FIG. 3A) and an open position exposing the receptacle 110 (FIG. 3B). In its closed position, the lid 112 covers the receptacle 110 and is locked in place. In the machine 100, a latch 116 on the lid 112 engages with a latch recess 118 on the pod-machine interface 106. A latch sensor 120 is disposed in the latch recess 118 to determine if the latch 116 is engaged with the latch recess 118. A processor 122 is electronically connected to the latch sensor 120 and recognizes that the lid 112 is closed when the latch sensor 120 determines that the latch 116 and the latch recess 118 are engaged. Not all machines include latch sensors.

An auxiliary cover 115 rotates upward as the lid 112 is moved from its closed position to its open position. A slot in the auxiliary cover 115 receives a handle of the lid 112 during this movement. Some auxiliary covers slide into the housing when the lid moves into the open position.

In the machine 100, the evaporator 108 is fixed in position with respect to the body 102 of the machine 100 and access to the receptacle 110 is provided by movement of the lid 112. In some machines, the evaporator 108 is displaceable relative to the body 102 and movement of the evaporator 108 provides access to the receptacle 110.

A motor 124 disposed in the housing 104 is mechanically connected to a driveshaft 126 that extends from the lid 112. When the lid 112 is in its closed position, the driveshaft 126 extends into the receptacle 110 and, if a pod is present, engages with the pod to move a paddle or paddles within the pod. Sometimes the paddle is referred to as an impeller, a blade, a dasher, or a mixing paddle. The processor 122 is in electronic communication with the motor 124 and controls operation of the motor 124.

In some machines, the shaft associated with the paddle(s) of the pod extends outward from the pod and the lid 112 has a rotating receptacle (instead of the driveshaft 126) mechanically connected to the motor 124. In some machines, the motor provides at least 50 ozf-in (ounce-force inch) of torque at a rotational velocity of at least 100 RPM (rotations per minute) at the mixing paddle. For example, a torque of 100 ozf-in and a rotational speed of 750 RPM may be used. In some machines, the motor of the mixing paddle provides a torque of up to 400 ozf-in and a rotational speed of up to 1,500 RPM.

Figure 3C:
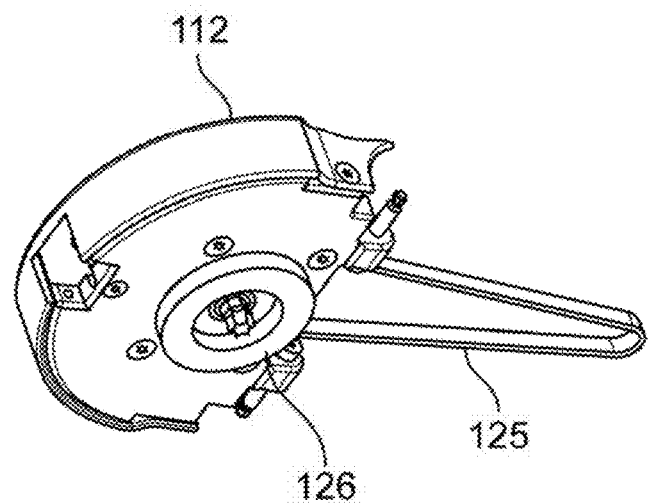
FIG. 3C is a perspective view of a portion of the machine of FIG. 3A.

FIG. 3C is perspective view of the lid 112 shown separately so the belt 125 that extends from motor 124 to the driveshaft 126 is visible. Referring again to FIG. 3B, the motor 124 is mounted on a plate that runs along rails 127. The plate can move approximately 0.25 inches to adjust the tension on the belt 125. During assembly, the plate slides along the rails. Springs disposed between the plate and the lid 112 bias the lid 112 away from the plate to maintain tension in the belt.

Figure 4A:
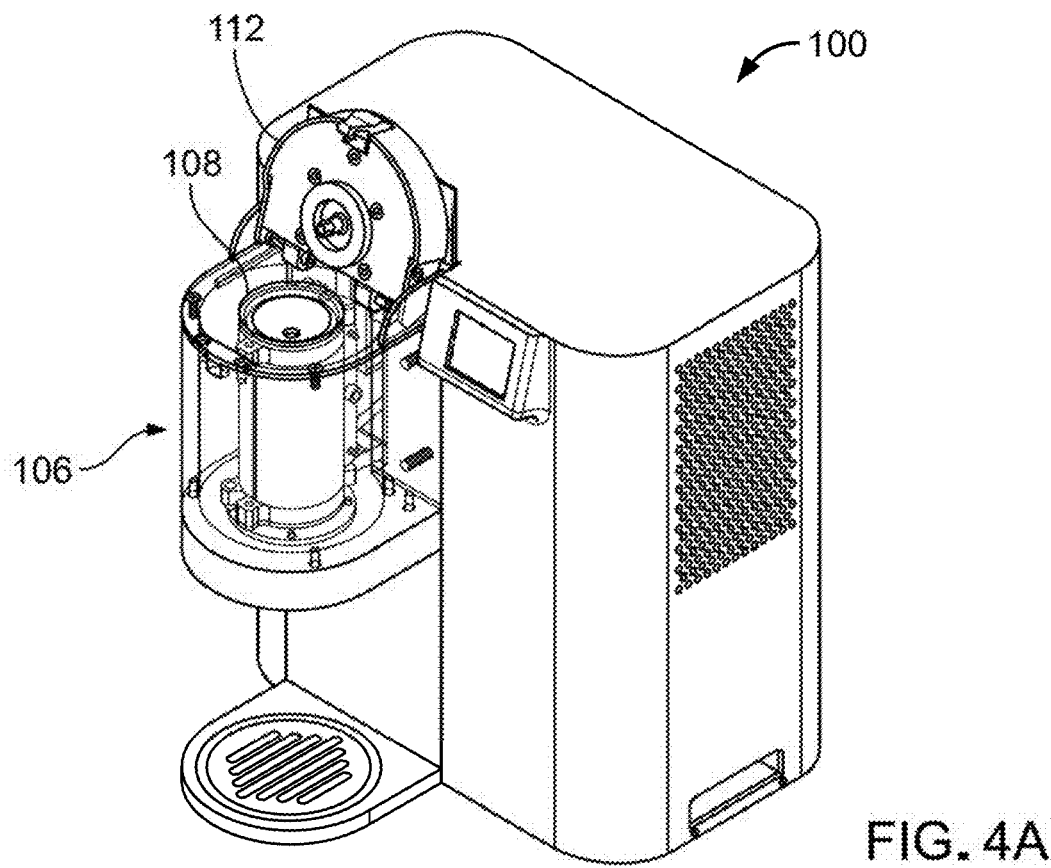
FIG. 4A is perspective view of the machine of FIG. 3A with the cover of the pod-machine interface illustrated as being transparent to allow a more detailed view of the evaporator to be seen.
Figure 4B:
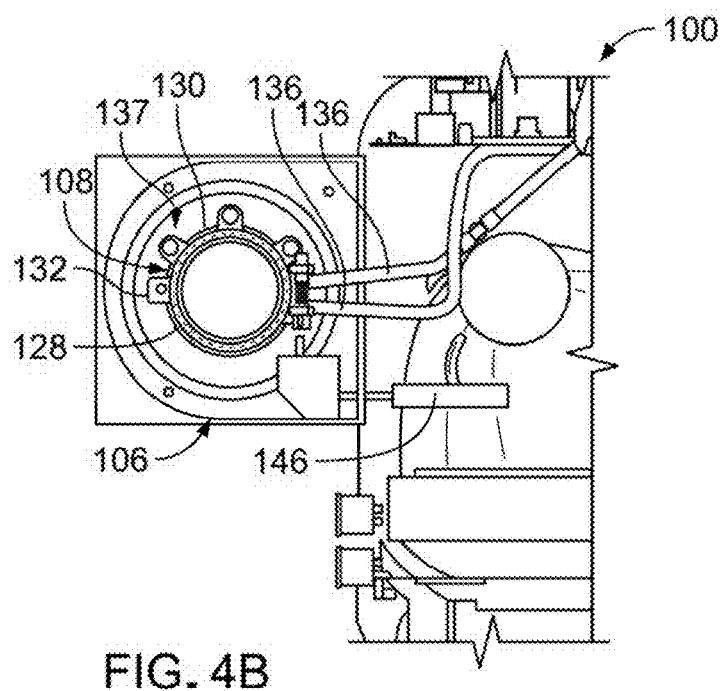
FIG. 4B is a top view of a portion of the machine without the housing and the pod-machine interface without the lid.
Figure 4C:
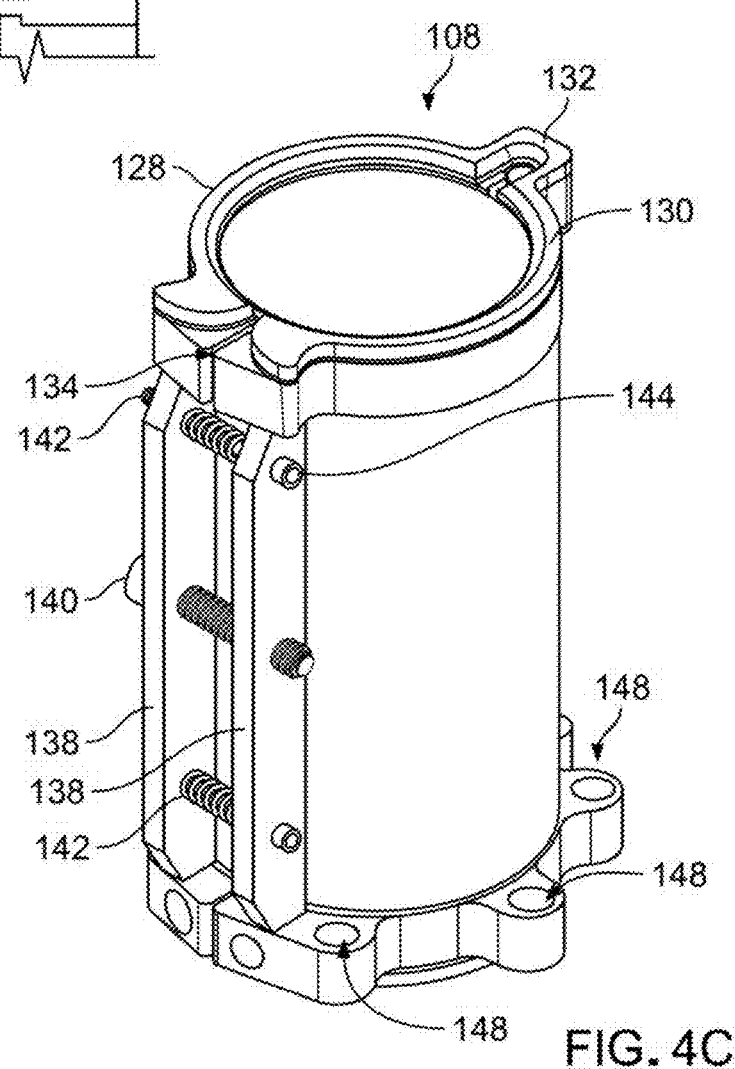
FIGS. 4C and 4D are, respectively, a perspective view and a side view of the evaporator.
Figure 4D:
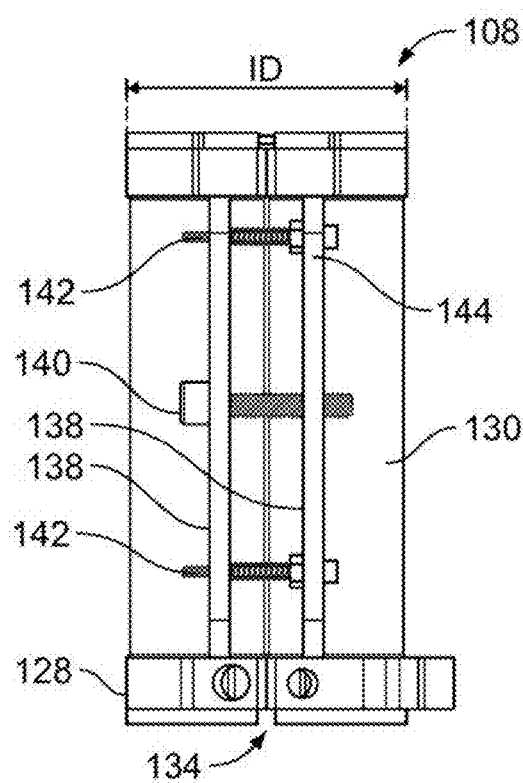

FIG. 4A is a perspective view of the machine 100 with the cover of the pod-machine interface 106 illustrated as being transparent to allow a more detailed view of the evaporator 108 to be seen. FIG. 4B is a top view of a portion of the machine 100 without housing 104 and the pod-machine interface 106 without the lid 112. FIGS. 4C and 4D are, respectively, a perspective view and a side view of the evaporator 108. The evaporator 108 is described in more detail in U.S. patent application Ser. No. 16/459,388 filed Jul. 1, 2019 and incorporated herein by reference in its entirety.

The evaporator 108 has a clamshell configuration with a first portion 128 attached to a second portion 130 by a living hinge 132 on one side and separated by a gap 134 on the other side. Refrigerant flows to the evaporator 108 from other components of the refrigeration system through fluid channels 136 (best seen on FIG. 4B). The refrigerant flows through the evaporator 108 in internal channels through the first portion 128, the living hinge 132, and the second portion 130.

The space 137 (best seen on FIG. 4B) between the outer wall of the evaporator 108 and the inner wall of the casing of the pod-machine interface 106 is filled with an insulating material to reduce heat exchange between the environment and the evaporator 108. In the machine 100, the space 137 is filled with an aerogel (not shown). Some machines use other insulating material, for example, an annulus (such as an airspace), insulating foams made of various polymers, or fiberglass wool.

The evaporator 108 has an open position and a closed position. In the open position, the gap 134 opens to provide an air gap between the first portion 128 and the second portion 130. In the machine 100, the first portion 128 and the second portion 130 are pressed together in the closed position.

The inner diameter ID of the evaporator 108 is slightly larger in the open position than in the closed position. Pods can be inserted into and removed from the evaporator 108 while the evaporator is in its open position. Transitioning the evaporator 108 from its open position to its closed position after a pod is inserted tightens the evaporator 108 around the outer diameter of the pod. For example, the machine 100 is configured to use pods with 2.085" outer diameter. The evaporator 108 has an inner diameter of 2.115" in the open position and an inner diameter inner diameter of 2.085" in the closed position. The evaporator 108 has an inner diameter of 2.115 inches in its open position and an inner diameter inner diameter of 2.085 inches in its closed position. Some machines have evaporators sized and configured to cool other pods.

The evaporator is sized to easily receive a pod in the open position and engage the pod in the closed position. Instead of a clamshell configuration, some evaporators can have multiple pieces that have an opened and closed position that do not hinge but can slide into close proximity with one another. Some evaporators can have a tube connecting the cooling channels between the various pieces of the evaporator. Some evaporators can be frustoconical. Some evaporators have first and second portions that are pressed towards each other and a gap between them is reduced, but a space between the first and second portions exists in the closed position.

Some machines have evaporators sized and configured to cool other pods. The pods can be formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085±0.10 inches outer diameter. Some pods have an inner diameter of 2.065 inches to 2.075 inches to allow the mixing paddle with a diameter of 2.045 to 2.055 inches, respectively, to rotate at an RPM of 100 to 1,500 RPM, resulting in 6,000 to 93,000 square inches scraped per minute.

With an inner diameter of about 2.085 inches, the pod can accommodate a mixing paddle with a diameter of about 2.065 inches. The mixing paddle can revolve in the pod at rotational speeds ranging between 100 RPM and 1,500 RPM. During this time a single blade edge of the mixing paddle scrapes the internal walls of the pod at rates ranging from 3,100 to 46,500 square inches per minute. The scraped area per minute multiplies with each scraping edge on the mixing paddle (i.e., a mixing paddle with two edges would scrape approximately 6,200 to 93,000 square inches per minute). As previously described, this scraping and mixing process helps distribute the ice crystals that formed at the wall of the pod to the interior of the pod.

Some pods are pressurized to have an internal pressure of around 5-100 psi gauge pressure. Some pods have a decorative external coating of no more than 10-50 microns thickness (e.g., less than 50 microns). Thicker external coatings can insulate the pod and interfere with heat transfer during cooling of the pod. Some pods do not have an internal or external coating on the ends.

In addition to cylindrical pods, some pods are frustoconical (e.g., frustoconical with an open end). Some pods do not require a dispensing port because the frozen confection can be spooned out from the open end of the pod.

In addition to single-use pods, some pods are reusable. Some pods are used, washed, and reused. Some pods are be purchased empty and filled before use. Some pods are be purchased or acquired full, used, and refilled by a user or by the machine. Some pods are sterilized after use and sterilized after refill using to enable room temperature storage. Some pods include resealed features that allow the pod to be refilled and resealed. Some pods include a reusable protrusion for dispensing the frozen confection of the pod from the machine. Some pods can be purchased empty and used with a home ice cream making kit with clean-label ingredients.

The closed position of evaporator 108 improves heat transfer between inserted pod 150 and the evaporator 108 by increasing the contact area between the pod 150 and the evaporator 108 and reducing or eliminating an air gap between the wall of the pod 150 and the evaporator 108. In some pods, the pressure applied to the pod by the evaporator 108 is opposed by the mixing paddles, pressurized gases within the pod, or both to maintain the casing shape of the pod. Evaporator 108 can provide a closure force against the pod 150 of approximately 10-50 lbf (pound-force) and an approximate torque clamping force of 1,000 to 1,500 ozf-in.

In the evaporator 108, the relative position of the first portion 128 and the second portion 130 and the size of the gap 134 between them is controlled by two bars 138 connected by a bolt 140 and two springs 142. Each of the bars 138 has a threaded central hole through which the bolt 140 extends and two end holes engaging the pins 144. Each of the two springs 142 is disposed around a pin 144 that extends between the bars 138. Some machines use other systems to control the size of the gap 134, for example, circumferential cable systems with cables that extend around the outer diameter of the evaporator 108 with the cable being tightened to close the evaporator 108 and loosened to open the evaporator 108. In other evaporators, there are a plurality of bolts and end holes, one or more than two springs, and one or more than engaging pins.

One bar 138 is mounted on the first portion 128 of the evaporator 108 and the other bar 138 is mounted on the second portion 130 of the evaporator 108. In some evaporators, the bars 138 are integral to the body of the evaporator 108 rather than being mounted on the body of the evaporator. The springs 142 press the bars 138 away from each other. The spring force biases the first portion 128 and the second portion 130 of the evaporator 108 away from each at the gap 134. Rotation of the bolt 140 in one direction increases a force pushing the bars 138 towards each and rotation of the bolt in the opposite direction decreases this force. When the force applied by the bolt 140 is greater than the spring force, the bars 138 bring the first portion 128 and the second portion 130 of the evaporator together.

The machine 100 includes an electric motor 146 (shown on FIG. 4B) that is operable to rotate the bolt 140 to control the size of the gap 134. Some machines use other mechanisms to rotate the bolt 140. For example, some machines use a mechanical linkage, for example, between the lid 112 and the bolt 140 to rotate the bolt 140 as the lid 112 is opened and closed. Some machines include a handle that can be attached to the bolt to manually tighten or loosen the bolt. Some machines have a wedge system that forces the bars into a closed position when the machine lid is shut. This approach may be used instead of the electric motor 146 or can be provided as a backup in case the motor fails.

The electric motor 146 is in communication with and controlled by the processor 122 of the machine 100. Some electric drives include a torque sensor that sends torque measurements to the processor 122. The processor 122 signals to the motor to rotate the bolt 140 in a first direction to press the bars 138 together, for example, when a pod sensor indicates that a pod is disposed in the receptacle 110 or when the latch sensor 120 indicates that the lid 112 and pod-machine interface 106 are engaged. It is desirable that the clamshell evaporator be shut and holding the pod in a tightly fixed position before the lid closes and the shaft pierces the pod and engages the mixing paddle. This positioning can be important for shaft-mixing paddle engagement. The processor 122 signals to the electric drive to rotate the bolt 140 in the second direction, for example, after the food or drink being produced has been cooled/frozen and dispensed from the machine 100, thereby opening the evaporator gap 134 and allowing for easy removal of pod 150 from evaporator 108.

The base of the evaporator 108 has three bores 148 (see FIG. 4C) which are used to mount the evaporator 108 to the floor of the pod-machine interface 106. All three of the bores 148 extend through the base of the second portion 130 of the evaporator 108. The first portion 128 of the evaporator 108 is not directly attached to the floor of the pod-machine interface 106. This configuration enables the opening and closing movement described above. Other configurations that enable the opening and closing movement of the evaporator 108 can also be used. Some machines have more or fewer than three bores 148. Some evaporators are mounted to components other than the floor of the pod-machine interface, for example, the dispensing mechanism.

Many factors affect the performance of a refrigeration system. Important factors include mass velocity of refrigerant flowing through the system, the refrigerant wetted surface area, the refrigeration process, the area of the pod/evaporator heat transfer surface, the mass of the evaporator, and the thermal conductivity of the material of the heat transfer surface. Extensive modeling and empirical studies in the development of the prototype systems described in this specification have determined that appropriate choices for the mass velocity of refrigerant flowing through the system and the refrigerant wetted surface area are the most important parameters to balance to provide a system capable of freezing up to 10-12 ounces of confection in less than 2 minutes.

The evaporators described in this specification have the following characteristics:

| | |
|---|---|
| Mass Velocity | 60,000 to 180,000 lb/(hour feet squared) |
| Refrigerant Wetted Surface Area | 35 to 110 square inches |
| Pressure drop Through Refrigeration Process | less than 2 psi pressure drop across the evaporator |
| Pod/Evaporator Heat Transfer Surface | 15 to 50 square inches |
| Mass of Evaporator | 0.100 to 1.50 pounds |
| Conductivity of the Material | 160 W/mK |

The following paragraphs describe the significance of these parameters in more detail.

Mass velocity accounts for the multi-phase nature or refrigerant flowing through an evaporator. The two-phase process takes advantage of the high amounts of heat absorbed and expended when a refrigerant fluid (e.g., R-290 propane) changes state from a liquid to gas and a gas to a liquid, respectively. The rate of heat transfer depends in part on exposing the evaporator inner surfaces with a new liquid refrigerant to vaporize and cool the liquid ice cream mix. To do this the velocity of the refrigerant fluid must be high enough for vapor to channel or flow down the center of the flow path within the walls of evaporator and for liquid refrigerant to be pushed thru these channel passages within the walls. One approximate measurement of fluid velocity in a refrigeration system is mass velocity—the mass flow of refrigerant in a system per unit cross sectional area of the flow passage in units of pounds/(hour-square foot) (lb/hr ft$^2$). Velocity as measured in feet/second (ft/s) (a more familiar way to measure "velocity") is difficult to apply in a two-phase system since the velocity (ft/s) is constantly changing as the fluid flow changes state from liquid to gas. If liquid refrigerant is constantly sweeping across the evaporator walls, it can be vaporized and new liquid can be pushed against the wall of the cooling channels by the "core" of vapor flowing down the middle of the passage. At low velocities, flow separates based on gravity and liquid remains on the bottom of the cooling passage within the evaporator and vapor rises to the top side of the cooling passage channels. If the amount of area exposed to liquid is reduced by half, for example, this could cut the amount of heat transfer almost half.

According to the American Society of Heating, Refrigerating and Air-Conditioning Engineers (ASHRAE), a mass velocity of 150,000 lb/hr ft^2 maximizes performance for the majority of the evaporator flow path. Mass velocity is one of the parameters that must be balanced to optimize a refrigerant system. The parameters that affect the performance of the evaporator are mass flow rate, convective heat transfer coefficient, and pressure drop. The nominal operating pressure of the evaporator is determined by the required temperature of the evaporator and the properties of the refrigerant used in the system. The mass flow rate of refrigerant through the evaporator must be high enough for it to absorb the amount of thermal energy from the confection to freeze it, in a given amount of time. Mass flow rate is primarily determined by the size of the compressor. It is desirable to use the smallest possible compressor to reduce, cost, weight and size. The convective heat transfer coefficient is influenced by the mass velocity and wetted surface area of the evaporator. The convective heat transfer coefficient will increase with increased mass velocity. However, pressure drop will also increase with mass velocity. This in turn increases the power required to operate the compressor and reduces the mass flow rate the compressor can deliver. It is desirable to design the evaporator to meet performance objectives while using the smallest least expensive compressor possible. We have determined that evaporators with a mass velocity of 75,000-125,000 lb/hr ft^2 are effective in helping provide a system capable of freezing up to 12 ounces of confection in less than 2 minutes. The latest prototype has a mass velocity of approximately 100,000 lb/hr ft^2 and provides a good balance of high mass velocity, manageable pressure drop in the system (under 2 psi), and a reasonable sized compressor below 12 cc displacement In some systems, the refrigeration system cools the pod with a compressor using a two-phase refrigerant fluid, such as R134A, R22, R600a, or R290. In some systems the compressor is a reciprocating compressor or a rotary compressor. Direct Current (DC) compressors with a variable motor speed allow for increased displacement towards the beginning of the refrigeration cooling cycle of the pod (e.g., first 45 seconds of cooling the pod) and slow down the motor speed towards the end of the cooling cycle of the pod in order to increase the efficiency of the freezing process while maintaining the pressure drop. In some systems, the DC compressor can have a variable motor speed that is adjusted depending on the load on the machine's refrigeration cycle.

In some systems, the use of a natural refrigerant, such as R290, can meet objectives of international protocols, such as Montreal and Kyoto, as well as help reduce environmental issues, such as ozone depletion and global warming. These protocols and environmental issues typically suggest that R22 and R134A refrigerants be phased out.

Thermo-physical properties of refrigerants determine an energy performance of the refrigeration system. The following table shows thermo-physical properties for refrigerants R22 and R290, at an evaporating temperature of 10° C. and condensing temperature of 45° C.

| Property | Temp (Degrees C.) | State | Refrigerant R22 | Refrigerant R290 |
|---|---|---|---|---|
| Saturation Pressure (MPa) | 10 | Liquid | 0.640 | 0.601 |
|  | 45 | Vapor | 1.729 | 1.534 |
| Density (kg/m^3) | 10 | Liquid | 1253.8 | 517.56 |
|  | 45 | Vapor | 75.45 | 34.14 |
| Viscosity (microPa-s) | 10 | Liquid | 197.97 | 115.69 |
|  | 45 | Vapor | 13.69 | 9.13 |
| Thermal conductivity (W/m deg. C.) | 10 | Liquid | 0.0911 | 0.101 |
|  | 45 | Vapor | 0.0135 | 0.0224 |
| Specific heat (kJ/kg deg C.) | 10 | Liquid | 1.1836 | 2.5318 |
|  | 45 | Vapor | 1.0487 | 2.3714 |

The lower liquid density of R290 refrigerant denotes the lower requirement of refrigerant mass resulting in lower friction and better heat transfer coefficients in the evaporator and condenser. Refrigerant viscosity is the major source of irreversibility and influences condensation and boiling heat transfer coefficients. R290 refrigerant has lower viscosity and higher thermal conductivity which improves the performance of condenser and evaporator. The higher specific heat of R290 gives lower discharge temperatures.

Another important factor that affects performance in an evaporator is the surface area wetted by refrigerant which is the area of all the cooling channels within the evaporator as long as at least some liquid refrigerant is present throughout these channels. Increasing the wetted surface area can improve heat transfer characteristics of an evaporator. However, increasing the wetted surface area can increase the mass of the evaporator which would increase thermal inertia and degrade heat transfer characteristics of the evaporator.

The amount of heat that can be transferred out of the liquid in a pod is proportional ice cream mix to the surface area of the pod/evaporator heat transfer surface. A larger surface area is desirable but increases in surface area can require increasing the mass of the evaporator which would degrade heat transfer characteristics of the evaporator. We have determined that evaporators in which the area of the pod/evaporator heat transfer surface is between 20 and 40 square inches are effectively combined with the other characteristics to help provide a system capable of freezing up to 12 ounces of confection in less than 2 minutes.

Thermal conductivity is the intrinsic property of a material which relates its ability to conduct heat. Heat transfer by conduction involves transfer of energy within a material without any motion of the material as a whole. An evaporator with walls made of a high conductivity material (e.g., aluminum) reduces the temperature difference across the evaporator walls. Reducing this temperature difference reduces the work required for the refrigeration system to cool the evaporator to the right temperature.

The temperature of the pod can be measured using a temperature sensor, such as a thermocouple. In some machines, a thermocouple physically touching the exterior surface of the pod can be used to measure the temperature of the pod, or the thermocouple can be provided directly on the exterior of the pod. In some machines, the sensor(s) penetrate radially through the evaporator and, in some cases, are spring loaded to ensure consistent force at the sensor tip. The sensor can be insulated thermally from the evaporator so it only senses the temperature of the outside of the pod. Pods can be made of approximately 0.004 to 0.008 inch thick aluminum such that the pod temperature is effectively the same as the temperature of the contents. Using these temperatures the process would be controllable in several ways: (i) by varying the mixer speed depending on how quickly the product freezes, (ii) by stopping the freezing process when the target temperature is achieved, and (iii) during the dispensing process, by sensing when the pod is empty and ending the dispensing process at that time, instead of spinning the mixing paddle in an empty pod, which can be noisy.

For the desired heat transfer to occur, the evaporator must be cooled. The greater the mass of the evaporator, the longer this cooling will take. Reducing evaporator mass reduces the amount of material that must be cooled during a freezing cycle. An evaporator with a large mass will increase the time require to freeze up to 12 ounces of confection.

The effects of thermal conductivity and mass can be balanced by an appropriate choice of materials. There are materials with higher thermal conductivity than aluminum such as copper. However, the density of copper is greater that the density of aluminum. For this reason, some evaporators have been constructed that use high thermal conductive copper only on the heat exchange surfaces of the evaporator and use aluminum everywhere else.

FIGS. 5A-5F show components of the pod-machine interface 106 that are operable to open pods in the evaporator 108 to dispense the food or drink being produced by the machine 100. This is an example of one approach to opening pods but some machines and the associated pods use other approaches.

Figure 5A:
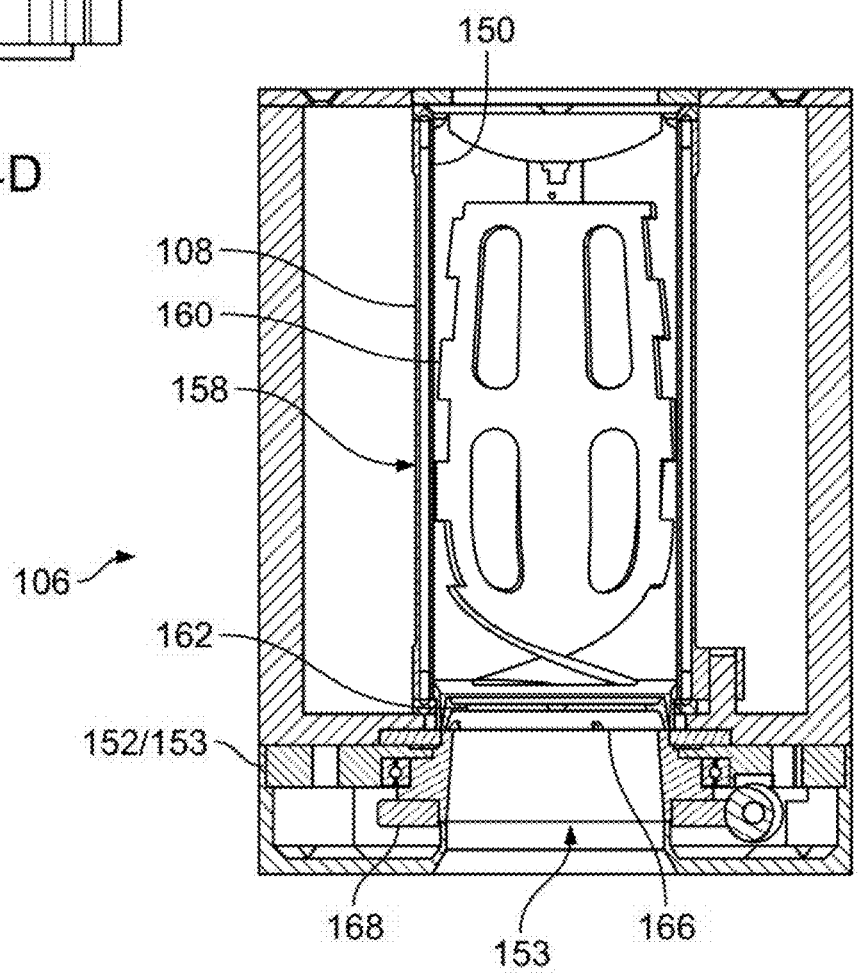
FIGS. 5A-5F show components of a pod-machine interface that are operable to open and close pods in the evaporator to dispense the food or drink being produced.
Figure 5B:
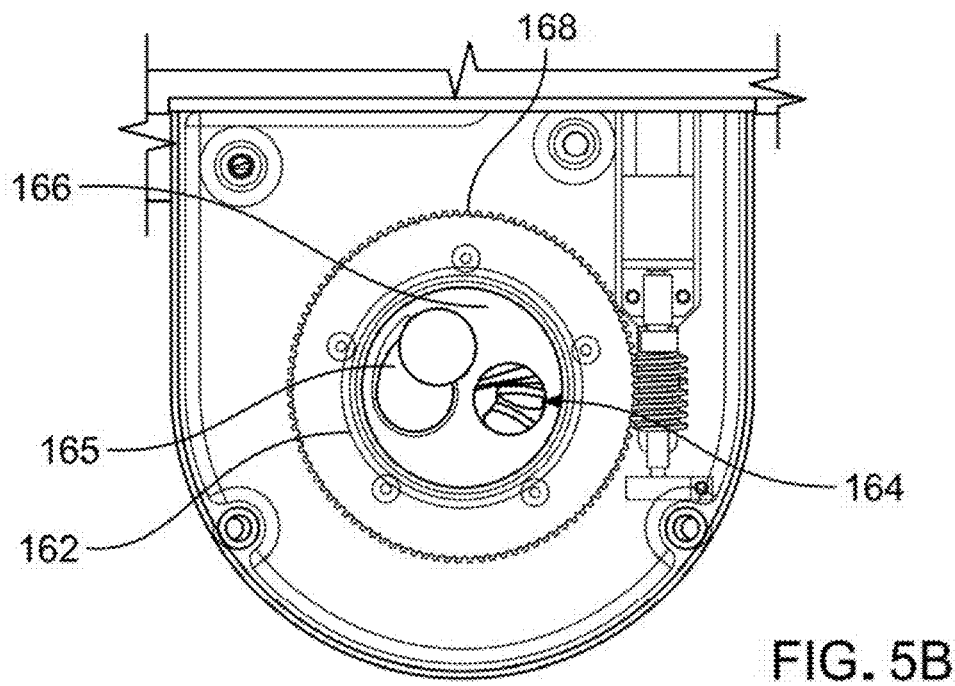
Figure 5C:
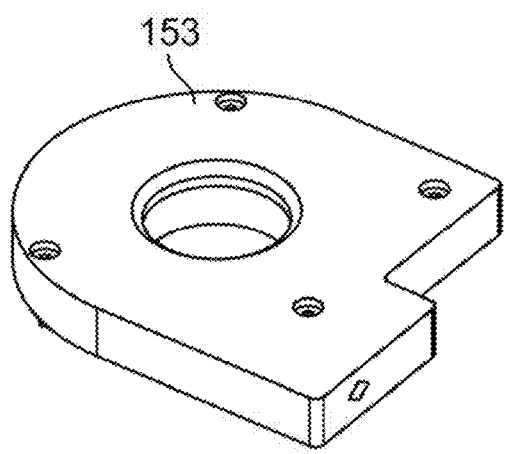
Figure 5D:
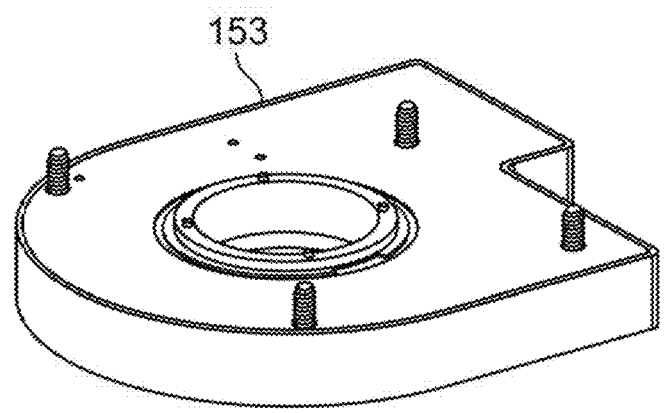
Figure 5E:
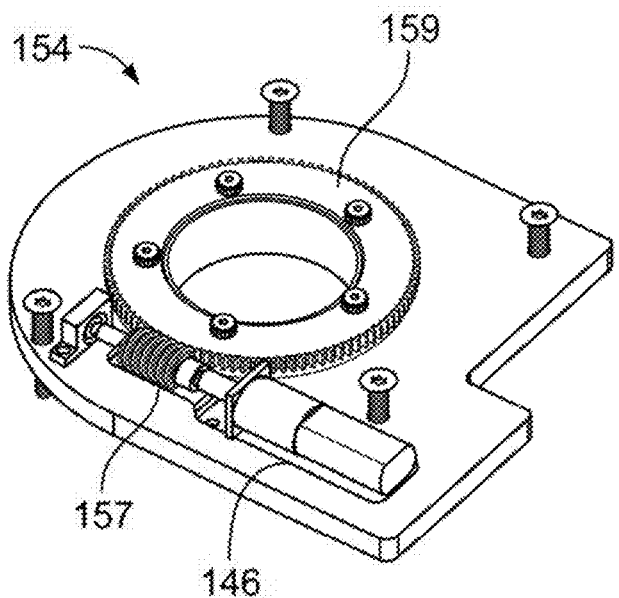
Figure 5F:
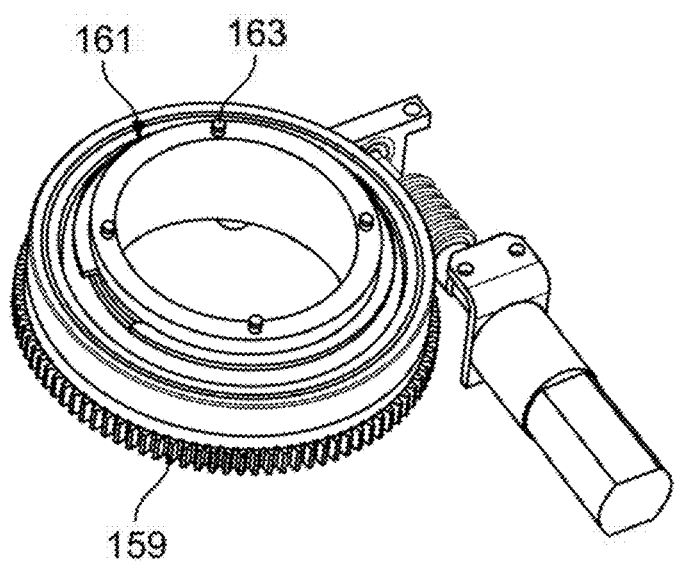

FIG. 5A is a partially cutaway schematic view of the pod-machine interface 106 with a pod 150 placed in the evaporator 108. FIG. 5B is a schematic plan view looking upwards that shows the relationship between the end of the pod 150 and the floor 152 of the pod-machine interface 106. The floor 152 of the pod-machine interface 106 is formed by a dispenser 153. FIGS. 5C and 5D are perspective views of a dispenser 153. FIGS. 5E and 5F are perspective views of an insert 154 that is disposed in the dispenser 153. The insert 154 includes an electric motor 146 operable to drive a worm gear 157 floor 152 of the pod-machine interface 106. The worm gear 157 is engaged with a gear 159 with an annular configuration. An annular member 161 mounted on the gear 159 extends from the gear 159 into an interior region of the pod-machine interface 106. The annular member 161 has protrusions 163 that are configured to engage with a pod inserted into the pod-machine interface 106 to open the pod. The protrusions 163 of the annular member 161 are four dowel-shaped protrusions. Some annular gears have more protrusions or fewer protrusions and the protrusions can have other shapes, for example, "teeth".

The pod 150 includes a body 158 containing a mixing paddle 160 (see FIG. 5A). The pod 150 also has a base 162 defining an aperture 164 and a cap 166 extending across the base 162 (see FIG. 5B). The base 162 is seamed/fixed onto the body 158 of the pod 150. The base 162 includes a protrusion 165. The cap 166 mounted over base 162 is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. The pod 150 and its components are described in more detail with respect to FIGS. 8A-8B.

The aperture 164 in the base 162 is opened by rotation of the cap 166. The pod-machine interface 106 includes an electric motor 146 with threading that engages the outer circumference of a gear 168. Operation of the electric motor 146 causes the gear 168 to rotate. The gear 168 is attached to an annular member 161 and rotation of the gear 168 rotates the annular member 161. The gear 168 and the annular member 161 are both annular and together define a central bore through which food or drink can be dispensed from the pod 150 through the aperture 164 without contacting the gear 168 or the annular member 161. When the pod 150 is placed in the evaporator 108, the annular member 161 engages the cap 166 and rotation of the annular member 161 rotates the cap 166.

Figure 6:
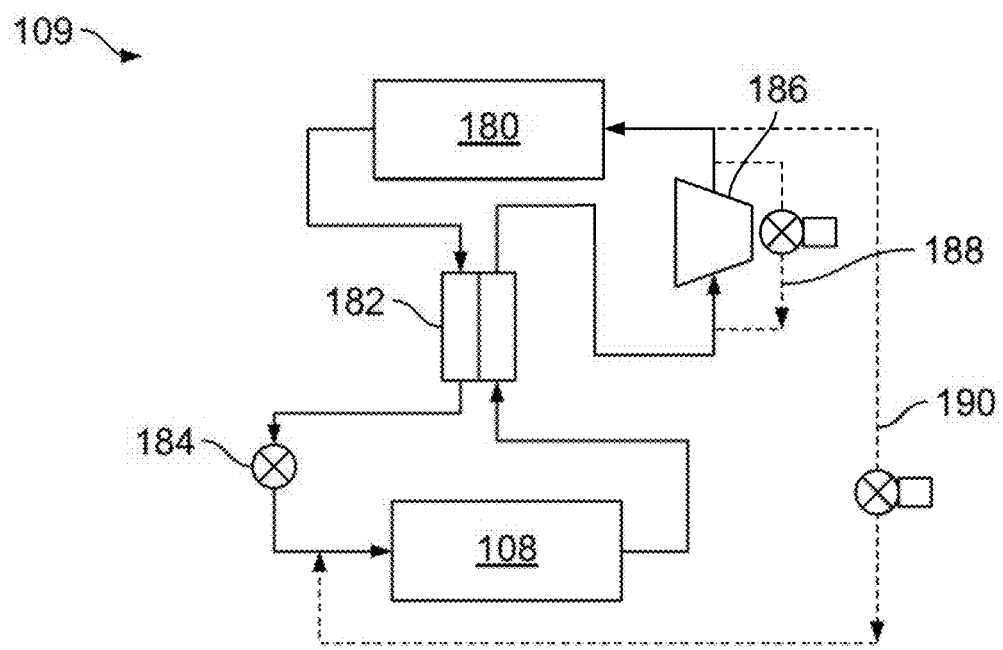
FIG. 6 is a schematic of a refrigeration system.

FIG. 6 is a schematic of the refrigeration system 109 that includes the evaporator 108. The refrigeration system also includes a condenser 180, a suction line heat exchanger 182, an expansion device 184, and a compressor 186. The expansion device 184 can include a valve or a capillary tube both of which could be used in the refrigeration system 109. High-pressure, liquid refrigerant flows from the condenser 180 through the suction line heat exchanger 182 and the expansion device 184 to the evaporator 108. The expansion device 184 restricts the flow of the liquid refrigerant fluid and lowers the pressure of the liquid refrigerant as it leaves the expansion device 184. The low-pressure liquid then moves to the evaporator 108 where heat is absorbed from a pod 150 and its contents in the evaporator 108 changes the refrigerant from a liquid to a gas. The gas-phase refrigerant flows from the evaporator 108 to the compressor 186 through the suction line heat exchanger 182. In the suction line heat exchanger 182, the cold vapor leaving the evaporator 108 pre-cools the liquid leaving the condenser 180. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 109 includes a first bypass line 188 or valve and second bypass line 190 or valve. The first bypass line 188 directly connects the discharge of the compressor 186 to the inlet of the compressor 186. Disposed on the both the first bypass line and second bypass line are bypass valves that open and close the passage to allow refrigerant bypass flow. Diverting the refrigerant directly from the compressor discharge to the inlet can provide evaporator defrosting and temperature control without injecting hot gas to the evaporator. The first bypass line 188 also provides a means for rapid pressure equalization across the compressor 186, which allows for rapid restarting (i.e., freezing one pod after another quickly). The second bypass line 190 enables the application of warm gas to the evaporator 108 to defrost the evaporator 108. The bypass valves may be, for example, solenoid valves or throttle valves. An additional bypass valve can be used (not shown) to direct warm air along the length of the mixing paddle 160 to help remove product sticking to the mixing paddle 160.

Figure 7A:
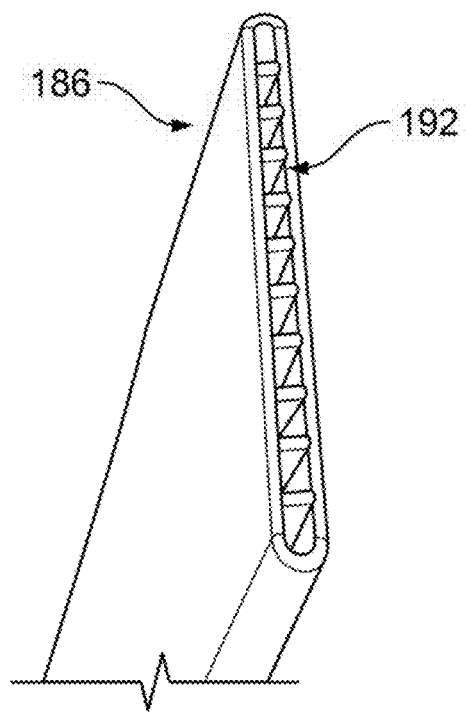
FIGS. 7A and 7B are views of a prototype of a condenser.
Figure 7B:
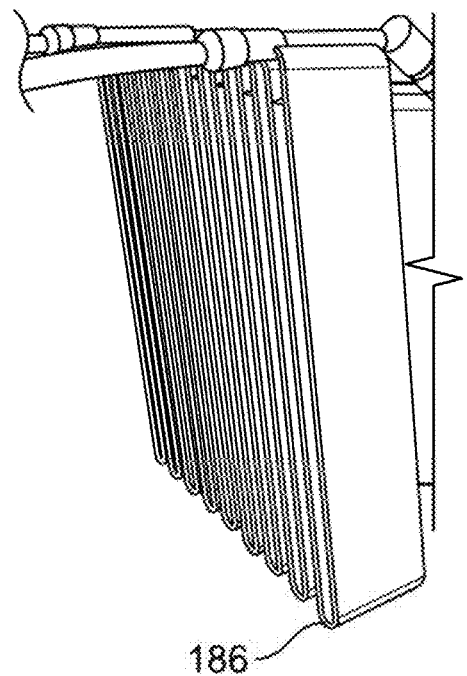

FIGS. 7A and 7B are views of a prototype of the condenser 180. The condenser has internal channels 192. The internal channels 192 increase the surface area that interacts with the refrigerant cooling the refrigerant quickly. These images show micro-channel tubing which are used because they have small channels which keeps the coolant velocity up and are thin wall for good heat transfer and have little mass to prevent the condenser for being a heat sink.

Figure 8A:
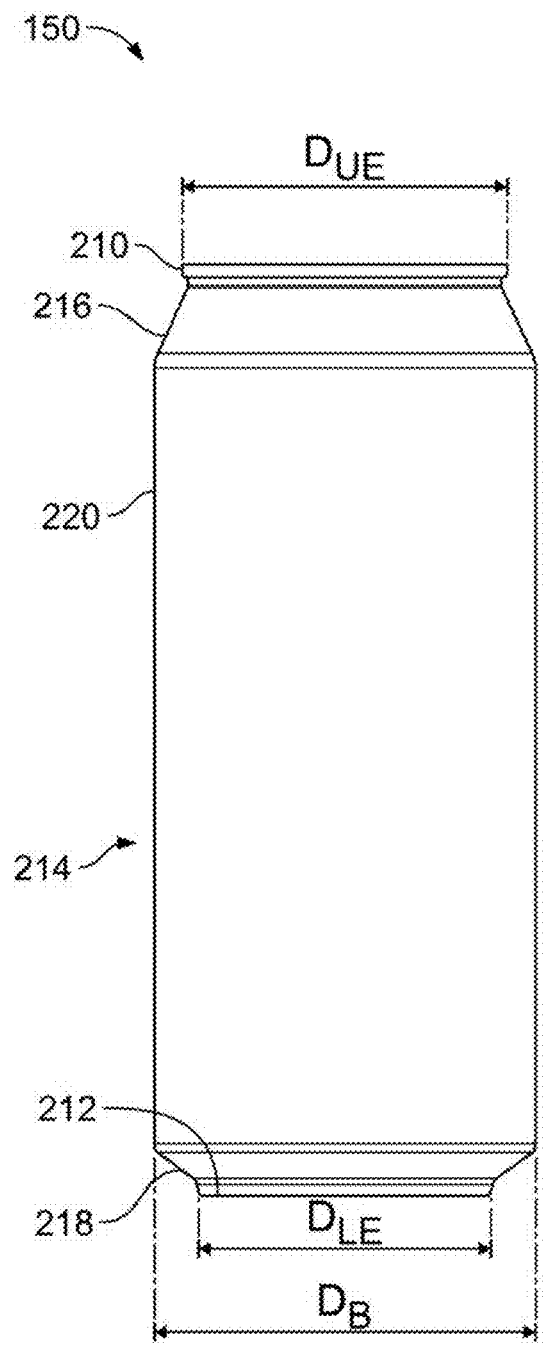
FIG. 8A is a side view of a pod.
Figure 8B:
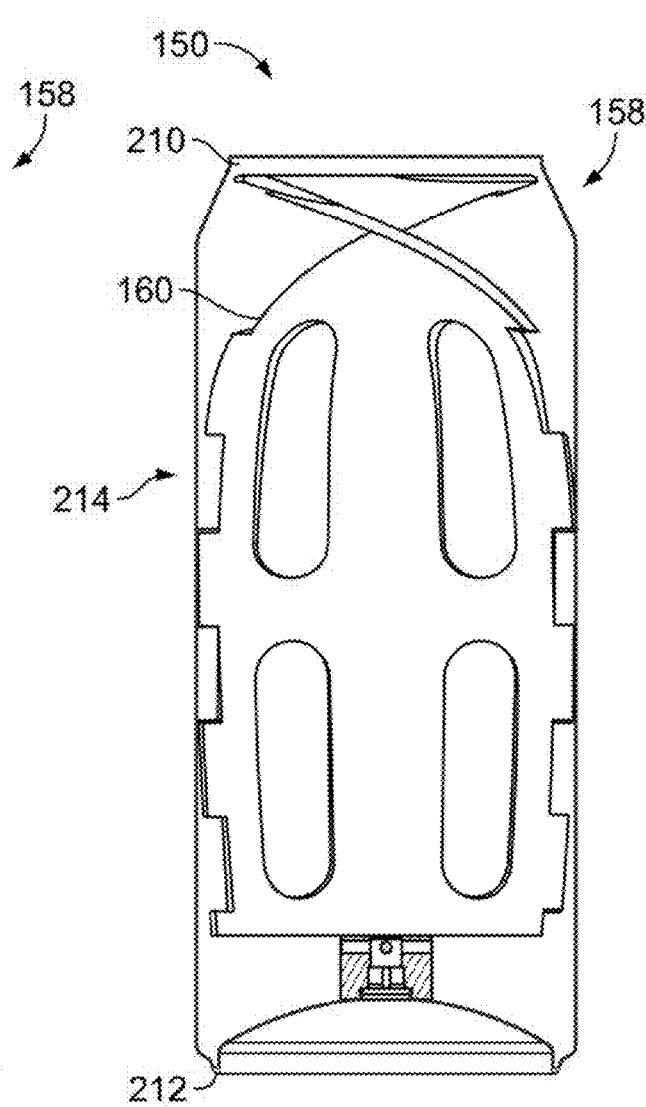
FIG. 8B is a schematic side view of the pod and a mixing paddle disposed in the pod.
Figure 10A:
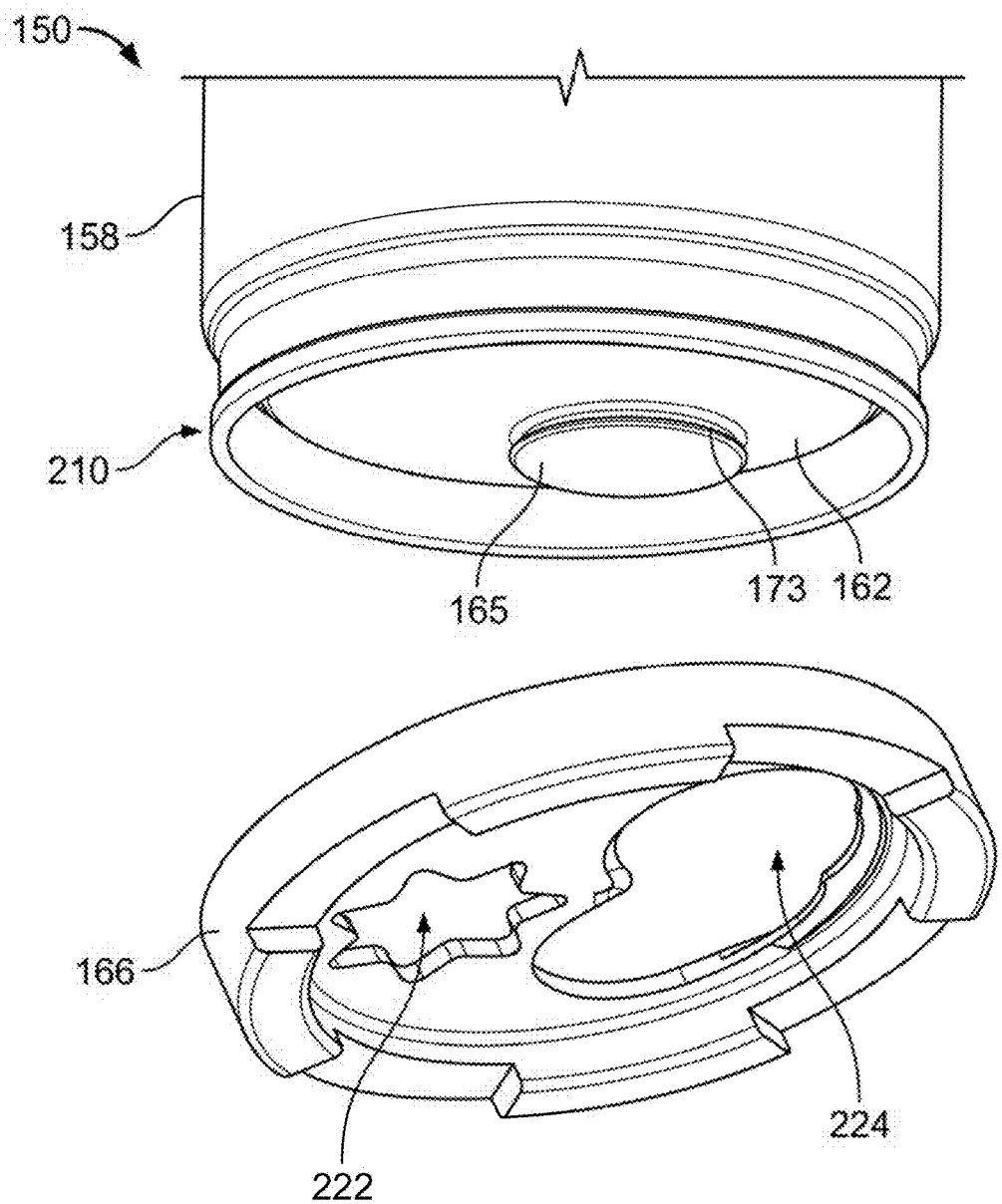
FIG. 10A-10D shows a first end of a pod with its cap spaced apart from its base for ease of viewing.
Figure 10B:
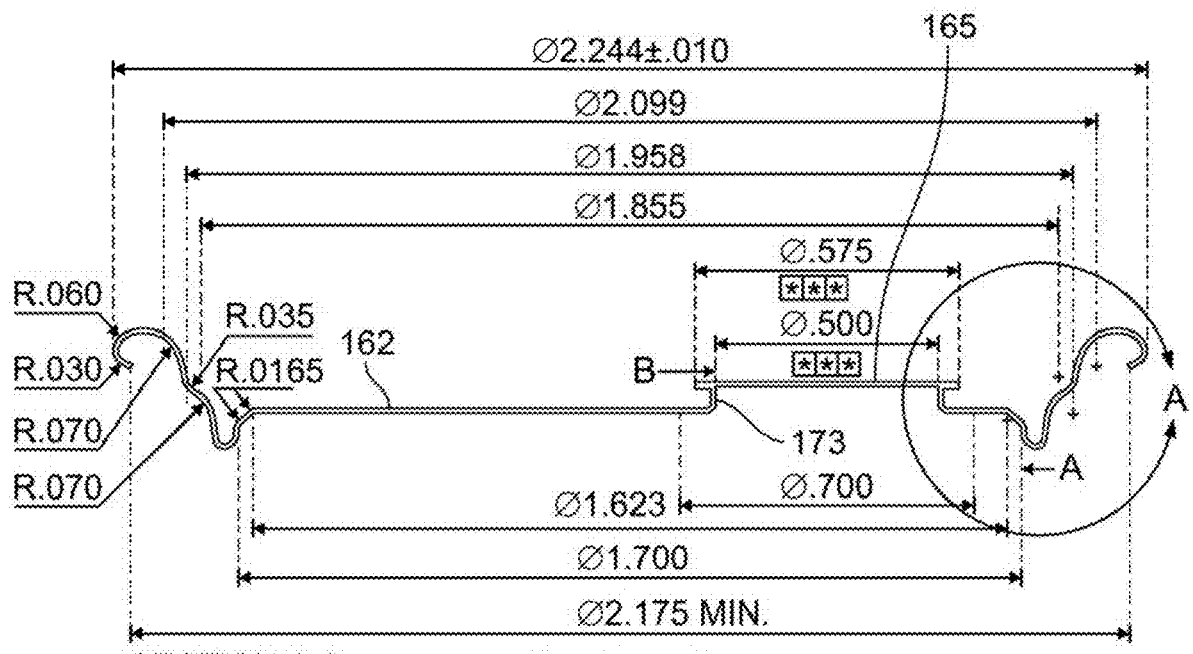

FIGS. 10A and 10B show an example of a pod 150 for use with the machine 100 described with respect to FIGS. 3A-5F. FIG. 8A is a side view of the pod 150. FIG. 8B is a schematic side view of the pod 150 and the mixing paddle 160 disposed in the body 158 of the pod 150.

The pod 150 is sized to fit in the receptacle 110 of the machine 100. The pods can be sized to provide a single serving of the food or drink being produced. Typically, pods have a volume between 6 and 18 fluid ounces. The pod 150 has a volume of approximately 8.5 fluid ounces.

The body 158 of the pod 150 is an aluminum beverage can that contains the mixing paddle 160. The body 158 extends from a first end 210 at the base to a second end 212 and has a circular cross-section. The first end 210 has a diameter $D_{UE}$ that is slightly larger than the diameter $D_{LE}$ of the second end 212. This configuration facilitates stacking multiple pods 150 on top of one another with the first end 210 of one pod receiving the second end 212 of another pod.

A sidewall 214 connects the first end 210 to the second end 212. The wall 214 has a first neck 216, second neck 218, and a barrel 220 between the first neck 216 and the second neck 218. The barrel 220 has a circular cross-section with a diameter $D_B$. The diameter $D_B$ is larger than both the diameter $D_{UE}$ of the first end 210 and the diameter $D_{LE}$ of the second end 212. The first neck 216 connects the barrel 220 to the first end 210 and slopes as the first neck 216 extends from the smaller diameter $D_{UE}$ to the larger diameter $D_B$ the barrel 220. The second neck 218 connects the barrel 220 to the second end 212 and slopes as the second neck 218 extends from the larger diameter $D_B$ of the barrel 220 to the smaller diameter $D_{LE}$ of the second end 212. The second neck 218 is sloped more steeply than the first neck 216 as the second end 212 has a smaller diameter than the first end 210.

This configuration of the pod 150 provides increased material usage; i.e., the ability to use more base material (e.g., aluminum) per pod. This configuration further assists with the columnar strength of the pod.

The pod 150 is designed for good heat transfer from the evaporator to the contents of the pod. The body 158 of the pod 150 is made of aluminum and is between 5 and 50 microns thick. The bodies of some pods are made of other materials, for example, tin, stainless steel, and various polymers such as polyethylene terephthalate (PTE).

Pod 150 may be made from a combination of different materials to assist with the manufacturability and performance of the pod. In one embodiment, the pod walls and the second end 212 may be made of Aluminum 3104 while the base may be made of Aluminum 5182.

In some pods, the internal components of the pod are coated with a lacquer to prevent corrosion of the pod as it comes into contact with the ingredients contained within pod. This lacquer also reduces the likelihood of "off notes" of the metal in the food and beverage ingredients contained within pod. For example, a pod made of aluminum may be internally coated with one or a combination of the following coatings: Sherwin Williams/Valspar V70Q11, V70Q05, 32SO2AD, 40Q60AJ; PPG Innovel 2012-823, 2012-820C; and/or Akzo Nobel Aqualure G1 50. Other coatings made by the same or other coating manufacturers may also be used.

Some mixing paddles are made of similar aluminum alloys and coated with similar lacquers/coatings. For example, Whitford/PPG coating 8870 may be used as a coating for mixing paddles. The mixing paddle lacquer may have additional non-stick and hardening benefits for mixing paddle. Some mixing paddles are made of AL 5182-H48 or other aluminum alloys. Some mixing paddles exhibit a tensile strength of 250-310 MPa minimum, a yield strength of 180-260 MPa minimum, and an elongation at break of 4%-12%.

In some machines, the mixing paddles can be reusable by removing from the pod, washing them, and reusing them in the same or another pod.

In addition to the functionally of the mixing paddles previously discussed, some machines oscillate and/or vibrate the mixing paddles to help remove product sticking to the mixing paddle. This approach can be enabled by a machine (such as machine 100) which includes a solenoid that oscillates and/or vibrates the mixing paddle.

Other pod-machine interfaces that can be used with this and similar machines are described in more detail in U.S. patent application Ser. No. 16/459,322 filed Jul. 1, 2019 and incorporated herein by reference in its entirety.

Some pods include a seal configured to be broken upon an applied torque by the mixing motor. Such a pod design can be easier and cheaper to manufacture for compatibility with machines.

Figure 9A:
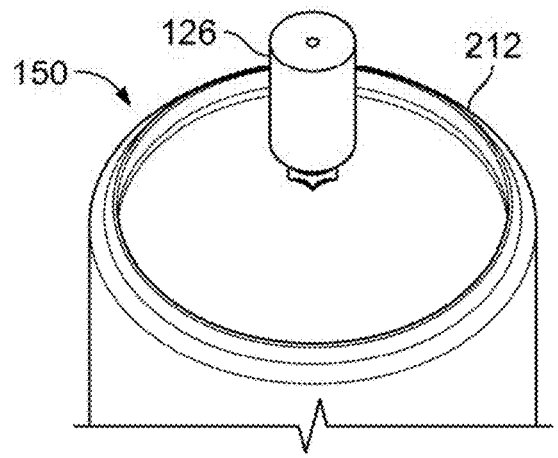
FIGS. 9A and 9B are perspective views of a pod and an associated driveshaft.
Figure 9B:
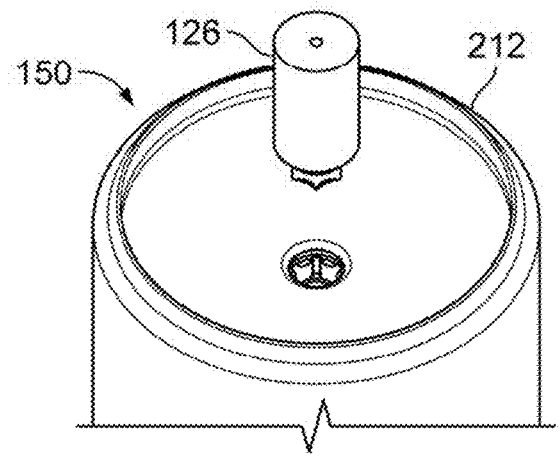
Figure 9C:
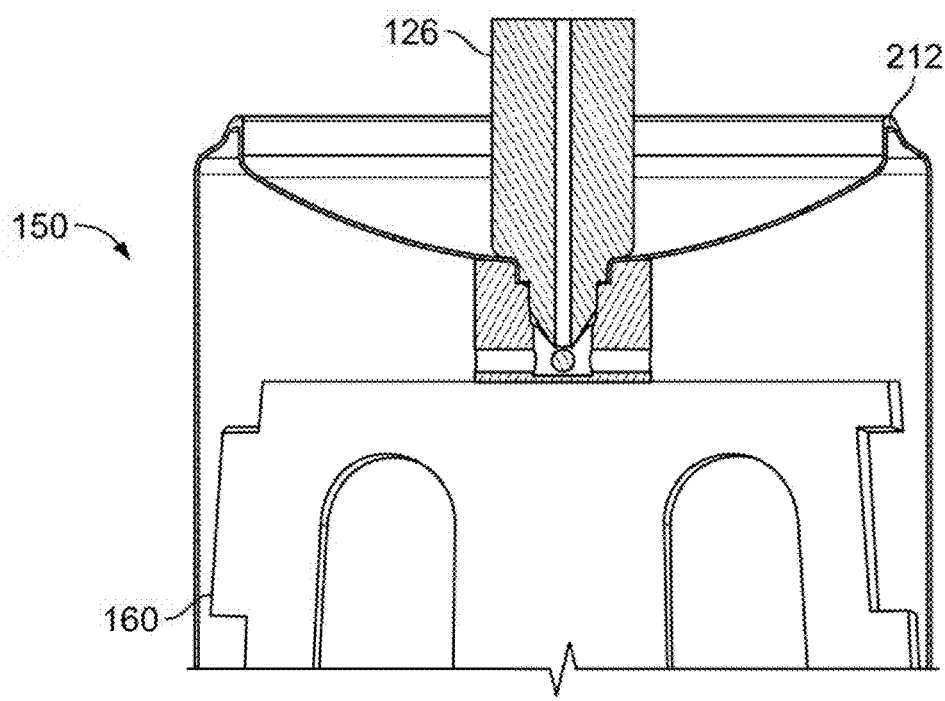
FIG. 9C is a cross-sectional view of a portion of the pod with the driveshaft 126 engaged with a mixing paddle in the pod.

FIGS. 9A-9C illustrate the engagement between the driveshaft 126 of the machine 100 and the mixing paddle 160 of a pod 150 inserted in the machine 100. FIGS. 9A and 9B are perspective views of the pod 150 and the driveshaft 126. In use, the pod 150 is inserted into the receptacle 110 of the evaporator 108 with the first end 210 of the pod 150 downward. This orientation exposes the second end 212 of the pod 150 to the driveshaft 126 as shown in FIG. 9A. Closing the lid 112 (see FIG. 3A) presses the driveshaft 126 against the second end 212 of the pod 150 with sufficient force that the driveshaft 126 pierces the second end 212 of the pod 150. In some machines, the downward force of the piercing action of the driveshaft 126 into the second end 212 of the pod 150 is approximately 50 lbf. Downward forces of between 15-65 lbf are effective in piercing the second end of the pod without damaging other portions of the pod.

FIG. 9B shows the resulting hole and the mixing paddle 160 visible through the hole. The driveshaft 126 is shown offset for ease of viewing. FIG. 9C is a cross-section of a portion of the pod 150 with the driveshaft 126 engaged with the mixing paddle 160 after the lid is closed. Typically, there is not a tight seal between the driveshaft 126 and the pod 150 so that air can flow in as the frozen confection is evacuating/dispensing out the other end of the pod 150. In an alternative embodiment, there is a tight seal such that the pod 150 retains pressure in order to enhance contact between the pod 150 and evaporator 108.

Some mixing paddles contain a funnel or receptacle configuration that receives the punctured end of the second end of the pod when the second end is punctured by driveshaft.

FIG. 10A shows the first end 210 of the pod 150 with the cap 166 spaced apart from the base 162 for ease of viewing. FIGS. 11A-11G illustrate rotation of the cap 166 around the first end 210 of the pod 150 to cut and carry away protrusion 165 of base 162 and expose aperture 164 extending through the base 162.

The base 162 is manufactured separately from the body 158 of the pod 150 and then attached (for example, by crimping or seaming) to the body 158 of the pod 150 covering an open end of the body 158. The protrusion 165 of the base 162 can be formed, for example, by stamping, deep drawing, or heading a sheet of aluminum being used to form the base. The protrusion 165 is attached to the remainder of the base 162, for example, by a weakened score line 173. The scoring can be a vertical score into the base of the aluminum sheet or a horizontal score into the wall of the protrusion 165. For example, the material can be scored from an initial thickness of 0.008 inches to 0.010 inches (e.g., the initial thickness can be 0.008 inches) to a post-scoring thickness of 0.001 inches-0.008 inches (e.g, the score thickness can be 0.002 inches).

FIG. 10B shows a cross section of the first end 210 of the pod 150 illustrating the base 162, the protrusion 165, and the weakened score line 173. The weakened score line 173 is 0.006 inches deep into 0.008 inches thick aluminum base lid material.

Figure 10C:
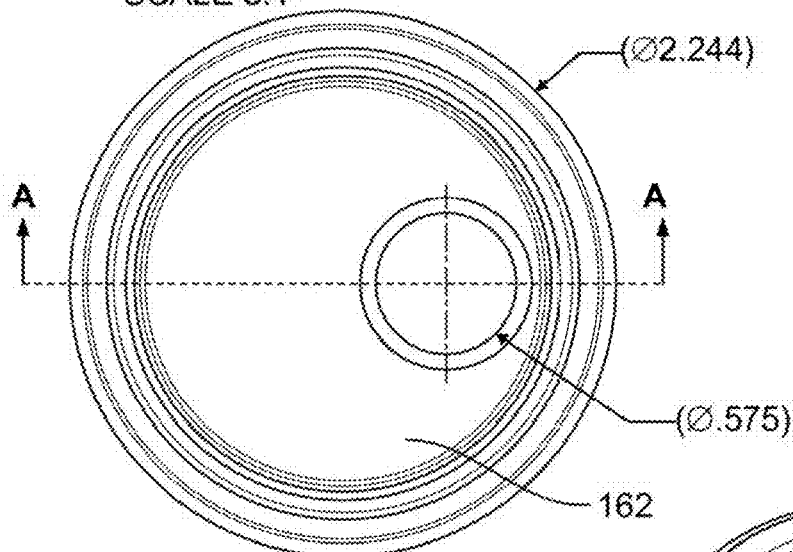
Figure 10D:
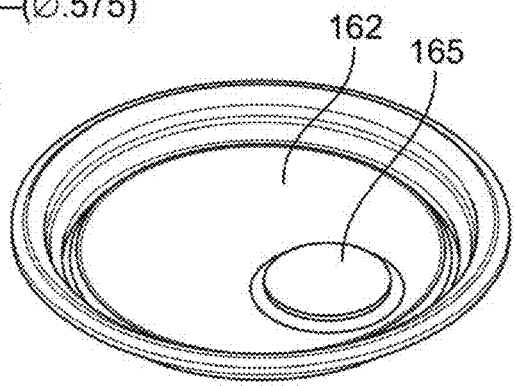

In some embodiments, there is no post-stamping scoring but rather the walls are intentionally thinned for ease of rupture. In another version, there is not variable wall thickness but rather the cap 166 combined with force of the machine dispensing mechanism engagement are enough to cut the 0.008 inches to 0.010 inches wall thickness on the protrusion 165. With the scoring, the protrusion 165 can be lifted and sheared off the base 162 with 5-75 pounds of force, for example between 15-40 pounds of force. In some cases, the diameter of a circular protrusion is 0.375-0.850 inches (e.g., 0.575 inches in diameter as seen in FIG. 10B). In some cases, an area of the protrusion 165 is 0.1-0.5 $in^2$ (e.g., 0.26 $in^2$ as seen in FIGS. 10B-10D). In some cases, the area of the base 162 is 2.0-5.0 $in^2$ (e.g. 3.95 $in^2$ as seen in FIGS. 10B-10D). The area of the circular protrusion is a fraction of the total surface area of the base 162. In some cases, a diameter of the base 162 is 1.5-3.0 inches (e.g., 2.244 inches as seen in FIGS. 10B-10D). In some cases, an area ratio of the circular protrusion 165 to the base 162 is 0.01-0.50 (e.g., 0.065 as seen in FIGS. 10B-10D).

In some cases, the protrusion and corresponding opening when protrusion is sheared and carried away has a surface area between 5% to 30% of the overall pod end surface area. In some cases, the protrusion may be circular in shape, have a tear-drop, have a kidney shape, or be of any arbitrary shape. In some cases the protrusion may be round but the scored shape can be either circular in shape, have a tear-drop, have a kidney shape, or be of any arbitrary shape.

FIG. 10A shows the cap 166 having a first aperture 222 and a second aperture 224. The first aperture approximately matches the shape of the aperture 164. The aperture 164 is exposed and extends through the base 162 when the protrusion 165 is removed. The second aperture 224 has a shape corresponding to two overlapping circles. One of the overlapping circles has a shape that corresponds to the shape of the protrusion 165 and the other of the overlapping circles is slightly smaller. A ramp 226 extends between the outer edges of the two overlapping circles. There is an additional 0.010 to 0.100 inches of material thickness at the top of the ramp transition (e.g., 0.070 inches). This extra height helps to lift and rupture the protrusion's head and open the aperture during the rotation of the cap as described in more detail with reference to FIGS. 11A-11G.

Figure 11A:
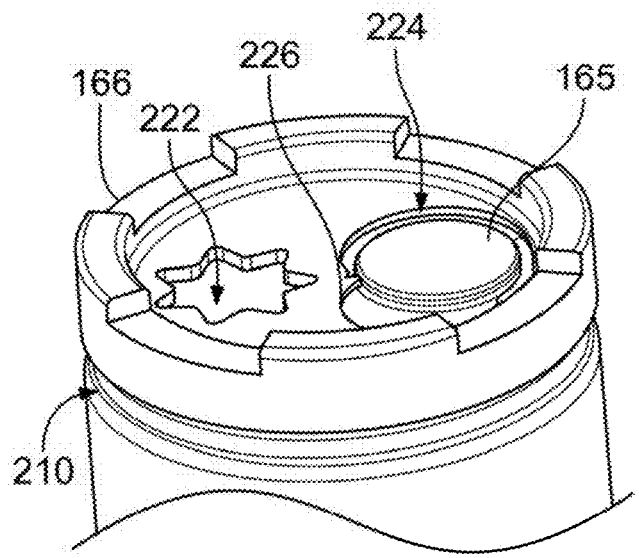
FIGS. 11A-11G illustrate rotation of a cap around the first end of the pod to open an aperture extending through the base.
Figure 11B:
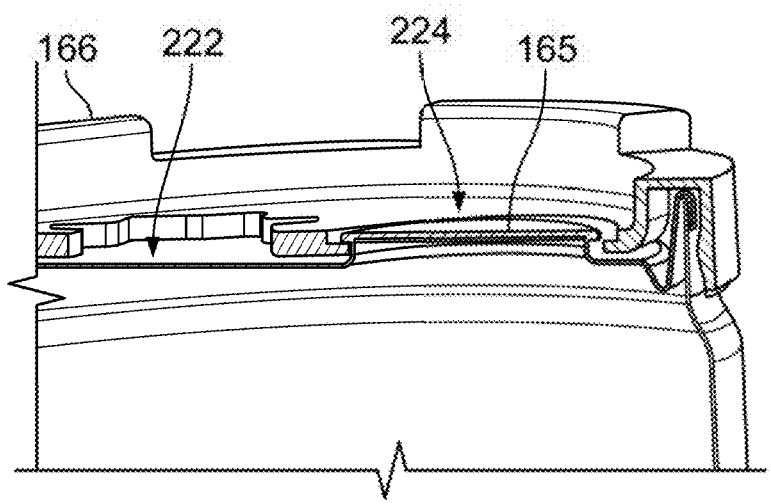
Figure 11C:
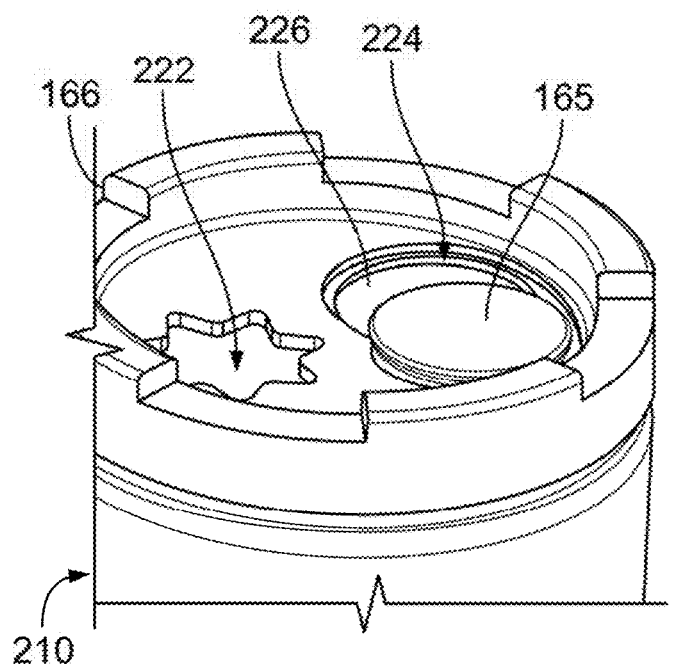
Figure 11D:
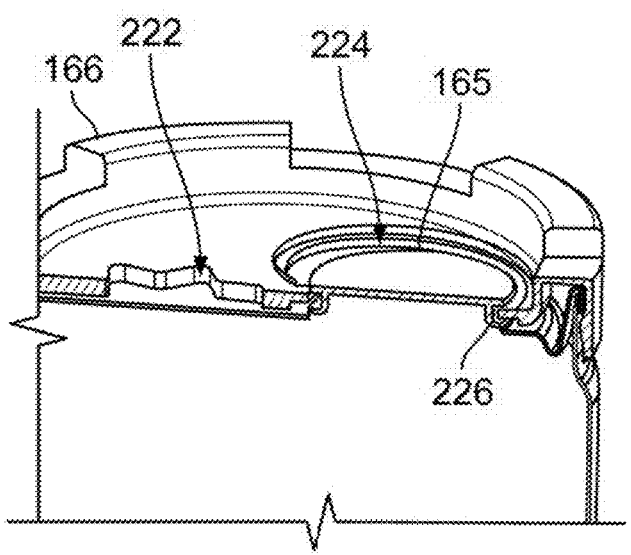
Figure 11E:
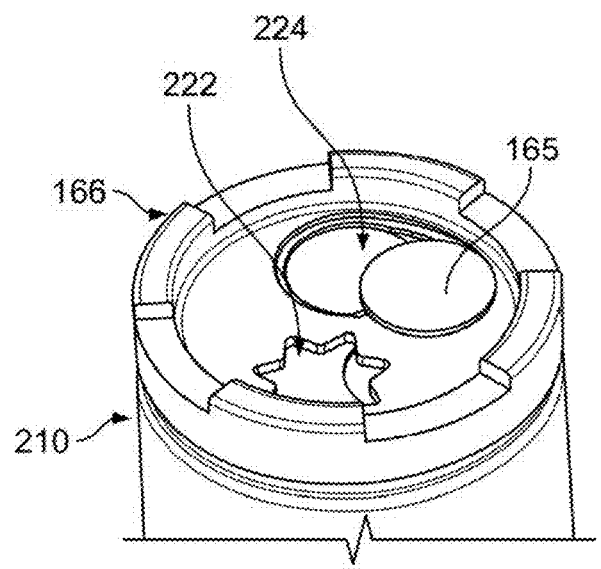
Figure 11F:
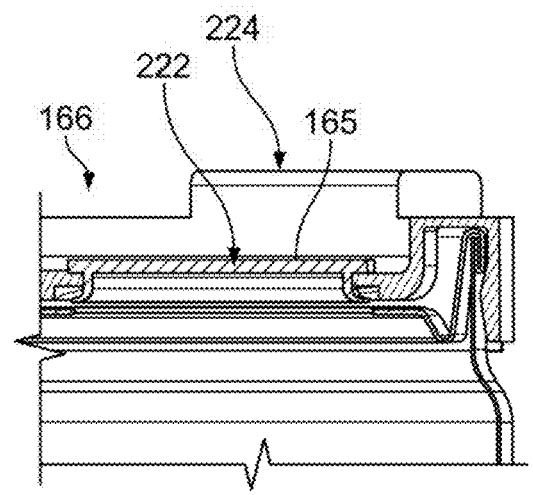
Figure 11G:
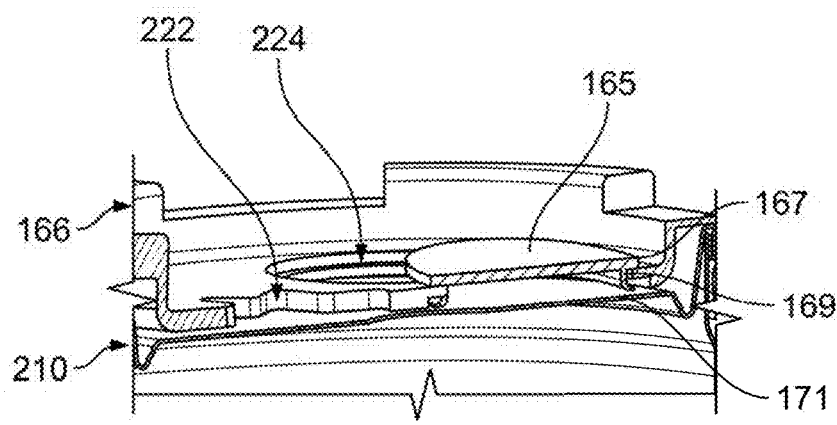

FIGS. 11A and 11B show the cap 166 being initially attached to the base 162 with the protrusion 165 aligned with and extending through the larger of the overlapping circles of the second aperture 224. When the processor 122 of the machine activates the electric motor 146 to rotate the gear 168 and the annular member 161, rotation of the cap 166 slides the ramp 226 under a lip of the protrusion 165 as shown in FIGS. 11C and 11D. Continued rotation of the cap 166 applies a lifting force that separates the protrusion 165 from the remainder of the base 162 (see FIGS. 11E-11G) and then aligns the first aperture 222 of the cap 166 with the aperture 164 in the base 162 resulting from removal of the protrusion 165. The electric motor 146 can apply up to 1,000 ozf-inches of torque to lift and shear off the protrusion 165. In some machines, the process of removing the protrusion also removes product (frozen or not) that may accumulate within a recess of the end of the protrusion.

In some machines, the motor 124 slows down during the protrusion shearing process, and then speeds up during the dispensing process. In this case, it is advantageous for the driveshaft to rotate without stopping or reversing through the mixing, shearing, and dispensing cycle in order to reduce the likelihood of the motor 124 stalling.

Some pods include a structure for retaining the protrusion 165 after the protrusion 165 is separated from the base 162. In the pod 150, the protrusion 165 has a head 167, a stem 169, and a foot 171 (best seen in FIG. 11G). The stem 169 extends between the head 167 and the foot 171 and has a smaller cross-section that the head 167 and the foot 171. As rotation of the cap 166 separates the protrusion 165 from the remainder of the base 162, the cap 166 presses laterally against the stem 169 with the head 167 and the foot 171 bracketing the cap 166 along the edges of one of the overlapping circles of the second aperture 224. This configuration retains the protrusion 165 when the protrusion 165 is separated from the base 162. Such a configuration reduces the likelihood that the protrusion falls into the waiting receptacle that when the protrusion 165 is removed from the base. After the mixing paddle 160 of the machine spins and dispenses the frozen confection through the aperture 224, the motor 124 rotates the cap 166 and closes the aperture 224 so that any residual product (e.g., ice cream) when melted does not leak out of the pod.

Some pods include other approaches to separating the protrusion 165 from the remainder of the base 162. For example, in some pods, the base has a rotatable cutting mechanism that is riveted to the base. The rotatable cutting mechanism has a shape similar to that described relative to cap 166 but this secondary piece is riveted to and located within the perimeter of base 162 rather than being mounted over and around base 162. When the refrigeration cycle is complete, the processor 122 of the machine activates an arm of the machine to rotate the riveted cutting mechanism around a rivet. During rotation, the cutting mechanism engages, cuts, and carries away the protrusion 165, leaving the aperture 164 of base 162 in its place.

In another example, some pods have caps with a sliding knife that moves across the base to remove the protrusion. The sliding knife is activated by the machine and, when triggered by the controller, slides across the base to separate, remove, and collect the protrusion 165. The cap 166 has a guillotine feature that, when activated by the machine, may slide straight across and over the base 162. The cap 166 engages, cuts, and carries away the protrusion 165. In another embodiment, this guillotine feature may be central to the machine and not the cap 166 of pod 150. In another embodiment, this guillotine feature may be mounted as a secondary piece within base 162 and not a secondary mounted piece as is the case with cap 166.

Some pods have a dispensing mechanism that includes a pop top that can be engaged and released by the machine. When the refrigeration cycle is complete, an arm of the machine engages and lifts a tab of the pod, thereby pressing the puncturing the base and creating an aperture in the base. Chilled or frozen product is dispensed through the aperture. The punctured surface of the base remains hinged to base and is retained inside the pod during dispensing. The mixing avoids or rotates over the punctured surface or, in another embodiment, so that the mixing paddle continues to rotate without obstruction. In some pop tops, the arm of the machine separates the punctured surface from the base.

Figure 12:
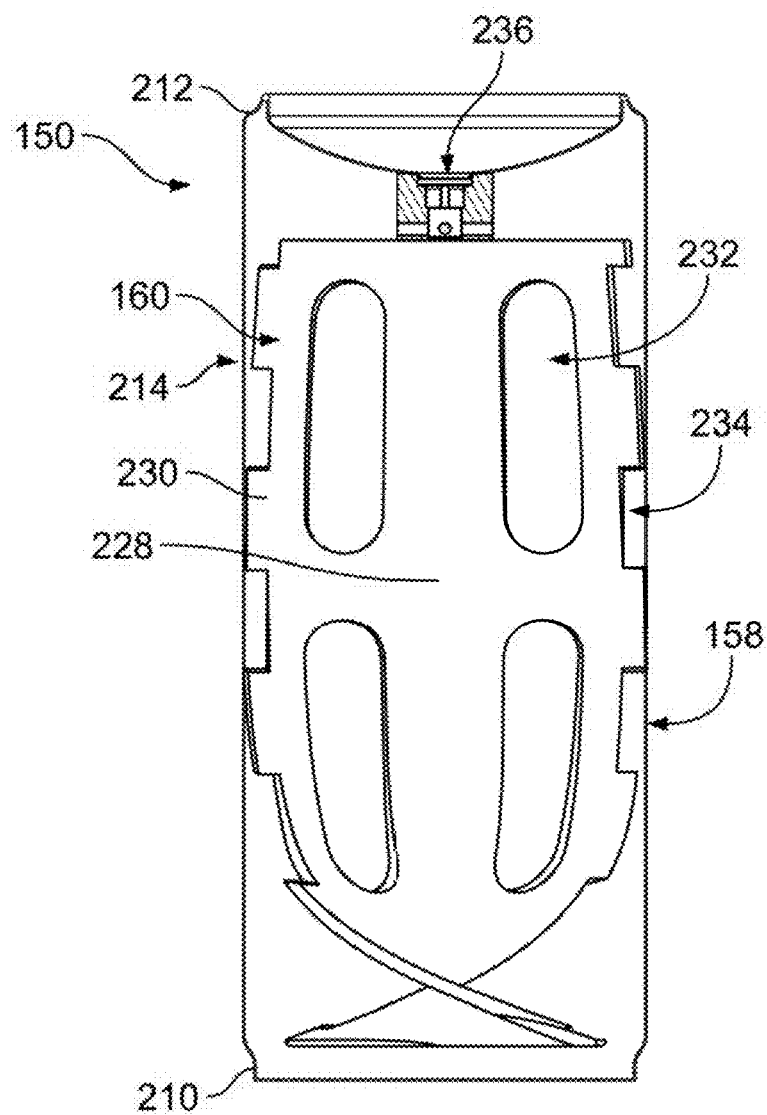
FIG. 12 is an enlarged schematic side view of a pod.

FIG. 12 is an enlarged schematic side view of the pod 150. The mixing paddle 160 includes a central stem 228 and two blades 230 extending from the central stem 228. The blades 230 are helical blades shaped to churn the contents of the pod 150 and to remove ingredients that adhere to inner surface of the body 158 of the pod 150. Some mixing paddles have a single blade and some mixing paddles have more than two mixing paddles.

Fluids (e.g., liquid ingredients, air, or frozen confection) flow through openings 232 in the blades 230 when the mixing paddle 160 rotates. These openings reduce the force required to rotate the mixing paddle 160. This reduction can be significant as the viscosity of the ingredients increases (e.g., as ice cream forms). The openings 232 also assist in mixing and aerating the ingredients within the pod. In some machines, the openings 232 represent about 36.5% of the total surface area of the mixing paddle 160.

The lateral edges of the blades 230 define slots 234. The slots 234 are offset so that most of the inner surface of the body 158 is cleared of ingredients that adhere to inner surface of the body by one of the blades 230 as the mixing paddle 160 rotates. Although the mixing paddle is 160 wider than the first end 210 of the body 158 of the pod 150, the slots 234 are alternating slots that facilitate insertion of the mixing paddle 160 into the body 158 of the pod 150 by rotating the mixing paddle 160 during insertion so that the slots 234 are aligned with the first end 210. In another embodiment, the outer diameter of the mixing paddle are less than the diameter of the pod 150 opening, allowing for a straight insertion (without rotation) into the pod 150. In another embodiment, one blade on the mixing paddle has an outer-diameter that is wider than the second blade diameter, thus allowing for straight insertion (without rotation) into the pod 150. In this mixing paddle configuration, one blade is intended to remove (e.g., scrape) ingredients from the sidewall while the second, shorter diameter blade, is intended to perform more of a churning operation.

Some mixing paddles have one or more blades that are hinged to the central stem. During insertion, the blades can be hinged into a condensed formation and released into an expanded formation once inserted. Some hinged blades are fixed open while rotating in a first direction and collapsible when rotating in a second direction, opposite the first direction. Some hinged blades lock into a fixed, outward, position once inside the pod regardless of rotational directions. Some hinged blades are manually condensed, expanded, and locked.

The mixing paddle 160 rotates clockwise (as observed from above the machine) and removes frozen confection build up from the pod 214 wall. Gravity forces the confection removed from the pod wall to fall towards first end 210. In the counterclockwise direction, the mixing paddle 160 rotate, lift and churn the ingredients towards the second end 212. When the paddle changes direction and rotates clockwise the ingredients are pushed towards the first end 210. When the protrusion 165 of the base 162 is removed as shown and described with respect to FIG. 11D, clockwise rotation of the mixing paddle dispenses produced food or drink from the pod 150 through the aperture 164. Some paddles mix and dispense the contents of the pod by rotating a first direction. Some paddles mix by moving in a first direction and dispense by moving in the second direction when the pod is opened. Some mixing paddles do not reverse direction.

The central stem 228 defines a recess 236 that is sized to receive the driveshaft 126 of the machine 100. The recess and driveshaft 126 have a square or faceted cross section so that the driveshaft 126 and the mixing paddle 160 are rotatably constrained. When the motor rotates the driveshaft 126, the driveshaft rotates the mixing paddle 160. In some embodiments, the cross section of the driveshaft is a different shape and the cross section of the recess is compatibly shaped. In some cases the driveshaft and recess are threadedly connected. In some pods, the recess contains a mating structure that grips the driveshaft to rotationally couple the driveshaft to the paddle.

Figure 35A:
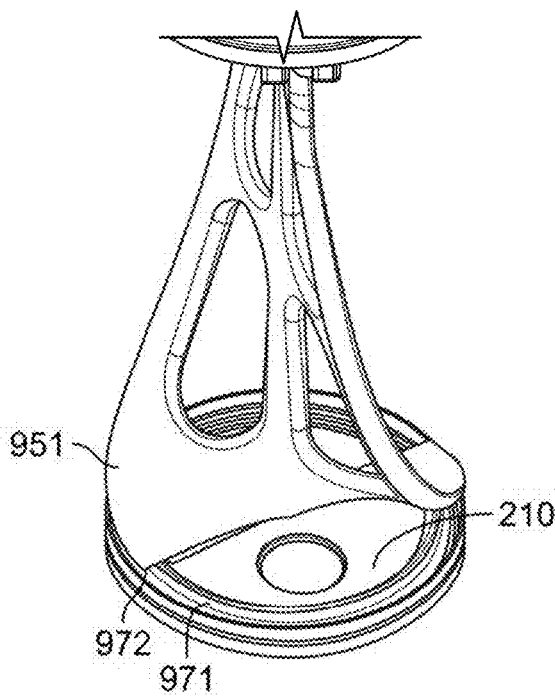
FIGS. 35A-35C illustrate the engagement of a mixing paddle with a pod.
Figure 35B:
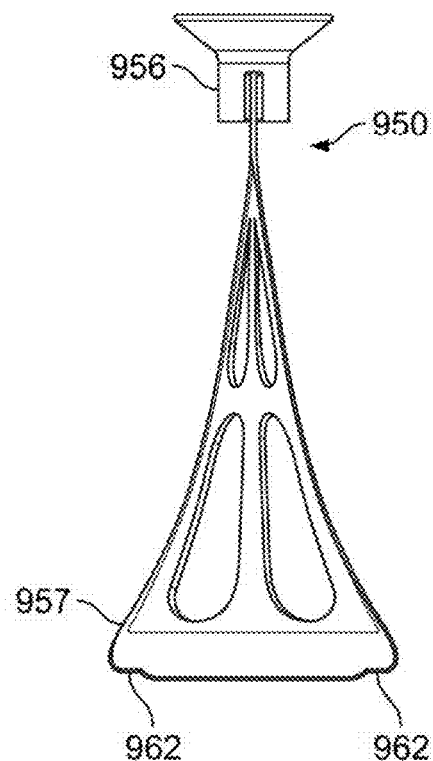
Figure 35C:
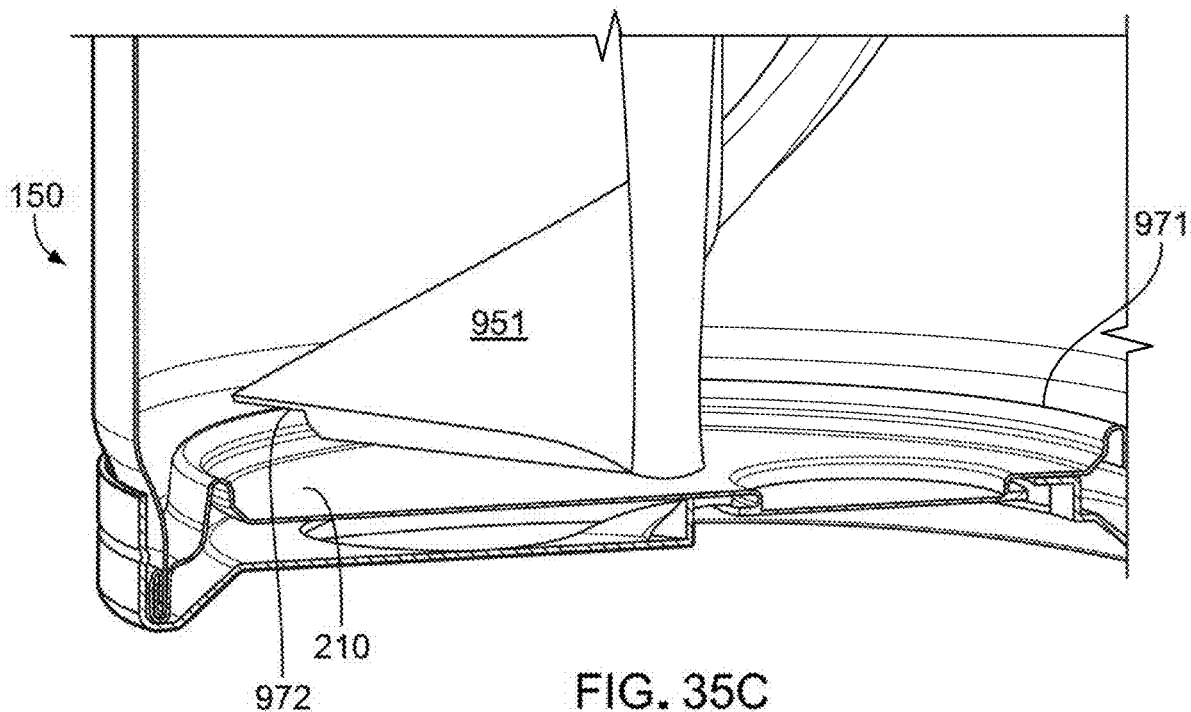

FIGS. 13A-13D show a body 1300 that is substantially similar to the body or can 158 of the pod 150. However, the body 1300 has two seamed ends 1302, 1304 instead of a domed end of the body 158 of the pod 150. By eliminating the domed end, body 1300 is easier to manufacture using methods such as stamping, extruding, or rolling. As shown in the isometric view of FIG. 13D, the body 1300 resembles a hollow tube and includes a thin walled extrusion 1306. A malleable material such as aluminum can be used to form the body 1300. Each seamed end 1302, 1304 features a lip that is configured to be engaged with a corresponding lip of the lid 1308 and seamed together using a seaming machine. FIG. 13B shows a cross section of the second seamed end 1304. FIG. 13C illustrates the seaming process between the body 1300 and the lid 1308. In some cases, the body 1300 to lid 1308 seamed connection is similar to the seam seen in FIG. 35C. In this way, a lid 1308 is attached to each end of the aluminum pod 1300.

One of the lids 1308 includes a grommet in the center (not shown) to rotationally couple the mixing motor to the mixing paddle within the body 1300 (not shown) and to seal the pod in an initial configuration. The grommet is overmolded, adhered, or fastened to the lid 1308. The body 1300, together with two lids 1308, defines a pod.

In these systems and methods, sterilization is typically done before the freezing of the liquid ice cream mix.

Figure 14A:
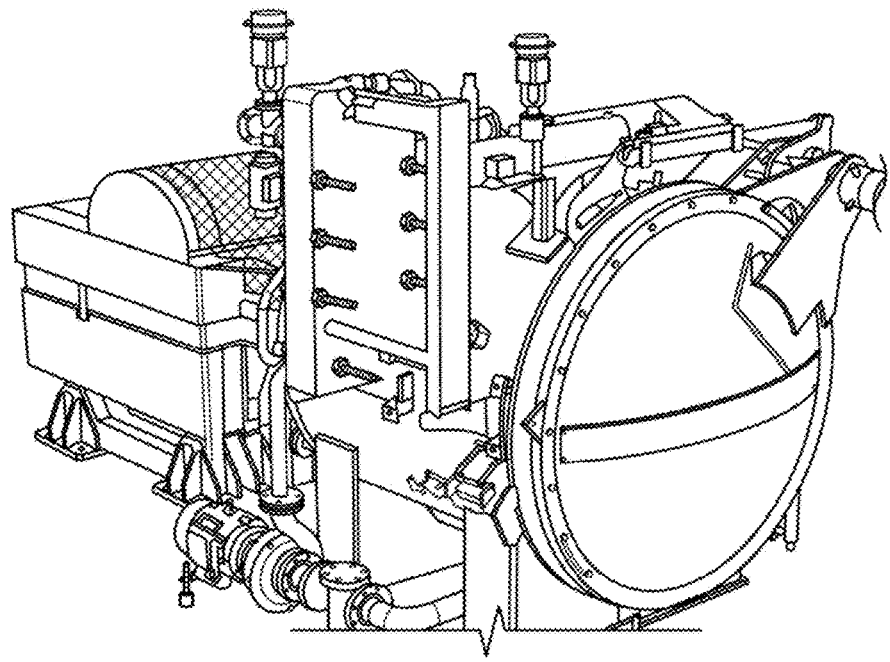
FIG. 14A is a photo of a retort machine.
Figure 14B:
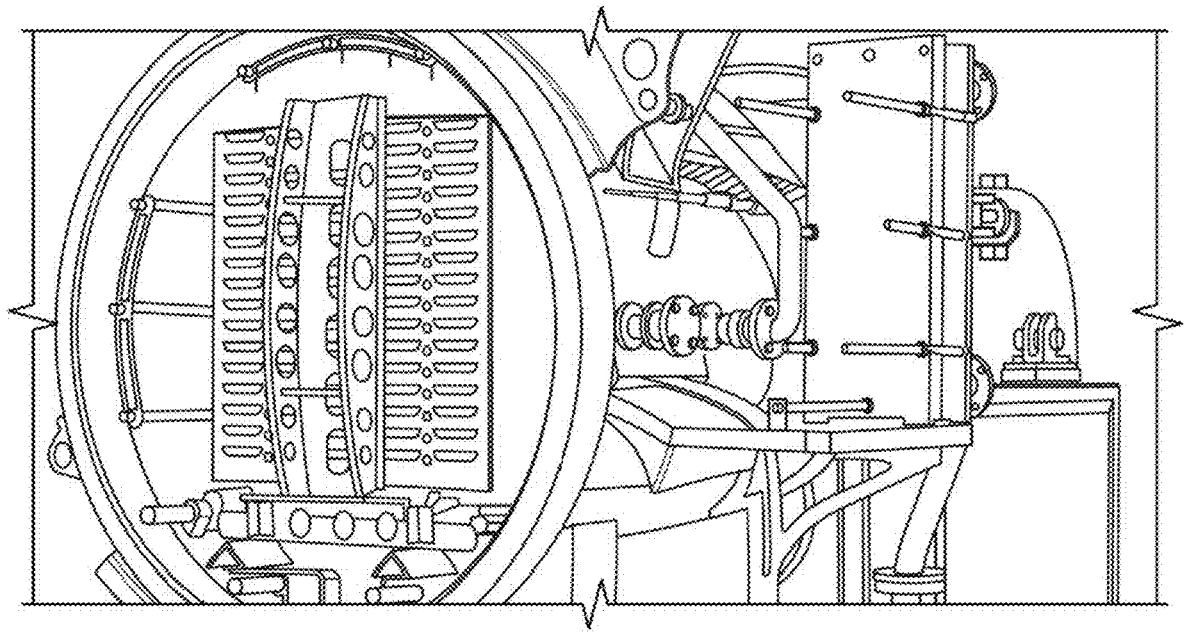
FIG. 14B is a photo of retort sterilization chambers inside a retort machine.

FIG. 14A is a photo of a retort machine and FIG. 14B is a photo of retort sterilization chambers inside a retort machine. As previously described, a retort machine is used to sterilize and make a pod shelf-stable. To help reduce operations in the factory with the processes described in this specification, it is possible to fill the single serve pods (cans) with liquid ice cream mix that has not been pasteurized nor homogenized. Then during the retort sterilization process, for example using the retort machine shown in the images of FIGS. 14A and 14B, the pods can be shaken back and forth at various rates, for example 180 cycles per minute at 3 Hz. During the retort process, the liquid ice cream sloshes inside the pod (i.e., homogenizing) while simultaneously being exposed to high temperatures and high pressures for sterilization.

By using unpasteurized dairy in our pods and performing a retort process on the pod before use, the dairy inside the pod is only pasteurized once. This is in contrast to the typical pasteurization process illustrated in FIG. 1 where the dairy is usually pasteurized before leaving the dairy factory which means it is pasteurized twice, e.g., once at the dairy factory and once in our retort process.

The sloshing of the liquid ice cream in the pod can significantly increase the heat transfer of 250° F. for 2-15 minutes because the liquid is sloshing around in the can inside the retort vessel. Both the can and the retort vessels are under pressure. For example, this pressure can be 100 psi. By pasteurizing through retort while homogenizing, this approach eliminates steps in the traditional operation of making ice cream (e.g., the process of FIG. 1), which improves efficiency and reduces cost. This process can give more authentic, fresher tasting, and better looking foods, with better color, texture and mouth feel. Recent growth in premium categories indicates strong consumer demand for enhanced food quality.

The retort shaking of these pods in and during the retort sterilization process produces much better-quality low acid foods preserved for ambient storage. It can also reduce cycle times by some 90% and energy consumption by up to 50%, compared to conventional batch, static retort processes. This quicker retort process is able to reach Fo lethality value faster providing a reduction in the over-cooked notes and flavor loss of the ice cream and reduction of discoloration often associated with the retort process in static or slow agitating retorts. The process is also capable of homogenizing the liquid mix. Homogenizing the liquid mix by shaking quickly is advantageous because two operations are achieved at once, sterilization and homogenization of the liquid ice cream mix. FIGS. 14A-14B are photos of retort sterilization chambers that can include dozens or hundreds of pods and move them back and forth at 3 Hz or up to 180 cycles per minute in order to quicken the heat transfer to minimize the caramelization from cooking the dairy in retort while simultaneously homogenizing the liquid ice cream mix.

During this pasteurization process, which can be done using a retort process, pasteurized dairy can caramelize and become brown, which can be undesirable. The highest rate of browning, or more generally referred to as color development, can be caused by the presence of fructose which begins to caramelize at temperatures of 230° F.

Some of these systems and processes use a retort process that retorts at 250° F. even though retorting at higher temperatures is generally preferred because it would allow the pasteurization process to complete in less time. Completing a retort at 250° F. can limit the effect of browning when fructose is removed from the ice cream mix formulation.

The highest rate of the color development can be caused by fructose as the caramelization process of fructose starts at 230° F. Caramelization should not be confused with the Maillard reaction, in which reducing sugar reacts with amino acids. Browning, or the Maillard reaction, creates flavor and changes the color of food. Maillard reactions generally only begin to occur above 285° F. For at least these reasons, our retort temperatures do not exceed 250° F., which would otherwise be preferred since it would be faster at the sterilization process.

For example, caramelization temperatures of fructose can be 230° F., galactose can be 320° F., glucose can be 320° F., lactose can be 397° F., and sucrose can be 320° F. In some examples, corn syrup, or high-fructose corn syrup (HFCS), when heated to about 113° F., forms hydroxymethylfurfural from the breakdown of fructose.

Some of these systems use a pod with a clean label, milk, or sugar cream. Sometimes a gum stabilizer is be used and preferably Gum acacia, gellan gum, pectin and cellulose gum stabilizers can be used which are retort stable. Lactose can be not preferable in retort since it is a disaccharide. Lactose is a sugar composed of galactose and glucose subunits and can make up about 2 to 8% of milk.

Figure 15:
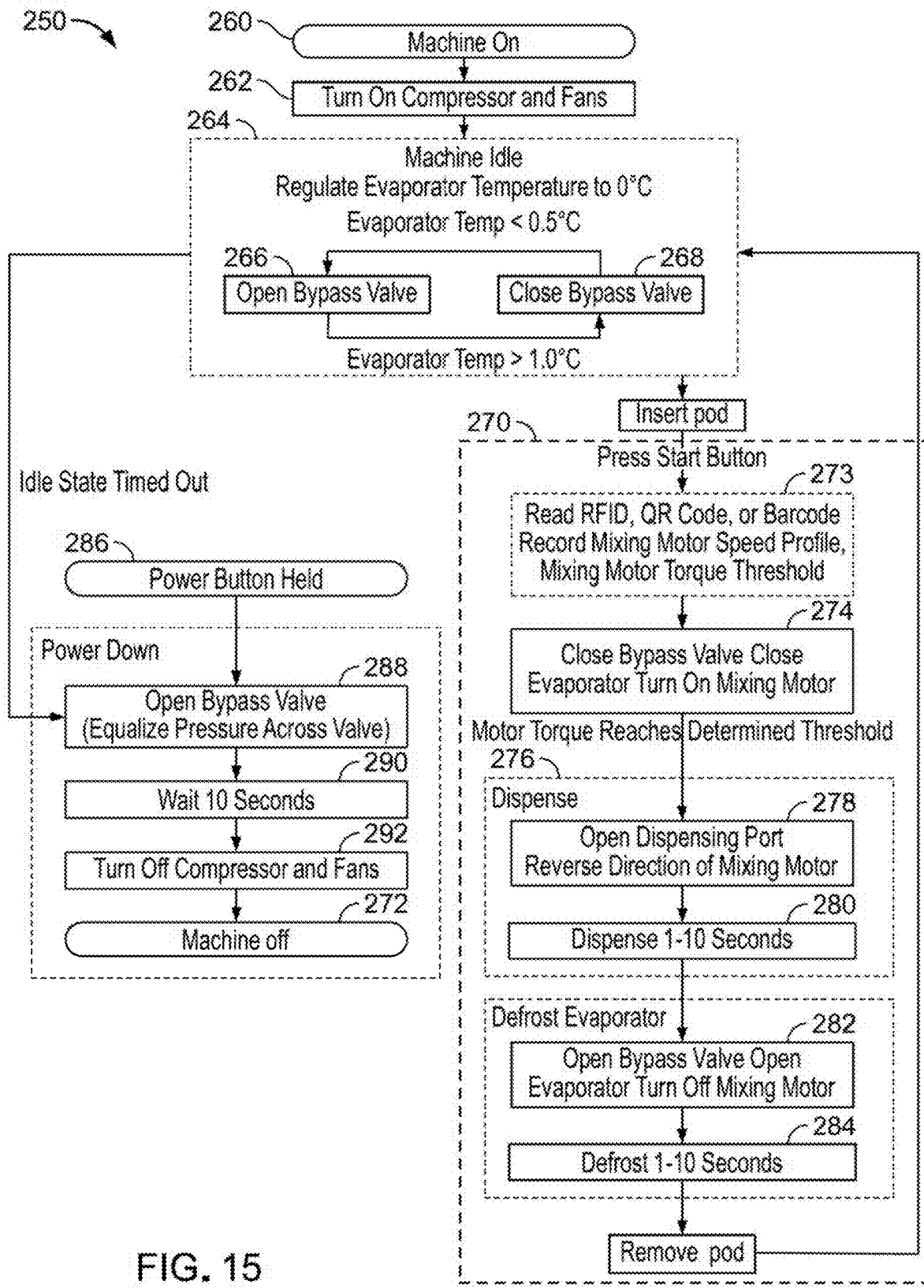
FIG. 15 is a flow chart of a method for operating a machine for producing cooled food or drinks.

FIG. 15 is a flow chart of a method 250 implemented on the processor 122 for operating the machine 100. The method 250 is described with references to refrigeration system 109 and machine 100. The method 250 may also be used with other refrigeration systems and machines. The method 250 is described as producing soft serve ice cream but can also be used to produce other cooled or frozen drinks and foods.

The first step of the method 250 is to turn the machine 100 on (step 260) and turn on the compressor 186 and the fans associated with the condenser 180 (step 262). The refrigeration system 109 then idles at regulated temperature (step 264). In the method 250, the evaporator 108 temperature is controlled to remain around 0.75° C. but may fluctuate by ±0.25° C. Some machines are operated at other idle temperatures, for example, from 0.75° C. to room temperature (22.0° C.). If the evaporator temperature is below 0.5° C., the processor 122 opens the bypass valve 190 to increase the heat of the system (step 266). When the evaporator temperature goes over 1° C., the bypass valve 190 is closed to cool the evaporator (step 268). From the idle state, the machine 100 can be operated to produce ice cream (step 270) or can shut down (step 272).

After inserting a pod, the user presses the start button. When the user presses the start button, the bypass valve 190 closes, the evaporator 108 moves to its closed position, and the motor 124 is turned on (step 274). In some machines, the evaporator is closed electronically using a motor. In some machines, the evaporator is closed mechanically, for example by the lid moving from the open position to the closed position. In some systems, a sensor confirms that a pod 150 is present in the evaporator 108 before these actions are taken.

Some systems include radio frequency identification (RFID) tags or other intelligent bar codes such as UPC bar or QR codes. Identification information on pods can be used to trigger specific cooling and mixing algorithms for specific pods. These systems can optionally read the RFID, QR code, or barcode and identify the mixing motor speed profile and the mixing motor torque threshold (step 273).

The identification information can also be used to facilitate direct to consumer marketing (e.g., over the internet or using a subscription model). This approach and the systems described in this specification enable selling ice cream thru e-commerce because the pods are shelf stable. In the subscription mode, customers pay a monthly fee for a predetermined number of pods shipped to them each month. They can select their personalized pods from various categories (e.g., ice cream, healthy smoothies, frozen coffees or frozen cocktails) as well as their personalized flavors (e.g., chocolate or vanilla). In some cases, the machine itself can be rented using a subscription model. In some cases, reusable pods and mixing paddles can be rented as well.

The identification can also be used to track each pod used. In some systems, the machine is linked with a network and can be configured to inform a vendor as to which pods are being used and need to be replaced (e.g., through a weekly shipment). This method is more efficient than having the consumers go to the grocery store and purchase pods.

These actions cool the pod 150 in the evaporator 108 while rotating the mixing paddle 160. As the ice cream forms, the viscosity of the contents of the pod 150 increases. A torque sensor of the machine 100 measures the torque of the motor 124 required to rotate the mixing paddle 160 within the pod 150. Once the torque of the motor 124 measured by a torque sensor satisfies a predetermined threshold, the machine 100 moves into a dispensing mode (step 276). The dispensing port opens and the motor 124 reverses direction (step 278) to press the frozen confection out of the pod 150. In some machines, however, the motor 124 does not reverse direction. The mixing paddle 160 is slowly rotated to allow frozen material to form on the wall of the pod 150 while the evaporator 108 gets cold. The RPM of the mixing paddle 160 is increased as the decreasing temperature increases the rate at which frozen material forms on the pod wall.

As previously described, in some machines the rotational speed of the mixing paddle 160 increases to help air into the frozen confection to achieve improved overrun (preferably at least 30% overrun) and to help give enough velocity to extrude the ice cream out of the exit port of the pod 150 while achieving a constant flow (stream) of ice cream coming out of the pod.

Increasing the rotational velocity of the mixing paddle 160 increases the required electric current. The table below illustrates electrical currents of the current prototype machine that are used to drive the mixing paddle 160 as a function of RPM and time into the freezing process (which affects the viscosity of the ice cream).

| | Seconds from start of the freezing cycle | | | | | | | |
|---|---|---|---|---|---|---|---|---|
| | 3 | 15 | 30 | 45 | 60 | 75 | 90 | 105 |
| RPM of the mixing paddle | 275 | 275 | 275 | 315 | 435 | 558 | 800 | 1000 |
| Current on the motor that drive the mixing paddle (milliamps) | 372 | 658 | 1202 | 1833 | 2738 | 4491 | 9192 | 13719 |

Rotation of the mixing paddle 160 continues for approximately 1 to 10 seconds to dispense the contents of the pod 150 (step 280). The machine 100 then switches to defrost mode (step 282). Frost that builds up on the evaporator 108 can reduce the heat transfer efficiency of the evaporator 108. In addition, the evaporator 108 can freeze to the pod 150, the first portion 128 and second portion 130 of the evaporator can freeze together, and/or the pod can freeze to the evaporator. The evaporator can be defrosted between cycles to avoid these issues by opening the bypass valve 190, opening the evaporator 108, and turning off the motor 124 (step 282). The machine then diverts gas through the bypass valve for about 1 to 10 seconds to defrost the evaporator (step 284). The machine is programmed to defrost after every cycle, unless a thermocouple reports that the evaporator 108 is already above freezing. The pod can then be removed. The machine 100 then returns to idle mode (step 264). In some machines, a thermometer measures the temperature of the contents of pod 150 and identifies when it is time to dispense the contents of the pod. In some machines, the dispensing mode begins when a predetermined time is achieved. In some machines, a combination of torque required to turn the mixing paddle, temperature of the pod, and/or time determines when it is time to dispense the contents of the pod.

If the idle time expires, the machine 100 automatically powers down (step 272). A user can also power down the machine 100 by holding down the power button (286). When powering down, the processor opens the bypass valve 190 to equalize pressure across the valve (step 288). The machine 100 waits ten seconds (step 290) then turns off the compressor 186 and fans (step 292). The machine is then off.

Figure 16A:
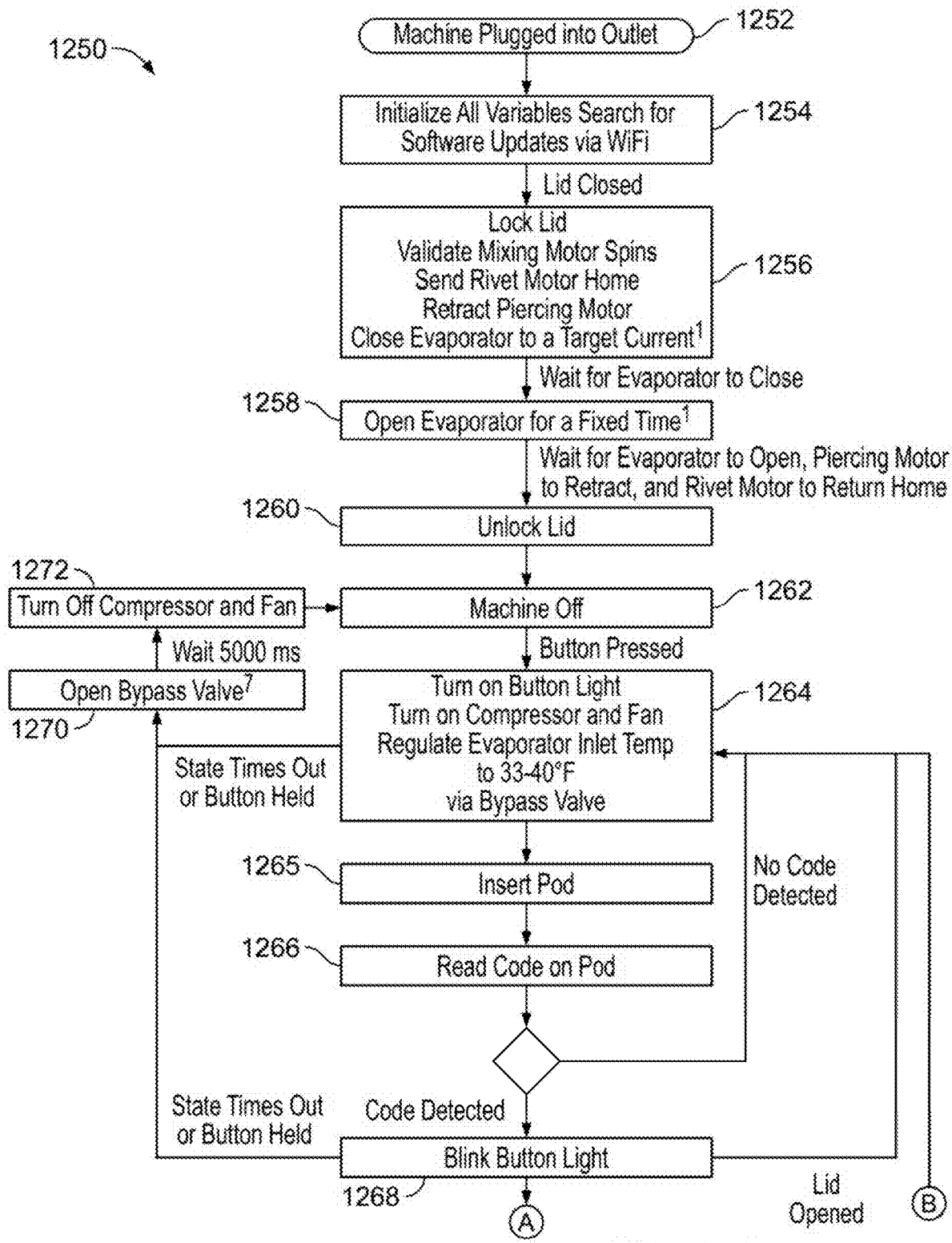
FIG. 16A-16C is a detailed flow chart of a method for operating a machine for producing cooled food or drinks.
Figure 16B:
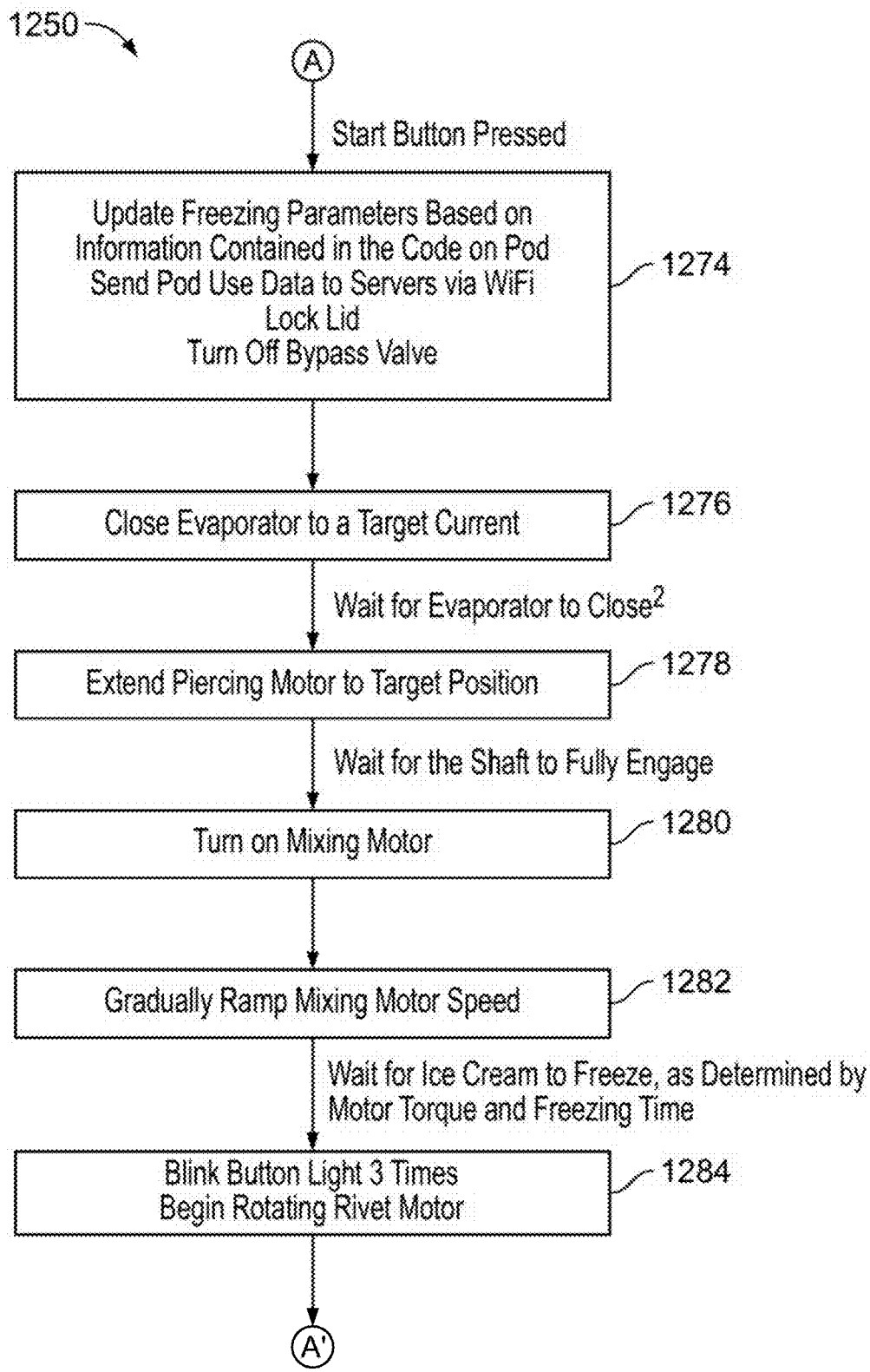
Figure 16C:
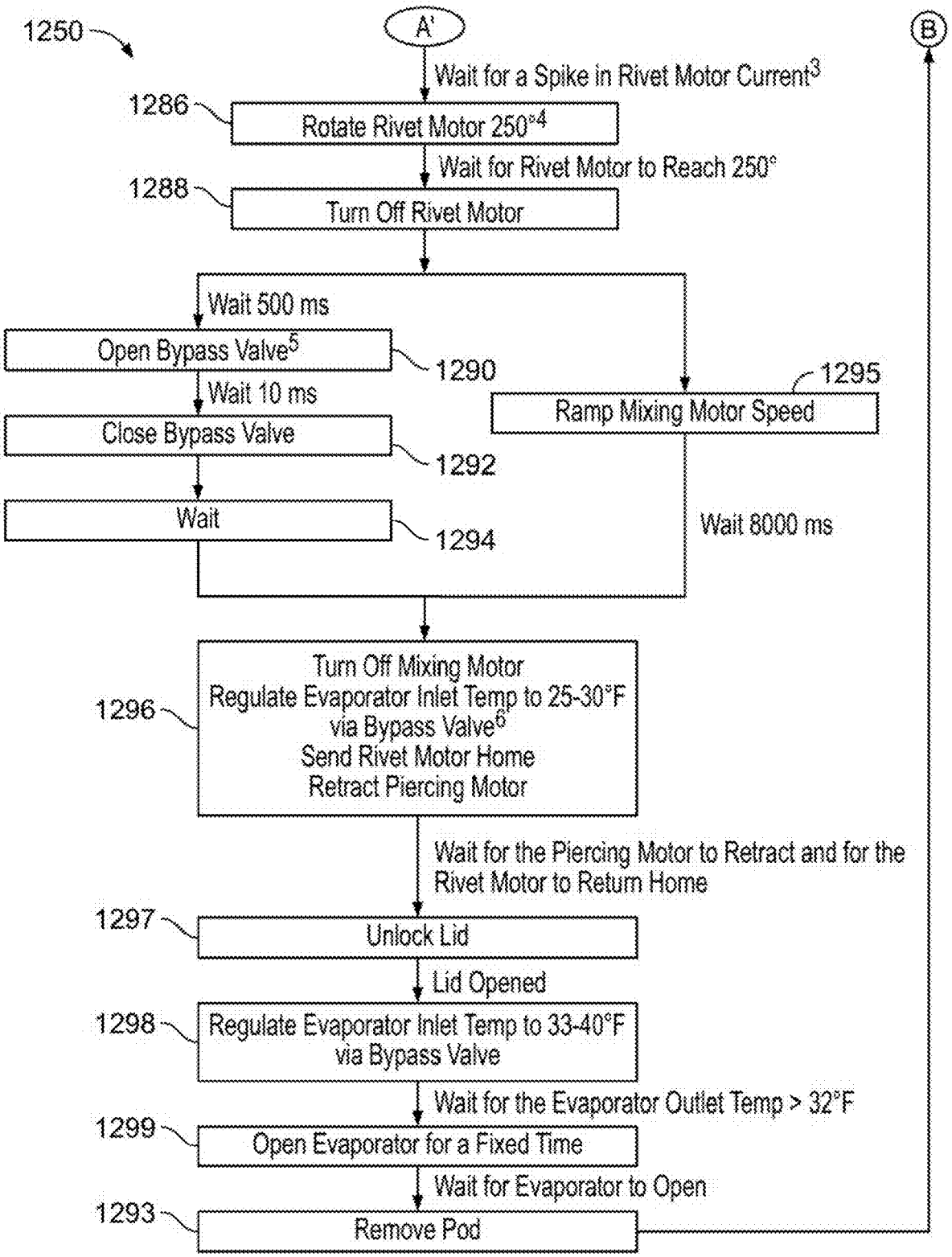

FIGS. 16A-16C are detailed flow charts of an alternate method 1250 implemented on the processor 122 for operating the machine 100. The method 1250 is similar to method 250. The method 1250 may be used with the refrigeration systems and machines described in this specification. The method 1250 is described as producing soft serve ice cream but can also be used to produce other cooled or frozen drinks and foods.

The first step of the method 1250 is to plug the machine 100 into an electrical outlet (step 1252). Once an electrical connection is detected, the processor 122 can initialize all variables. The processor 122 and network hardware can search for software updates via WiFi or using a wired Ethernet connection (step 1254). In some cases, cellular service (such as 4G/5G LTE) is included in the machine 100 and connection can be used for software updates and for pushing notifications and alerts to user devices. Step 1252 occurs once electrical connection is detected and does not necessarily require the machine 100 to be turned on.

To verify proper functionality of the machine 100 prior to use, a start-up routine is performed once this electrical connection is detected (step 1256). This process can identify issues or malfunctions within the machine and verify the machine 100 is ready for use. The processor 122 proceeds to lock the lid to verify the lid locking mechanism is working properly. This can be verified using sensors, including but not limited to limit switches, hall sensors, potentiometers, or any sensor that is capable of monitoring the position of the lid and the functionality of the locking mechanism. During this time, sensors in the machine 100 verify that the mixing motor is spinning properly. Sensors in the machine also verify the rivet shearing mechanism is in the home position, and if not, it is moved to the home position so that a pod can be inserted into the machine properly. Sensors in the machine 100 also verify that the piercing motor is in the home position, and if not, it is moved to the home position (i.e., retracted position) so that premature piercing of a pod is avoided.

The evaporator in the machine 100 is ensured to be in the closed position, which can be monitored using electrical current being sent to the motor closing the evaporator. When the evaporator is open, the current applied to the motor is low, while when the evaporator is closed, the current applied to the motor is large. This difference in electrical current is be used to monitor the closure of the evaporator. A predetermined electrical current is be used as a threshold to monitor when the evaporator is open versus closed. The machine 100 is configured to wait for the evaporator to close before continuing. Sensors in the machine also verify that the evaporator is in the open position when the machine is turned on (step 1258).

Machine 100 then waits for the evaporator to open, the piercing motor to retract (if not done already), and the rivet motor to return home (if not done already). The lid is also unlocked (step 1260). The machine 100 then turns off or enters a low-power standby state until the machine is turned on (step 1262).

Once the machine 100 power button is pressed, the power button light is turned on (step 1264). The machine user interface includes a single button with an LED ring. The single button acts as a power up, start, and power down button. In some machines, more than one button can be used. For example, a separate button is used for the power and ice cream making process. At this point, the processor 122 instructs the compressor and fan to turn on. The temperature of the inlet port to the evaporator is also regulated by the processor 122 to be about 33-40° F. via the bypass valve.

Once a pod (e.g., pod 150) is inserted into the machine and the lid is closed (step 1265), the processor 122 of the machine 100 reads the identification on the pod (step 1266). The identification is read in various ways, such as a bar code, RFID tag, UPC bar, QR codes, or using the identification methods previously described. If no code is detected then the machine 100 goes back to step 1264 and allows the lid to be opened and closed again. The machine may also send an alert to a display or user device notifying that the pod was not identified properly. An audible alert may also be used. Once the lid is closed again, identification of the pod is again attempted. Once the pod is identified properly by the processor 122 and the barcode is detected, the machine 100 proceeds to step 1268 where the processor 122 controls the button light to blink as a notification to the user that the pod has been identified and that machine 100 is ready for use.

The processor 122 may also send an alert to a display or user device of this notification. An audible alert may also be used.

If the lid opens, machine 100 reverts to step 1264 to reset machine 100 and repeat the pod identification process (step 1266).

If the power button is held down or a predetermined time has elapsed without user interaction, e.g., the process times out, then the processor 122 of the machine 100 proceeds to open the bypass valve to begin the shutdown process (step 1270). The bypass valve is opened immediately before shutdown to equalize pressure between the high and low sides of the refrigeration system quickly. This reduces the start-up load on the compressor if it is restarted shortly after being turned off After waiting about 5 seconds, the processor 122 then proceeds to turn off the compressor and fan (step 1272) and the machine 100 is turned off (step 1262) where the machine 100 enters the low-power standby state.

FIG. 16B is a continuation of the method 1250. Once the start button is pressed, processor 122 proceeds to update the freezing parameters based on information contained on pod (step 1274). In some cases, the information can identify temperatures, times, brand, flavor, contents of pod, as well as mechanical aspects of the pod, for example, pressure of the pod, type of pod used, dimensions of the pod, mixing paddle design aspects, or rivet shearing design aspects. Pod data usage or data related to the pod and/or machine can be sent using the processor 122 to servers via WiFi or using a cellular network connection as previously described. This data can be used in identifying customers or frequency of order placement for the pod subscription service. The lid of the machine 100 is also locked at this point the closed position so a user cannot inadvertently open the lid during the operation of the machine. The bypass valve the machine is also turned off.

The evaporator is closed to grip the pod (step 1276). As previously described, a predetermined target electrical current can be used by the processor 122 to identify the proper closed position of the evaporator. The evaporator can also be used to align a longitudinal axis of the pod with a longitudinal axis of the evaporator to ensure the pod is centered in the evaporator. The evaporator must be closed before the piercing motor punctures the can, so this ensures the can is centered before it is punctured.

The piercing motor is now controlled by the processor 122 to lower the dagger into the pod (step 1278). As described in this specification, in some pods, the dagger pierces the pod and then the dagger rotationally engages with the mixing paddle. In some pods, the dagger does not need to pierce the pod.

Once the mixing motor is rotationally engaged with the pod, the mixing motor is then controlled to turn on by the processor 122 (step 1280). Sensors on the machine 100 and connected to the processor 122 can ensure that the mixing motor is operating properly and that no malfunctions have been detected. The processor 122 commands the rotational speed of the mixing motor to gradually increase (ramp up) (step 1282). At this point, the processor 122 controls the mixing motor which spins the mixing paddle inside the pod. The machine 100 is now in the process of freezing the ice cream and the processor 122 waits for this process to complete before continuing. As previously described, information can be determined from the information from the pod via a barcode. Information can be related to the freezing process, such as motor torque which can be a proxy for measuring viscosity of the ice cream and freezing time. The machine 100 waits until the processor 122 detects that the ice cream is at the appropriate conditions for dispensing.

When the ice cream is ready to be dispensed, the user is notified by the processor 122 using a display on the machine 100, a notification to a user device, or using an audible alert. In some cases, the processor 122 controls the power button light to blink three times (step 1284), however any number of blinks or lighting patterns can be used to distinguish this state of the ice cream making process from the powered off or powered on state. The rivet motor of the rivet shearing mechanism is then signaled by the processor 122 to being rotating.

FIG. 16C is a continuation of the method 1250. As the rivet mechanism engages with the rivet of the pod, the electrical current of the motor increases dramatically. This increase in electrical current can be used by the processor 122 to monitor and detect when the rivet shearing mechanism actually engages with the rivet of the pod during the shearing process. Upon continued rotation of the rivet motor, the rivet shearing mechanism causes the rivet of the pod to be removed from the pod (e.g., the rivet can be mechanically sheared off). In some machines, the rivet or protrusion is moved out of the way instead of being sheared off or removed (e.g., in reusable pods it is advantageous to have a reusable rivet). The processor 122 of the machine 100 ensures a spike in the electrical current to the rivet motor occurs before continuing. Lack of a spike of electrical current could be indicative of a machine 100 malfunction.

After the rivet is sheared, the processor 122 controls the rivet shearing mechanism to turn a fixed distance to align the hole in the cutting cap attached to the pod with the port in the pod. This alignment is required for dispensing the contents of the pod. Ice cream sill mixes as the rivet shears to prevent the auger from freezing to the pod. The rivet must shear and rotate 250° quickly, e.g., in under 2 seconds, to prevent ice cream from ejecting from the pod while the rivet is being sheared (step 1286). Once the processor 122 of the machine 100 senses that the rivet has been removed, the rivet motor can be turned off (step 1288).

The ice cream is now dispensed from the machine. It is usual for the mixing motor to experience increased toque/load/current demands after nearly all the ice cream has been dispensed from the pod. This increased torque/load/current is caused because the evaporator is still chilling aggressively, but most of the mass has been evacuated from the pod. As a result, the ice cream left in the pod gets very cold and can freeze the mixing paddle to the pod. To reduce this effect, the bypass valve is timed to slightly warm the pod after nearly all ice cream has been dispensed (step 1290) which typically represents a wait time of seconds (500 ms) before opening the bypass valve, however this wait time can be adjusted based on information of the pod and machine 100 configurations. Note that when the bypass valve is opened, it can take several seconds for the evaporator to begin warming up. Once this process is complete, typically after a wait time of 10 ms, the bypass valve is closed (step 1292). The machine 100 then waits until all the ice cream is dispensed before continuing (step 1294).

During the dispensing process, the mixing motor is also ramped up in speed (step 1295). The mixing motor is continued to rotate during the dispensing process, which can be about 4 to 12 seconds.

At this point, the machine 100 is ready to begin a reset process (step 1296). First, the processor 122 commands the mixing motor to spin down and turn off. After the cooling cycle is complete and before the pod is removed, the pod is chilled in the evaporator to just below freezing. Superficially, the evaporator inlet temperature is regulated, by the processor 122, to about 25-30° F. via the bypass valve. This temperature prevents liquid from leaking from the pod when the bypass valve defrosts the evaporator from the pod, a necessary step before the evaporator is opened and the pod removed.

The processor 122 further commands the rivet motor to the home position and commands the piercing motor to retract. The process waits until one or more sensors detect that the rivet motor is in the home position and the piercing motor is in the retracted position.

The processor 122 of the machine 100 commands the lid to unlock (step 1297) so that a user can lift the lid and expose the top of the pod. At this point, the processor 122 regulates the evaporator inlet temperature to about 33-40° F. via the bypass valve (step 1298). The processor 122 can wait until the evaporator outlet temperature reaches at least 32° F. before continuing.

At this point, the processor 122 commands the evaporator to open so that the pod is released from the grip of the evaporator in anticipation of removal of the pod 150 from the receptacle of the machine 100. The processor 122 may also allow the evaporator to stay open for a predetermined time (step 1299) during this process. The pod 150 is then removed from the machine 100 (step 1293).

The machine then reverts back to step 364 (as seen in FIG. 16A) where the processor 122 of the machine 100 configures the machine 100 to be ready for the next pod to be inserted.

FIGS. 17A-17D are perspective views of a machine 300. The machine 300 is substantially similar to the machine 100 but has a different mechanism for opening the lid 112 to insert a pod 150 and to connect the driveshaft of the machine 300 to the pod 150.

Figure 17A:
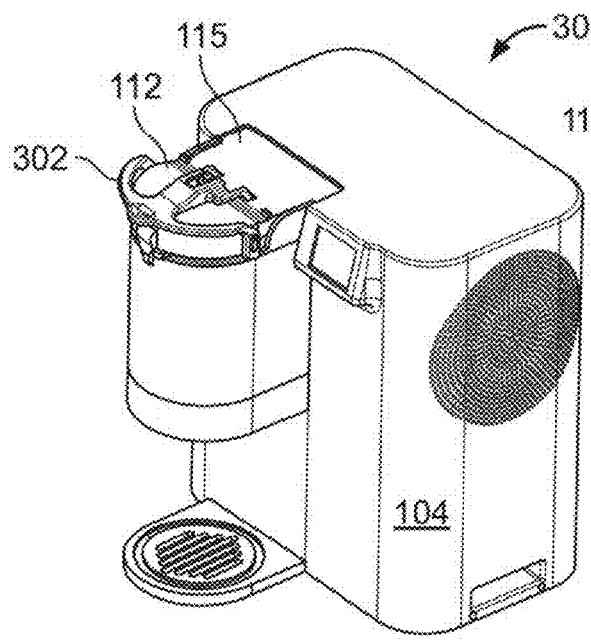
FIGS. 17A-17D are perspective views of a machine for producing cooled food or drinks.
Figure 17B:
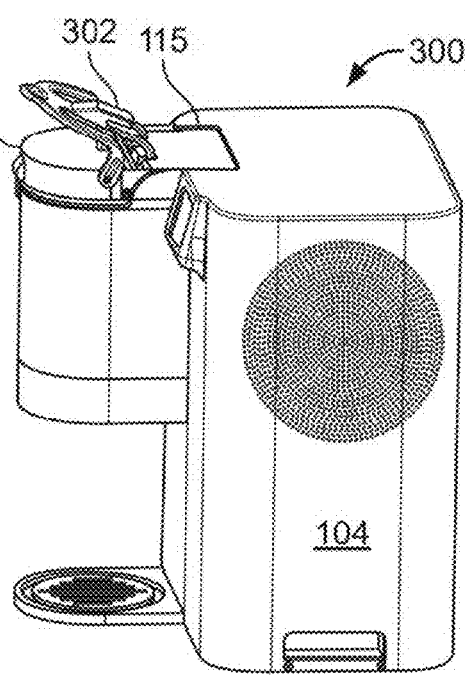

FIG. 17A show the machine 300 with the lid 112 in its closed position. In this position, a handle 302 is flush with the lid 112. FIG. 17B shows the handle 302 raised to an intermediate position. In this position, the lid 112 stills covers the evaporator 108 but, as is explained in more detail with respect to FIGS. 18A and 18B, the driveshaft 126 is raised slightly.

Figure 17C:
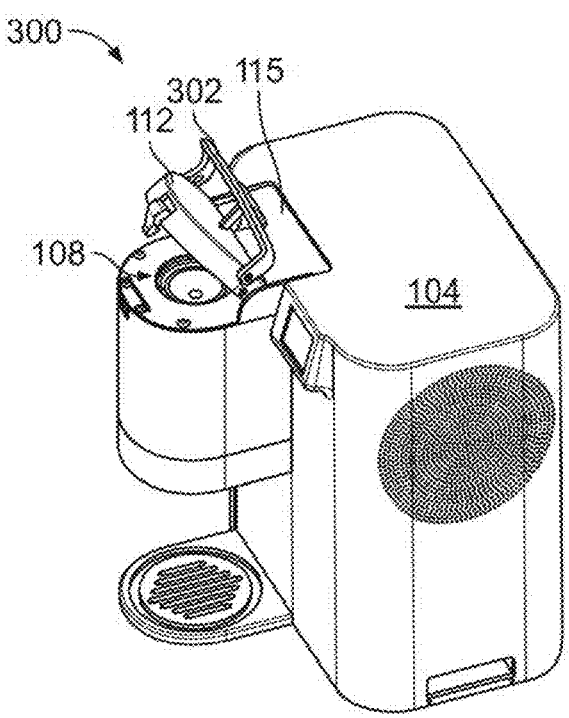
Figure 17D:
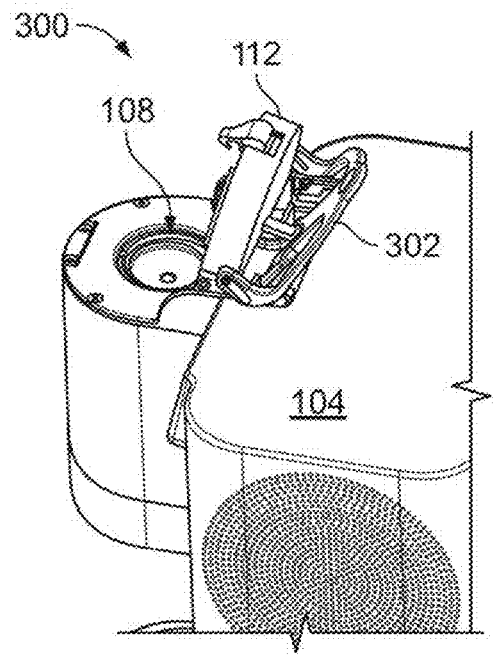

The auxiliary cover 115 of the machine 300 slides back into the housing 104 rather than pivoting like the auxiliary cover 115 of the machine 100. FIG. 17C shows that, as the handle 302 is lifted further, the handle 302 lifts the lid 112 to an open position with the auxiliary cover 115 starting to slide backwards under housing 104. FIG. 17D shows the auxiliary cover 115 fully retracted into the housing 104 leaving space for the handle 302 and the lid 112 to articulate far enough back that a pod 150 can be inserted into the evaporator 108.

Figure 18A:
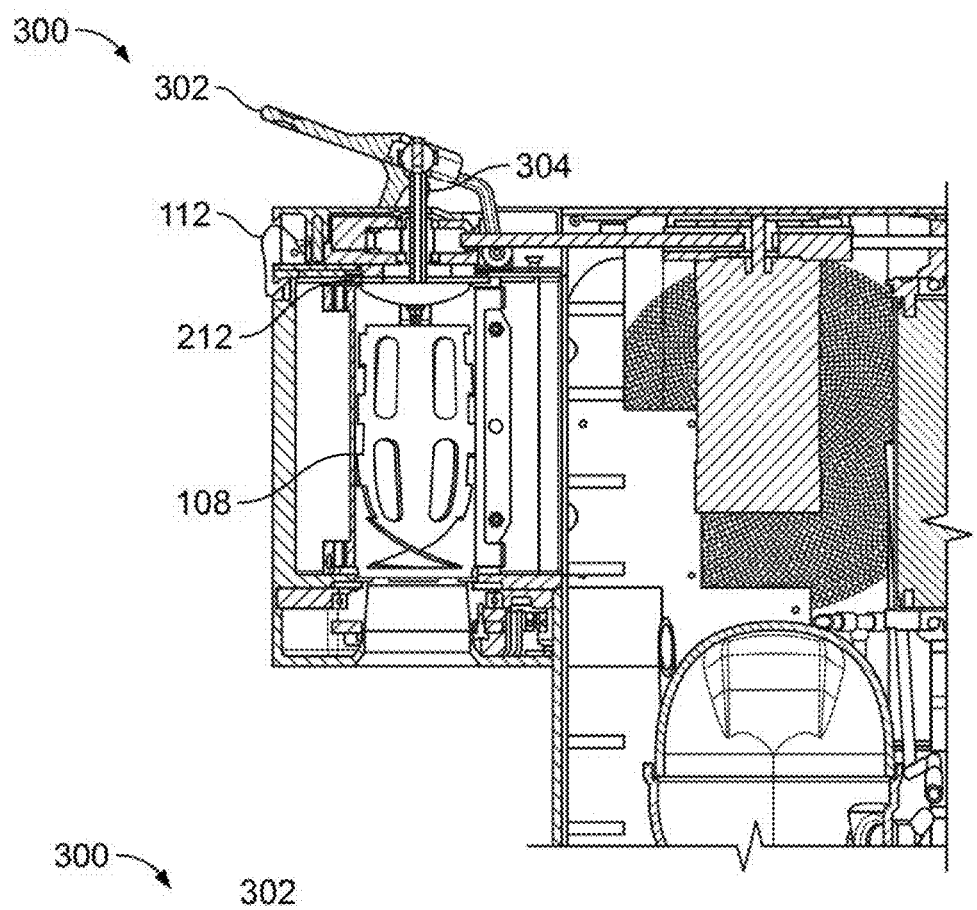
FIGS. 18A and 18B are partial cross-sectional views of the machine of FIGS. 17A-17D.
Figure 18B:
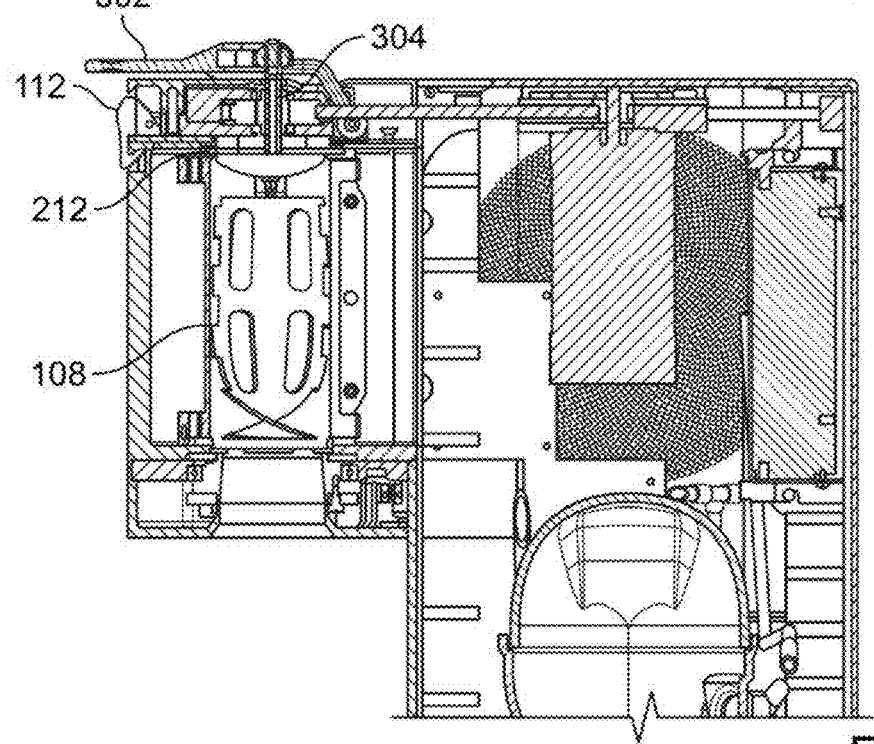

FIGS. 18A and 18B are partial cross-sectional views of the machine 300 illustrating the insertion of a driveshaft 304 into the interior region of the evaporator 108. The driveshaft 304 is attached to the handle 302. As shown in FIG. 18A, the driveshaft 304 is close to but spaced apart from the pod 150 when the handle 302 is in its intermediate position. Moving the handle 302 to its closed position forces the driveshaft 304 through the second end of the pod 150 into engagement with an internal mixing paddle.

Figure 19:
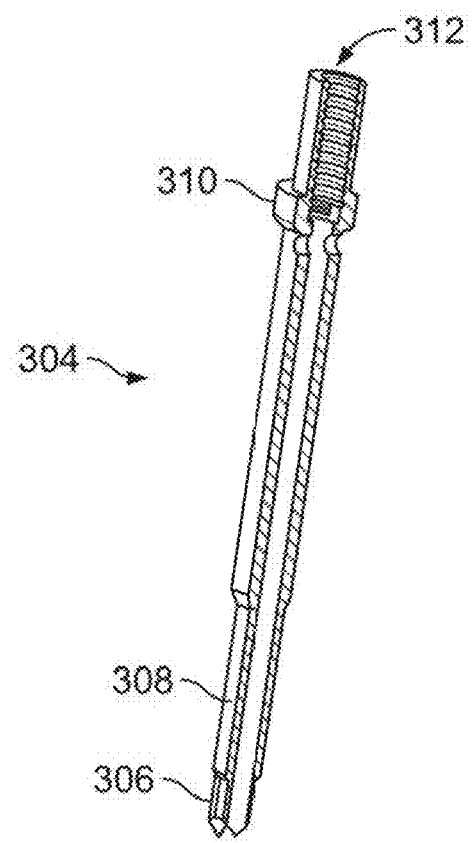
FIG. 19 is a partially cutaway perspective view of a driveshaft.

FIG. 19 is a partially-cutaway perspective view of the driveshaft 304. The driveshaft 304 includes teeth 306, a locking section 308, and a flange 310. The teeth 306 cut through the second end 212 of the pod 150 (see FIG. 9C) when movement of the handle 302 to its closed position forces the driveshaft 304 through the second end 212 of the pod 150. In some systems, a sharp edge without teeth is used.

The locking section 308 is received in a bore in the mixing paddle 160. The bore in the mixing paddle 160 and locking section 308 of the driveshaft 304 have matching shapes so rotation of the driveshaft 304 causes rotation of the mixing paddle 160. The driveshaft 304 has a locking section 308 with a square cross-section. Some driveshafts have locking sections with other shapes (e.g., hexagonal or octagonal cross-sections). The flange 310 of the driveshaft 304 is attached to the handle 302. A central bore 312 extends through the driveshaft 304. When the driveshaft 304 is inserted into a pod 150, the central bore 312 of the driveshaft 304 allows air to flow into the pod 150 as cooled food or drink is being mixed and evacuating/dispensing out the other end of the pod 150. Some driveshafts are made of solid material.

In some machines, the driveshaft 304 is configured so that the piercing/distal end of the driveshaft 304 is wider in diameter than the central portion of the driveshaft 304 so that the hole created in the aluminum pod is wider than the diameter of the central part of driveshaft 304. This configuration reduces the likelihood that the central portion of the driveshaft touches the pod while rotating. In addition, the driveshaft 304 may be coated with self-cleaning and/or hydrophobic coatings that reduce the amount of pod ingredients that adhere to driveshaft 304. In some machines, the driveshaft 304 is relieved so as not to hit the second end 212 of the pod 150 during the puncturing process.

Figure 20:
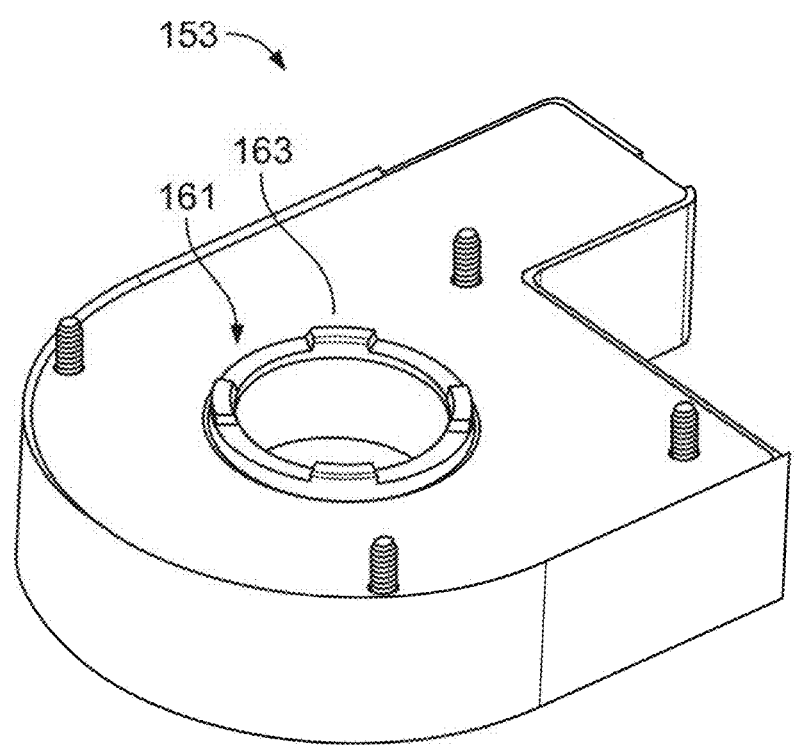
FIG. 20 is a perspective view of a dispenser.

FIG. 20 is a perspective view of the dispenser 153 of the machine 300. The protrusions 163 of the annular member 161 are rectangular-shaped rather than dowel shaped. The dispenser 153 is otherwise substantially the same as the dispenser 153 of the machine 100.

Some machines implement other approaches to the pod-machine interface than the machine 100. For example, some machines have a pod-machine interface that is movable relative to the body of the machine to expose the receptacle defined by the evaporator. A loading system can control the position of the pod-machine interface relative to the body of the machine. In some of these machines, the lid is fixed in position relative to the body of the machine.

Figure 21A:
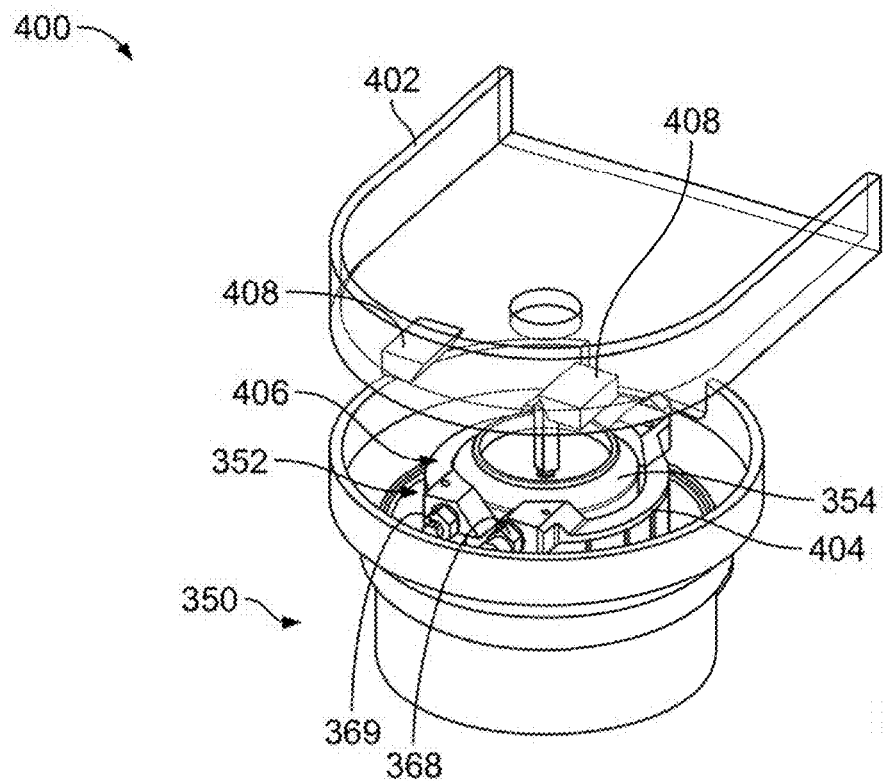
FIGS. 21A-21C are schematic views that illustrate a wedge system associated with the pod-machine interface.
Figure 21B:
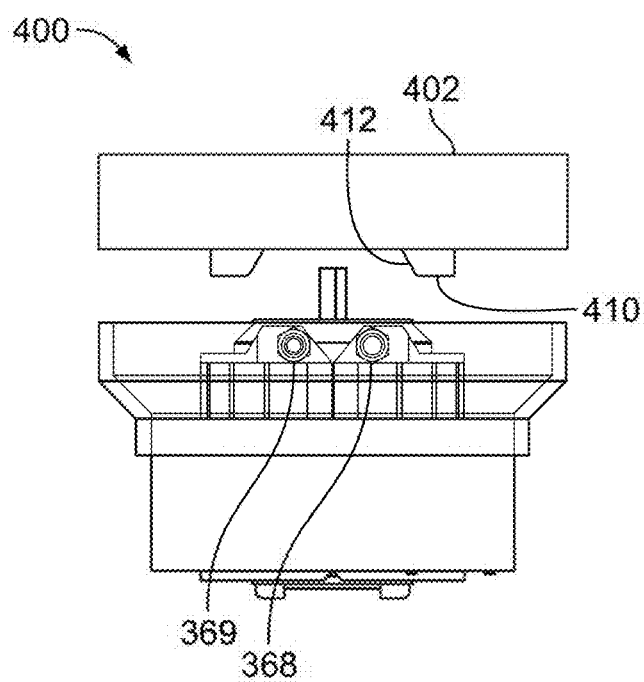
Figure 21C:
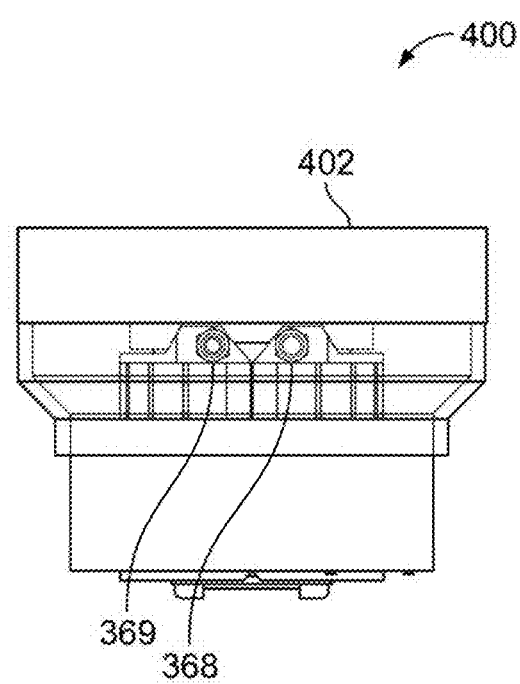

FIGS. 21A-21C illustrate a wedge system 400 associated with the pod-machine interface 350 that uses a lid 402 to clamp the evaporator 352 around the pod 354. FIGS. 21A and 21B are, respectively, a schematic perspective view and a schematic side view of the pod-machine interface 350 with the lid 402 spaced apart from the evaporator. FIG. 21C is a schematic side view of the pod-machine interface 350 engaged with the lid 402 in the closed position.

Each side of the evaporator 352 has a manifold 404 that connects channels inside the walls of the evaporator 352 with the inlet ports 368 and the outlet ports 369. The manifold 404 has sloped portions 406 near the inlet ports 368 and the outlet ports 369. The lid 402 has wedges 408 on the side facing the evaporator 352. The wedges 408 have a flat surface 410 and a sloped surface 412. When the pod-machine interface 350 engaged with the lid 402 (e.g., by movement of a lid towards a fixed position evaporator or by movement of an evaporator towards a fixed position lid), the wedges 408 on the lid 402 contact the sloped portions 406 of the manifold 404. The movement applies force to the sloped portions 406 of the manifold 404 on the evaporator and clamps a first portion and a second portion of the evaporator 352 closed around a pod 354 for a tight fit. Latching the lid 402 closed maintains this tight fit.

The loading mechanisms previously described receive a pod by inserting the pod into the receptacle from the top of the pod-machine interface. Some machines load pods from the bottom of the pod-machine interface.

Figure 22A:
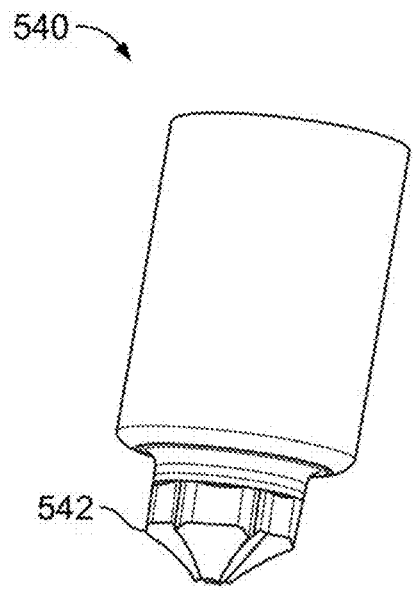
FIGS. 22A-22C are schematic views of a driveshaft with a barbed head and a matching recess on a mixing paddle.
Figure 22B:
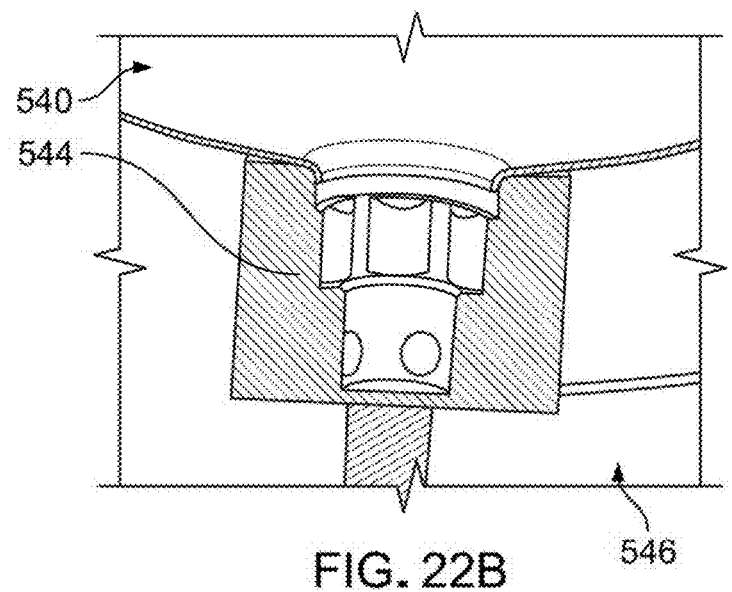
Figure 22C:
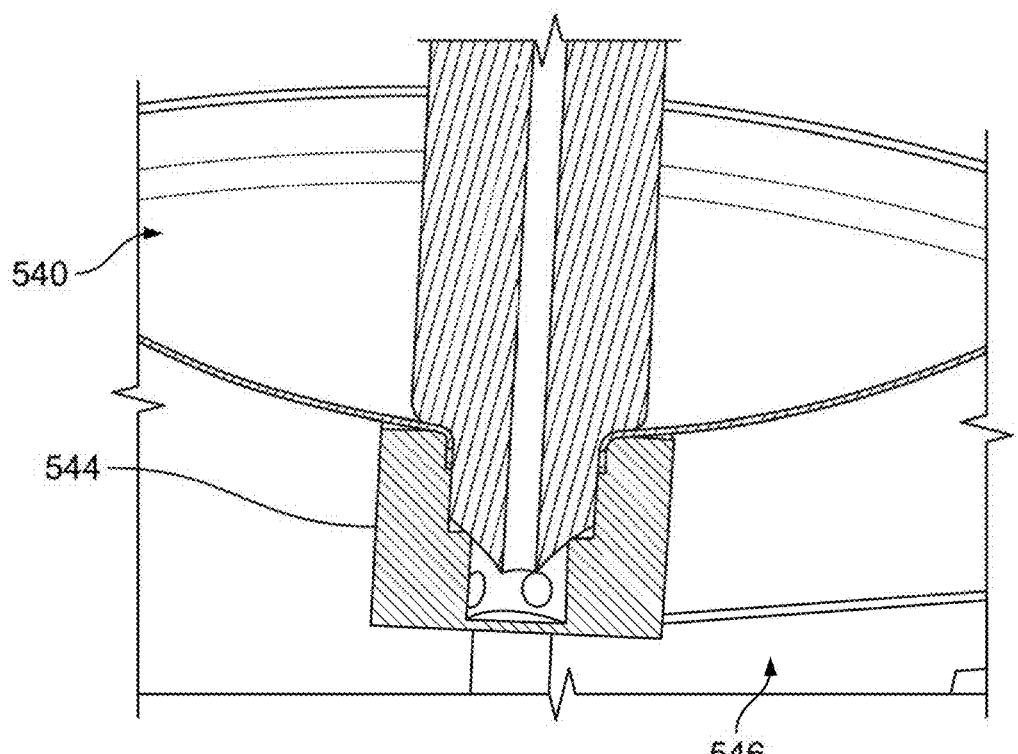

FIGS. 22A-22C show a driveshaft 540 with a barbed end 542 for engaging a complementary recess 544 in a mixing paddle 546. The barbed end of the driveshaft rotationally couples the driveshaft 540 to the mixing paddle. Driveshafts with a barbed end 542 may more easily pierce pods than driveshafts with a square end.

Figure 23:
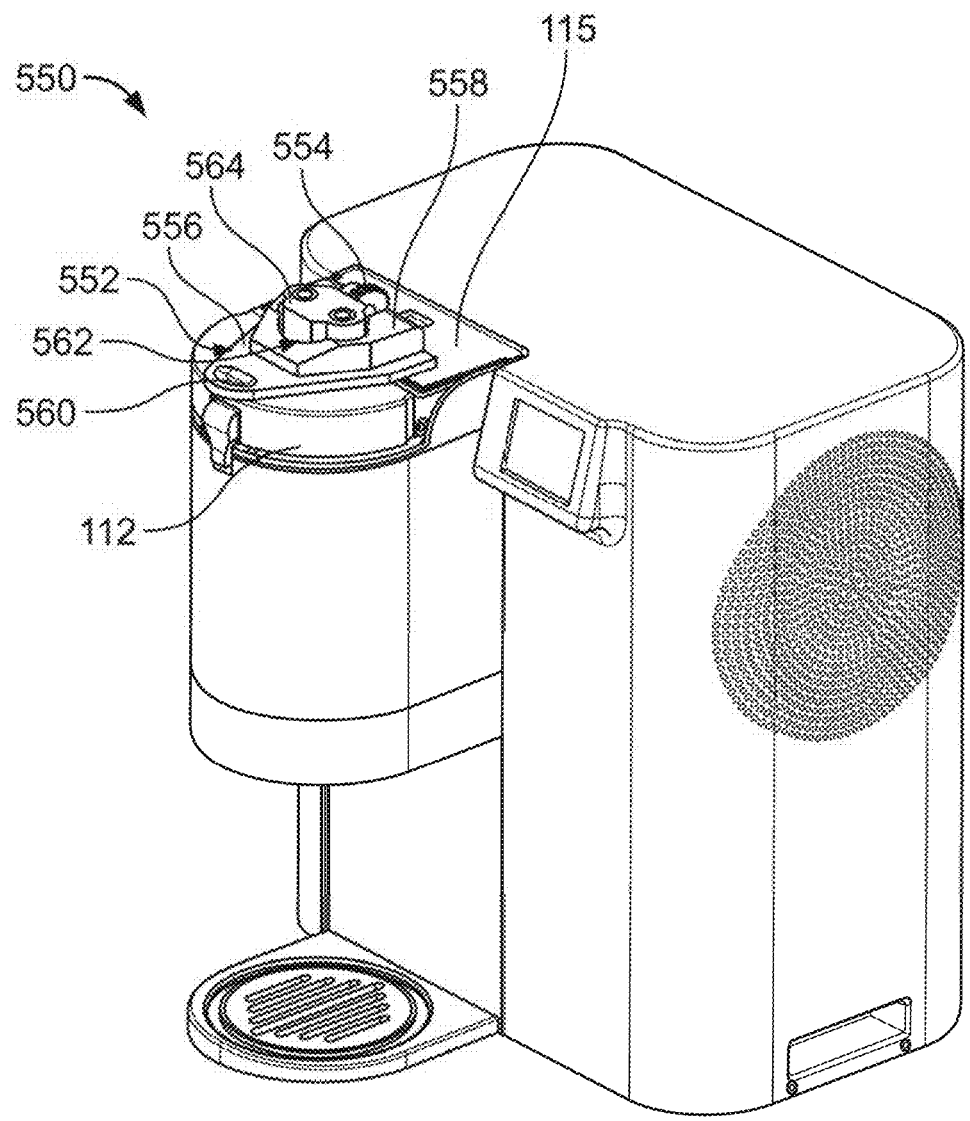
FIG. 23 shows a perspective view of a machine with a handle connected to a pinion.

FIG. 23 shows a perspective view of a machine 550 that is substantially similar to the machine 300 shown in FIGS. 17A-17D. However, the machine 550 has a handle 552 that is connected to a pinion 554 for moving a driveshaft up and down. The handle 552 is triangularly shaped and widens from a first end 556 to a second end 558. A dimple 560 on the first end 556 of the handle 552 provides a gripping surface. The dimple 560 indicates to the user where to grip the handle 552. Some handles have other shapes (e.g., rectangular, square, or circular). Some handles are shaped like the handle shown in FIG. 17A (e.g., handle 302). A recess 562 extends into the handle 552 from the second end 558 of the handle. The pinion 554 and an elevator shaft 564 are disposed in the recess 562. A user lifts the first end 556 of the handle 552 to rotate the handle 552 about the second end 558 to open the lid 112. The user presses downwards on the first end 556 of the handle 552 to rotate the handle 552 about the second end 558 and close the lid 112.

Figure 24A:
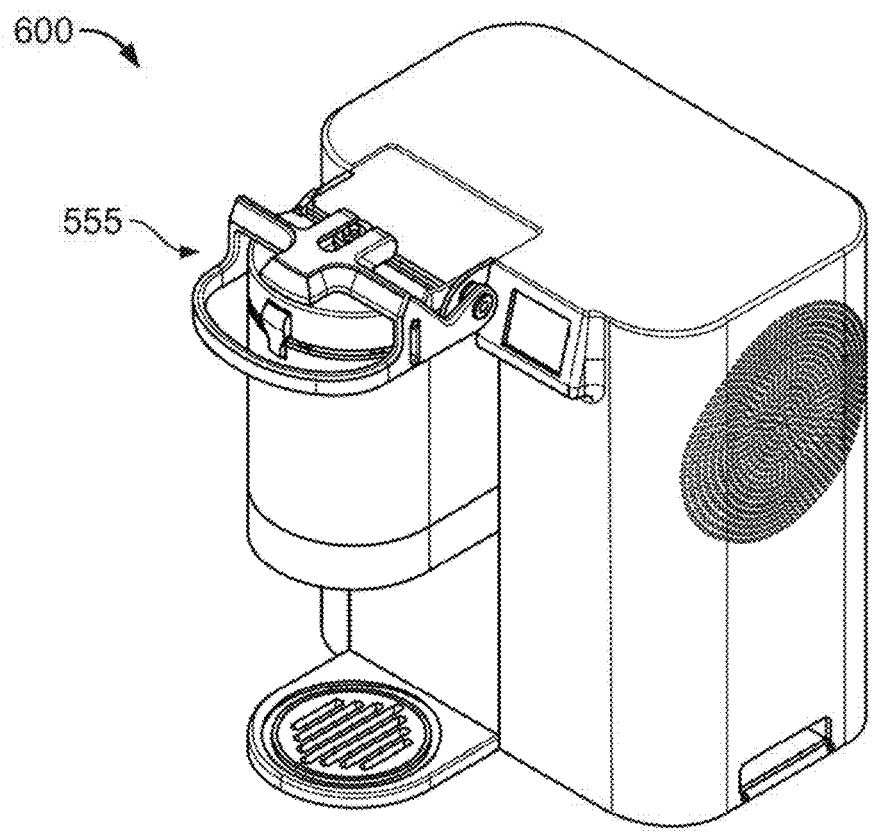
FIGS. 24A-24E show perspective and cross sectional views of a machine with a handle that rotates on the same axis as a lid of the machine.
Figure 24B:
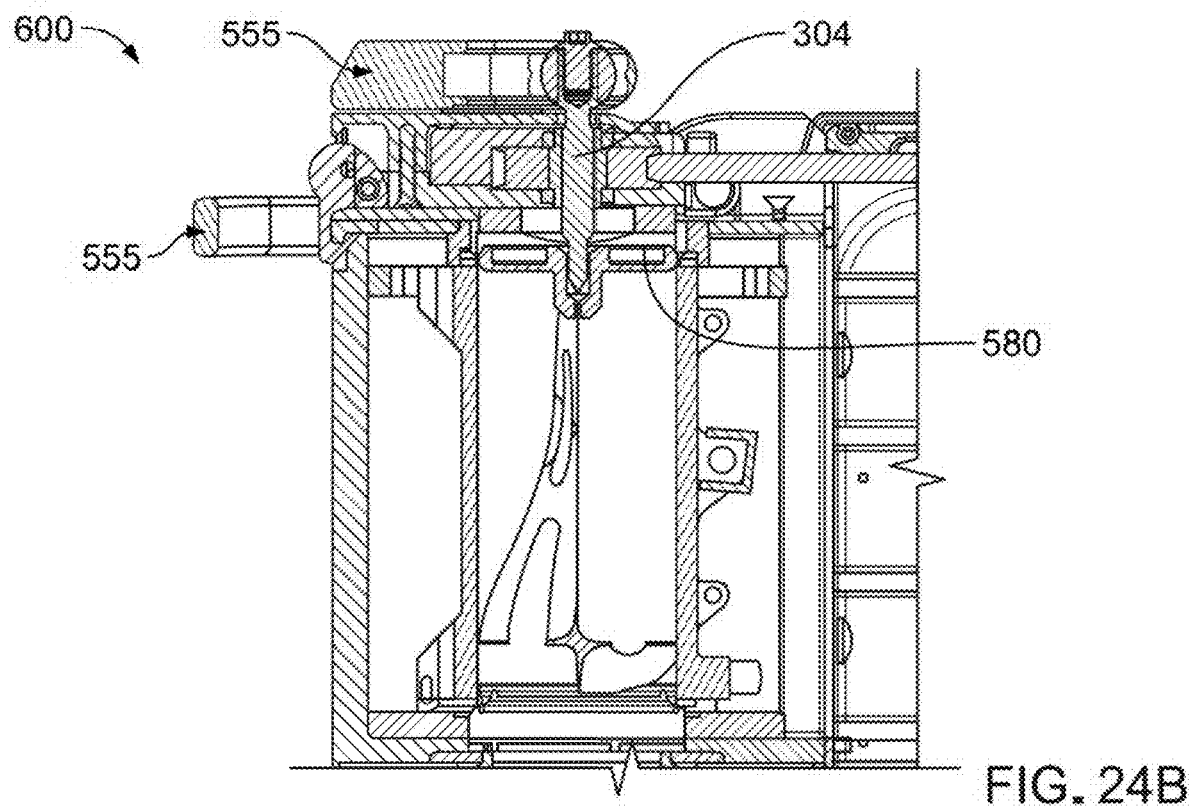
Figure 24C:
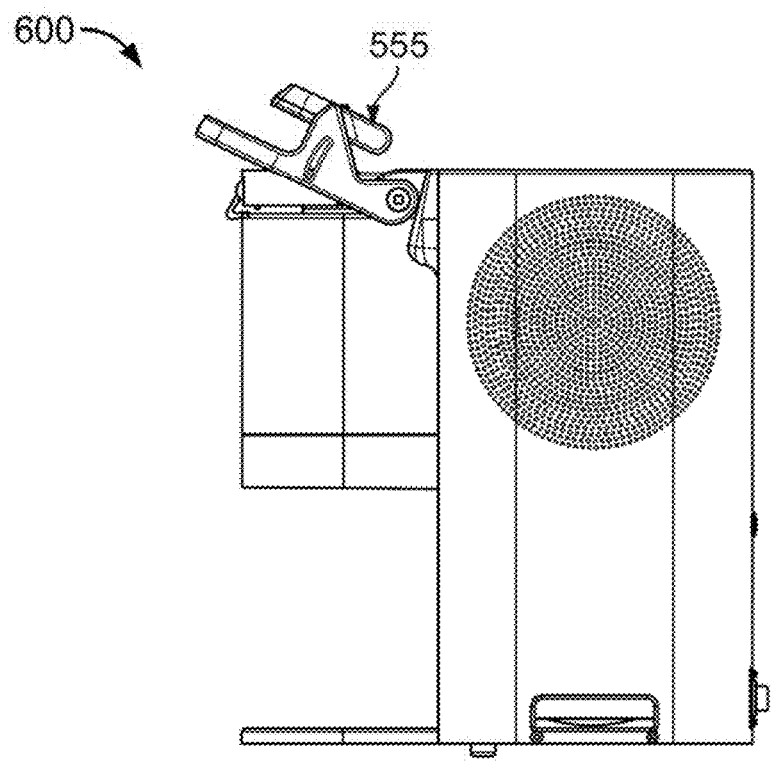
Figure 24D:
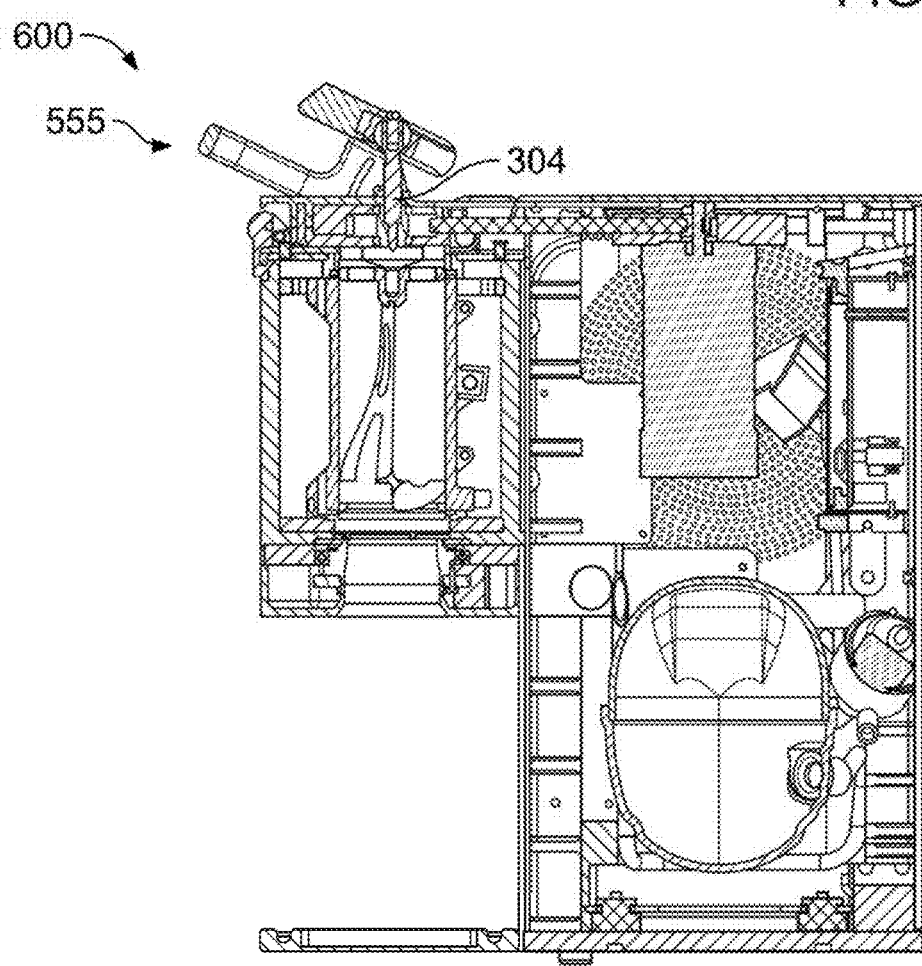
Figure 24E:
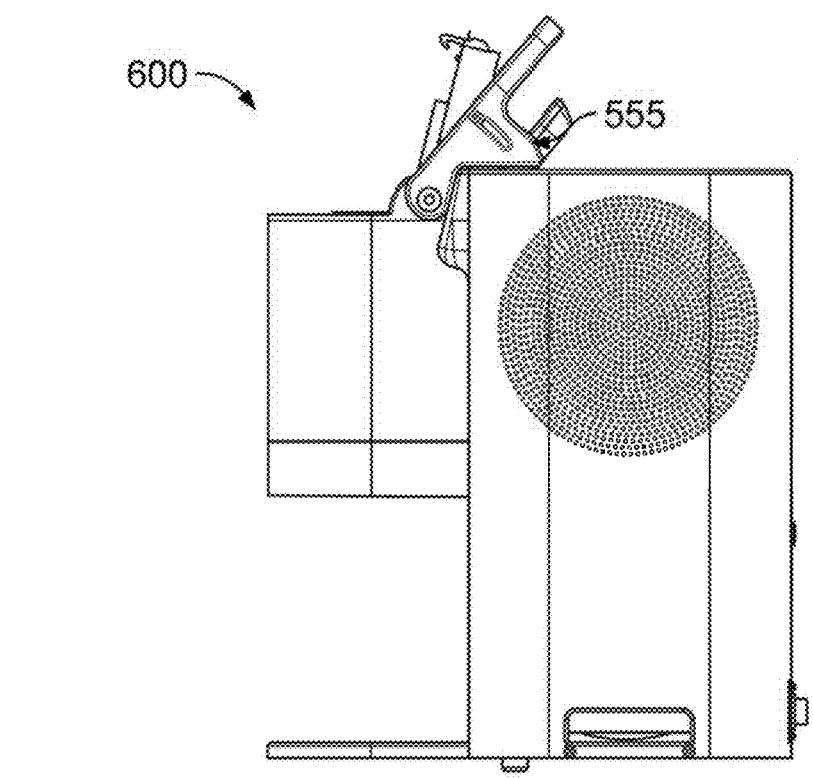

FIGS. 24A-24E show a machine 600 with a handle 555 that operates similarly to the handle 302 on machine 300 in FIGS. 17A-17D. However, in FIGS. 24A-24E the handle 555 and the lid 112 rotate about the same hinge. The handle 555 is also larger and allowing a user to use their entire hand to apply force to the driveshaft via the handle. The length of the handle 555 increases the mechanical advantage provided by the handle 555 and decreases the required amount of force applied by the user to puncture the pod and engage the driveshaft 304. The pod 150 as shown in FIG. 24B also includes a centering head 580 that engages with the mixing paddle 160. The centering head 580 holds the mixing paddle 160 in position with the central stem 228 along the rotational axis. FIGS. 24A and 24B show the handle 555 and lid 112 in its closed position. The driveshaft 304 is extended into the evaporator to pierce the pod 150 and engage the mixing paddle 160. FIGS. 24C and 24D show the handle 555 in the open position and the lid 112 in the closed position. The driveshaft 304 is retracted and is held within the lid 112. FIG. 24E shows the lid 112 and the handle 555 in the open position. The evaporator 108 is exposed and a pod 150 can be inserted into the evaporator 108.

Figure 25A:
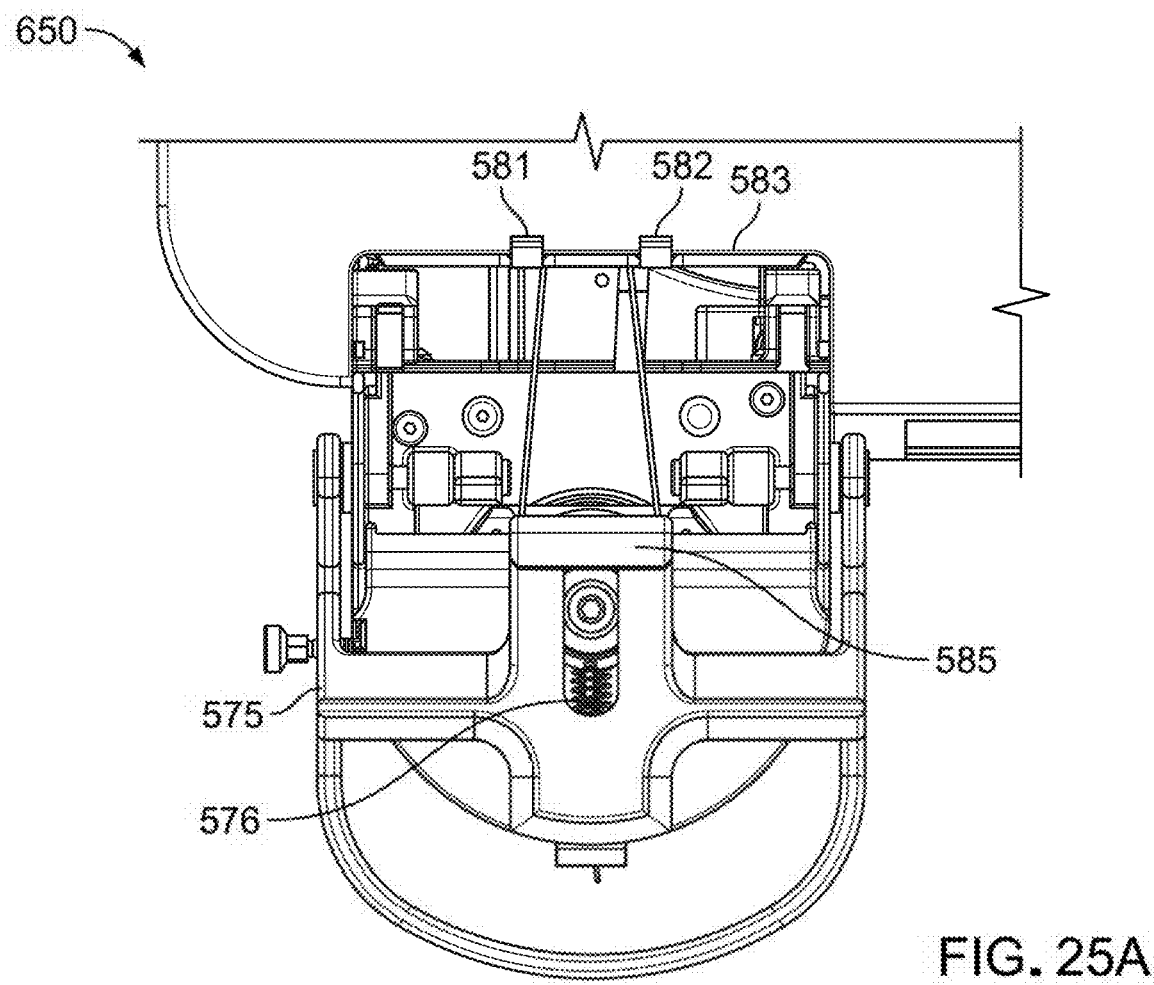
FIGS. 25A-25C show a portion of a machine with a spring-loaded handle that rotates on the same axis as a lid of the machine.
Figure 25B:
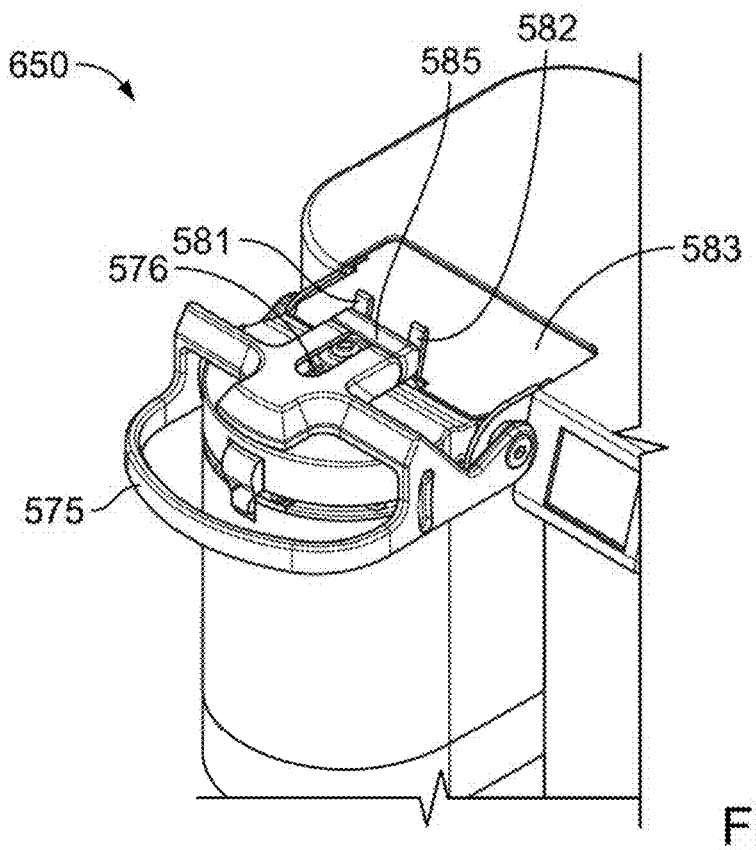
Figure 25C:
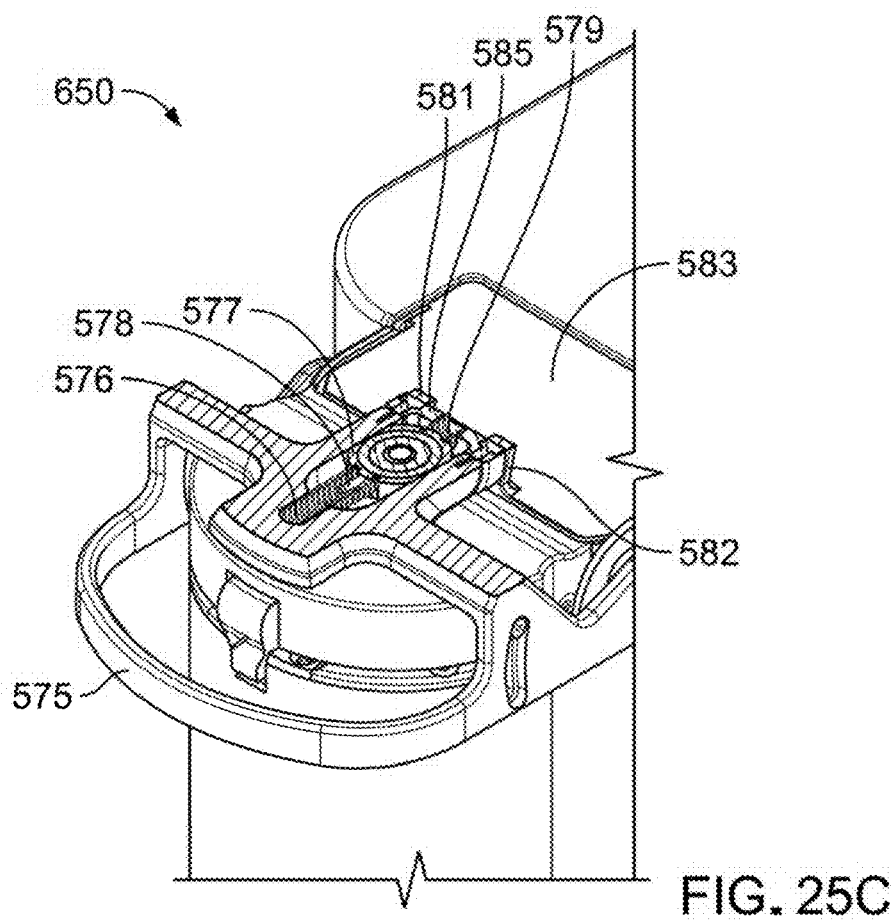
Figure 26A:
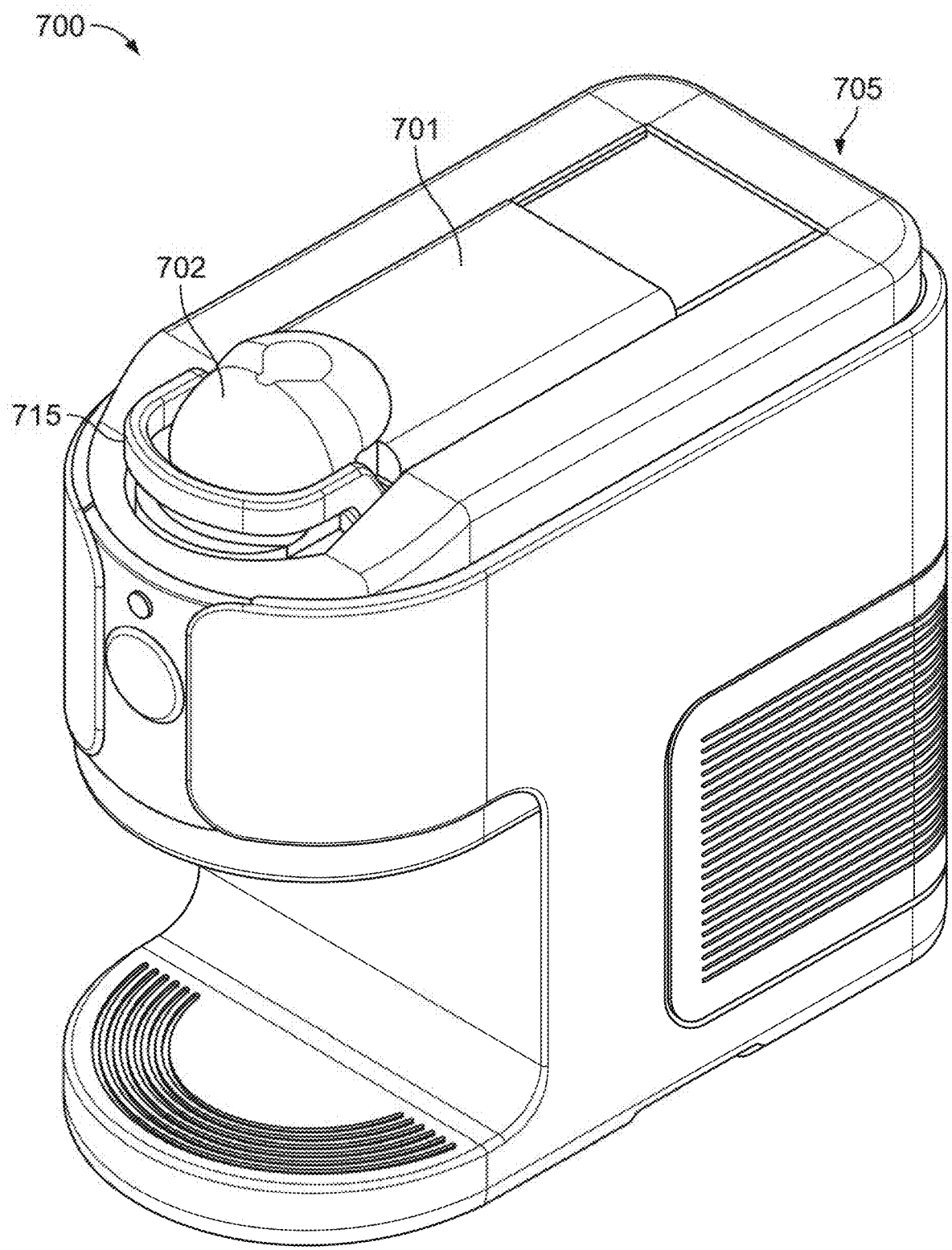
FIGS. 26A-26C are perspective views of a machine for rapidly cooling food and drinks.
Figure 26B:
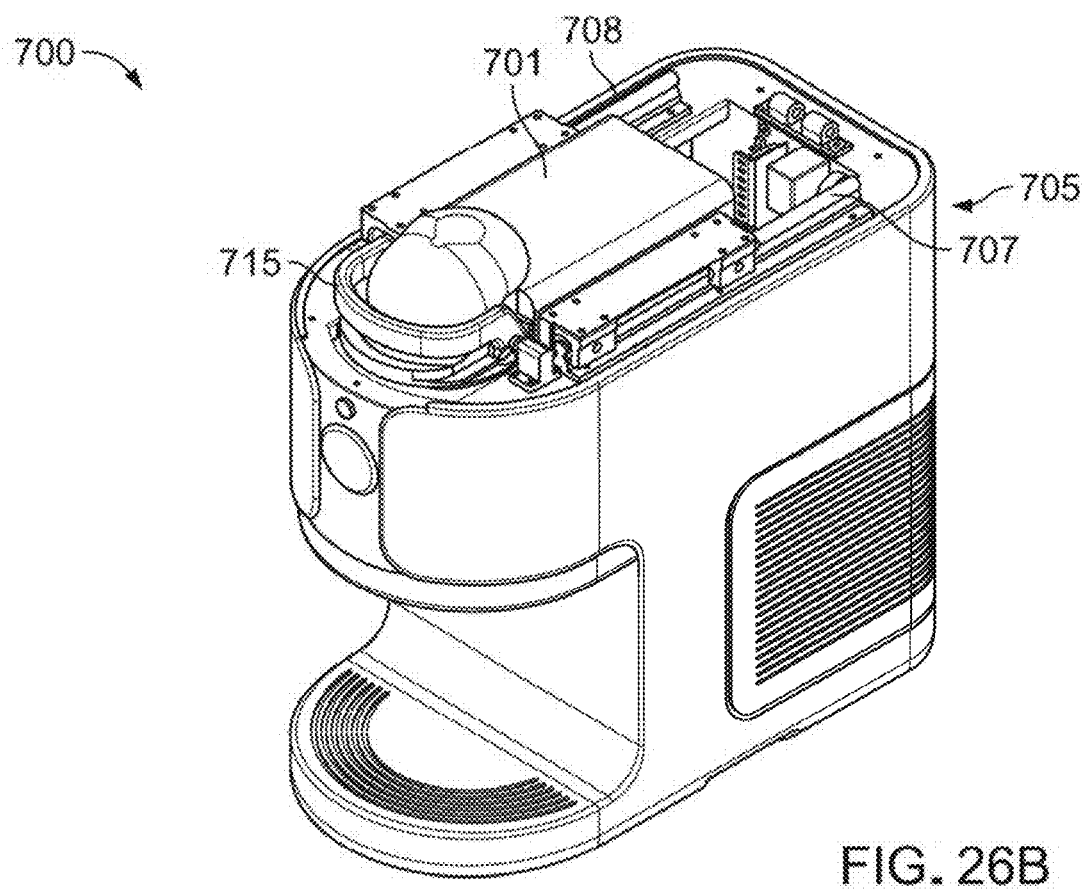
Figure 26C:
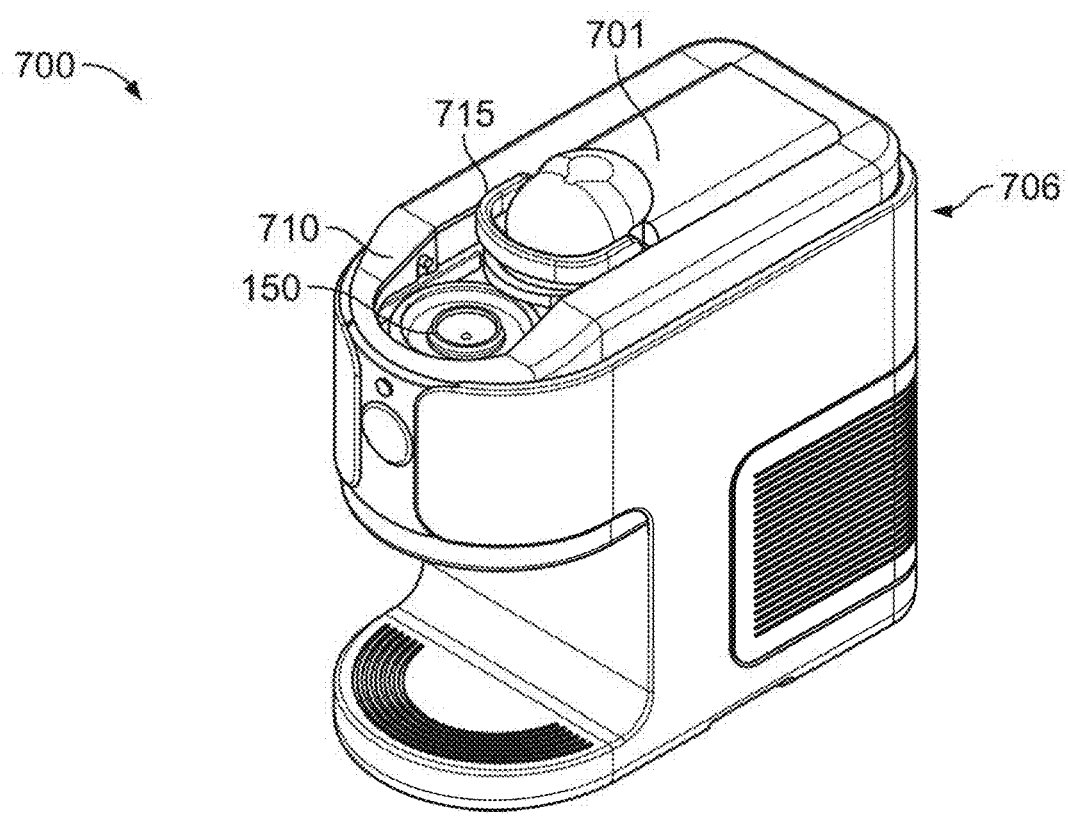

FIGS. 25A-25C show a machine 650 with a spring-loaded handle 575, substantially similar to the handle 555. The spring-loaded handle is shown mounted to a machine 650 in a closed position in the top view of FIG. 25A. A spring 576 provides a smooth transition of the handle 575 as the driveshaft 304 is extended into the evaporator to pierce the pod 150 and engage the mixing paddle 160. The spring 576 is connected to a bearing housing 577 (best seen in FIG. 25C) and the handle 575. A cover 585 extends over a second spring 579 (best seen in FIG. 25C), and the force of the second spring 579 can ease raising/lowering of the handle 575 on the machine 650. An auxiliary cover 583, which is substantially similar to the auxiliary cover 115, is shown in a retracted position.

FIG. 25B is a perspective view of handle 575 mounted on machine 650 in the closed position. The auxiliary cover 583 is shown in the closed position. A pair of deflectors 581 and 582 engage the cover 585 of the handle 575. The pair of deflectors 581 and 582 are mounted on the auxiliary cover 583.

FIG. 25C is a partially cutaway view showing a cross section of the handle 575. A locating pin 578 sets the position of the spring 276. The locating pin is connected to the bearing housing 577. As the handle 575 is lifted, the angle of the bearing changes to help the bearing slide forward and back without binding during lifting and closing. The springs 276 assist the bearings on staying on track. The second spring 579 is located in the rear of the bearing housing 577 and further provides a smooth transition of the handle 575. The handle 575 is connected to the cover 585 by mechanical fasteners, such as bolts (not shown).

FIGS. 26A-27B shows a machine 700 with a sliding lid assembly 701. Such sliding lid assembly 701 can reduce the overall height of the machine 700 relative to machines with lid assemblies that open upward. This approach makes the machine 700 more compact and able to fit on kitchen countertops underneath cupboards.

Machine 700 is substantially similar to the machines previously discussed (e.g., machine 650). However, the sliding lid assembly 701 slides along tracks, or rails 707 and 708, to move from a closed configuration 705 (shown in FIGS. 26A and 26B) to an open configuration 706 (shown in FIG. 26C). In the open configuration 706, the sliding lid assembly 701 translates rearward, along linear rails 707 and 708, to slide a cover 702 to reveal an opening 710 in the machine 700 for accessing the pod 150. The user typically pushes/pulls the handle 715 to translate the sliding lid assembly 701 from the closed configuration 705 to the open configuration 706.

Figure 27A:
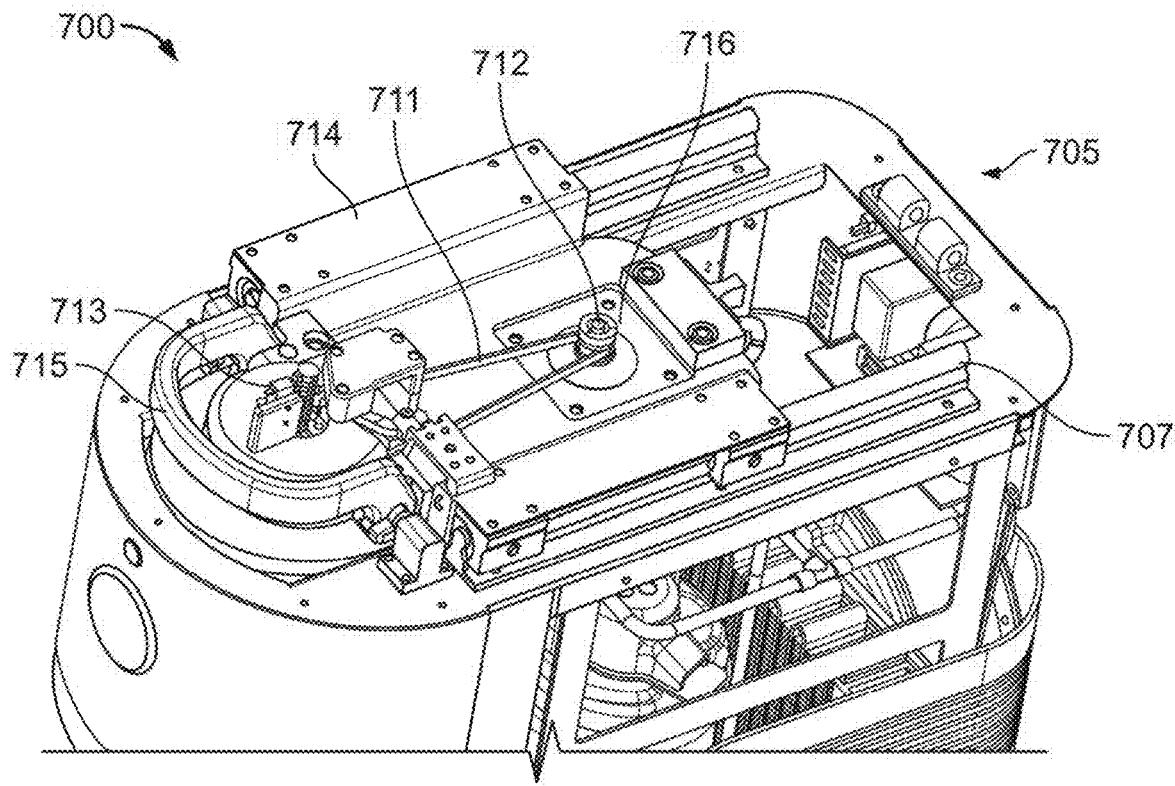
FIGS. 27A-27B are perspective views of the machine of FIGS. 26A-26C with internal details shown.
Figure 27B:
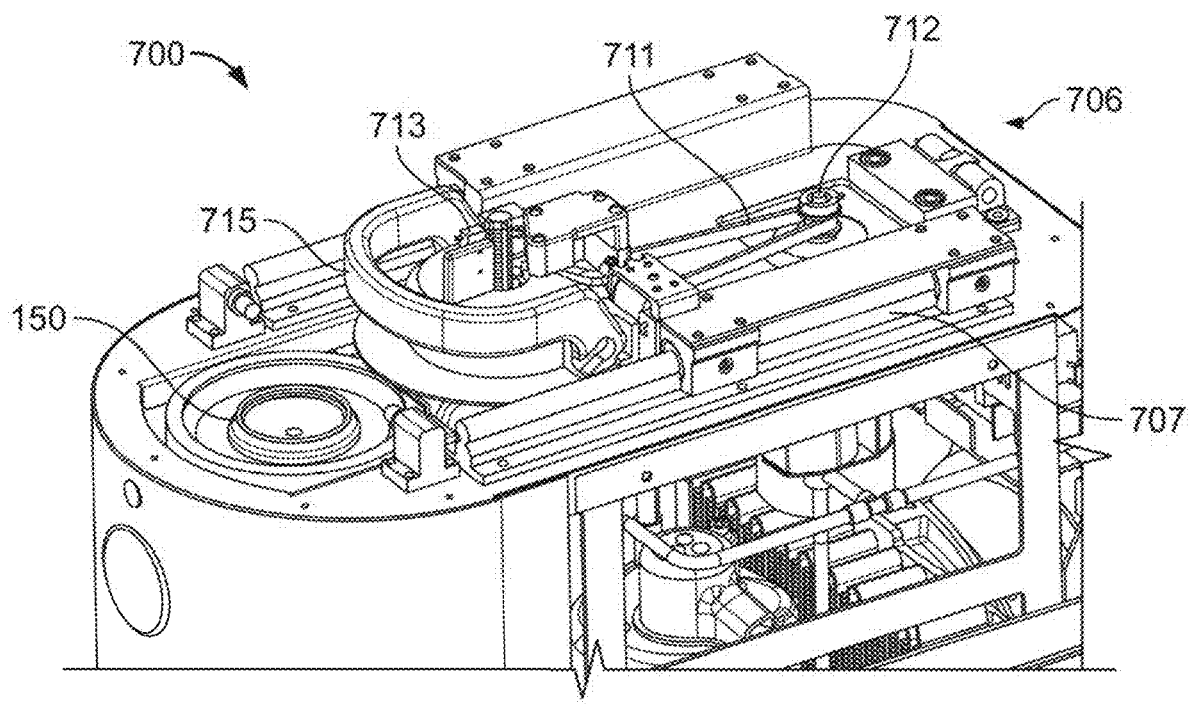
Figure 28A:
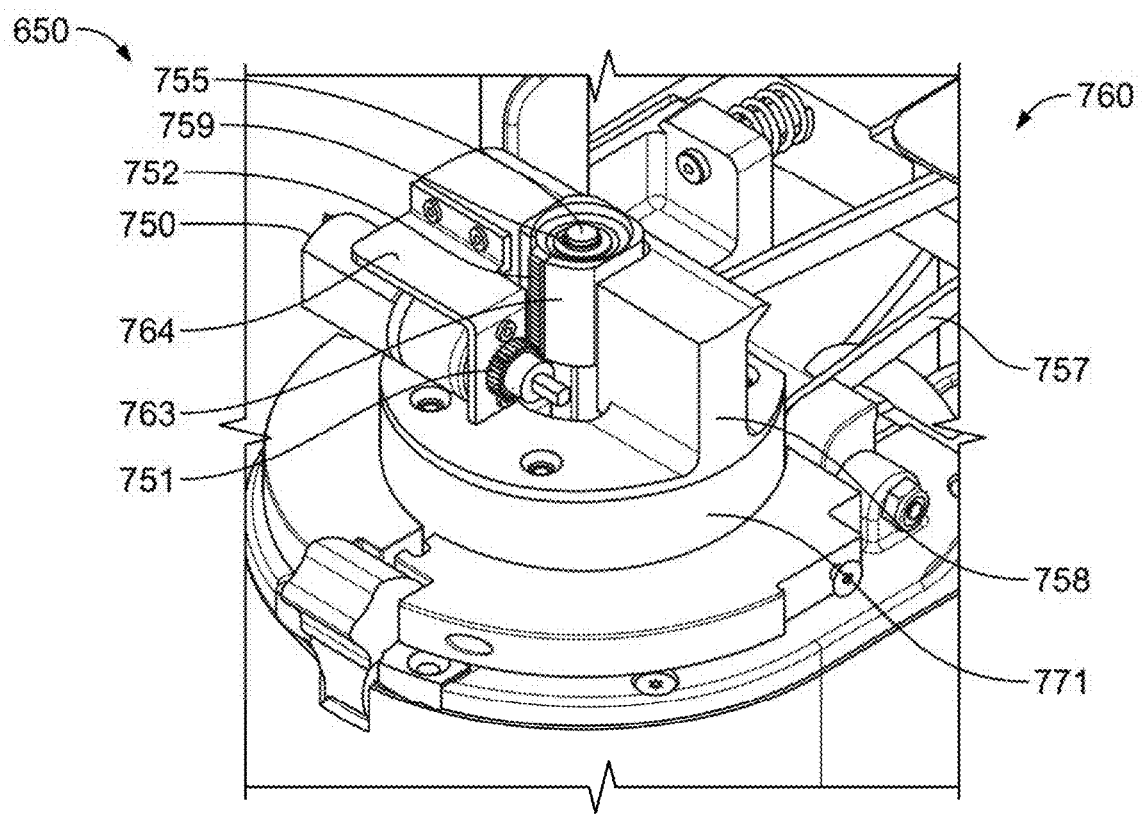
FIGS. 28A-28D are perspective and cross-sectional views of a machine with an automatic plunger in a retracted position (FIGS. 28A and 28B) and in an engaged position (FIGS. 28C and 28D).
Figure 28B:
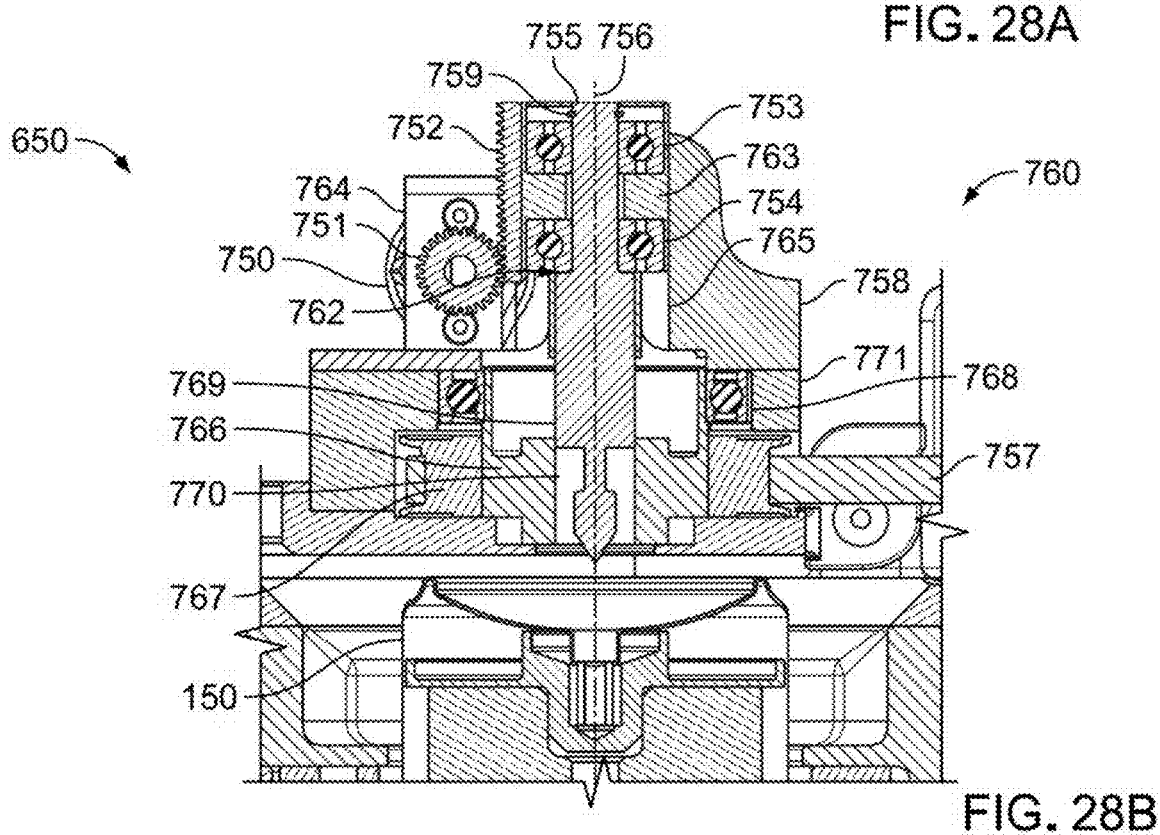
Figure 28C:
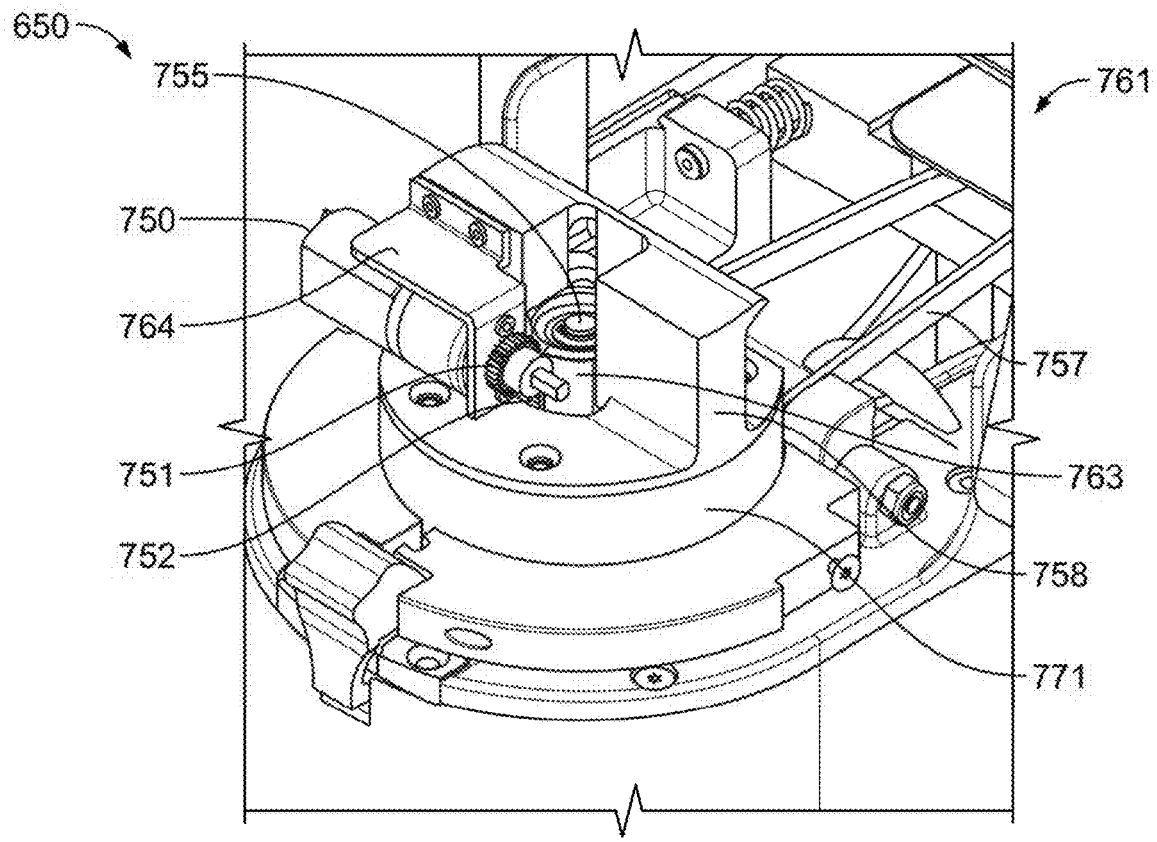
Figure 28D:
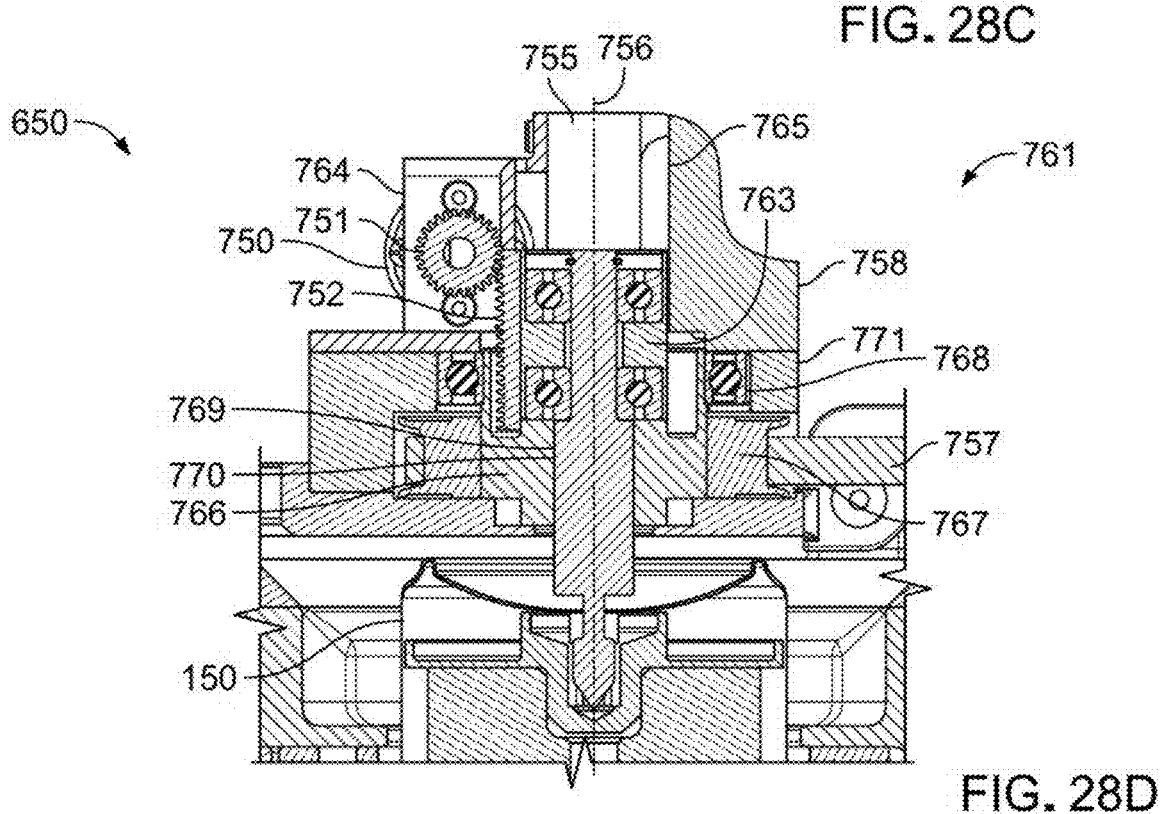

FIGS. 27A and 27B show a platform 714 of machine 700 which contains a motor to drive the paddle (the motor is not shown, but placed underneath plate 716 to drive the pulley 712 and belt 711) and a solenoid 713 to drive a driveshaft/plunger downward into the pod 150. (the driveshaft/plunger is not shown). The pulley 712 mounted to a driveshaft of the motor and the motor is mounted to the plate 716. Since the motor is mechanically connected to the sliding lid assembly 701, the motor also translates as the sliding lid assembly 701 translates from the closed configuration 705 to the open configuration 706. The motor is rotationally coupled to the paddle through the pulley 712 and the belt 711. The belt 711 is under tension both when the lid is in its open position and when the lid is in its closed position. However, other drive mechanisms can also be used such as gear systems. The belt 711 also translates with the sliding lid assembly 701 and a belt tensioning system can also be used (not shown). Once the sliding lid assembly 701 is in the closed configuration 705 and ready to use, the solenoid 713 is used to engage the driveshaft and cause the driveshaft to plunge (not shown) downward into the pod 150. The driveshaft/plunger/dagger pokes through the domed end of the pod 150 and engages the hexagonal cavity of a mixing paddle (such as mixing paddle 160) of the pod 150 (these details were previously discussed and are not shown in FIGS. 27A and 27B). The driveshaft is rotationally coupled to the belt 711 so the motor can rotationally drive the driveshaft once the driveshaft is mated to the paddle (not shown) in the pod 150.

FIGS. 28A-28D show a machine 650 that is substantially similar to the machines previously discussed (e.g., machine 600). However, in machine 650 a solenoid 713 is not used to activate and engage the driveshaft/plunger/dagger into the pod 150. Instead, a motor 750 is connected to the driveshaft 755 using a rack 752 and pinion 751 system to translate the driveshaft axially between a disengaged configuration 760 and an engaged configuration 761. The motor 750 is oriented perpendicular to the driveshaft 755. The driveshaft 755 is substantially similar to the previously described driveshafts except for the following differences. A set of bearings 753 and 754 allow the driveshaft 755 to rotate around a central axis 756. The driveshaft 755 is rotationally coupled to a mixing motor (not shown) using a belt 757. The belt 757 rotates a pulley 767 which is in an interference fit (typically a press-fit) with an intermediary member 766. A hexagonal bore 770 of the intermediary member 766 allows a keyed connection with a hexagonal section 769 of the driveshaft 755. This keyed connection mechanically couples rotation of the pulley 767 to the driveshaft 755 so that the driveshaft 755 is constrained from spinning with respect to the pulley 767. The intermediary member 766 is rotationally connected to a bearing 768 which allows it to freely rotate relative to the frame 758 and a frame 771.

The driveshaft 755 is axially secured using a shoulder 762 which mates against the bearing 754 and a snap ring 759 that mates against bearing 753. The bearings 753 and 754 are secured in a housing 763. The housing 763 axially translates between the disengaged configuration 760 and the engaged configuration 761 using the rack 752 and pinion 751 system which axially couples the motor 750 to the housing 763. The housing 763 axially translates within a bore 765 of the frame 758. The mixing motor (not shown) spins the driveshaft 755 via the belt 757 and the motor 750, which is typically smaller and less powerful, translates the driveshaft 755 axially via the rack 752 and pinion 751 system. The motor 750 is attached to the housing 763 via a motor mount 764.

In contrast to the previous machines, machine 650 does not require a user to manually operate a handle to punch the driveshaft (dagger) through a pod. In machine 650, this action is controlled by the motor 750 and is automatically controlled by the machine 650. This provides advantages where a user has difficulty manually operating a handle to apply the necessary piercing force. In some machines, an onboard controller monitors the axial position of the driveshaft 755 using an encoder on the motor 750 (not shown) and a limit switch (not shown). For instance, when the user inserts a pod (such as the pod 150) and hits the start button, the evaporator closes and the driveshaft 755 plunges into the pod 150, while potentially wiggling or rotating to ensure proper alignment with an auger head of the paddle, and mixing and freezing would commence.

Figure 29A:
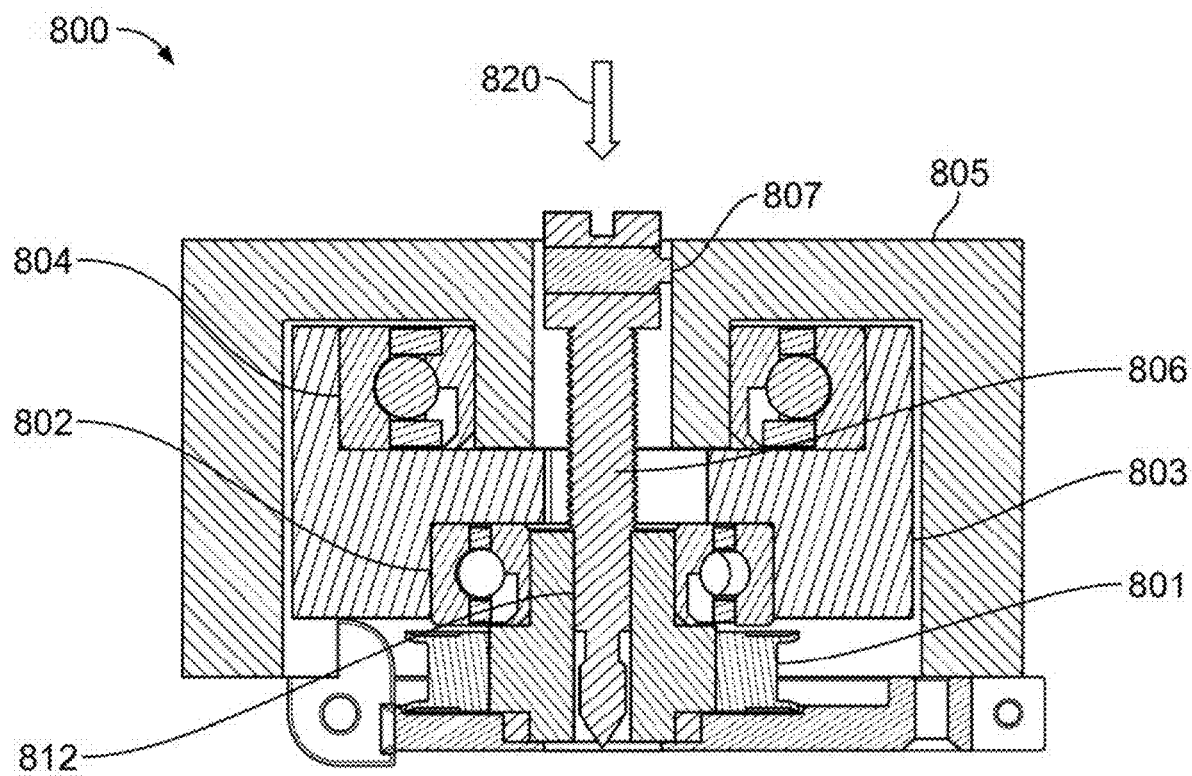
FIGS. 29A-29D are partial perspective and plan views of a machine with a self-driven plunger in a retracted position (FIGS. 29A and 29B) and in an engaged position (FIGS. 29C and 29D).

FIG. 29A shows a cross section of a side view of an alternate driveshaft (dagger/plunger) assembly 800. Driveshaft assembly 800 is designed so that a driveshaft 806 is lowered to pierce a pod with only the actuation of a mixing motor (not shown) through a pulley 801. Reversal of the rotation of the mixing motor, and hence the pulley 801 fully retracts the driveshaft 806.

The driveshaft assembly 800 uses the mixing motor (not shown) to drive a pulley 801. The pulley 801 spins and engages with a first sprag bearing 802. The first sprag bearing 802 is a one-way rotational bearing, or ratchet system, that allows (i) an inside diameter of the bearing to spin relative to an outside diameter of the bearing in a first rotational direction, and (ii) the inside diameter of the bearing to rotationally lock relative to the outside diameter of the bearing in an opposite rotational direction. The first sprag bearing 802 connects to an intermediary piece 803 so when the first sprag bearing 802 spins in a first rotational direction, the intermediary piece 803 rotationally locks to the pulley 801, and slips in the other direction. The intermediary piece 803 connects to a second sprag bearing 804. The second sprag bearing 804 is orientated opposite the first sprag bearing 802 so that the second sprag bearing 804 rotationally locks when the first sprag bearing 802 slips, and vice versa. The second sprag bearing 804 is connected to a housing 805. Therefore, when spinning the mixing motor in one direction (i.e., clockwise 821, also relative to an observer looking in the direction 820), the intermediary piece 803 spins with pulley 801; otherwise (i.e., counterclockwise, or opposite of the clockwise direction 821), the intermediary piece 803 is fixed to the housing 805.

Figure 29B:
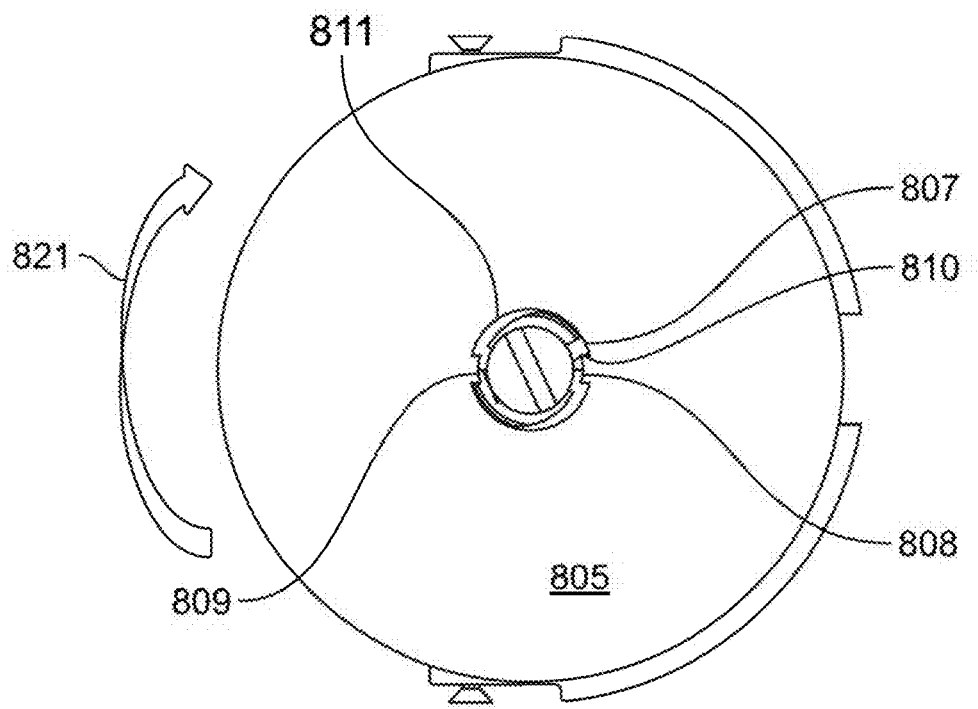
Figure 29C:
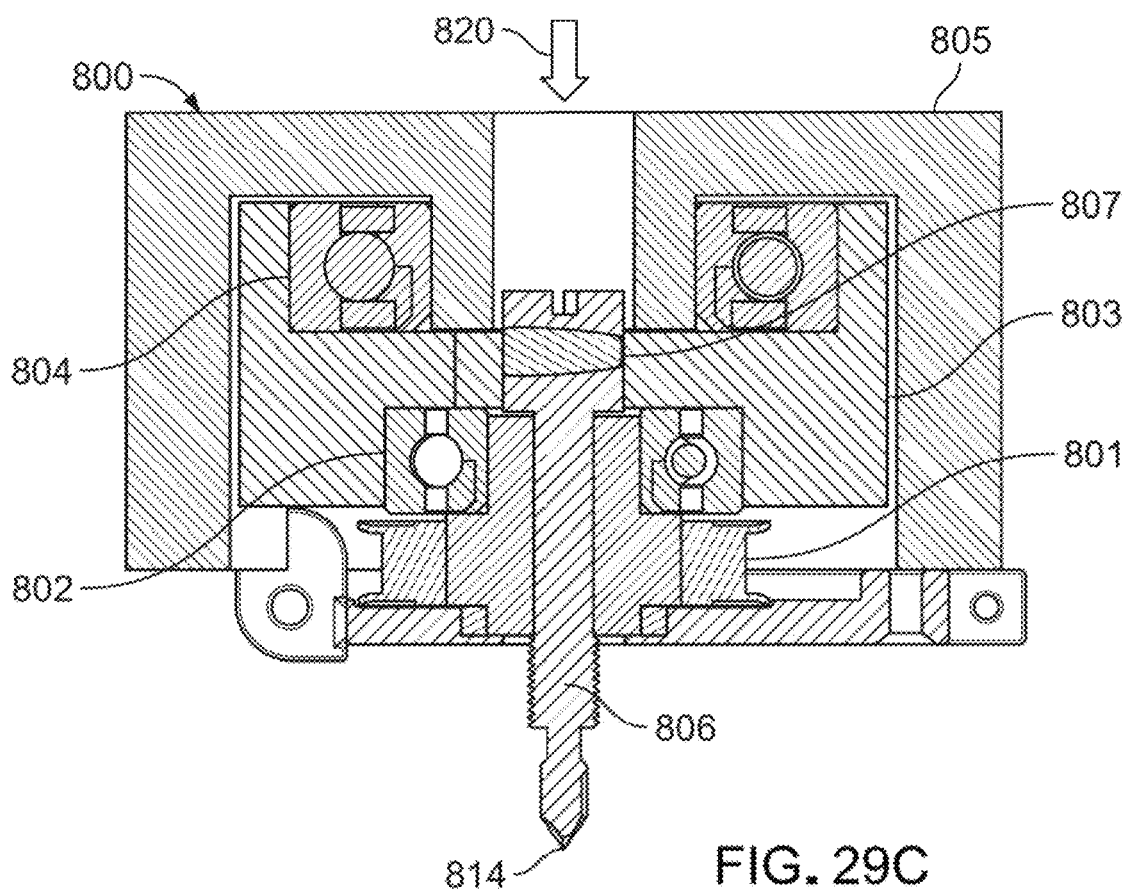
Figure 29D:
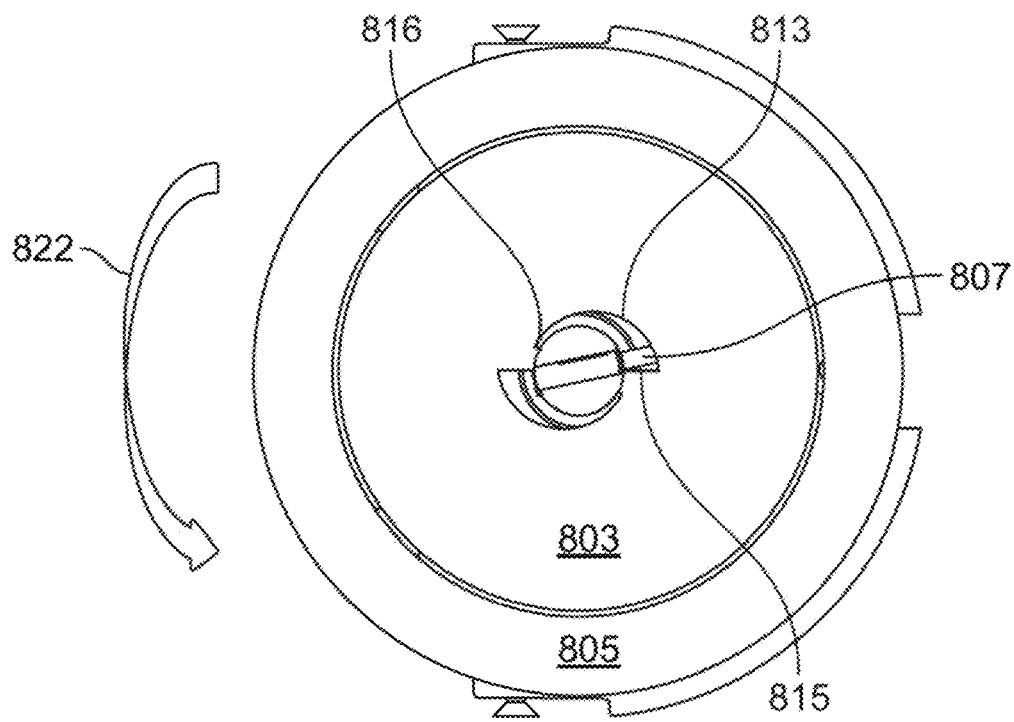

The driveshaft 806 is left-hand threaded almost the entire length. The threads engage, at threaded interface 812, with internal threads inside a bore of the pulley 801. A detent pin, spring detent pin, or spring detent 807 is located, typically via press-fit, on top of the driveshaft 806. When the mixing motor starts to spin clockwise 821, the pulley 801 spins, and the driveshaft 806 also starts to spin. The spring detent 807 of the driveshaft 806 spins in a groove 811 (best seen in FIG. 29B) of the housing 805 until the spring detent 807 engages, at interface 810, one of the protrusions 808 or 809 of the housing 805. Interface 810 prevents further rotation of the driveshaft 806. Further clockwise 821 rotation of the pulley 801 causes a translation of the driveshaft 806 and begins threading, at threaded interface 812, into the bore of the pulley 801. Threading continues until the spring detent 807 engages with the recess 813 of the intermediary piece 803 (best seen in FIG. 29D) and further engages with the shoulder 815. At this point, the spring detent 807, and thus the driveshaft 806, begins rotating clockwise 821 with the pulley since the first and second sprag bearings 802, 804 are configured so that the intermediary piece 803 spins with the pulley 801 during the actuation phase. The dagger 814 of the driveshaft 806 is now fully lowered to pierce a pod.

Upon reversal of the rotation of the mixing motor, i.e., in the counter-clockwise direction 822, the driveshaft 806 retracts automatically (i.e., no other motor or actuation method is necessary). During the retraction phase, the intermediary piece 803 is fixed relative to the pulley 801 by the first and second sprag bearings 802, 804. Once rotation is reversed, the spring detent 807 rotates counter-clockwise 822 away from the shoulder 815 of the recess 813 of the intermediary piece 803. The recess 813 retract the spring detent 807 at the small shoulder 816.

Figure 30:
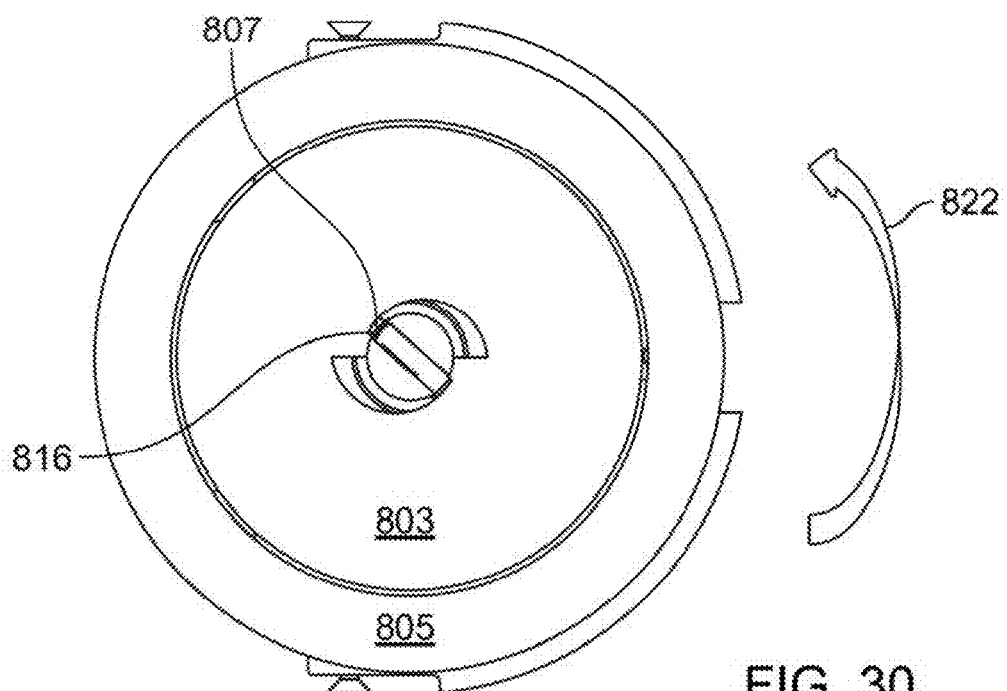
FIG. 30 is a partial cross-sectional view of a machine with a self-driven plunger as it moves from an engaged position to a retracted position.

FIG. 30 shows the spring detent 807 engaging the small shoulder 816. At this point, further counter-clockwise 822 rotation of the pulley 801 causes the driveshaft 806 to begin threading out of the bore of the pulley 801 and into the groove 811 of the housing 805. Further counter-clockwise rotation 822 continues to unscrew the driveshaft 806 from the pulley 801 causing a reset of the driveshaft assembly 800. The driveshaft assembly 800 is now reset (fully retracted) and can be used again.

While clockwise 821 rotation of the pulley 801 engages the driveshaft 806 and counter-clockwise 822 rotation disengages the pulley 801 in this machine, some machines have mirrored versions of the driveshaft assembly 800 where counter-clockwise rotation engages a driveshaft and clockwise rotation disengages the driveshaft.

Figure 31:
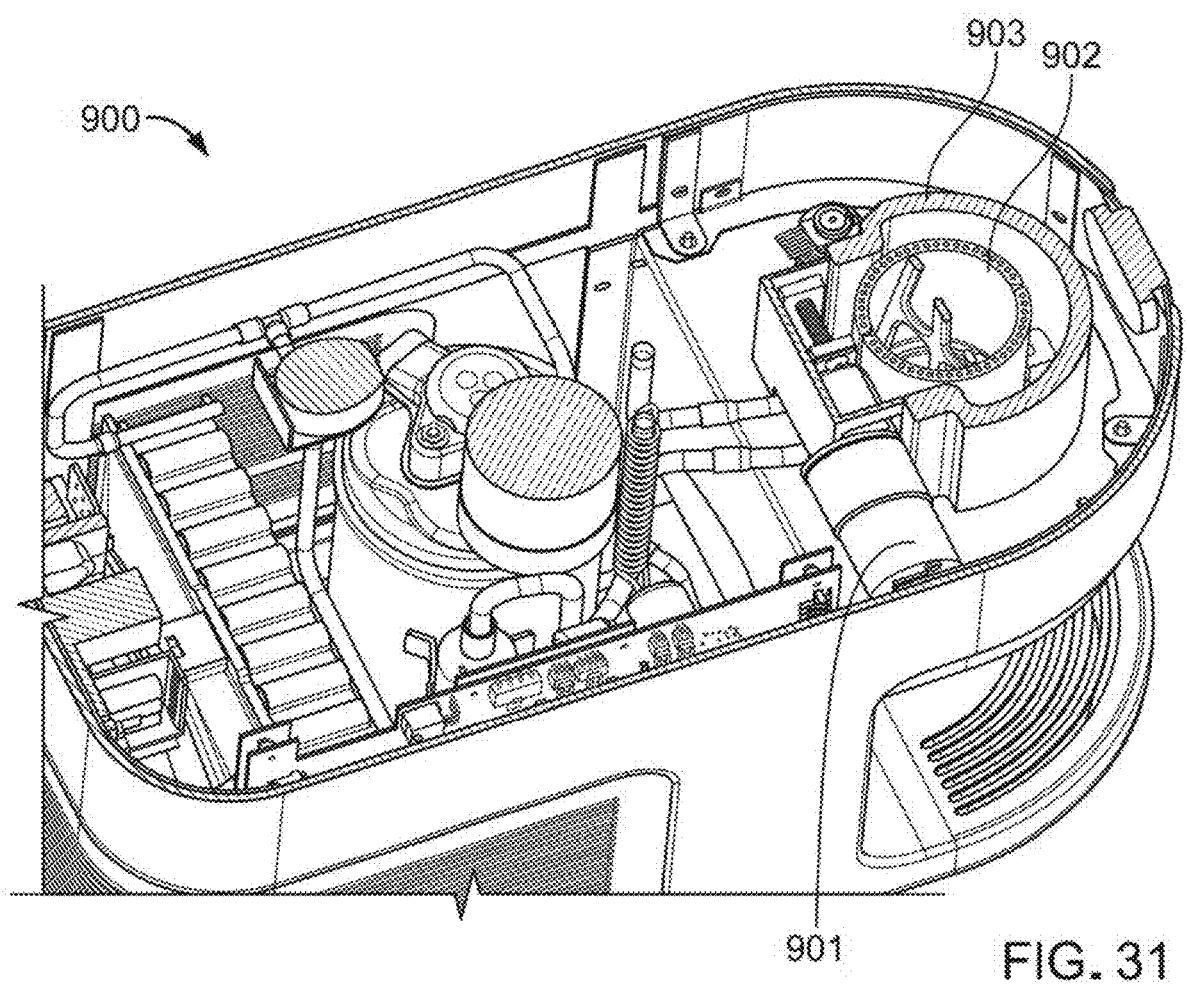
FIG. 31 is view of the internal components of a machine with an evaporator with an attached motor.

FIG. 31 is a cross section of a perspective view of a machine 900, which is substantially similar to the previous machines, except for the evaporator assembly. In machine 900, the evaporator 902 is mounted on a frame 903 and connected to a motor 901 that controls the opening and closing of the evaporator 902. The motor 901 is mounted directly to the frame 903 permitting an in-line connection between the motor 901 and the opening/closing action of the evaporator 902. The motor system can provide a compact system with reduced mechanical complexity.

Figure 32A:
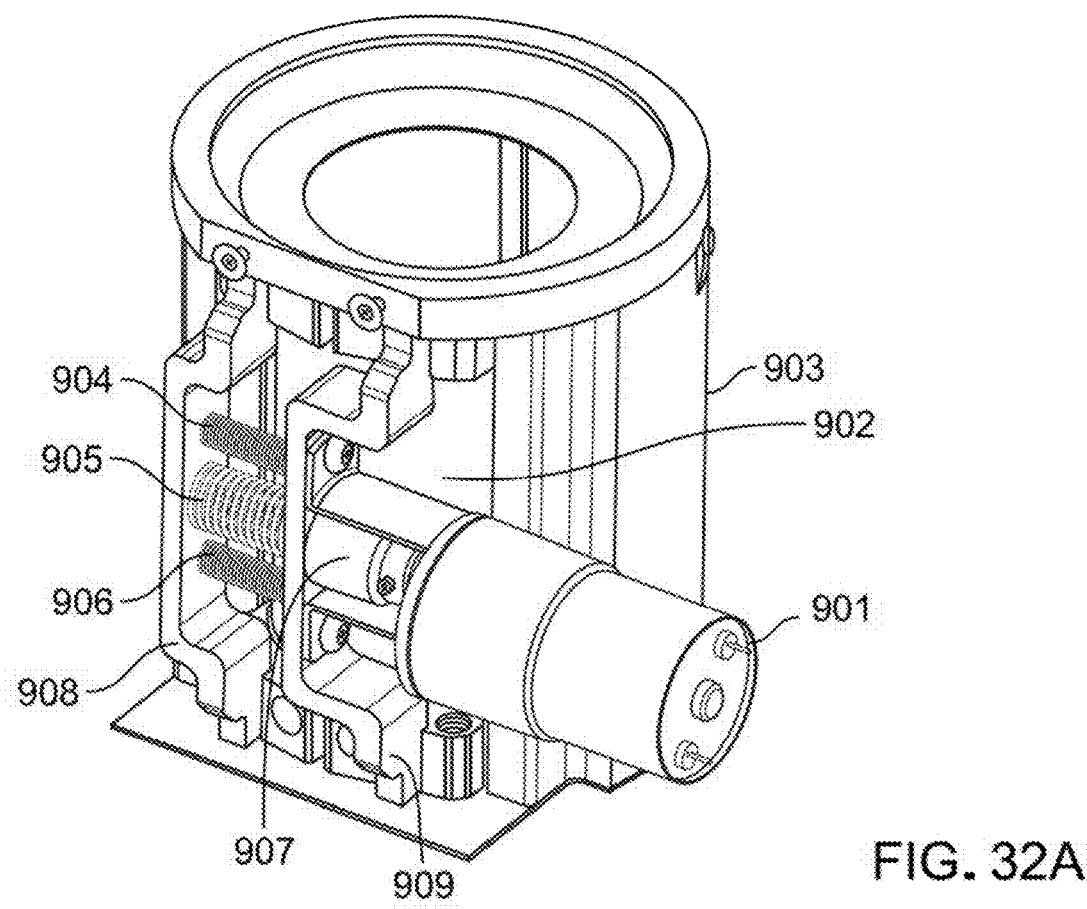
FIGS. 32A and 32B are perspective views an evaporator with an attached motor.
Figure 32B:
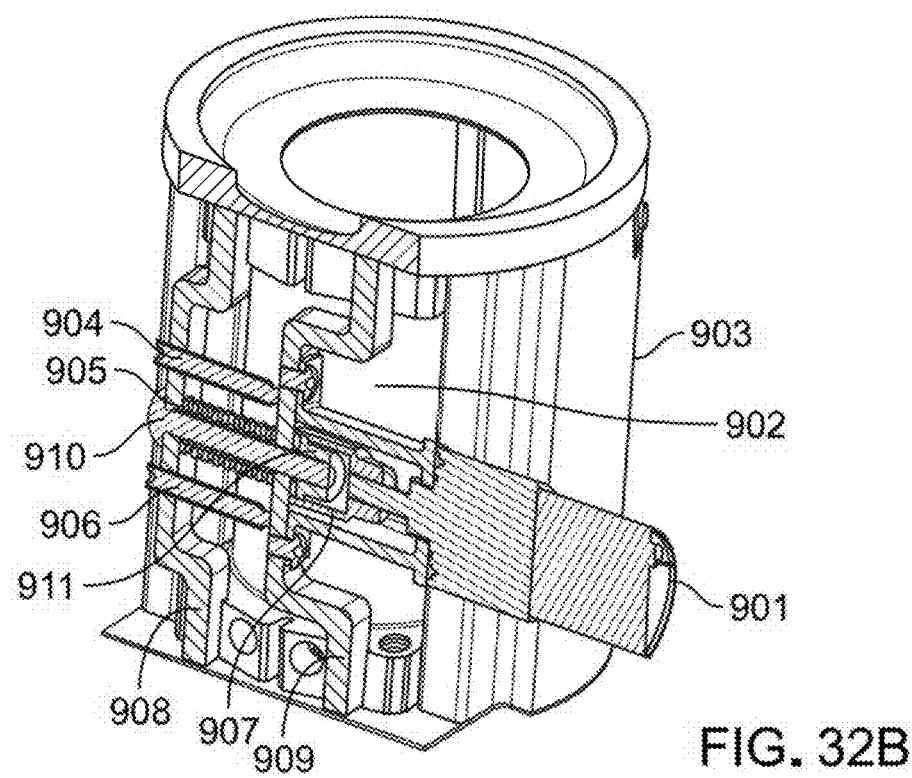

FIGS. 32A and 32B show a perspective view and a partially cutaway perspective view of the evaporator assembly shown in FIG. 31, respectively. The evaporator 902 is biased in the open position by a spring 905. When the motor 901 is energized, it drives a nut 911 onto a bolt 910 via a threaded connection. This threading action causes the space between a left bracket 908 and a right bracket 909 (left and right observed relative to FIGS. 32A and 32B) to decrease. The torque of the motor 901 is connected to the nut 911 using a coupler 907. The coupler 907 is sized to mate with the nut 911 via a hexagonal bore. The torque of the motor 901 compresses the spring 905 and squeezes the evaporator 902 closed. The bolts 904 and 906 provide hard limits to the closing action so that a pod present in the evaporator is not crushed (a pod is not shown in the evaporator 902). The ends of each respective bolt 904 and 906 engage the right bracket 909 when the final closed position is reached providing this hard limit. Upon reversal of the motor, the spring 905 expands aiding in the opening of the evaporator 902 to release the pod.

Figure 33A:
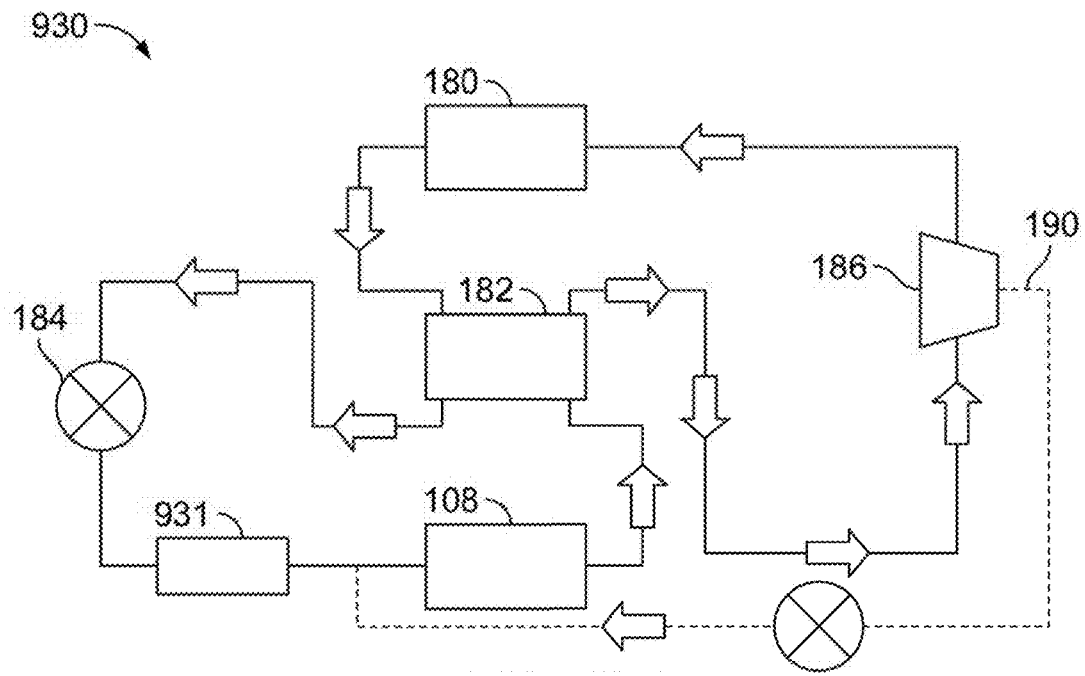
FIGS. 33A-33B are schematics of a refrigeration system.

FIG. 33A is a schematic of a refrigeration system 930, which is substantially similar to refrigeration system 109. The refrigeration system includes a condenser 180, a suction line heat exchanger 182, an expansion device 184, and a compressor 186. High-pressure, liquid refrigerant flows from the condenser 180 through the suction line heat exchanger 182 and the expansion device 184 to the evaporator 108. The expansion device 184 restricts the flow of the liquid refrigerant fluid and lowers the pressure of the liquid refrigerant as it leaves the expansion device 184. The low-pressure liquid then moves to the evaporator 108 where heat is absorbed from a pod (such as pod 150) and its contents in the evaporator 108 changes the refrigerant from a liquid to a gas. The gas-phase refrigerant flows from the evaporator 108 to the compressor 186 through the suction line heat exchanger 182. In the suction line heat exchanger 182, the cold vapor leaving the evaporator 108 pre-cools the liquid leaving the condenser 180. The refrigerant enters the compressor 186 as a low-pressure gas and leaves the compressor 186 as a high-pressure gas. The gas then flows to the condenser 180 where heat exchange cools and condenses the refrigerant to a liquid.

The second bypass line 190 enables the application of warm gas to the evaporator 108 to defrost the evaporator 108. The first bypass line 188 directly connecting the discharge of the compressor 186 to the inlet of the compressor 186 can also be used but is not shown. The first and second bypass lines 188, 190 may be enabled and disabled using valves (such as solenoid valves or throttle valves—not shown).

Consumers expect a quality, frozen confection on the first cycle without waiting several minutes for the machine to warm-up. Refrigeration systems with capillary tube heat exchangers 182 (e.g., refrigeration system 109) are not actively controlled and can take longer than actively-controlled systems (e.g., systems using thermal expansion devices or valves) to reach steady state. When the machine is initially turned on, the warm-up process enters "hot gas bypass mode," which cycles a solenoid to control the evaporator 108 temperature to below ambient conditions.

A risk in starting the machine in standard cooling mode versus hot gas bypass mode is that without a pod or heat load in the evaporator, the refrigerant would not be fully vaporized before returning to the compressor 186, risking compressor damage by attempting to compress an incompressible liquid. Another limitation of the hot gas bypass approach is that while the system is somewhat "warmed-up" after several minutes, it is not at the actual temperatures it would experience under cooling conditions. In addition, during bypass mode the capillary tube orifice 182 is receiving a constantly varying flow rate, which is different from the flow during cooling mode.

When a pod (e.g., pod 150) is inserted into the evaporator 108, and the cooling process is started, the temperatures and refrigerant flow rates will need time to adjust from the hot gas bypass mode conditions to the cooling conditions. This delay will increase the time to cool the product versus if the pod was placed in an evaporator in cooling mode. However starting a refrigeration process in cooling mode without a heat load risks damaging the compressor.

Refrigeration system 930 goes directly into a cooling mode as a solution to the delay where the temperatures and refrigerant flow rates need time to adjust from the hot gas bypass mode conditions to the cooling conditions. An electrical heater 931 located either before or after the evaporator 108 provides a heat load on start-up to simulate cooling ice cream. The heater vaporizes refrigerant, similar to how liquid ice cream mix in the pod would affect the refrigerant system 930, allowing the refrigerant system 930 to achieve steady state cooling conditions for refrigerant temperature, pressure and flow rates without the need for an ice cream pod placed in the machine. From an ambient (room temperature) start, the machine will reach steady state faster than refrigeration system 109 and does not risk damaging the compressor. While not illustrated in FIG. 33A, a first bypass line 188 or valve (as seen in FIG. 6) can also be used in the refrigeration system 930.

Figure 33B:
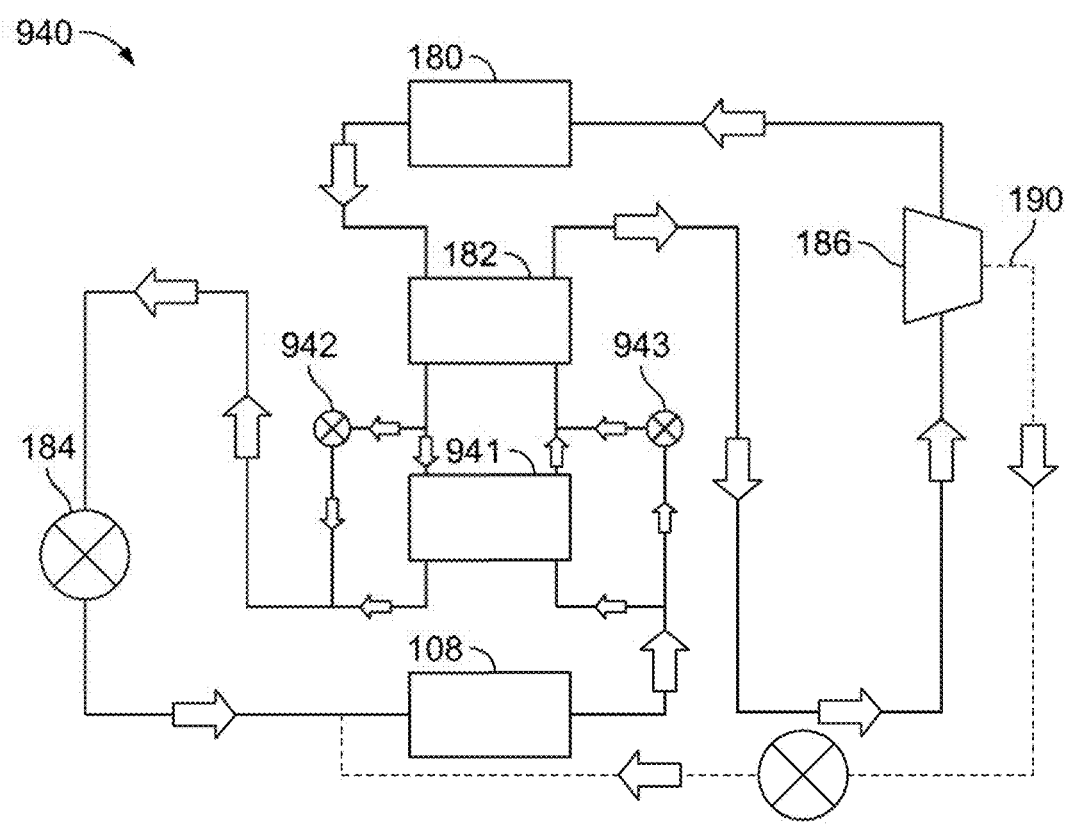

FIG. 33B shows a refrigeration system 940 using a thermal battery 941. The thermal battery 941 provides a thermal "capacitance" or "reservoir" to remove some cooling load from the vapor compression system, thereby reducing the freezing time. When the machine is starting from room temperature, valves 942 and 943 (e.g., solenoid valves or throttle valves) are open and the thermal battery 941 does not receive refrigerant. Towards the end or at the end of the first cooling cycle, valve 943 closes and cold refrigerant flows to the thermal battery 941. When the cold refrigerant flows to the thermal battery 941, paraffin inside the thermal battery 941 is solidified. Pre-cooling the thermal battery at the end of one cycle will allow the thermal battery 941 to be used to reduce the cooling load on the compressor 186 during the next cooling cycle. The energy required to solidify a material is large compared to the energy required to lower its temperature.

Wax is used in the thermal battery 941. Many waxes solidify at a convenient temperature for use in the thermal battery 941. Some waxes (e.g., alkanes) have a melting point in a range of 5° C.-10° C. For example, Dodecane wax or Tridecane wax have melting points in this range. These waxes are used in the thermal battery 941 because they solidify at a temperature that is between the hot side and cold side temperatures of the refrigeration system 940 and can store thermal "capacitance" and transfer or use that capacitance on subsequent cooling cycles. Energy is removed from the wax during a time when the machine is not in a cooling mode, or at least when the user is not expecting the machine to be cooling. Cooling the thermal battery 941 has the additional benefit of heating up refrigerant which protects the compressor 186 from liquid refrigerant which could result in damage to the compressor 186. During the second cooling cycle, valve 942 is closed sending hot liquid refrigerant to the thermal battery 941, which pre-cools the thermal battery 941 before the refrigerant reaches the expansion device 184. During this same cycle valve 943 is open allowing cold refrigerant to bypass the battery. At the end of the second cycle valve 943 closes and valve 942 opens, cooling the thermal battery 941 for the next cycle. This process repeats allowing the cooling from the end of one cycle to be used or "stored" for use on the next cycle, which can reduce the required freezing time.

FIGS. 34A-34D shows a mixing paddle which is substantially similar to the mixing paddle 160, except it is partly over-molded with a polymer to squeegee frozen ice cream from the inside of the pod (e.g., pod 150). In FIG. 34A, an aluminum paddle 951 is formed (typically stamped and bent/twisted, but can be formed in other ways such as cast, forged, or machined). Ribs 960 on the top region 952 of the aluminum paddle 951 give extra stiffness to the thin areas of the aluminum paddle 951. This extra stiffness is important since the thin areas of the aluminum paddle 951 are subject to large torques from the drive head during the mixing process and reduces deformation of the aluminum paddle 951 under this applied torque. Edge molds 958 and 959 are molded (i.e., poured and cast) in place over each edge 954 and 955, respectively. This process is often referred to as "over-molding," and can create a part with multiple materials.

Figure 34C:
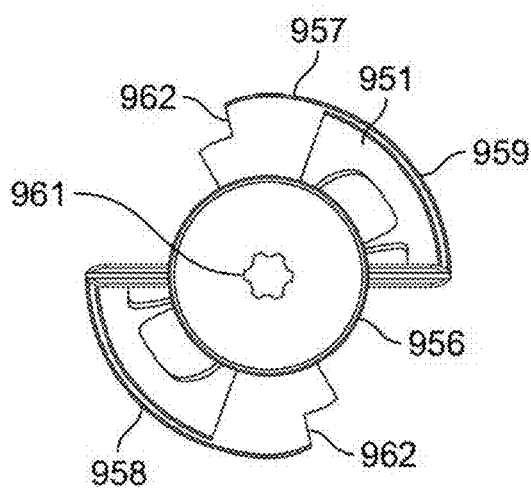
Figure 34D:
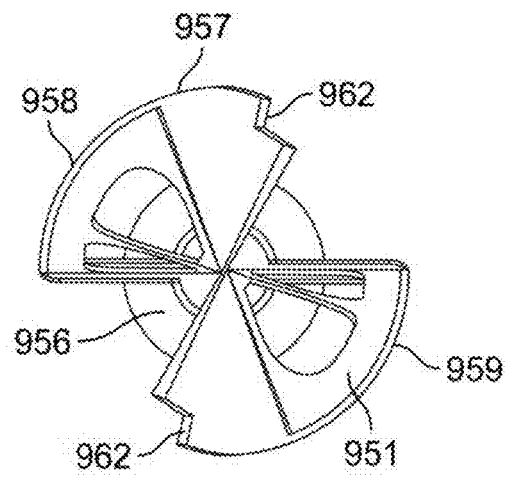

Other molding techniques can be used, such as molding the edge molds 958 and 959 separately and then inserting or mating the aluminum paddle 951 with the edge molds 958 and 959. These over-moldings 956-959 can help squeegee a frozen ice cream buildup from an inner diameter of a pod wall (e.g., pod wall 214) and the bottom of the pod (e.g., first end 210). A top cap 956 of silicone can be molded in place over a top region 952 of the aluminum paddle 951 and a bottom cap 957 of silicone can be molded in place over a bottom region 953 of the aluminum paddle 951. The mixing paddle 950 is formed once the over-molds are complete. The top cap 956 can be over-molded to include the drive head 961 of the mixing paddle 950 as well. FIGS. 34C and 34D are top and bottom views of mixing paddle 950, respectively.

In some cases, dip coating of plastic is used to coat the aluminum paddle 951 to prevent the metal mixing paddle 951 from rotating on the metal lid (e.g., first end 210) and pod walls (e.g., pod wall 214). In some cases, a polyolefin coating is used. Typical properties of the polyolefin coating are represented in the following table:

| Properties | Test Methods | Value |
|---|---|---|
| Color | N/A | As required |
| Abrasion (H18, 500 g load, 1000 cycles) | ASTM D 4060/84 | 69 mg weight loss |
| Hardness | Shore A | 98 |
| Hardness | Shore D | 58 |
| Tensile Strength | ISO 527 (4 in/mm) | 2320 lbs/in$^2$ |
| Elongation at Break | ISO 527 | 160% |
| Dielectric Strength | ASTM D-149 | >700 volts/mil |
| Salt Stray (500 hours) | ASTM B-117 | <15 mm from scribe |
| Stress Cracking | ASTM D 1693 | >1000 Hours |
| Vicat Softening Point | ISO 306 | 266 degrees F |
| Melting Point | N/A | 311 degrees F |

FIGS. 35A-35D also show a pair of notches 962. Notches 962 are sized such that they fit over a lip 971 on the inside of a second end of a pod (such as the first end 210 of the 150). Although shown on mixing paddle 951, other mixing paddles (e.g., the mixing paddle 950 or the mixing paddle 160) can also include such notches. Once installed, contact 972 allows the mixing paddle 951 to rotate along the lip or track 971 inside the pod 150 to help guide the mixing paddle 951 and provide structural support to the mixing paddle 951.

Figure 36A:
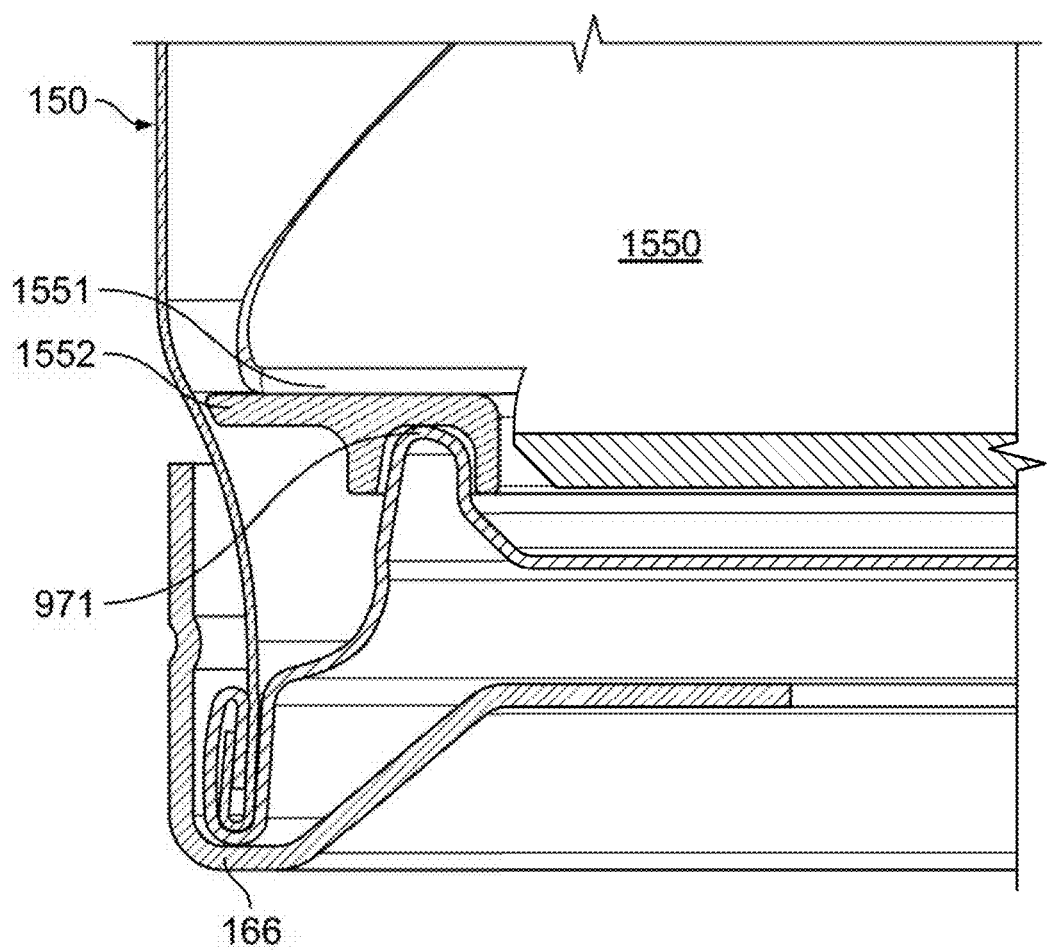
FIGS. 36A-36B illustrate a polymer liner of a pod.
Figure 36B:
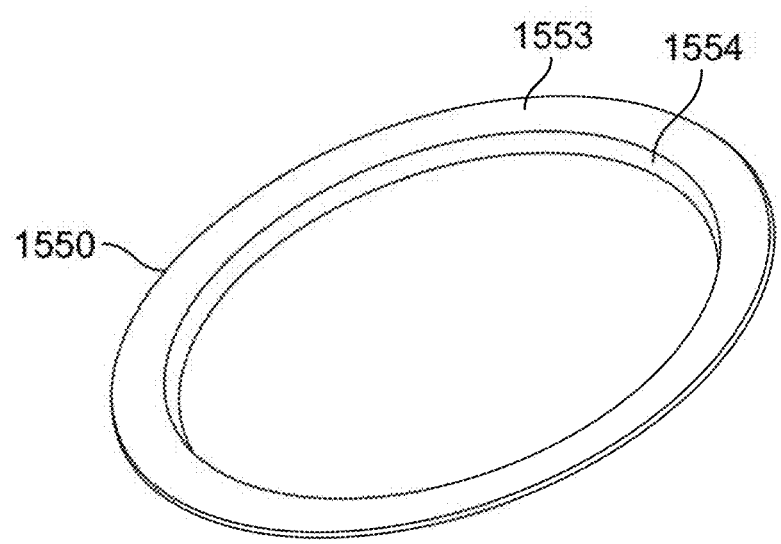

FIGS. 36A and 36B shows a mixing paddle 1550 which is substantially similar to the mixing paddle 951, except notches 1551 of the mixing paddle 1550 avoid direct contact with the lip 971 of the pod 150. The pod 150 includes the cap 166. The notches 1551 are sized to allow a polymer liner 1552 or bushing to be used between the lip 971 of the pod 150 and the notches 1551 of the mixing paddle 1550. The polymer liner 1552 is used to lower the friction between the notches 1551 and the lip 971.

The polymer liner 1552 is shaped as a ring and functions as a bushing to reduce friction between the rotating mixing paddle 951 and the metal lip 971 of the pod 150. By reducing friction, galling and wear of the materials of the mixing paddle 971 and the lip 971 is reduced. The polymer liner 1552 also reduces heat in the pod when the rotating mixing paddle spins when making frozen confections in the machine. The polymer liner 1552 include a receptacle that engages with the lip 971. The polymer liner 1552 is radially constrained to the lip 971. The polymer liner 1550 includes a flat upper surface 1553 that contacts a lower surface of the notches 1551 of the mixing paddle 1550. The polymer liner 1550 includes a radial inner surface 1554 that contacts a radial outer surface of the notches 1551 of the mixing paddle 1550.

FIG. 37A shows a cross-section of a perspective view of a first end 981 of a pod—substantially similar to the first end 210 of the pod 150 but which includes an over-molded connection for receiving the driveshaft. A silicone sealing grommet 980 is over-molded between the first end 981 and a plastic plug or paddle driver 982. The over-molding causes a covalent bond creating a hermetic seal between the grommet 980 and the paddle driver 982. A head 983 sticks out of the first end 981 for engagement with the driveshaft of a mixing motor (not shown). The head is keyed to provide a rotationally locked connection with the driveshaft. By providing a sealed connection, this approach avoids the need for the driveshaft to pierce the pod, therefore using the gas stored within the pod (typically Nitrogen) to assist in developing overrun or loft. In some cases, when the driveshaft rotates the paddle driver 982, the covalent bond between the mixing paddle 950 and the grommet 980 breaks allowing the shaft to rotate and air to flow into the pod for producing overrun. In another approach, a grommet 985 can be glued against a plastic plug or paddle driver 986. FIG. 37B illustrates the grommet 985 sliding 988 over a shaft 987 and glued into place on the paddle drive 986. Various other examples of grommets or sealing pieces can be used such as grommets 991 or lip seals 992 (or rotary seals) as shown in FIGS. 37C and 37D, respectively.

FIGS. 38A-38D are perspective views of a mixing paddle 1350 of a pod 150 with integral dog ears 1354 and a mating drive head 1352 that forms a mating drive assembly 1355. Assembly 1355 rotationally couples the dagger/driveshaft of the ice cream machine to the mixing paddle 1350 and helps avoid undesirable deformation, buckling, or bending when the torque of the machine is large. In assembly 1355, the mixing paddle 1350 is stamped or formed using sheet metal and one or more dog ears 1354 are formed by bending the sheet metal onto an end of the mixing paddle 1350. The mixing paddle 135 can be made of aluminum, approximately 0.032 inches thick, and then subsequently bent in a sheet metal press/dye/machine to form dog ears 1354 on the mixing paddle 1350. The dog ears 1354 can give the mixing paddle 1350 increased stiffness and torsional rigidity compared to mechanical stiffeners such as ribs. Some mixing paddles include dog ears 1354 in addition to ribs.

Figures 38A, 38B:
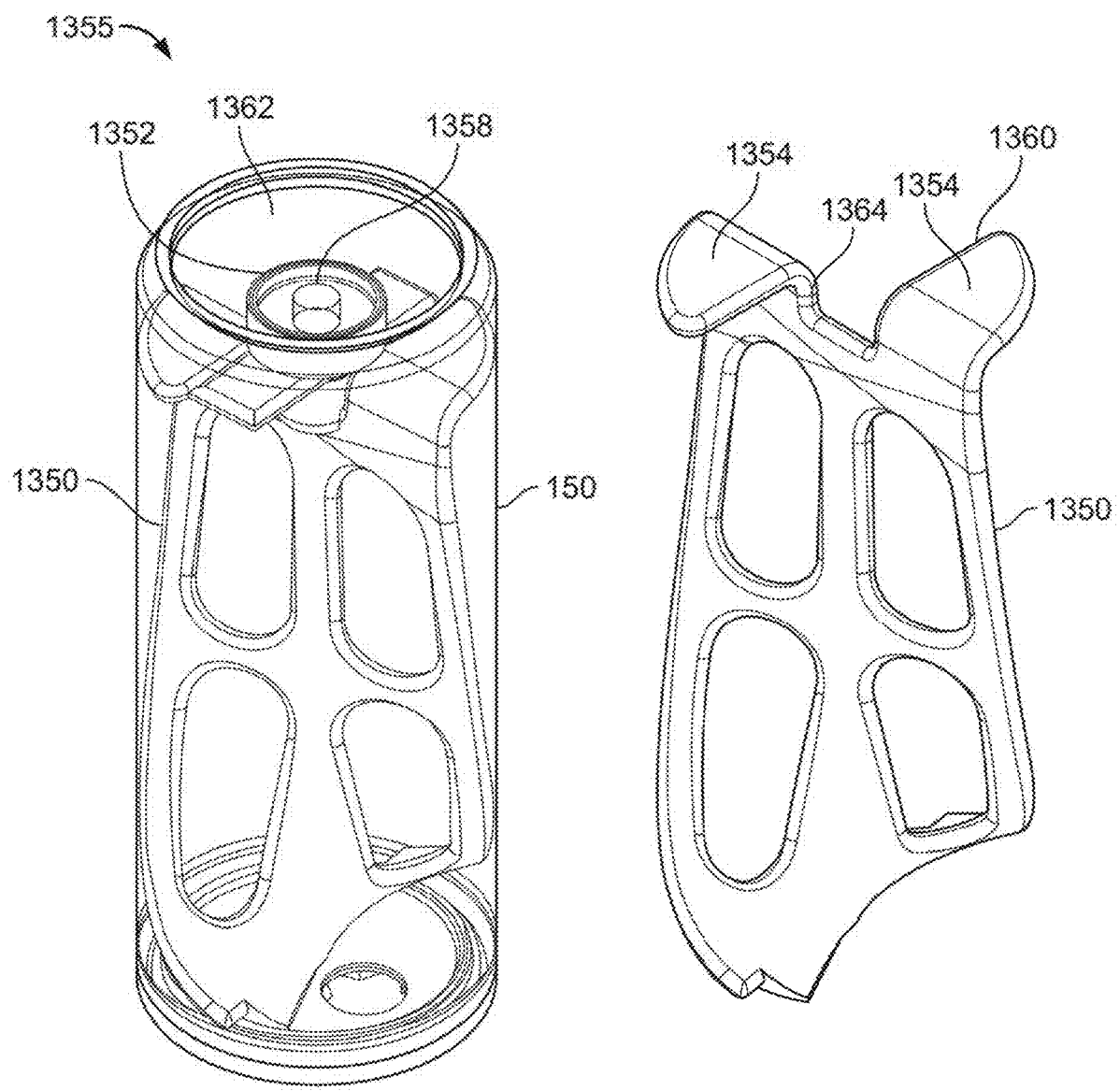
FIGS. 38A-38D are perspective views of a mixing paddle with dog-ears disposed inside a pod (FIG. 38A), alone (FIG. 38B), and with a connector attached (FIGS. 38C and 38D).
Figures 38C, 38D:
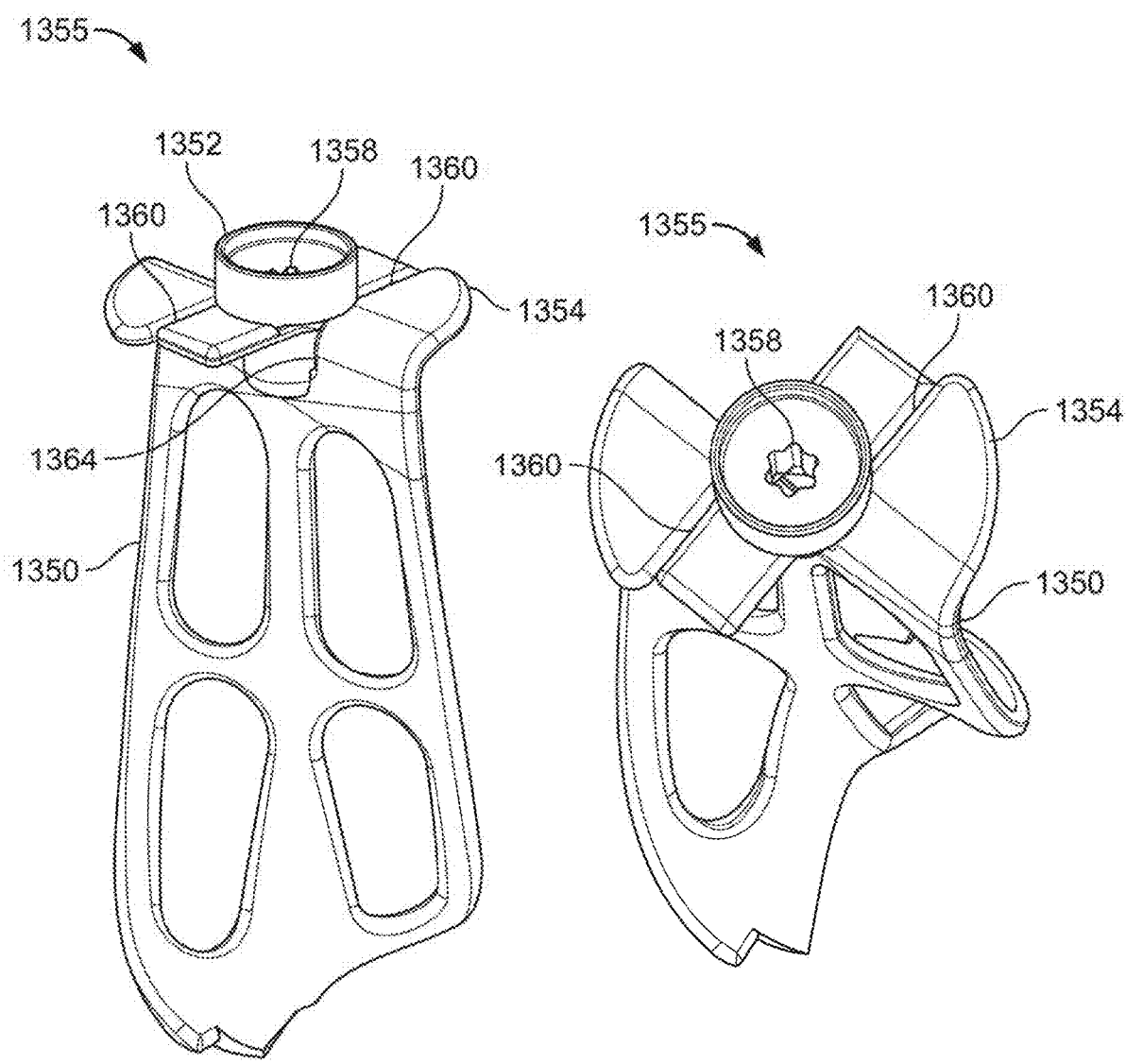

To transfer the torque, inner surfaces 1360 of the dog ears 1354 mate with corresponding surfaces of a mating drive head 1352 that can be seen in the translucent perspective view of FIG. 38A, and seen in further detail in FIGS. 38C and 38D.

The mating drive head 1352 receives the dagger/driveshaft (not shown in FIGS. 38A-38D) from the ice cream machine and rotationally couple the dagger/driveshaft to the mixing paddle. Mating drive head 1352 is typically constructed out of aluminum, metal, or a hard plastic.

As previously described, pod 150 is originally hermetically sealed. As the dagger/driveshaft lowered into the domed region 1362 of the pod 150, it pierces the pod 150 and is received by the receptacle 1358 of the mating drive head 1352.

Referring to FIG. 38C, mating drive head 1352 can be slidably connected with the mixing paddle 1350 by a friction fit. By manufacturing a diameter or width of the mating drive head 1352 to have a slightly larger spacing between the inner surfaces 1360, 1364 of the dog ears 1354, a slight interference, or friction fit can be achieved when assembling the mating drive head 1352 to the mixing paddle 1350. Detents or other latches can be incorporated into either the mixing paddle 1350 or the mating drive head 1352 in order to retain the mixing paddle 1350 to the mating drive head 1352 and ensure proper rotational coupling. The mating drive head 1352 can be snapped into place. The mating drive head 1352 can also be releasable connected to the mixing paddle 1350.

The dog ears 1354 of the mixing paddle 1350 can be designed to permit only one-way rotational coupling. For example, in FIGS. 38A-38D, a clockwise rotation of the driveshaft would be rotationally coupled to the mixing paddle 1350, but counter-clockwise rotation could be released by the anti-symmetric design of the dog ears 1354.

In operation, the domed region 1362 of the pod 150 is pierced, the dagger/driveshaft engages with the receptacle 1358 of the mating drive head 1352, and the driveshaft can quickly spin to mix the ice cream, produce overrun, and dispense the ice cream.

Pods 150 are typically filled then retorted or can be aseptically filled. In either case they are backfilled with Nitrogen so air does not get into the pod 150 prematurely. This is typically referred to as 'headspace.' However, during the ice cream mixing process, it is desirable to introduce air into the mixing process to produce overrun. In some machines, the pods do not need to introduce air and can rely on the nitrogen in the pod. In these cases the pod can remain sealed during at least part of the mixing process. In some cases, air can be introduced during the mixing process.

Figure 39A:
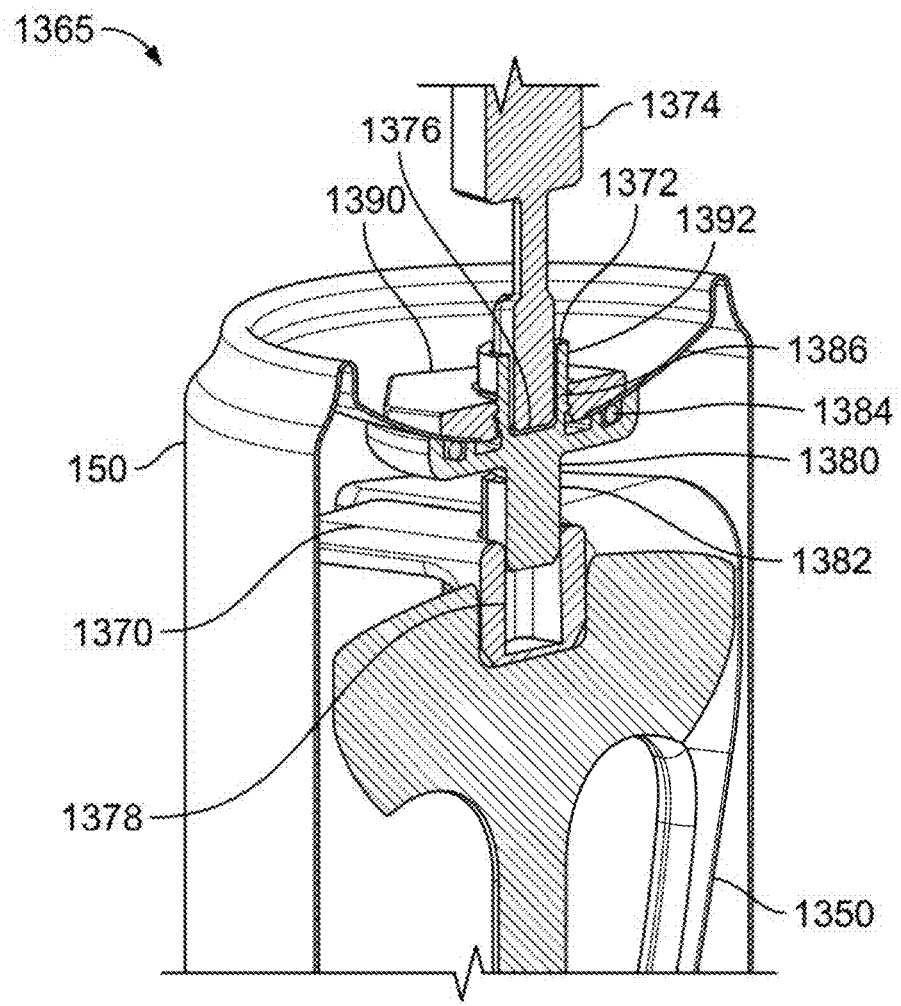
FIG. 39A is a perspective view of mixing paddle using a sealed connection to a pod.
Figure 39B:
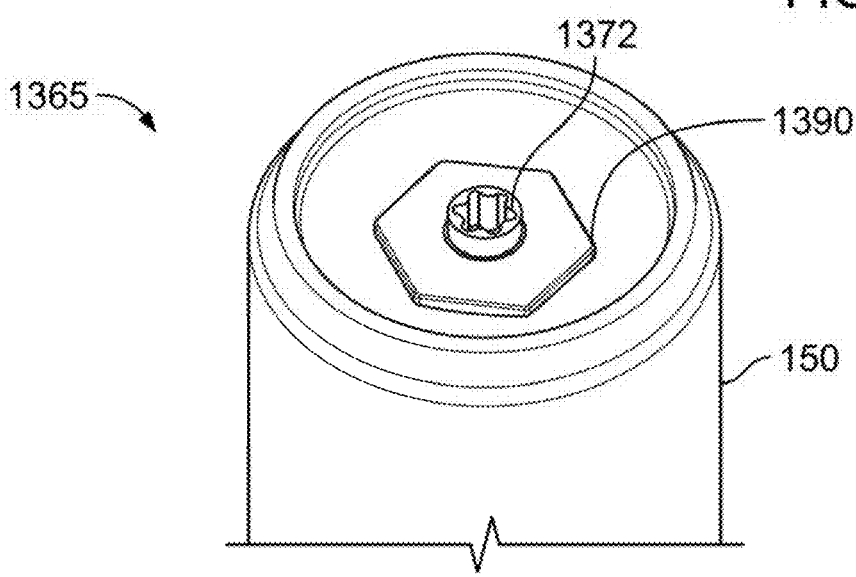
FIG. 39B is a perspective view of the exterior of the pod shown in FIG. 39A.
Figure 42A:
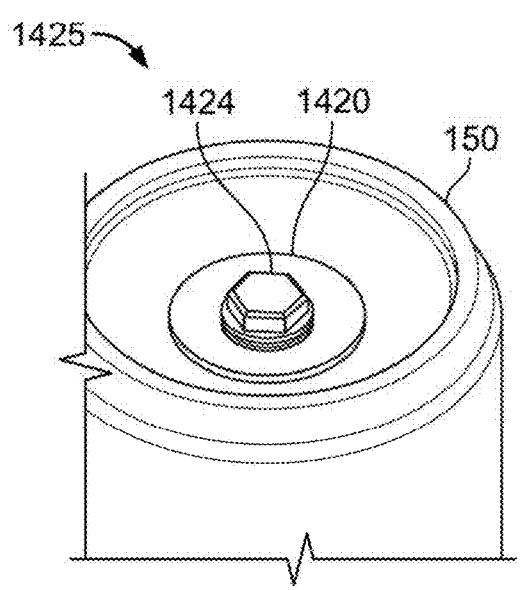
FIGS. 42A-42D are perspective and plan views of a mixing paddle using an alternate sealed connection to a pod.
Figure 42B:
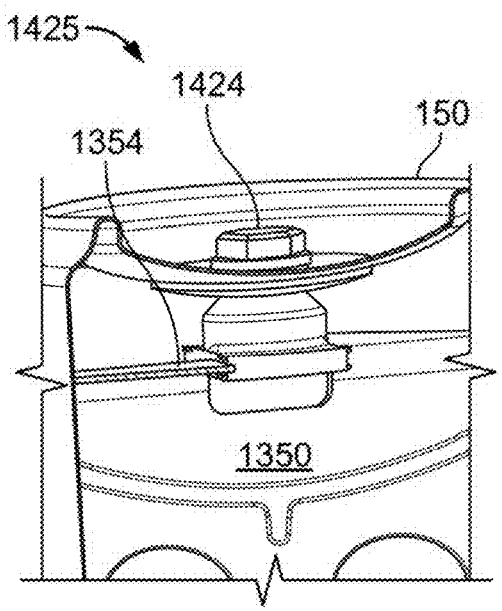
Figure 42C:
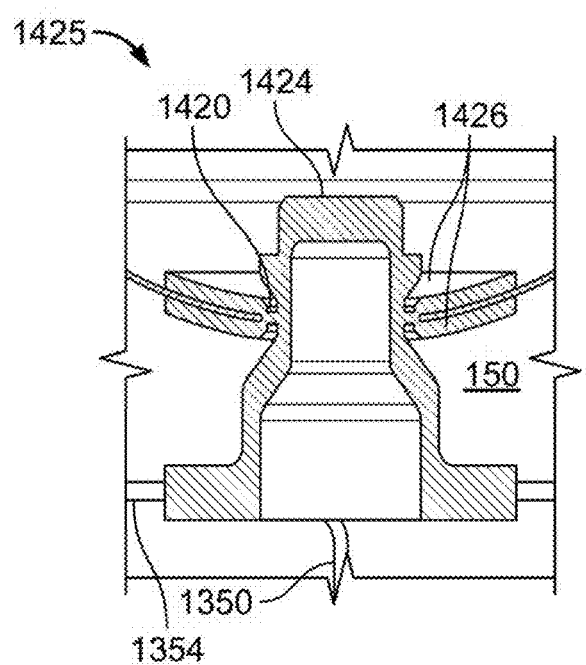
Figure 42D:
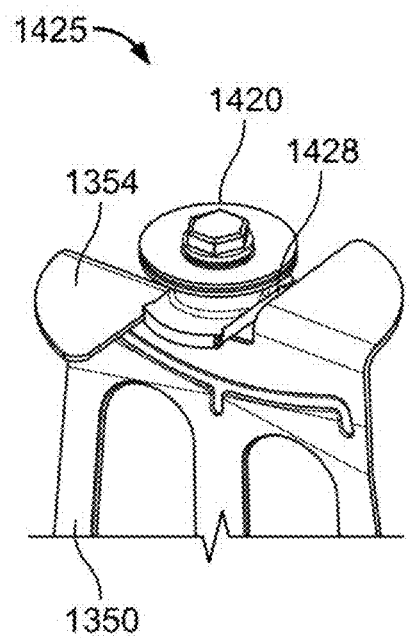

FIGS. 39A-39B are perspective views of the mixing paddle 1350 of a pod 150 that engages with a mating drive head 1370 to form a mating drive assembly 1365. The functionality of the mating drive head 1370 is similar to the mating drive head 1352 by rotationally coupling the driveshaft of the machine to the mixing paddle 1350, but different because the pod 150 is never pierced by the driveshaft when mating drive assembly 1365 is used.

Mating drive head 1370 includes a receptacle 1378 that receives a shaft 1382 of a grommet 1380 to rotationally couple the driveshaft 1374 to the mixing paddle 1350. The rotational connection and engagement between mating drive head 1370 and the mixing paddle 1350 is similar to the connection of mating drive head 1352 (i.e., a rotationally keyed connection). Mating drive head 1370 can also be connected using an interference fit (a press fit), snapped, latched, or otherwise mechanically fastened similarly to mating drive head 1352.

Grommet 1380 includes a receptacle 1372 that receives a driveshaft 1374 that can be similar to any of the driveshaft's described in this specification, except the driveshaft 1374 can be formed with a blunted end 1376 since the driveshaft 1374 does not need to piece the pod 150 at all. Instead, a hole in the domed portion of the pod 150 is made during filling and assembly of the pod, and the pod remains hermetically sealed during storage. Grommet 1380 includes an o-ring 1384 that is used to provide this sealed connection of the contents of the pod 150. While only one o-ring 1384 is shown, multiple o-rings can be used.

Exterior threads 1386 on a cylindrical outer surface of the grommet 1380 is configured to threadably engage with corresponding internal threads 1388 of a seal member 1390. During installation, the grommet 1380 is installed from the interior of the pod 150 with the receptacle 1372 and exterior threads 1386 sticking out of the pod 150. The seal member 1390 is threaded tightly onto the exterior threads 1386 of grommet 1380 and also adhered to the surface of the domed portion of the pod 150. This forms both an air-tight seal between of the pod 150 and also allows the grommet 1380 to rotate relative to the seal member 1390.

The seal member 1390 is adhered to the pod so it cannot move. Adhering the seal member 1390 can be performed with glue, rivets, or any process that would hold the seal member 1390 in place. During operation, the driveshaft 1374 lowers into the receptacle 1372 of the grommet 1380 and begins to rotate. As the driveshaft 1374 begins to rotate, the exterior threads 1386 begin to unscrew from the interior threads of the seal member 1390. This causes the grommet 1380 to lower itself into the pod 150. This lowering motion causes the shaft 1382 of the grommet 1380 to lower into the receptacle 1378 of the mating drive head 1370. The dimensions of the shaft 1382 and receptacle 1378 can be sized such that rotational coupling between the driveshaft 1374 and the mixing paddle 1350 only occurs once the grommet 1380 is lowered into the pod 150 by the driveshaft 1374, or it can be sized such that it is always rotationally coupled.

Once the grommet 1380 clears the mating threads of the seal member 1390 it is free to rotate without further vertical translation. For example, the cylindrical surface 1392 of the grommet 1380 could freely spin within the threads of the seal member 1390. This means that the driveshaft 1374 can continue to spin to rotationally engage the mixing paddle 1350 long after the grommet 1380 moves downward and the grommet 1380 completely unscrews itself from the seal member 1390. The shaft 1382 of the grommet would further slide into the receptacle 1378 and the shaft 1382 can be configured to bottom out in the receptacle 1378 to maximize the strength of the rotational connection between the grommet 1380 and the mating drive head 1370.

The grommet 1380 can also be configured to break the seal of the pod 150 upon lowering into the pod 150 caused by rotation. Once the seal is broken, air can enter the pod 150 to aid in the mixing of the ice cream and the production of overrun. The threaded engagement 1386 and dimensions of the shafts 1374, 1382 and receptacles 1372, 1378 can be sized to minimize or maximize the air intake during the mixing process. For example, in cases where no air is desired at all, the pod 150 can remain sealed by using a very small thread pitch on the grommet 1380, or a rotating seal could be used to eliminate the thread pitch altogether. In this way, the driveshaft 1374 could rotate indefinitely and the seal would not be broken. In other cases where maximum air intake is desired as quickly as possible, the grommet 1380 can have a very large thread pitch so that the seal is broken with less than one revolution of the driveshaft 1374.

Another advantage of mating drive assembly 1365 is that the driveshaft 1374 never enters the pod 150. This means it does not get contaminated by dairy and hence require washing. Furthermore, since the pod 150 does not need to be pierced, the likelihood of aluminum shards entering the can is significantly reduced or eliminated.

The grommet 1380 is typically constructed out of aluminum, metal, or hard plastic so that it can withstand the required torques during the ice cream making process. A hard durometer elastomer could also be used which would help seal the pod 150. The seal member 1390 can be made of these materials as well and the o-ring 1384 is typically elastomeric.

FIGS. 40A-40C are plan and perspective views of the mixing paddle 1350 of a pod 150 to form a mating drive assembly 1600. Mating drive assembly 1600 is substantially similar to mating drive assembly 1365 seen in FIGS. 39A-39B, except the functionality of the grommet 1380 and the mating drive head 1370 is combined into a single component. This single component is the mating drive head 1602.

The mixing paddle 1350 is rotationally coupled to the mating drive head 1602 through a connection 1614 (best seen in FIG. 40C). The connection 1614 is preferably a welded connection, but other connections can be used. In some cases, the connection 1614 is a friction connection that is formed by engaging one or more grooves 1616 of the mating drive head 1602 onto complementary one or more edges of the mixing paddle 1350. In some cases, the connection 1614 is engaged by rotating the mating drive head 1602 relative to the mixing paddle 1350 90 degrees. In some cases, the connection 1614 is formed during the manufacturing process when the mating drive head 1602 is molded in the assembled position on the mixing paddle 1350 as shown in FIGS. 40A-40C. In some cases, the connection 1614 is adhered (e.g., glued). In some cases, the mechanical coupling is made with a fastener (e.g., a set screw).

A seal member 1604, which is substantially similar to seal member 1390, is adhered to the pod so it cannot move. Adhering the seal member 1604 can be performed with glue, rivets, or any process that would hold the seal member 1604 in place. The seal member 1604 is shown on the outer surface of the pod 150, but in some pods, is on the interior of the pod. In some pods, the seal member 1604 spans the interior of the pod 150 to the exterior of the pod 150.

Exterior threads 1606 on a cylindrical outer surface of the mating drive head 1602 is configured to threadably engage with corresponding internal threads 1608 of the seal member 1604. During operation, the driveshaft (not shown in FIGS. 40A-40C) of the machine lowers into the receptacle 1610 of the mating drive head 1602. The receptacle 1610 is keyed (best seen in FIG. 40B) so that rotation is between the driveshaft and the mating drive head 1602 is coupled. As the driveshaft begins to rotate, the exterior threads 1606 begin to unscrew from the interior threads of the seal member 1604. This causes the mating drive head 1602 to lower itself into the pod 150. This lowering motion causes the mixing paddle 1350 to lower into the pod 150 as well, but the amount of lowering is preferably small by the using a small thread pitch of the threaded connection between the mating drive head 1602 and the seal member 1604. Once the external threads 1606 of the mating drive head 1602 lowers past the lower edge of the internal threads 1608 of the seal member 1604, the threaded connection disengages and the mating drive head 1602 (and the mixing paddle 1350) can freely spin within the pod 150 and the bottom of the mixing paddle 1350 lowers onto the lip 971 of the pod 150 (not shown in FIGS. 40A-40C). At this point during operation, the mixing paddle 1350 can spin under the control of the mixing motor of the machine The threaded connection between the exterior threads 1606 and the interior threads 1608 is reversible if the rotation of the mixing motor is reversed. This allows the machine to reseal the pod 150.

The mating drive head 1602 also includes a cylindrical section 1620 that is configured to center the mating drive head 1602 and the mixing paddle 1350 in the pod 150 after the threaded connection between the exterior threads 1606 and the interior threads 1608 have disengaged. An outer diameter of the cylindrical section 1620 is slightly less than the internal diameter of the interior threads 1608 so that a rotational clearance is allowed but centering of the mixing paddle 1350 in the pod 150 is also possible.

The mating drive head 1602 also functions to seal the pod 150. Before the mating drive head 102 is lowered into the position shown in FIG. 40A, an o-ring (not shown in FIGS. 40A-40C) which is located in a groove 1612 is pressed against the inside dome of the pod 150 forming a seal. This seal is complemented by the threaded connection between exterior threads 1606 and the interior threads 1608. These seals help to seal outside air from getting into the pod 150 so the pod 150 can remain hermetically sealed until it is ready for use in the machine.

FIGS. 41A-41F are perspective views of the mixing paddle 1350 that engages with an mating drive head 1402 to form a mating drive assembly 1400. In mating drive assembly 1400, the pod 150 is pierced by a dagger/driveshaft 1406, but the dagger/driveshaft 1406 does not contact the contents of the pod 150 and any shards of aluminum resulting from the piercing action are captured in the space 1408 which is sealed from the contents of the pod 150. The dagger/driveshaft 1406 is rotationally coupled to the mixing paddle 1350 once the dagger head 1410 slides into the receptacle 1412 of the mating drive head 1402. Rotational engagement between the mating drive head 1402 and the mixing paddle 1350 is similar to the mating drive heads 1352, 1370.

A guide bushing 1404 is adhered or glued to the inside of the domed region of the pod 150. The mating drive head 1402 includes a cylindrical protrusion 1416 that includes a recess for an o-ring 1414. The o-ring 1414 hermetically seals the mating drive head 1402 to the guide bushing 1404. The dagger/driveshaft 1406 punctures through the domed region of the pod 150 and rotates the mating drive head 1402 and the mixing paddle 1350. The o-ring 1414 may be a dynamic o-ring since the mating drive head 1402 will rotate relative to the guide bushing 1404. The protrusion 1416 of the mating drive head 1402 may be chamfered to provide a lead-in angle for ease of assembling the mating drive head 1402 into the bore of the guide bushing 1404. The mating drive head 1402 or the guide bushing 1404 may be aluminum, metal, hard plastic, or a high durometer elastomer to support the torques required during mixing, scraping, and dispensing of the ice cream.

Mating drive assembly 1400 allows a pod 150 to be hermetically sealed during packaging. This seal continues to be intact even after piercing by the dagger/driveshaft 1406. This means that air does not enter the pod 150 during the mixing process which is typically used to aid in the generation of overrun. However, in this case, Nitrogen of the pod can assist in the development of overrun, and/or micro pores in cylindrical protrusion 1416 can be used to allow air to enter the pod 150 for this purpose.

FIGS. 42A-42D are perspective views of the mixing paddle 1350 that engages with a mating drive head 1420 to form a mating drive assembly 1425. Mating drive assembly 1425 is different from mating drive assemblies 1355, 1365, 1400 in that only one part, namely mating drive head 1420, is needed to form the rotary coupling and the sealed connection.

Mating drive head 1420 is molded from an elastomer or a hard plastic and is configured to rotatably deform and break at a weakened region 1422 when torque is applied to the hex surface 1424. Hex surface 1424 is configured to slidably engage with a driveshaft of the machine (not shown). Large cylindrical bearing surfaces 1426 are configured to adhere to the domed region of the pod 150 by gluing or otherwise permanent fastening.

Weakened region 1422 may be cylindrical. Weakened region 1422 may also be broken by a vertical displacement of the driveshaft onto the hex surface 1424 to cause the entire central region of the mating drive head 1420 to move downward. Sometimes both vertical displacement and rotation can cause the weakened region 1422 to break.

Torque is transferred from the mating drive head 1420 to the mixing paddle 1350 similarly to mating drive heads 1352, 1370, 1402. For example, clockwise rotation of the mating drive head 1420 causes a mechanical connection, via compression, at location 1428 on the surface of the dog ears 1354 of the mixing paddle 1350 to transfer the torque and rotationally couple the driveshaft of the machine to the mixing paddle 1350.

Mating drive head 1420 is hermetically sealed during packaging and the seal is configured to break during the ice cream mixing process to allow air to enter the pod 150 to generate overrun.

Figure 43A:
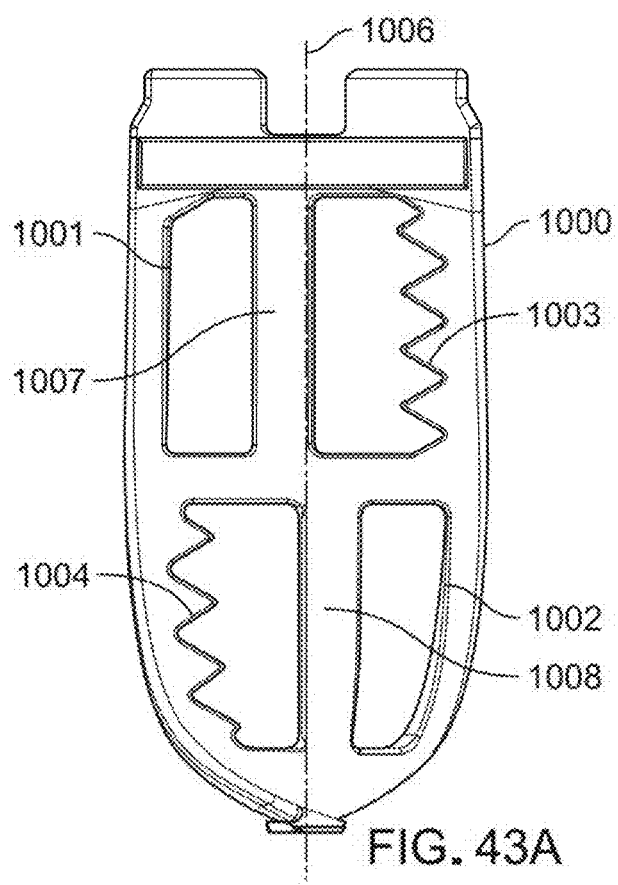
FIGS. 43A-43C are perspective views of a mixing paddle with eccentric windows.
Figure 43B:
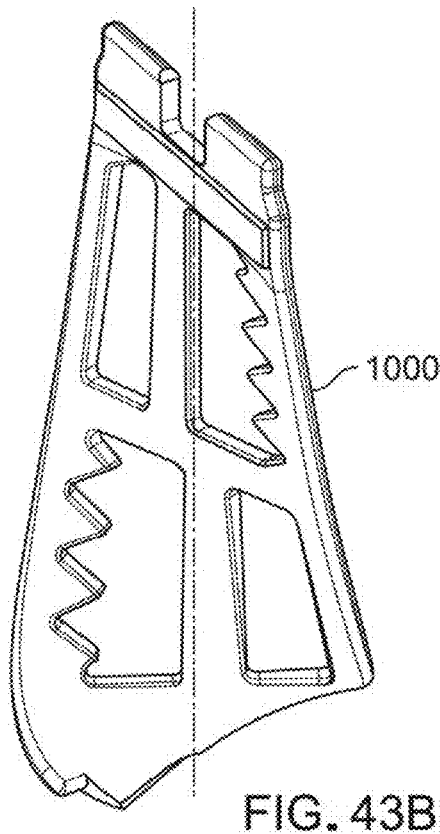
Figure 43C:
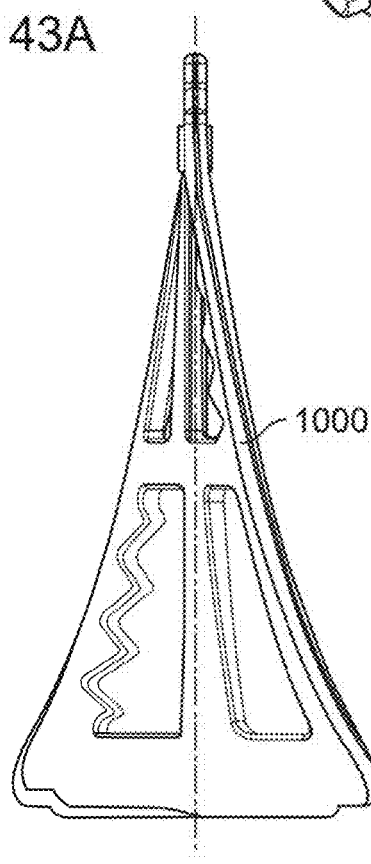

FIGS. 43A-43C show a mixing paddle 1000 with windows 1001-1004 that are off-center (or eccentric) relative to a drive axis 1006. Windows 1001 and 1002 are cut such that center sections 1007 and 1008 are radially biased to alternate sides of the mixing paddle 1000. Windows 1001 and 1002 do not need to be alternating but this configuration is helpful for rotationally balancing. A mixing paddle 1000 with windows 1001 and 1002 will mix the frozen confection better than a mixing paddle with balanced windows with center sections that simply rotate in the center of the pod because windows 1001 and 1002 can swing around the drive axis 1006 to act like a mixing stick, or beater, and help to mix the frozen confection. Mixing paddle 1000, in similarity to the previously mentioned mixing paddles, is also helically shaped to drive the frozen confection downward to facilitate top to bottom mixing and drive the frozen confection out of a pod. This driving action is similar to a screw conveyer. The mixing paddle 1000 mixes product laterally and pulls in air to create loft. The mixing paddle 1000 also features one or more teeth 1004 that helps to break up frozen product and scrape product off of the wall of the pod into smaller pieces or streams. This paddle has four teeth, but there is no upper limit to the number of teeth.

Some mixing paddles include ribs or other features to increase torsional resistance. Some mixing paddles exhibit high torsional rigidity (e.g., greater than 15 ozf-in) and a high torque to failure limit (e.g., greater than 150 ozf-in). Some mixing paddles have a low surface roughness (e.g., less than 8-16 Ra) to prevent product from sticking to the mixing paddle and to help remove product that sticks to the mixing paddle. With mixing paddles having a surface roughness between 8-16 Ra, these machines evacuate at least 85% of the frozen confection in the pod and usually 95%. Some mixing paddles have a recess at the second end of the mixing paddle, allowing the mixing paddle to be turned to the center axis of the mixing paddle. During manufacturing, the twist of the mixing paddle at the bottom can be very large 100° to 150° which can be a problem for the stamping process which can tear the material of the mixing paddle. A cut notch (not shown) in the center of the bottom of the mixing paddle blades enables the mixing paddle to be formed without tearing the material.

As previously described, the cap 166 of a pod 150 includes a protrusion 165 that is sheared off to allow the dispensing of product from the pod (e.g., see FIGS. 10A and 11A-11G). The cap 166 is mounted over base 162 and is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. However, some systems incorporate the shearing mechanism as part of the machine rather than as part of the pod.

Figure 44A:
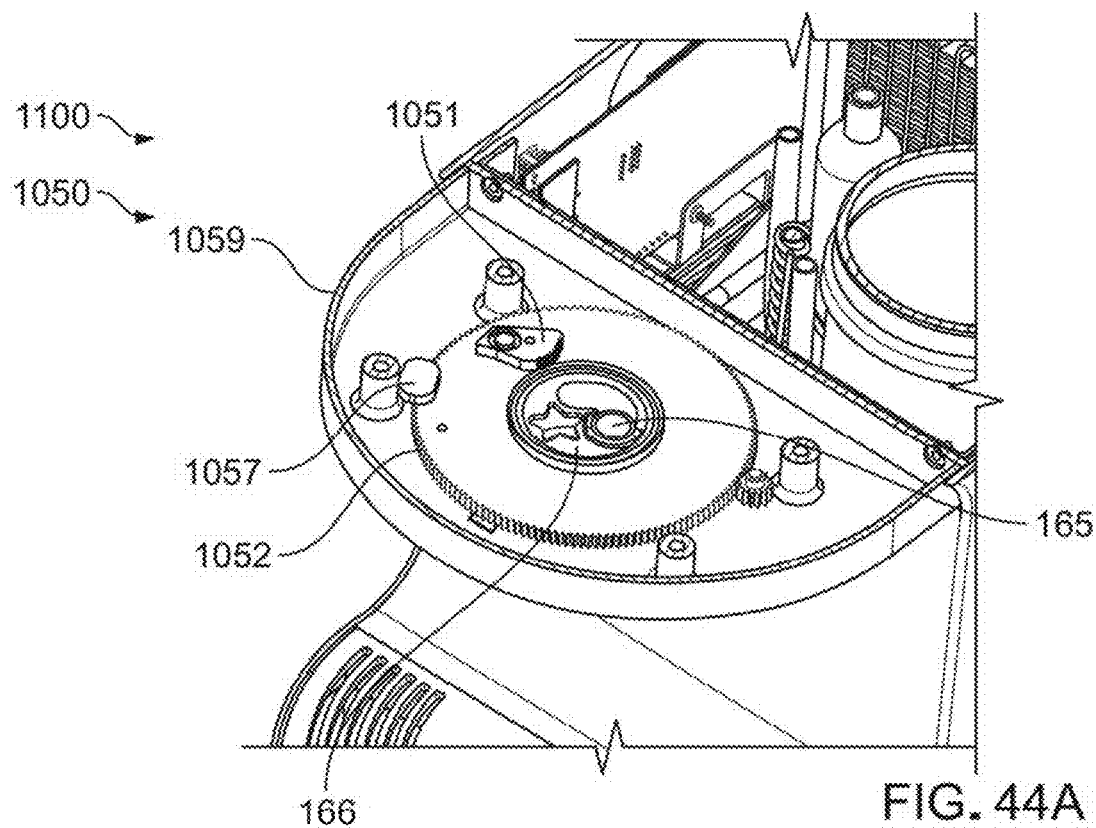
FIGS. 44A-44B are perspective views of a cam system to engage a pod.
Figure 44B:
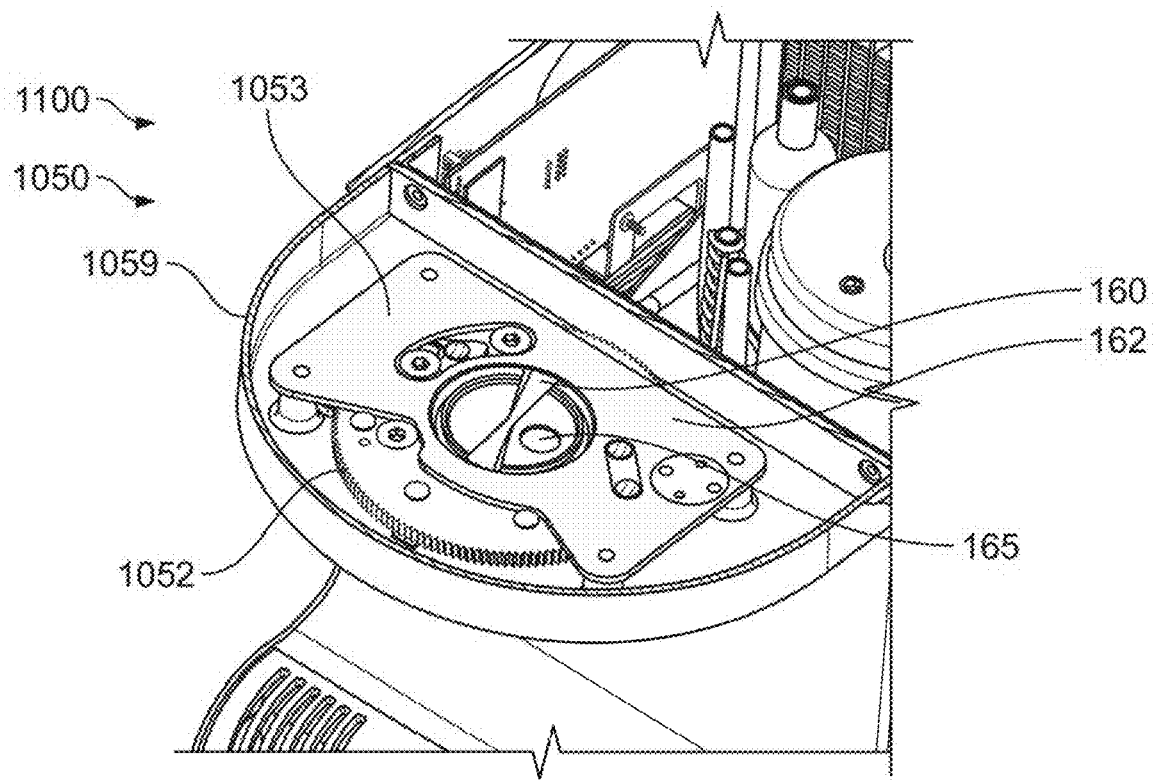
Figure 45D:
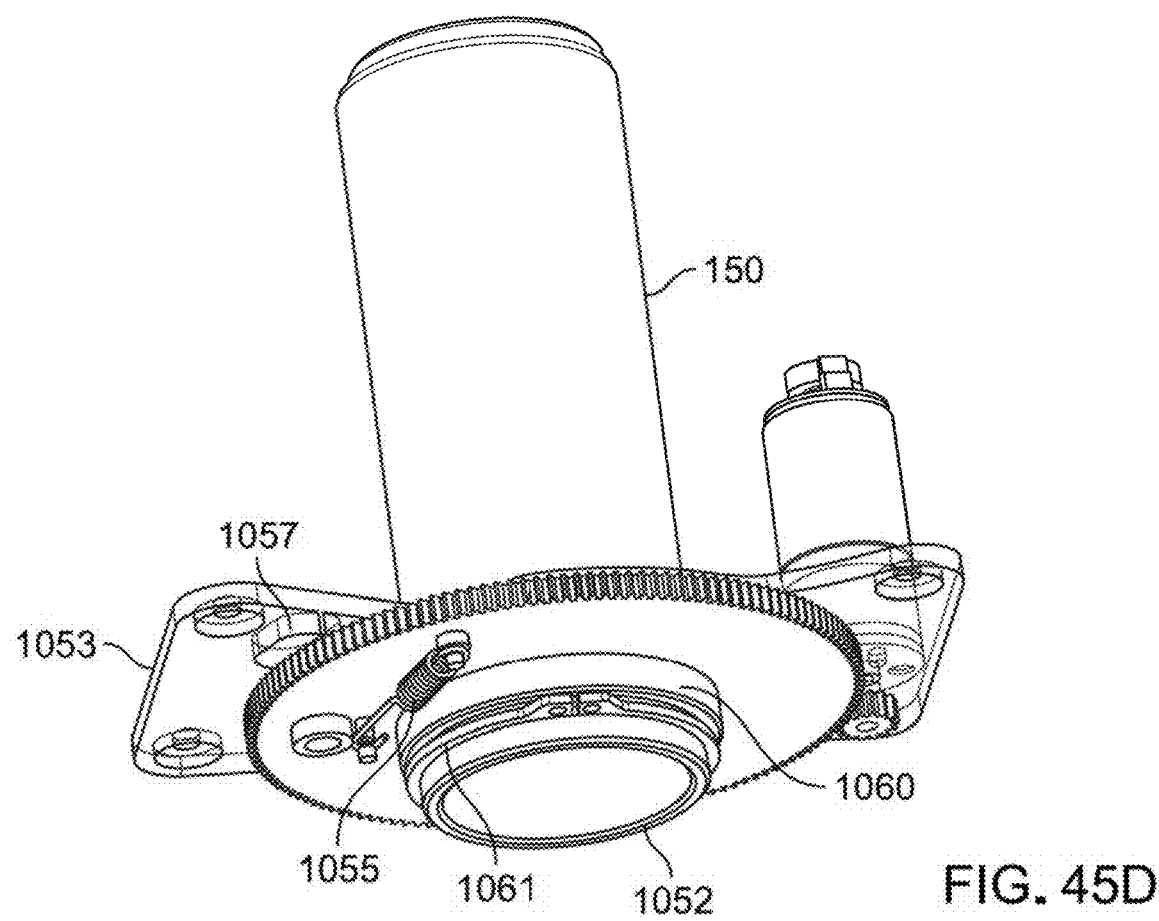
Figure 45E:
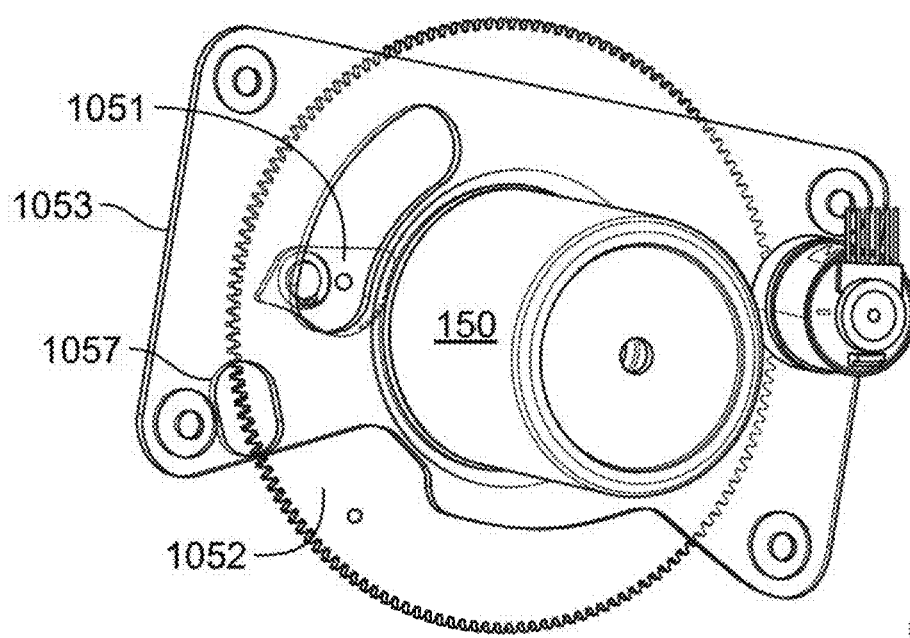

FIGS. 44A-44B show cross sections of a perspective view of a machine 1100 with a protrusion shearing mechanism 1050 that engages and shears off the protrusion 165 from the base 162. The protrusion shearing mechanism 1050 does not require the cap to be rotationally aligned or oriented in any particular direction with respect to the evaporator 108 (not shown). For example, the pod 150 can be inserted into the evaporator without a user having to rotationally align the pod with the protrusion shearing mechanism 1050. The machine will accept the pod 150 with any angular orientation.

FIGS. 45A-45E show a cam 1051 pivotally connected to a gear 1052 which is rotated by a shearing motor 1054. In operation, the cam 1051 is rotated out of the way by the back side of the cam 1051 riding along the home dog 1057 (i.e., "home position"). Once the pod 150 with cap 166 is inserted into the opening 1058 of a frame 1053, a spring 1055 provides a force pressing the cam 1051 onto the cap 166 of the pod 150. The frame 1053 is mounted to a housing 1059 as part of the machine 1100 and is fixed in position.

Once the gear 1052 is rotated, the cam 1051 is forced further into contact with the cap 166 and a firm grip is generated by the cam 1051 being wedged between the rotating gear 1052 and the cap 166. A knurled surface 1056 of the cam 1051 helps to provide this firm grip and refrain the cap 166 from rotating relative to the gear 1052. As the gear 1052 is rotated, the cam 1051 travels off the home dog 1057 (i.e., "engaging position"). Rotation of the gear 1052 ultimately turns the shearing cap which shears the protrusion 165 and opens the pod aperture.

Figure 46:
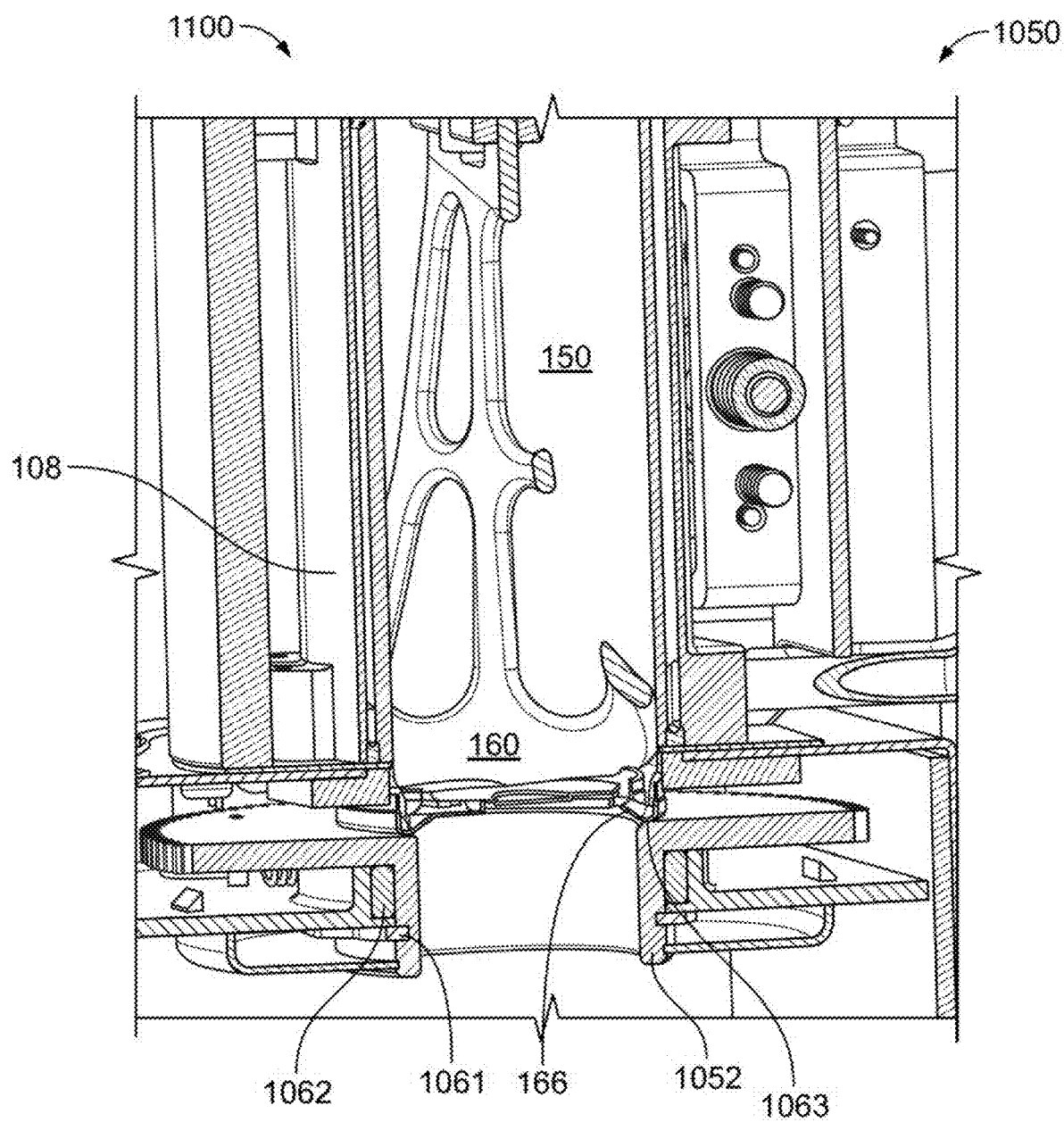
FIG. 46 illustrate a machine with a cam system engaging a pod.

FIG. 46 is a cross section of a perspective view of the machine 1100 illustrating the engagement 1063 of the cap 166 with the gear 1052. A bearing 1062 allows the gear 1052 to spin relative to the machine 1100 and a snap ring or retaining ring 1061 axially secures the gear 1052 in place.

In some machines, the mixing paddle never stops rotating during the shearing of the protrusion. In some machines, during the protrusion shearing process, rotation of the cap 166 of the pod 150 is opposite the direction of the rotation of the mixing paddle 160. By rotating in opposite directions, the likelihood of the pod 150 slipping in the evaporator 108 is reduced. This is shown in FIGS. 47A and 47B.

Figure 47A:
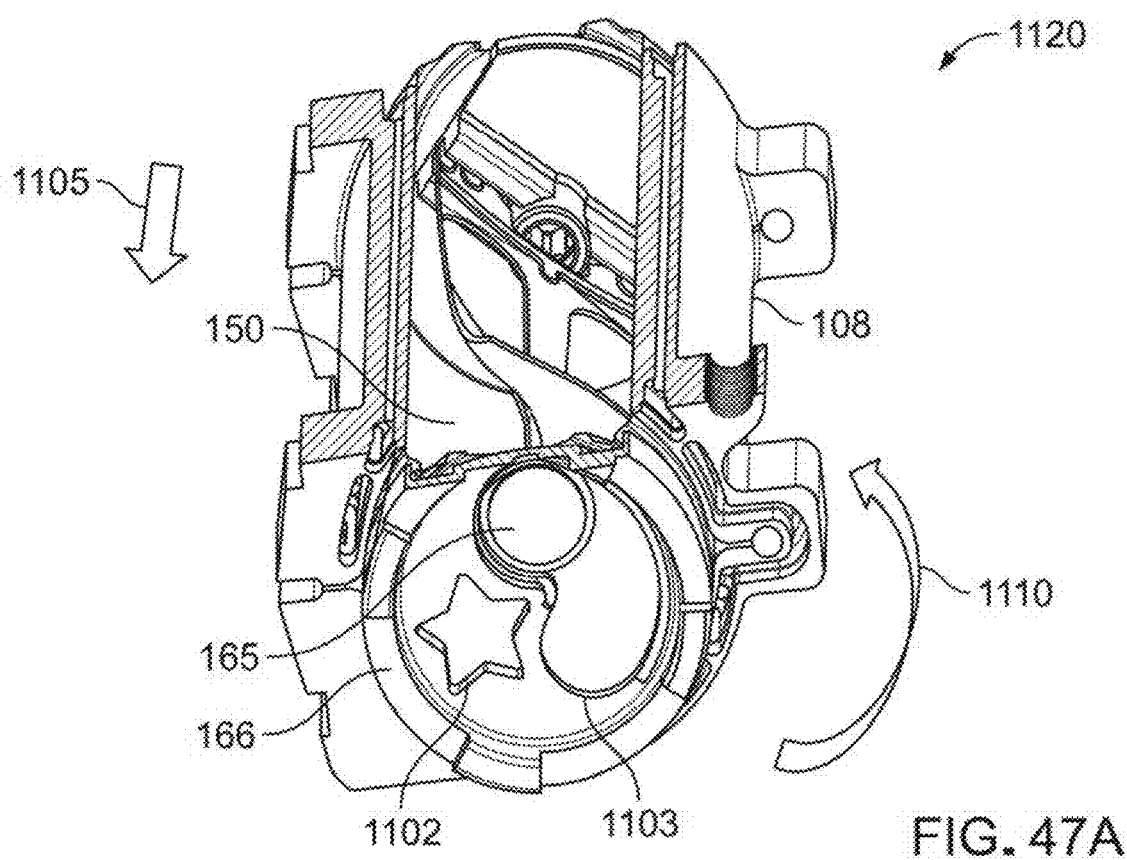
FIGS. 47A-47B illustrate a cap for a pod.
Figure 47B:
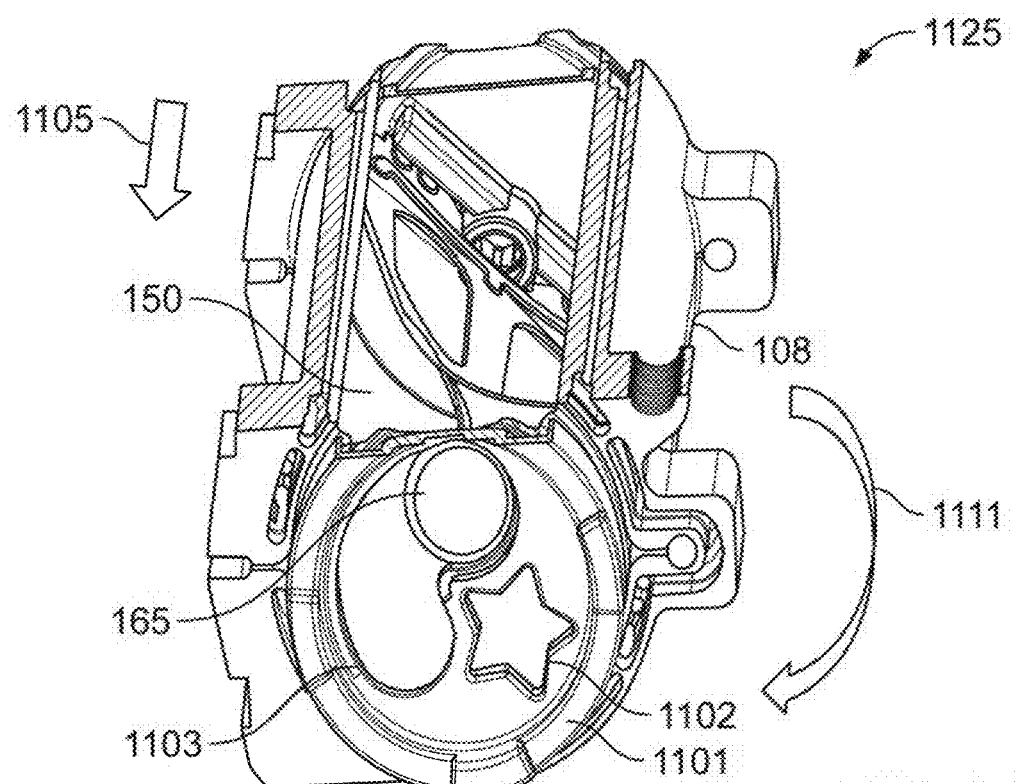

FIG. 47A shows cap shearing system 1120 that is a subassembly of a machine. The cap shearing system 1120 features a protrusion shearing process that is preformed clockwise 1110 (i.e., clockwise relative to a direction 1105 looking down the pod 150) and the mixing paddle 160 that is rotated clockwise as well. In contrast, FIG. 47B shows a cap shearing system 1125 where cap 166 enables the protrusion 165 to be sheared in a counter-clockwise direction 1111 (counter-clockwise relative to a direction 1105 looking down the pod 150). The cap 1101 has a first aperture 1102 and a second aperture 1103 that mirrors the first aperture 222 and second aperture 224 of the cap 166.

By rotating the shearing cap 166 in the opposite direction of the mixing paddle 160, the rotational or torsional forces cancel out allowing the clamshell evaporator 108 to close with enough force to keep the pod 150 from slipping/rotating in the clamped evaporator 108. This is important so the first aperture (222 and 1102) on the cap (166 and 1101) properly align with the protrusion opening 165. If the pod 150 slips relative to the cap (166 and 1101), the first aperture may not align, and the functionality of the machine will be affected.

Some pods can include a first end that is removable and a reusable mixing paddle may be inserted into the first end. The mixing paddle may be removed, washed, and reused for subsequent use.

Figure 48A:
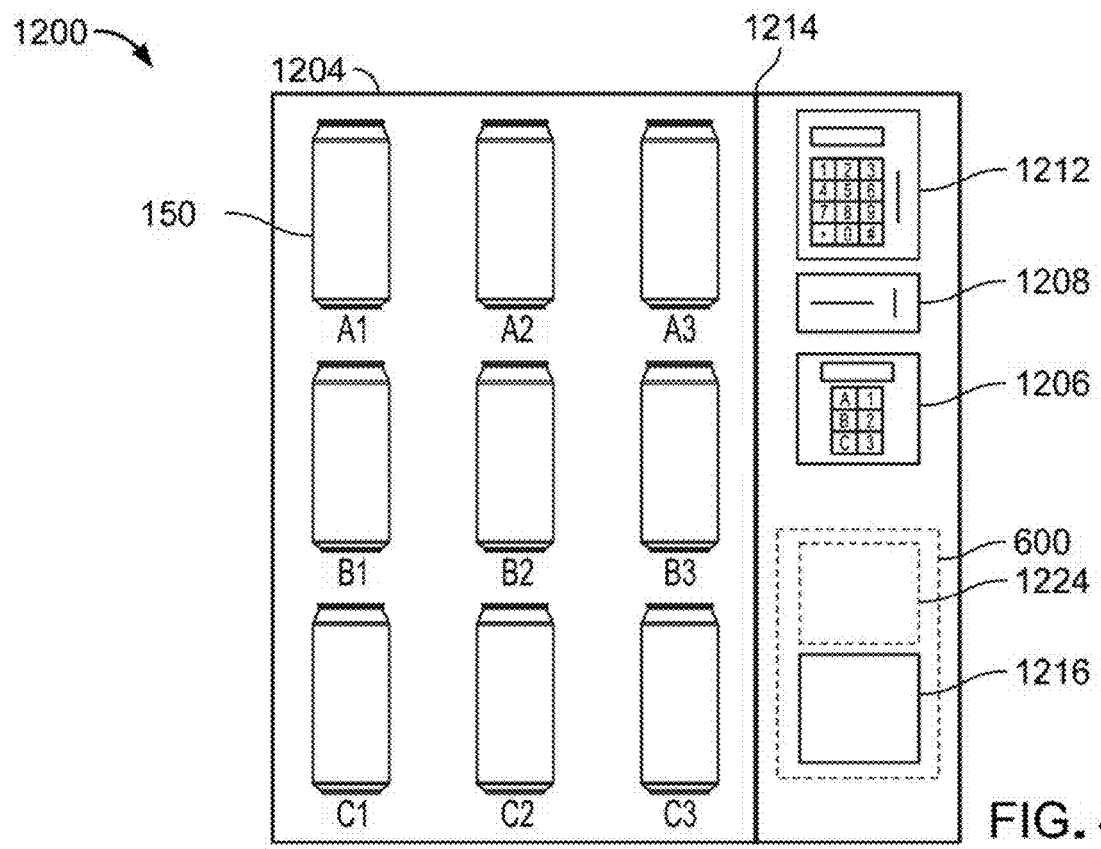
FIGS. 48A-48C are schematics of a vending machine including a machine for producing cooled food or drinks.
Figure 48B:
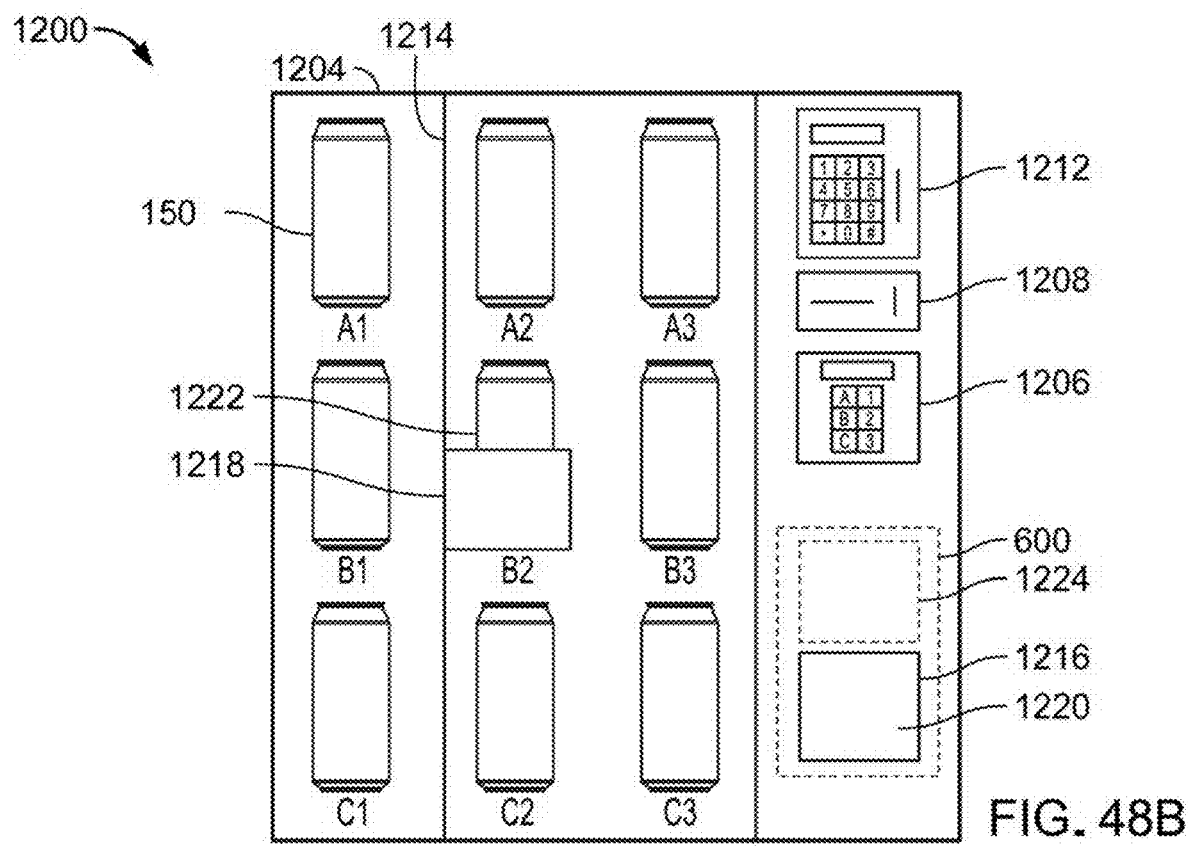
Figure 48C:
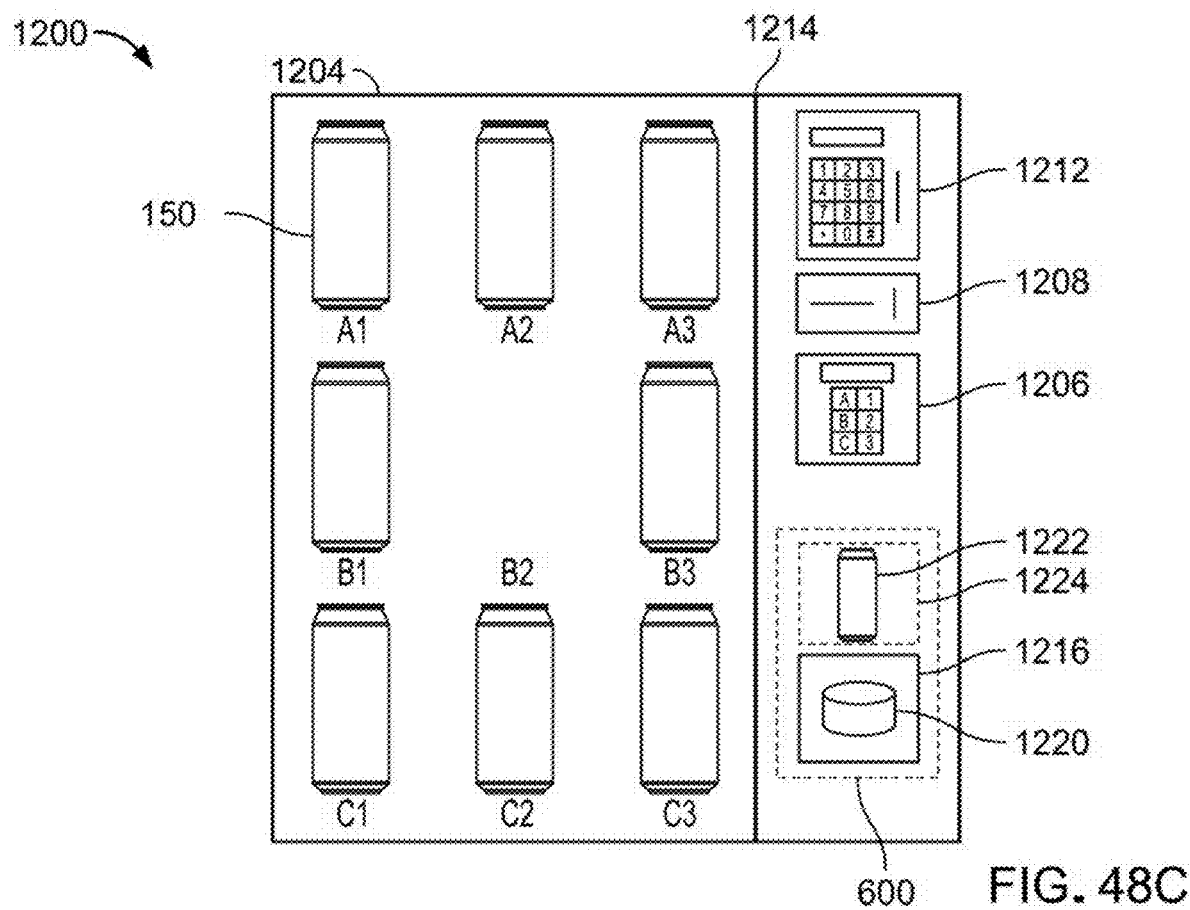

FIGS. 48A-48C show a vending machine 1200 for vending various pods (e.g., pods 150) and depositing them into a built-in machine (e.g., machine 600) to allow ice cream to be made and served into a bowl or cone. As such, vending machine 1200 can contain various types of pods, such as various types of ice creams, or any of the pods previously discussed. One advantage is that vending machine 1200 can be used in commercial locations and be easily used by more than just one user. Additionally, since the pods 150 do not need to be refrigerated before use, there is no need to refrigerate the vending machine 1200 which lowers the cost to operate and manufacture.

As shown in FIG. 48A, vending machine 1200 contains nine pods (one of which labeled pod 150) that are arranged in a rectangular or square grid behind a viewing window 1204. Nine pods are shown but any number of pods or arrangements can be used. Each of the nine pods can contain a stack of pods behind the first pod so that when one pod is selected and removed from vending machine 1200, a pod behind it will move forward. This is typically caused by gravity and/or a drive element such as a spring. For instance, pod 150 may have ten pods behind it so that the machine is stocked to require less frequent refills.

Vending machine 1200 includes an alphanumeric keypad 1206 that allows a user to make a pod selection. For example, to select pod 1222, the user would enter "B" followed by "2" into the keypad 1206. Vending machine 1200 also includes provisions to accept money 1208 by receiving cash and coins using a cash receptacle and a coin receptacle, respectively. Vending machine 1200 can also accept credit card payments using a credit card reader 1212, or any method to transfer money from a user to the machine, such as using ApplePay, or payments via an app or via the internet. A similar server or network that is used in machine 100 can also be implemented in the vending machine 1200. For example, a subscription service can be used to allow users access to a certain number of pods per month.

As mentioned above, vending machine 1200 includes the functionality of the cooling machine previously described (e.g., machine 600). Machine 600 is shown in dashed lines to represent the fact that it is inside the vending machine 1200. Machine 600 includes an evaporator 1224 and a dispensing receptacle or opening 1216. While the other features of machine 600 are not shown in FIGS. 48A-48C, it should be understood that the functionality of machine 600 is built-in to vending machine 1200 in a standalone package.

Vending machine 1200 includes a robotic arm 1214 (best seen in FIG. 48B) that can fetch a pod based on the user's selection and deposit it in the evaporator 1224. To achieve this, the robotic arm 1214 includes a basket or platform 1218 to receive a pod from a shelf and transport it safely to the evaporator 1224. The robotic arm 1214 is configured to move horizontally to move to the column of the selected pod. The basket 1218 is configured to move vertically along the robotic arm 1214 to move to the row of the selected pod. Both of these are typically driven by belt drive systems coupled to rotary motors, but various actuation methods can be used. Note that the robotic arm is shown in a retracted position in FIGS. 48A and 48C.

For example, upon selecting pod 1222, the basket 1218 moves into the location "B2" as shown in FIG. 48B, and the pod 1222 is released into the basket 1218. Once the pod is in the basket 1218, the pods behind the first pod can move to replace pod 1202, as previously mentioned. However, location "B2" is now empty in FIG. 48C.

Referring to FIG. 48C, the basket 1218 moves the pod 1222 to the evaporator 1224 and the process of making the ice cream can begin. At this point, the refrigeration system of vending machine 1200 cools the liquid ingredients in the pod 1222 to the desired temperature, typically 17-26 degrees Fahrenheit. The vending machine 1200 inserts a driveshaft into the pod 1222 to cause the mixing paddle of the pod 1222 to spin to prepare the ice cream and drive the ice cream downward. The vending machine 1200 can open the pod 1222 by shearing off the protrusion. The mixing paddle can then drive the ice cream out of the pod 1222 and into a bowl, dish, or cone 1220. Once the process is complete, the pod 1222 is removed and can be recycled. A receptacle within vending machine 1200 can be used to store the used pods until they are recycled.

Alternatively, instead of using a robotic arm 1214, vending machine 1200 can also permit manual selection by opening a window (substantially similar to window 1204, except on a hinge, or sliding mechanism to permit it to swing or slide open) and allowing a user to reach in, grab a selection, and place the pod in the evaporator manually.

Figure 49:
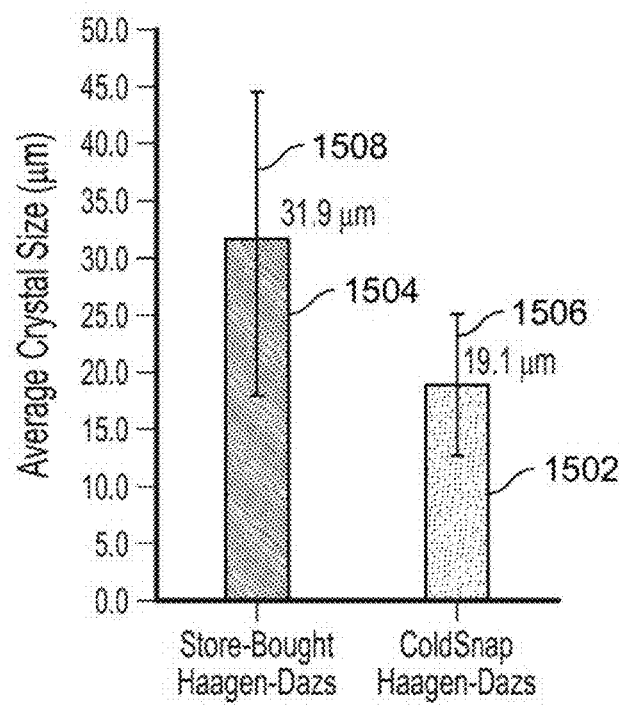
FIG. 49 are ice crystal size analysis results for ice cream.

FIG. 49 illustrates the comparison of ice crystal size typical of store-bought ice cream (e.g., Haagan-Dazs ice cream) versus the same ice cream that is melted, packaged into a pod, and served using the machines described in this specification. Store-bought ice cream that is melted, packaged into a pod, and served using the machines described in this specification is considered "ColdSnap" ice cream. FIG. 49 illustrates that the ColdSnap Haagan-Dazs ice cream 1502 has a 40% reduction in mean ice crystal size compared to the store-bought Haagan-Dazs ice cream 1504. Specifically, the ColdSnap Haagan-Dazs ice cream 1502 has a mean ice crystal size of 19.2 µm compared to the store-bought Haagan-Dazs ice cream 1504 with a mean ice crystal size of 31.9 µm. Additionally, the standard deviation of the measured ice crystals in the ColdSnap Haagan-Dazs ice cream 1506 is much tighter than the standard deviation of the store-bought Haagan-Dazs ice cream 1508.

The machines described in this specification speed up impeller RPM so that ice crystals do not have time to grow large which means that the ice crystal size of the frozen ice cream is much smaller which significantly improves texture and smoothness of the ice cream.

The ice crystal measurements shown in FIG. 49 were analyzed using a light microscope at 40× magnification housed in an insulated glovebox system at a temperature of approximately −10° C. The samples were transferred to the glovebox immediately after being frozen by the ice cream machines described in this specification. The ice cream samples were placed on a microscope slide and a drop of 50% pentanol and 50% kerosene dispersing solution were added to aid in dispersing the ice crystals and to improve image quality. Images of the ice crystals were obtained using optical light microscopy at 40× magnification.

During post-processing, the diameter of each ice crystal seen in an image was measured by tracing the boundary of the ice crystals shown in the images. Measuring the boundary of the ice crystals was performed using Microsoft Softonic Paintbrush for Mac with the assistance of an ice crystal measurement macro in the Image Pro Plus software program. For each sample of ice cream analyzed, at least 300 ice crystals were measured per analysis to verify that a proper statistical average of ice crystal sizes was obtained.

Figure 50A:
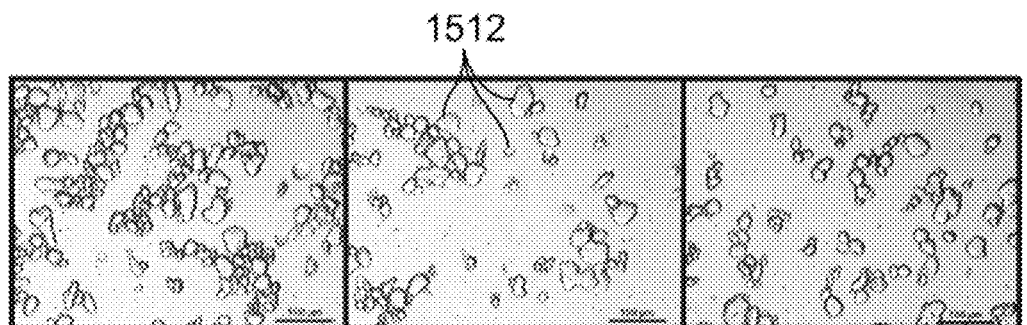
FIGS. 50A-50E are images representing an ice crystal size analysis for various ice creams.

FIGS. 50A-50E are images of ice crystals recorded using optical light microscopy at 40× (40 times) magnification for various ice creams. FIG. 50A includes three examples of the ice crystal images recorded for measuring the ice crystal size for ColdSnap Sweet Cream 1 ice cream. Scale of the images are represented by the scale bar 1510 representing a 100 μm length. Scale bars are shown in each of the three images of FIG. 50A. Ice crystals are represented by the generally circular shaped objects (e.g., objects 1512) in the images. There are many ice crystals seen in the images. The mean diameter of the ice crystals is 21.7 μm which is smaller than the store-bought counterpart for this ice cream.

Figure 50B:
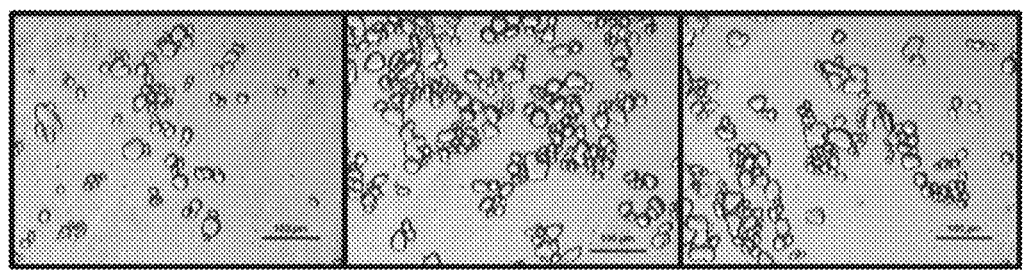
Figure 50C:
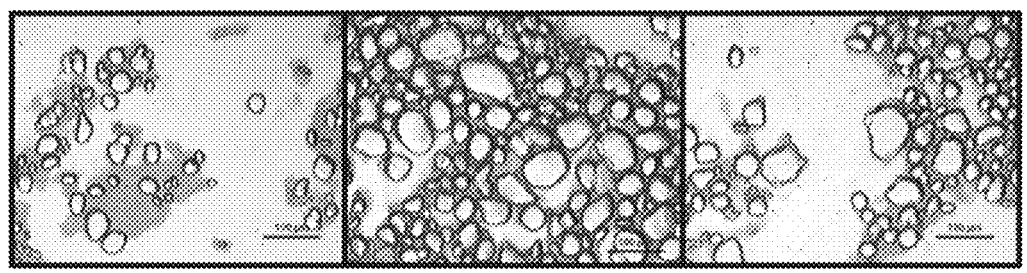

FIG. 50B includes three examples of the ice crystal images recorded for measuring the ice crystal size for ColdSnap Sweet Cream 2 ice cream. The mean diameter of the ice crystals is 19.5 μm which is even smaller the ice crystals seen in FIG. 50A and still less than the store-bought counterpart for this ice cream FIG. 50C includes three examples of the ice crystal images recorded for measuring the ice crystal size for ColdSnap Blueberry chobani ice cream. The mean diameter of the ice crystals is 21.2 μm but some ice crystals are larger with a diameter of 76.9 μm. However, on average, the ice crystal size is still less than the store-bought counterpart for this ice cream.

Figure 50D:

FIG. 50D includes three examples of the ice crystal images recorded for measuring the ice crystal size for ColdSnap Haagen-Dazs ice cream, which was also discussed with reference to FIG. 49. The mean diameter of the ice crystals is 19.1 μm and the maximum ice crystal measured was 38.2 μm, which is the lowest maximum ice crystal size of the ice crystal measurements shown in FIGS. 50A-50E. This mean ice crystal size is smaller than the store-bought counterpart for this ice cream which is shown in FIG. 50E.

Figure 50E:
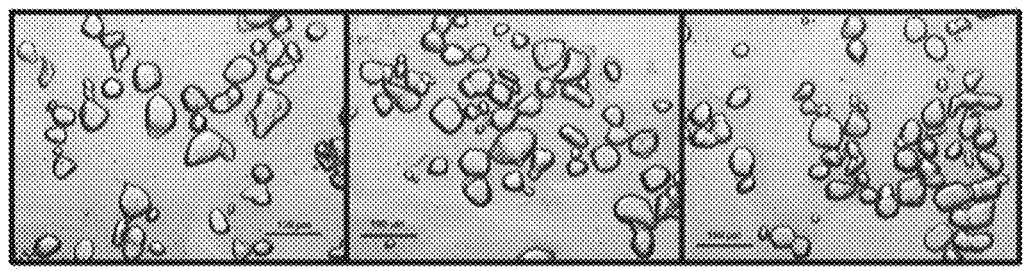

FIG. 50E includes three examples of the ice crystal images recorded for measuring the ice crystal size for store-bought Haagen-Dazs ice cream, which was also discussed with reference to FIG. 49. Notably, the mean diameter is 31.9 μm which is much larger than the ColdSnap Haagen-Dazs result of 19.1 μm. All quantitative values (i.e., the mean ice crystal diameter, the standard deviation, the minimum ice crystal diameter, and the maximum ice crystal diameter) are larger for the store-bought ice cream compared to the ColdSnap counterparts.

These results are a strong indication that the ice creams produced with the machines described in this specification produce much smoother ice cream that store-bought ice cream. The ice creams produced with the machines described in this specification were also 27% smaller in ice crystal size compared to the average ice cream crystal size of 25 μm.

Below is a table of the ice crystals size measurements shown in FIGS. 49 and 50A-50E.

| Sample/Data | Mean (μm) | Std. Dev. (μm) | Min. (μm) | Max. (μm) |
| --- | --- | --- | --- | --- |
| ColdSnap Sweet Cream 1 | 21.7 | 7.7 | 6.0 | 51.9 |
| ColdSnap Sweet Cream 2 | 19.5 | 7.1 | 5.3 | 43.1 |
| ColdSnap Blueberry Chobani | 21.2 | 13.2 | 6.5 | 76.9 |
| ColdSnap HaagenDazs | 19.1 | 6.24 | 6.7 | 38.3 |
| Store-bought HaagenDazs | 31.9 | 13.8 | 6.9 | 84.9 |

Figure 51A:
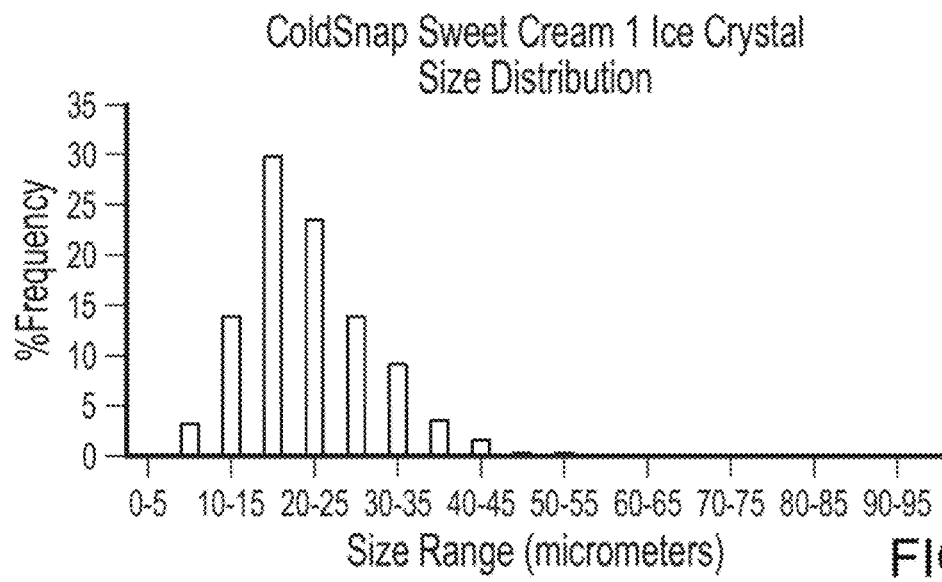
FIGS. 51A-51E are histograms representing the ice crystal size analysis for the various ice creams shown in FIGS. 50A-50E.

FIGS. 51A-51E are histograms of the ice crystal size measurements. FIG. 51A is a histogram of the ColdSnap sweet cream 1 ice crystal size distribution which illustrates the tight standard deviation (or spread) of measurements about the mean ice crystal diameter of 21.7 μm.

Figure 51B:
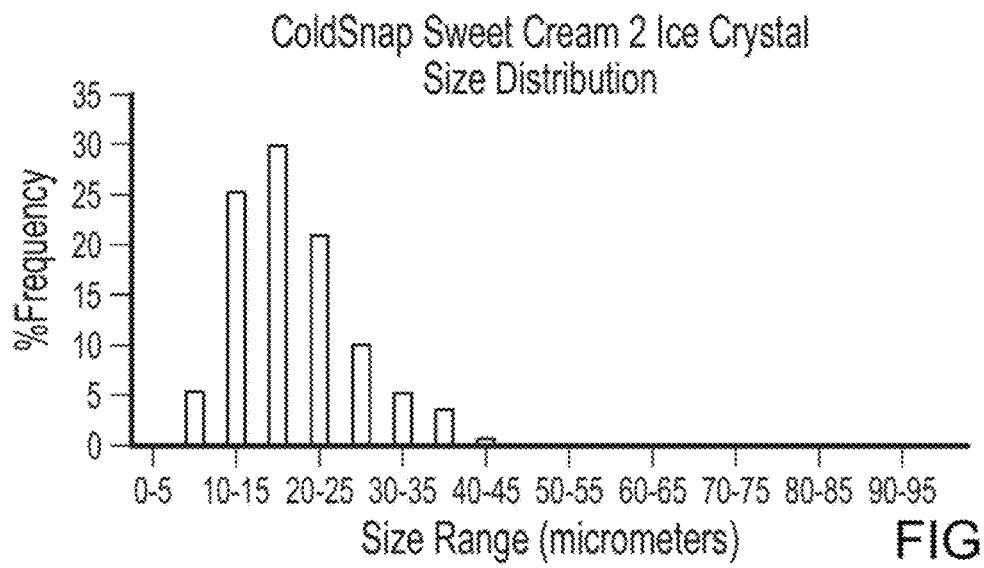

FIG. 51B is a histogram of the ColdSnap sweet cream 2 ice crystal size distribution which illustrates the tight standard deviation of measurements about the mean ice crystal diameter of 19.5 μm.

Figure 51C:
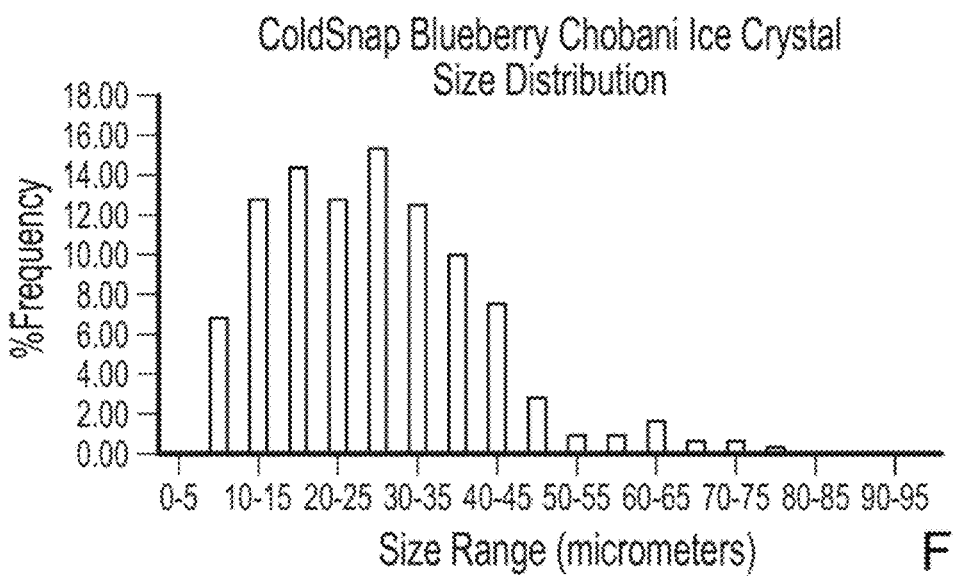

FIG. 51C is a histogram of the ColdSnap blueberry chobani ice crystal size distribution which illustrates the tight standard deviation of measurements about the mean ice crystal diameter of 19.5 μm.

Figure 51D:
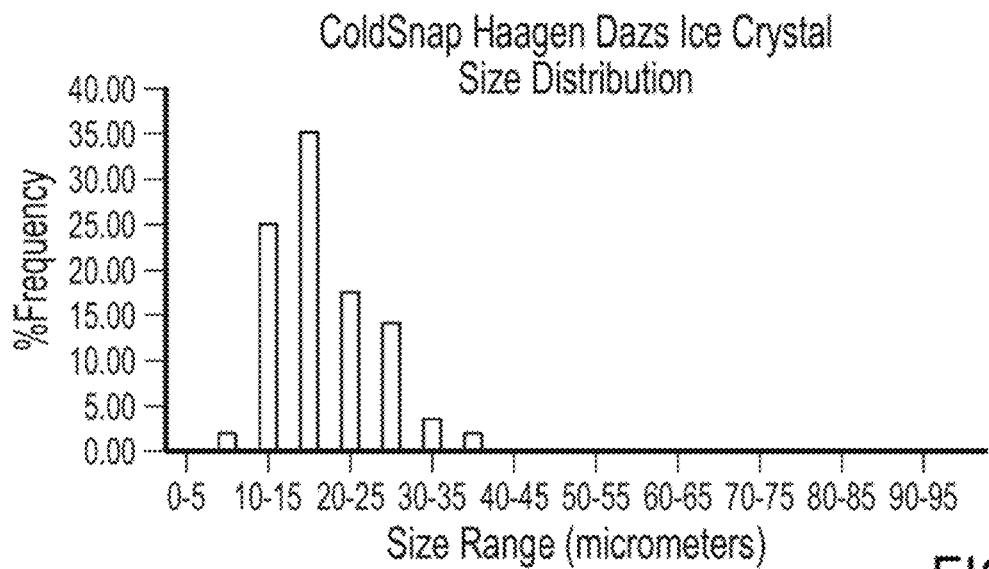

FIG. 51D is a histogram of the ColdSnap Haagen-Dazs ice crystal size distribution which illustrates the tight standard deviation of measurements about the mean ice crystal diameter of 19.1 μm.

Figure 51E:
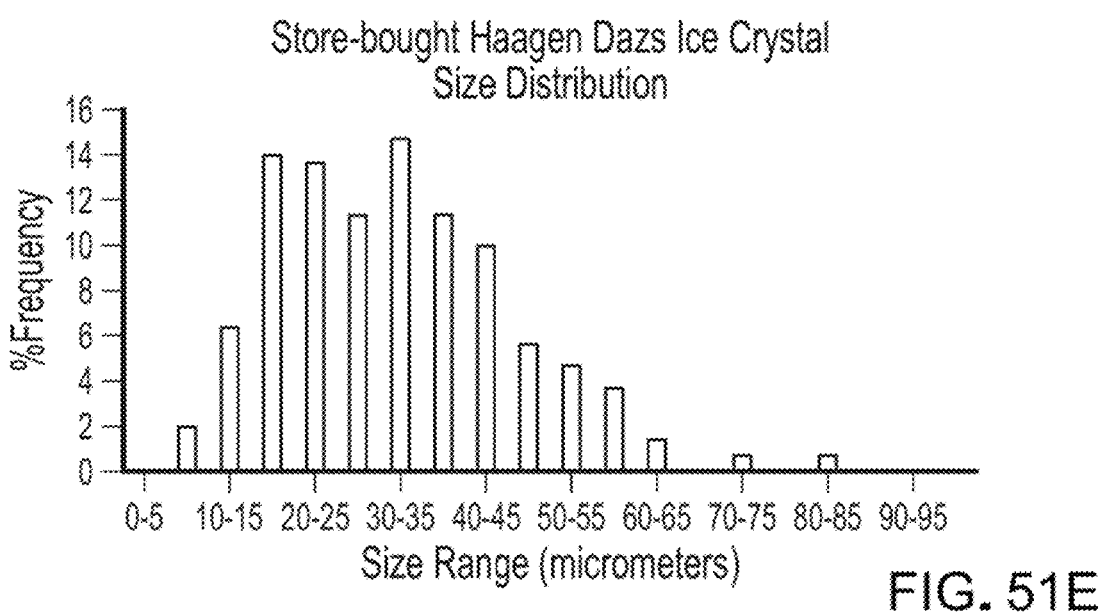

FIG. 51E is a histogram of the store-bought Haagen-Dazs ice crystal size distribution which illustrates the wider standard deviation of measurements about the mean ice crystal diameter of 31.9 μm. Not only is the mean ice crystal diameter for the store-bought ice cream larger than the ColdSnap counterpart, but standard deviation is much greater.

As previously mentioned, the ice creams produced using the machines described in this specification have a much smaller ice crystal size on average and a much tighter standard deviation of ice crystal size compared to their store-bought counterparts. This is important because the ice cream machines described in this specification produce smoother ice cream that does not require refrigeration or freezing prior to use. This means that the ice creams used in these machines do not need to include non-natural ingredients such as emulsifiers or stabilizers in the ice cream. The ice creams used with these machines can be "clean-label" and contain simply milk, cream, sugar, and powdered milk and can be stored at room-temperature for up to 9 months in a sterilized pod.

A number of systems and methods have been described. Nevertheless, it will be understood that various modifications may be made without departing from the spirit and scope of this disclosure. For example, although the evaporators have been generally illustrated as being in vertical orientation during use, some machines have evaporators that are oriented horizontally or an angle to gravity during use. Accordingly, other embodiments are within the scope of the following claims.

What is claimed is:

1. A pod for providing a single serving of a cooled food or drink, the pod comprising:
   a substantially rigid container having a first end and a sidewall, the first end and the sidewall together defining an interior, a portion of the first end configured to be opened by an application of a force;

a mixing paddle movably disposed within the interior of the substantially rigid container; the mixing paddle operable to stir at least one ingredient;

a drive head coupled to the mixing paddle such that rotation of the drive head causes rotation of the mixing paddle, the drive head comprising exterior threads on a cylindrical outer surface and defining a receptacle for engaging with a driveshaft of a machine to couple rotation of the driveshaft and the drive head; and a seal member fixed to a second end of the substantially rigid container, the seal member comprising an internal thread engaged with the exterior threads of the drive head such that a rotation of the drive head in a first direction relative to the seal member fixed in position causes an axial translation of the drive head relative to the seal member and into the interior.

2. The pod of claim 1, wherein the drive head is axially moveable between an engaged position in which the internal thread of the seal member and the external threads of the drive head are engaged and a disengaged position in which further rotation of the drive head in the first direction rotates the drive head without further translating the drive head into the interior.

3. The pod of claim 2, wherein the drive head and the seal member are configured such that rotation of the drive head in a second direction opposite the first direction causes an axial translation of the drive head away from the interior.

4. The pod of claim 1, wherein the drive head comprises a sealing element that limits fluid flow between the drive head and the seal member when the drive head is in its engaged position.

5. The pod of claim 4, wherein the sealing element comprises an o-ring.

6. The pod of claim 4, wherein the sealing element of the drive head is spaced apart from the seal member when the drive head is in its disengaged position.

7. The pod of claim 6, wherein air is allowed to enter to the pod once a substantial seal is broken and the air is used to aid in stirring of the cooled food or drink and a production of overrun.

8. The pod of claim 1, wherein the at least one ingredient for forming the single serving of the cooled food or drink is disposed within the interior of the substantially rigid container.

9. The pod of claim 1, wherein the drive head is rotationally coupled to the mixing paddle by a permanent connection.

10. The pod of claim 9, wherein the drive head is molded to the mixing paddle.

11. The pod of claim 1, wherein the drive head is rotationally coupled to the mixing paddle by a friction connection that is formed by engaging one or more grooves of the drive head onto complementary one or more edges of the mixing paddle.

12. The pod of claim 1, wherein the drive head comprises a cylindrical section that is configured to center the drive head and the mixing paddle in the pod when the threaded connection is disengaged.

13. The pod of claim 1, wherein the mixing paddle contacts a lip of the substantially rigid container when the drive head is in its disengaged position.

14. The pod of claim 1, wherein the mixing paddle comprises bent portions mated to the drive head for providing the rotational coupling between to the drive head and the mixing paddle.

* * * * *